(12) United States Patent
Doering et al.

(10) Patent No.: US 9,296,387 B2
(45) Date of Patent: *Mar. 29, 2016

(54) METHODS AND SYSTEMS FOR TRANSITIONING BETWEEN DRIVELINE BRAKING MODES

(71) Applicant: Ford Global Technologies, LLC, Dearborn, MI (US)

(72) Inventors: Jeffrey Allen Doering, Canton, MI (US); Alex O'Connor Gibson, Ann Arbor, MI (US); Dennis Craig Reed, Dexter, MI (US); Adam Nathan Banker, Canton, MI (US); David Oshinsky, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,086

(22) Filed: Jan. 20, 2015

(65) Prior Publication Data

US 2015/0133264 A1   May 14, 2015

Related U.S. Application Data

(63) Continuation of application No. 13/776,263, filed on Feb. 25, 2013, now Pat. No. 8,938,327.

(60) Provisional application No. 61/643,154, filed on May 4, 2012.

(51) Int. Cl.
*B60W 20/00* (2006.01)
*B60W 10/196* (2012.01)
(Continued)

(52) U.S. Cl.
CPC ............ *B60W 20/1062* (2013.01); *B60L 8/003* (2013.01); *B60L 11/14* (2013.01); *B60L 11/1861* (2013.01); *B60L 15/2009* (2013.01); *B60L 15/2045* (2013.01); *B60L 15/2081* (2013.01); *B60W 10/02* (2013.01); *B60W 10/06* (2013.01);
(Continued)

(58) Field of Classification Search
CPC .............. B60W 10/196; B60W 20/00; B60W 30/18127; B60W 20/1062; B60L 8/003; B60L 11/14; B60L 11/1861; B60L 15/2009; B60L 15/2045; B60L 15/2081; B60L 2400/216; B60L 2240/12; B60L 2240/421; B60L 2240/423; B60L 2240/441; B60L 2240/443; B60L 2240/507; B60L 2240/622; B60L 2240/72; B60L 2250/26; B60L 2260/52; B60L 2260/54
USPC ........................ 701/22, 36, 67, 102; 477/2–9; 180/65.1–65.29
See application file for complete search history.

(56) References Cited

U.S. PATENT DOCUMENTS 4,708,030 A   11/1987   Cordner
5,993,350 A   11/1999   Lawrie et al.
(Continued)

FOREIGN PATENT DOCUMENTS

EP   1582737 A2   3/2005
GB   2468906 A1   9/2010

*Primary Examiner* — Richard Camby
(74) *Attorney, Agent, or Firm* — David Kelley; Alleman Hall McCoy Russell & Tuttle LLP

(57) ABSTRACT

Systems and methods for improving operation of a hybrid vehicle are presented. In one example, a method for transitioning between regenerative braking and engine braking is described.

20 Claims, 47 Drawing Sheets

(51) Int. Cl.

| | | |
|---|---|---|
| *B60W 30/18* | (2012.01) | |
| *B60L 8/00* | (2006.01) | |
| *B60L 11/14* | (2006.01) | |
| *B60L 11/18* | (2006.01) | |
| *B60L 15/20* | (2006.01) | |
| *B60W 10/06* | (2006.01) | |
| *B60W 10/08* | (2006.01) | |
| *B60W 10/02* | (2006.01) | |
| *B60W 10/11* | (2012.01) | |
| *B60W 10/30* | (2006.01) | |
| *B60L 7/18* | (2006.01) | |

(52) U.S. Cl.
CPC ............... *B60W 10/08* (2013.01); *B60W 10/11* (2013.01); *B60W 10/196* (2013.01); *B60W 10/30* (2013.01); *B60W 20/00* (2013.01); *B60W 20/30* (2013.01); *B60W 30/18027* (2013.01); *B60W 30/18127* (2013.01); *B60W 30/18136* (2013.01); *B60L 7/18* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2240/622* (2013.01); *B60L 2240/72* (2013.01); *B60L 2250/26* (2013.01); *B60L 2260/52* (2013.01); *B60L 2260/54* (2013.01); *B60W 20/104* (2013.01); *B60W 20/40* (2013.01); *B60Y 2400/216* (2013.01); *Y02T 10/642* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7083* (2013.01); *Y02T 10/7283* (2013.01); *Y02T 10/7291* (2013.01); *Y02T 90/16* (2013.01); *Y02T 90/162* (2013.01); *Y02T 90/163* (2013.01); *Y10S 903/902* (2013.01); *Y10S 903/93* (2013.01); *Y10S 903/946* (2013.01); *Y10S 903/947* (2013.01); *Y10T 477/24* (2015.01); *Y10T 477/26* (2015.01); *Y10T 477/865* (2015.01)

(56) References Cited

U.S. PATENT DOCUMENTS

| | | |
|---|---|---|
| 6,599,214 B2 | 7/2003 | Swales |
| 6,821,223 B2 | 11/2004 | Henry |
| 7,021,409 B2 | 4/2006 | Tamor |
| 8,036,815 B2 | 10/2011 | Okumoto et al. |
| 8,152,682 B2 | 4/2012 | Swales et al. |
| 8,591,361 B2 | 11/2013 | Hisada et al. |
| 8,808,140 B2 | 8/2014 | Reed et al. |
| 8,813,881 B2 | 8/2014 | Gibson et al. |
| 8,882,634 B2 | 11/2014 | Banker et al. |
| 8,886,425 B2 | 11/2014 | Doering et al. |
| 8,892,289 B2 | 11/2014 | Reed et al. |
| 8,892,290 B2 | 11/2014 | Reed et al. |
| 8,894,541 B2 | 11/2014 | Gibson et al. |
| 8,924,061 B2 | 12/2014 | Reed et al. |
| 8,924,062 B2 | 12/2014 | Reed et al. |
| 8,928,418 B2 | 1/2015 | Ainspan et al. |
| 8,932,179 B2 | 1/2015 | Banker et al. |
| 8,965,616 B2 | 2/2015 | Gibson et al. |
| 8,977,449 B2 | 3/2015 | Gibson et al. |
| 8,998,771 B2 | 4/2015 | Pietron et al. |
| 2002/0111239 A1 | 8/2002 | Swales |
| 2009/0312144 A1 | 12/2009 | Allgaier et al. |
| 2010/0299053 A1 | 11/2010 | Okumoto et al. |
| 2011/0056450 A1 | 3/2011 | Notani |
| 2011/0092334 A1 | 4/2011 | Baino et al. |
| 2011/0137544 A1 | 6/2011 | Kawazu et al. |
| 2011/0172901 A1 | 7/2011 | Okumoto et al. |
| 2011/0224858 A1 | 9/2011 | Bissontz |
| 2012/0083385 A1 | 4/2012 | Smith et al. |
| 2012/0083952 A1 | 4/2012 | Smith et al. |
| 2013/0291830 A1 | 11/2013 | Doering et al. |
| 2013/0296101 A1 | 11/2013 | Doering et al. |
| 2013/0296102 A1 | 11/2013 | Banker et al. |
| 2013/0296119 A1 | 11/2013 | Reed et al. |
| 2013/0296121 A1 | 11/2013 | Gibson et al. |
| 2013/0296123 A1 | 11/2013 | Doering et al. |
| 2013/0296124 A1 | 11/2013 | Pietron et al. |
| 2013/0296125 A1 | 11/2013 | Gibson et al. |
| 2013/0296126 A1 | 11/2013 | Gibson et al. |
| 2013/0296132 A1 | 11/2013 | Doering et al. |
| 2013/0297115 A1 | 11/2013 | Doering et al. |
| 2013/0297117 A1 | 11/2013 | Lee et al. |
| 2013/0297122 A1 | 11/2013 | Gibson et al. |
| 2013/0297157 A1 | 11/2013 | Pietron et al. |
| 2013/0297187 A1 | 11/2013 | Doering et al. |

METHODS AND SYSTEMS FOR TRANSITIONING BETWEEN DRIVELINE BRAKING MODES

CROSS REFERENCE TO RELATED APPLICATIONS

The present application is a continuation of U.S. patent application Ser. No. 13/776,263, entitled "METHODS AND SYSTEMS FOR TRANSITIONING BETWEEN DRIVELINE BRAKING MODES," filed on Feb. 25, 2013, now U.S. Pat. No. 8,938,327, which claims priority to U.S. Provisional Patent Application Ser. No. 61/643,154, entitled "METHODS AND SYSTEMS FOR A VEHICLE DRIVELINE," filed on May 4, 2012, the entire contents of each which are hereby incorporated by reference for all purposes.

FIELD

The present description relates to a system and methods for improving drivability and fuel economy of a vehicle. The methods may be particularly useful for engines that are selectively coupled to an electrical machine and a transmission.

BACKGROUND AND SUMMARY

A hybrid vehicle may provide regenerative driveline braking to slow a vehicle. During regenerative braking, a vehicle's kinetic energy may be converted to electrical energy. The electrical energy is stored in an energy storage device where it may be held until it is needed to supply power to the vehicle or perform some other function. The energy storage device may have capacity constraints so that it may store a limited amount of electrical energy. Consequently, it may not be desirable to continue to convert the vehicle's kinetic energy into electrical energy even though conditions are favorable to produce electrical energy. The driveline may transition from a regeneration mode to an engine braking mode to maintain driveline braking when it is not desirable to continue regeneration. However, transitioning from regenerative braking to engine braking may produce driveline torque disturbances. Driveline torque disturbances may be especially noticeable if engine rotation has been stopped before engine braking is initiated.

The inventors herein have recognized the above-mentioned disadvantages and have developed a method for controlling driveline braking, comprising: providing driveline braking via an electric machine while rotation of an engine is stopped; operating the electric machine in a speed control mode in response to a request to provide driveline braking via the engine; starting the engine; accelerating the engine to a speed of the electric machine; and closing an open driveline disconnect clutch in response to engine speed substantially equaling electric machine speed.

By operating an electric machine in a speed control mode during a transition from regenerative braking to engine braking, it may be possible to reduce driveline torque disturbances. In particular, an electric machine may be operated in a speed control mode so that the electric machine can react to driveline speed variations caused by the torque variation. In other words, a torque change in the driveline may be reflected in the speed of the electric machine, and torque output of the electric machine may be adjusted to counter act torque that caused the change in driveline speed. In this way, driveline torque variation may be reduced so that driveline speed follows at a desired driveline speed.

The present description may provide several advantages. Specifically, the approach may reduce driveline torque disturbances of a hybrid driveline. Additionally, the approach may improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
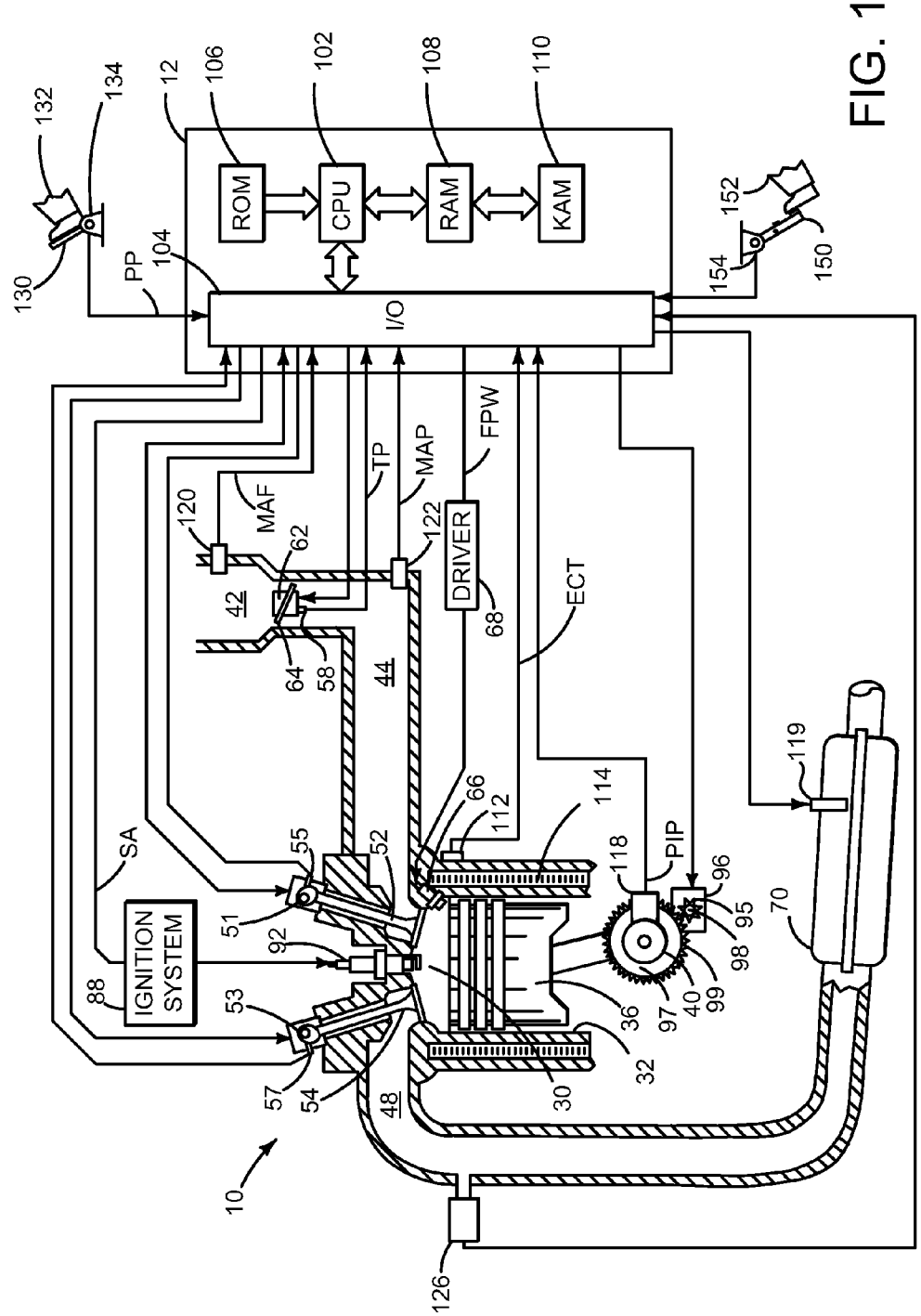
FIG. 1 is a schematic diagram of an engine.
Figure 2:
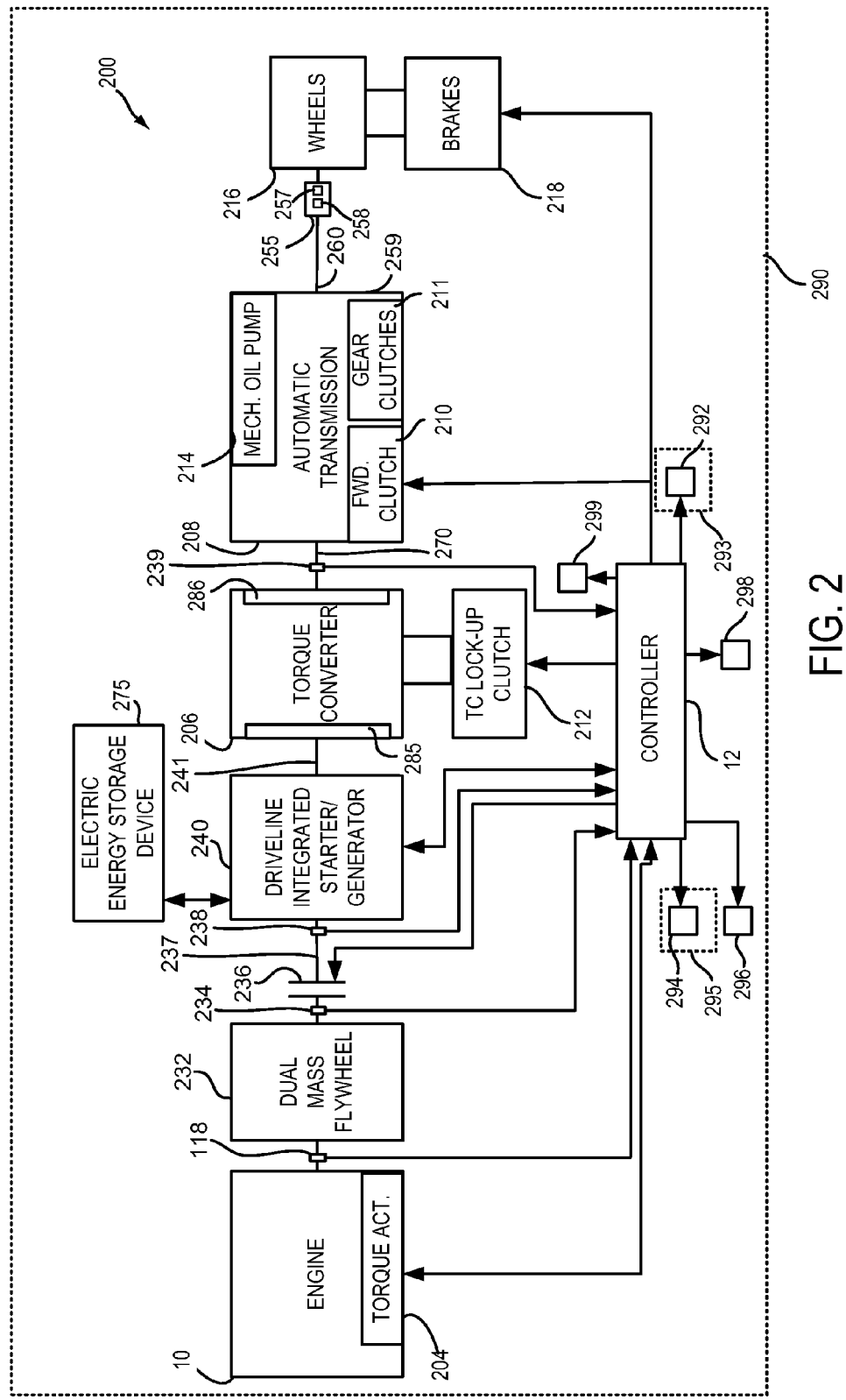
FIG. 2 is shows a first example vehicle driveline configuration.
Figure 3:
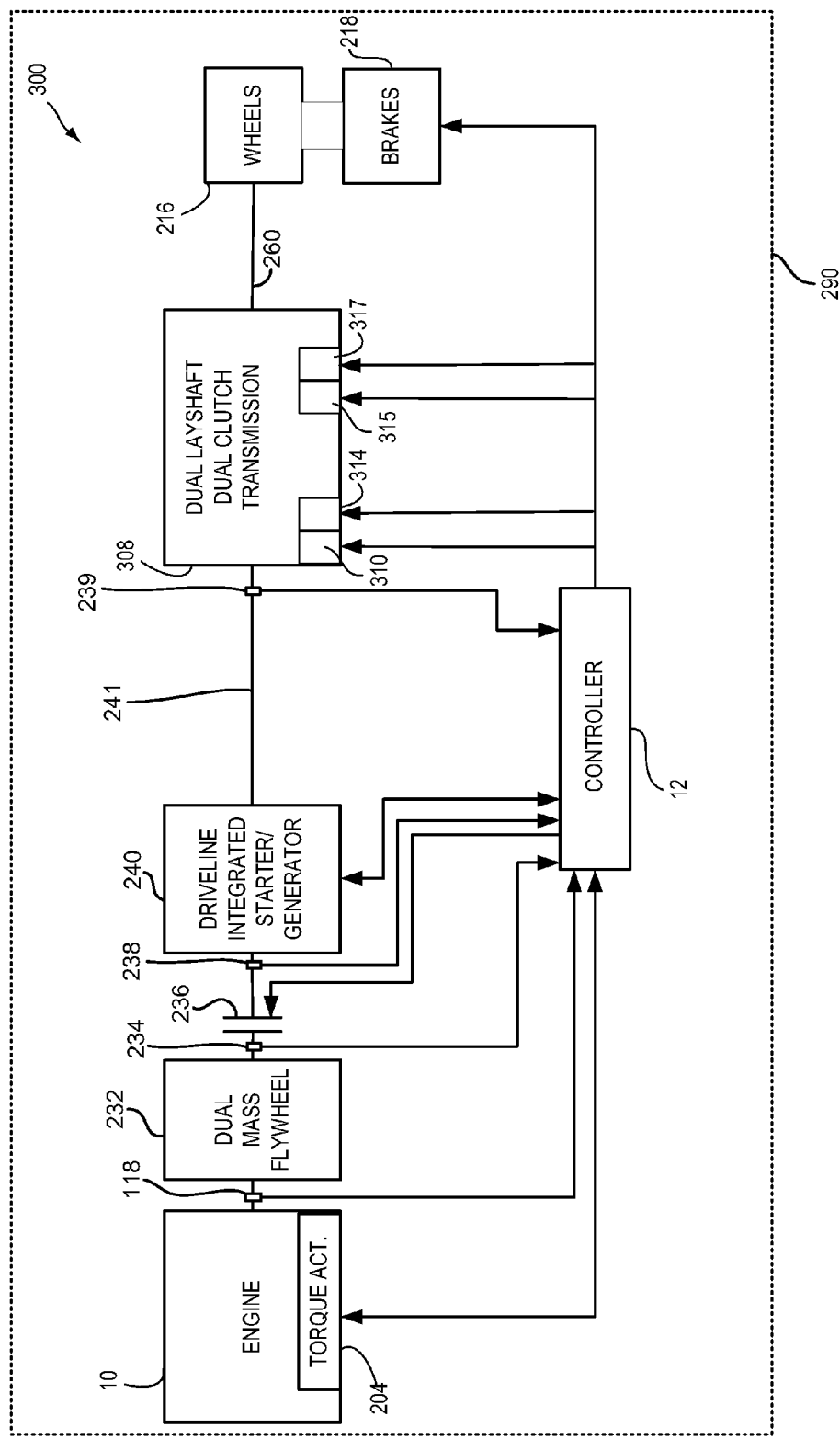
FIG. 3 is shows a second example vehicle driveline configuration.

The present description is related to controlling a driveline of a hybrid vehicle. The hybrid vehicle may include an engine and electric machine as shown in FIGS. 1-3. The engine may be operated with or without a driveline integrated starter/generator (e.g., an electric machine or motor that may be abbreviated DISG) during vehicle operation. The driveline integrated starter/generator is integrated into the driveline on the same axis as the engine crankshaft and rotates whenever the torque converter impeller rotates. Further, the DISG may not be selectively engaged or disengaged with the driveline. Rather, the DISG is an integral part of the driveline. Further still, the DISG may be operated with or without operating the engine. The mass and inertia of the DISG remain with the driveline when the DISG is not operating to provide or absorb torque from the driveline.

Figure 4:
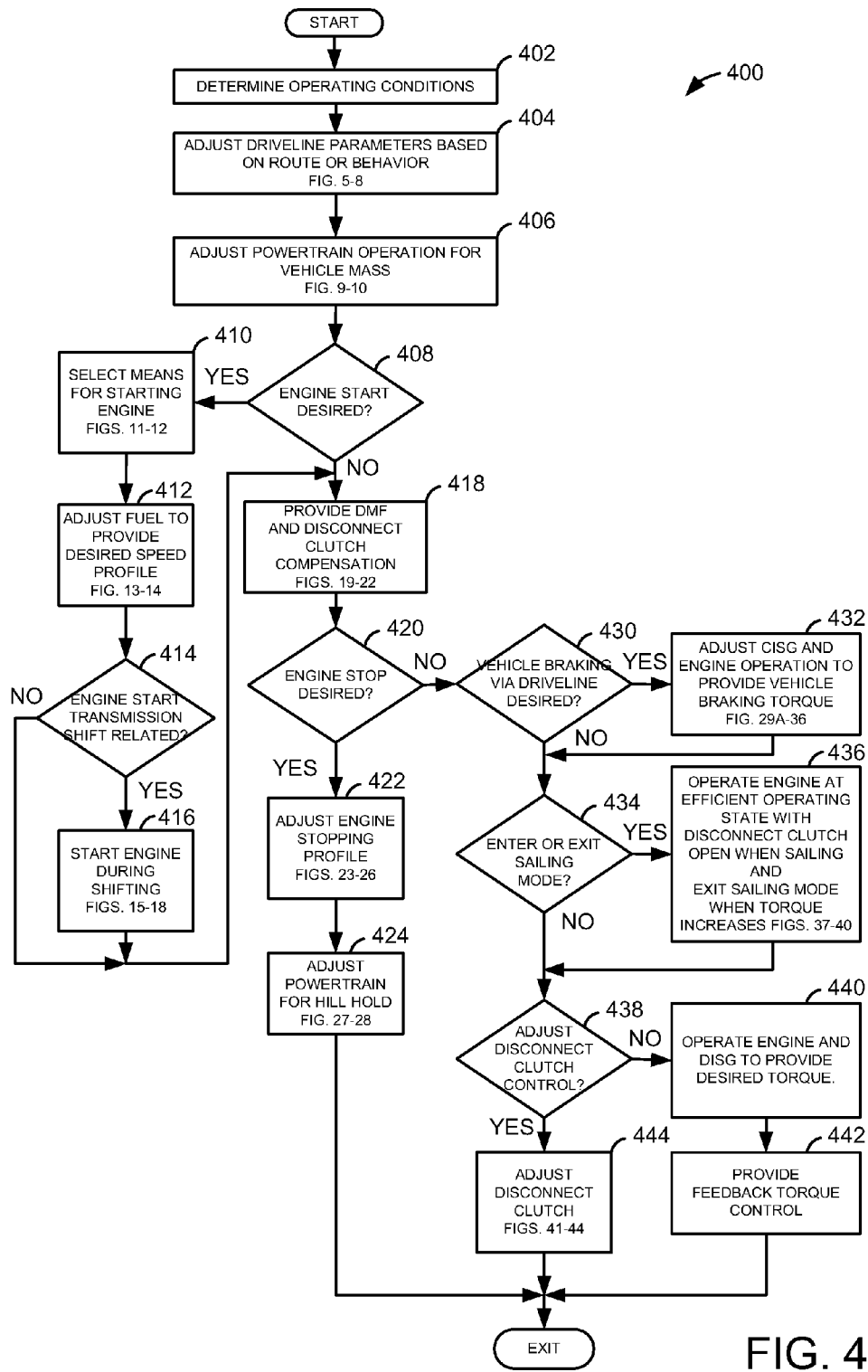
FIG. 4 is a flowchart showing one example of operating a vehicle driveline with the methods described in the subsequent figures.
Figure 45:
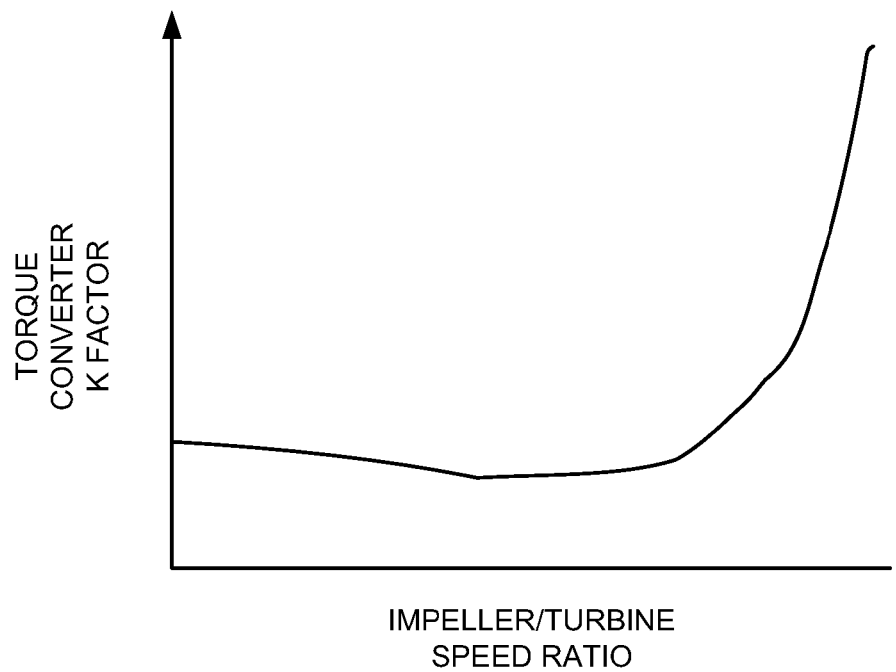
FIGS. 45-48 show prophetic functions for describing or modeling a transmission torque converter.
Figure 46:
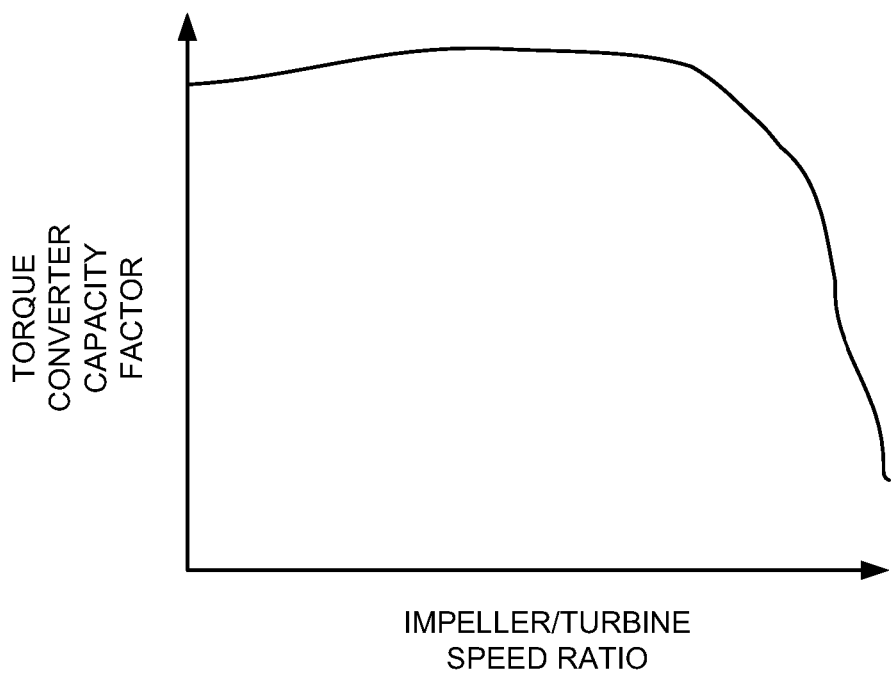
Figure 47:
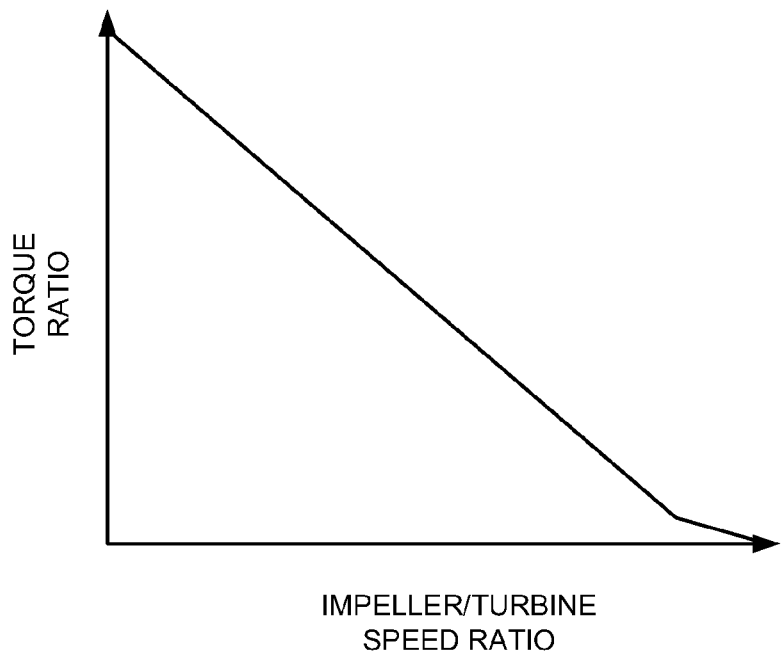

The driveline may be operated according to the method of FIG. 4. In some examples, the driveline may be operated based on a driving route and vehicle mass as described in FIGS. 5-10. The engine may be started according to the methods shown in FIGS. 11 through 18. Driveline component compensation may be provided as described in FIGS. 19-22. Fuel may be conserved by selectively stopping the engine as described in FIGS. 23-28. The driveline may also enter a regeneration mode as described in FIGS. 29A-36 where the vehicle's kinetic energy is converted in to electrical energy. The electrical energy may be subsequently used to propel the vehicle. During some conditions, the vehicle driveline may enter a sailing mode where the engine is operated but not mechanically coupled to the DISG or the transmission or vehicle wheels as described in FIGS. 37-40. Operation of the driveline disconnect clutch may be adapted as shown in FIGS. 41 through 44. The methods described herein may be used together at the same time so as to operate in a system that performs multiple methods. Finally, FIGS. 45-47 show prophetic functions for describing a transmission torque converter.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Starter 96 may be described as a lower power starting device. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst, a particulate filter, a lean NOx trap, selective reduction catalyst, or other emissions control device. An emissions device heater 119 may also be positioned in the exhaust system to heat converter 70 and/or exhaust gases.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force and/or position applied by foot 132; a position sensor 154 coupled to brake pedal 150 for sensing force and/or position applied by foot 152; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2 and 3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 in vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Driveline disconnect clutch 236 may be electrically or hydraulically actuated. A position sensor 234 is positioned on the driveline disconnect clutch side of dual mass flywheel 232 to sense the output position and speed of the dual mass flywheel 232. In some examples, position sensor 234 may include a torque sensor. The downstream side of driveline disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a power output that is greater than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the driveline disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter impeller speed and position may be determined via sensor 238. Torque converter turbine speed and position may be determined via position sensor 239. In some examples, 238 and/or 239 may be torque sensors or may be combination position and torque sensors.

When torque converter clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter clutch 212 is fully engaged, the engine output torque is directly transferred via the torque converter clutch to an input shaft 270 of transmission 208. Alternatively, the torque converter clutch 212 may be partially engaged, thereby enabling the amount of torque directly relayed to the transmission to be adjusted. The controller 12 may be configured to adjust the amount of torque transmitted by torque converter 206 by adjusting the torque converter clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Output shaft 260 delivers torque from transmission 308 to wheels 216 via differential 255 which includes first gear 257 and second gear 258. Automatic transmission 208 may transfer an input driving torque at the input shaft 270 responsive to a vehicle traveling condition before transmitting an output driving torque to the wheels 216.

Further, a frictional force may be applied to wheels 216 by engaging wheel friction brakes 218. In one example, wheel friction brakes 218 may be engaged in response to the driver pressing his foot on a brake pedal (not shown). In other examples, controller 12 or a controller linked to controller 12 may apply engage wheel friction brakes. In the same way, a frictional force may be reduced to wheels 216 by disengaging wheel friction brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from DISG windings as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch (es) to the transmission case 259 and vehicle frame as described in U.S. patent application Ser. No. 12/833,788 "METHOD FOR CONTROLLING AN ENGINE THAT MAY BE AUTOMATICALLY STOPPED" which is hereby fully incorporated by reference for all intents and purposes. A transmission clutch pressure may be varied (e.g., increased) to adjust the engagement state of a transmission clutch, and provide a desired amount of transmission torsion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 12 may reactivate the engine by resuming combustion in cylinders. As further elaborated with reference to FIGS. 11-18, the engine may be started in a variety of ways.

Vehicle 290 may also include front 294 and rear 292 windscreen heaters. Windscreen heaters 294 and 292 may be electrically operated and embedded within or coupled to the vehicle's front and rear windscreens 295 and 293. Vehicle 290 may also include lights 296, which may or may not be visible to the driver while the driver is operating vehicle 290. Vehicle 290 may also include an electrically operated fuel pump 299 that supplies fuel to engine 10 during selected conditions. Finally, vehicle 290 may include an electric heater 298 that selectively supplies heat to air in a vehicle cabin or ambient air outside vehicle 290.

Referring now to FIG. 3, a second example vehicle driveline configuration is shown. Many of the elements in driveline 300 are similar to the elements of driveline 200 and use equivalent numbers. Therefore, for the sake of brevity, the description of elements that are common between FIG. 2 and FIG. 3 is omitted. The description of FIG. 3 is limited to elements that are different from the elements of FIG. 2.

Driveline 300 includes a dual clutch-dual layshaft transmission 308. Transmission 308 is essentially an automatically operated manual transmission. Controller 12 operates first clutch 310, second clutch 314, and shifting mechanism 315 to select between gears (e.g., $1^{st}$-$5^{th}$ gears) 317. First clutch 310 and second clutch 314 may be selectively opened and closed to shift between gears 317.

The systems of FIG. 1-3 may include torque sensors that may be the basis for adjusting driveline operation. Alternatively, the torque converter itself may be used as the torque sensor when the torque converter clutch 212 is fully disengaged. Specifically, the torque output of an open torque converter is a function of the input and output speeds, the impeller and turbine speeds where the impeller in the torque converter input and the turbine the torque converter output. In the application of FIGS. 2/3, the impeller speed is equal to the measured DISG speed, as the DISG rotor output shaft is the impeller input shaft and the turbine speed is measured and used in the control of the transmission clutch control.

Additionally, given an input and output speed characterization of the open torque converter, the torque output of the open torque converter can be controlled by controlling the torque converter impeller speed as a function of the torque converter turbine speed. The DISG may be operated in speed feedback mode to control torque converter torque. For example, the commanded DISG speed (e.g., same as torque converter impeller speed) is a function of the torque converter turbine speed. The commanded DISG speed may be determined as a function of both the DISG speed and the turbine speed to deliver the desired torque at the torque converter output.

Drive line disturbances in the systems of FIGS. 1-3 may also be reduced via the driveline disconnect clutch. One example approach opens the torque converter clutch prior to actuating the driveline disconnect clutch. For example, the driveline disconnect clutch may be opened when the engine is commanded to shutdown, either during a vehicle regenerative braking condition and/or when the vehicle comes to a stop and the engine is shutdown.

In another example, during regenerative braking, the driveline disconnect clutch may be open, the engine may be stopped, and the torque converter may be locked in order to increase the braking torque that can be absorbed in the DISG 240. After the engine is shutdown, the driveline disconnect clutch remains open until the beginning of the engine restart process. During the engine restart, the driveline disconnect clutch may be partially closed to crank the engine until the first combustion event in a cylinder. Alternatively, the driveline disconnect clutch may be partially closed until the engine reaches a predetermined speed after combustion in a cylinder is initiated. Once the engine combustion is sufficiently restarted and the engine and driveline disconnect clutch speed are sufficiently close (e.g., within a threshold RPM value), the driveline disconnect clutch capacity is ramped up to close and hold without slip. During driveline disconnect clutch ramping, torque disturbances at the driveline disconnect clutch output may be present. Consequently, torque feedback from the open torque converter or a torque sensor may be the basis for adjusting a DISG speed setting. Operating the DISG in speed control mode may allow desired torque values to be maintained with more consistency until the driveline disconnect clutch is fully closed. After the driveline disconnect clutch is closed, the torque converter clutch (TCC) may be locked based on a lock-up schedule (e.g., TCC may be actuated based on accelerator pedal position and vehicle speed).

In this way, the torque converter clutch may be fully opened prior to the beginning of the engine restart process. The torque converter clutch may be closed after the engine has restarted and the driveline disconnect clutch has fully closed. Additionally, while the driveline disconnect clutch is being closed, pressure to the driveline disconnect clutch is known (as it is being commanded by the controller) and thereby an estimate of the average driveline disconnect clutch torque is available. To further enhance the operation, this estimate of the driveline disconnect clutch torque, or capacity, can be used by the controller as a feed-forward input to the DISG feedback speed control to improve the disturbance rejection response. The driveline disconnect clutch capacity which is based on a torque estimate may then be added as an input to an inner torque feedback loop in the electric machine (DISG). The inner loop is an inner current loop which may be the basis for improving the response of the DISG when the DISG is in speed feedback mode.

In this way, one example approach for operating a vehicle having a powertrain, such as the powertrain described with regard to FIGS. 2-3, includes first operating with the vehicle stopped or with a speed below a threshold, and with the engine at rest and the driveline disconnect clutch open. Next, with the torque converter fully unlocked, the method includes receiving a request to launch the vehicle, such as based on an operator pedal input increasing past a threshold amount. In response, the engine is cranked and started with one or more of the DISG 240 and a starter motor while the driveline disconnect clutch is closed, again with the torque converter still unlocked. During this operation, torque feedback from the torque converter input/output speeds is used to estimate the torque at shaft 241, which is compared with a desired torque value and it provides adjustment to a speed setting of the DISG 240, which is in speed control mode. For example, the speed setting may be an adjustment parameter that drives torque error between estimated and desired torque at shaft 241 toward zero.

In addition to the above operation, additional control actions can also be taken, particularly with regard to lash crossing. For example, when the driver tips-in while the vehicle is in a regeneration mode with the engine off (e.g., at rest), the driveline transitions from negative torque to positive torque, the engine is started, and the driveline disconnect clutch closes, with all of these actions being coordinated so as to introduce minimal torque disturbances at the wheels. Under selected conditions, these actions are carried out while maintaining the transmission 208 at a fixed gear (e.g., without changing transmission gear). However, the starting of the engine and the crossing of the lash can generate such disturbances. As such, during the transition the driveline torque may be controlled from small negative to a small positive torque during lash crossing and then to the demanded torque. Such limitation of engine torque, however, can introduce delay in delivering the driver demanded torque, which when added to the delay of restarting the engine, can cause considerable driver dissatisfaction.

In one approach, coordination of the torque converter bypass clutch 212 capacity and the DISG 240 output may be used. For example, timing of converting the DISG from torque control to speed control may be aligned with engine restarting conditions and transition through the lash region to reduce disturbances to the driveline caused by the engine starting and crossing through the lash region.

In one example, operation is provided for conditions where the driver is applying the brake and the vehicle is in a regeneration mode, the engine is off, the driveline disconnect clutch fully open, and the DISG is absorbing torque. The DISG is generating a desired level of braking torque (and storing generated electricity in the battery, for example). During these conditions, the driveline is undergoing negative torque and the torque converter bypass clutch 212 is locked. The amount of negative torque at the DISG may be increased and applied through the driveline so as to increase regeneration. The amount of negative torque may be based on a desired wheel braking torque for the present operating conditions. The negative braking may be based on a degree to which the driver is actuating a brake. However, negative braking may also occur while the operator has both the brake pedal and accelerator pedal released.

When the driver releases the brake (if it was applied) and tips-in to the accelerator pedal, the vehicle transitions to engine on operation with positive driveline torque delivering a demanded torque level. As noted above, during this transition, with no transmission gear changes, the torque crosses through zero torque (lash zone) and the engine is cranked and started. The inventors herein have recognized that the engine cranking torque disturbance is upstream of the clutch 212, but the lash disturbance is downstream of the clutch 212. The capacity of clutch 212 may be coordinated with the speed of the DISG to reduce these driveline disturbances.

For example, the TCC 212 capacity may be reduced enough to allow controlled slip as the regeneration torque is decreased. Such operation may help to isolate the driveline from the engine cranking torque disturbance. As the DISG regeneration torque transitions from the current value down towards zero torque, the driveline may transition from a large negative torque down to near zero torque. Near zero torque, the driveline may enter the lash region. The control of the DISG is then switched from torque control mode to speed control mode and the torque converter impeller speed (Ni) is adjusted to a fixed speed above the torque converter turbine speed (Nt).

Adjusting torque converter impeller speed this way provides a small positive torque during the crossing of the lash region and reduces the disturbance to the driveline associated with crossing the lash region. The DISG desired speed may be increased to provide torque to the wheels and provide some vehicle acceleration. An estimate of the amount of torque required to crank the engine may be determined by the controller to provide a feed-forward DISG torque command. The feed-forward DISG torque command may reduce speed disturbances at the torque converter impeller as the driveline disconnect clutch is engaged and the engine is cranked. The capacity of the driveline disconnect clutch is adjusted to reduce driveline disturbances. Once the engine has started and the driveline disconnect clutch is closed, the engine may be transitioned into torque control and deliver the desired torque.

As described above herein with regard to the system of FIGS. 1-3, for example, torque disturbances may occur when the driveline disconnect clutch is actuated. Torque disturbances may lead to degraded drivability and NVH. For example, torque disturbances (e.g., due to a clutch actuation error, or clutch stick-slip, or an error between the commanded and actual engine torque) at the driveline disconnect clutch output may be transferred to the transmission input and to the wheels as a function of the transmission clutch state (e.g., degree of engagement of the driveline disconnect clutch, such as based on pressure or slip ratio) and the transmission gear ratio.

The torque produced by the DISG 240 may in some examples be a function of three phase current. The torque at the DISG output shaft 241 is a sum of DISG output torque and the torque at the DISG or electric machine input. The DISG may be commanded by a powertrain control module (e.g., controller 12) to operate in either a speed feedback mode or a torque mode. The controller provides the commanded speed or torque. The controller or an inverter uses feedback of either the DISG speed sensor or the DISG current to produce the desired speed or torque.

For example, DISG torque may be output from a function or table that includes empirically determined values of DISG torque based on DISG speed and current. In some designs the DISG output is connected to a launch clutch which is modulated during shift events to shape or smooth the torque output of the DISG before it is transferred to the wheels. In other applications, the DISG output is connected to a torque converter 206 with a lock-up clutch. In designs that use a launch clutch instead of a torque converter, the ability of the launch clutch to accurately and rapidly control the clutch torque at low torque levels may be challenging. For example, the launch clutch may slip in the presence of the maximum torque output of the engine plus DISG. Therefore, the launch clutch may be designed with a high torque capacity. However, it may be difficult to accurately control the launch clutch at low torque levels that may be used during an engine restart and during vehicle launch from zero and/or low vehicle speeds.

One approach to adjust or control a launch clutch is to use a torque sensor that is mounted on the launch clutch input shaft. The torque sensor installation deposits a shaped magnetic layer on the launch clutch input shaft which generates a voltage output that is proportional to shaft torque. The voltage is read by a non-contacting sensor(s) and sensing system. The torque signal from the torque sensor can then be used to operate the DISG in a closed loop torque feedback mode to cancel torque disturbances that appear at the driveline disconnect clutch output (DISG input). If the automatic transmission uses a torque converter clutch at the transmission input, a torque sensor may be mounted on the torque converter input shaft. The torque converter input shaft torque sensor may be used to provide feedback in the DISG controller to reject torque disturbances transmitted by the driveline disconnect clutch.

As described herein, the engine may be shutdown, to zero speed (and the driveline disconnect clutch opened), to reduce fuel consumption when the operator releases the accelerator pedal. Therefore, the engine is shutdown when the vehicle is coming to a stop or another other time when the torque from the DISG is sufficient to accelerate the vehicle or overcome the road load. When the operator applies the accelerator pedal and the desired torque exceeds that which the DISG can provide, the engine is restarted to supplement the DISG output torque. In addition, the engine can be restarted during a coasting condition if the battery state of charge drops below a minimum threshold. The engine may be restarted to provide positive driveline torque and to provide torque to allow the DISG to operate as a generator to recharge the battery. During the engine restart process, either the driveline disconnect clutch or a separate starter motor may be used to crank the engine depending on operating conditions as described herein. Once combustion commences in the engine, either the engine is accelerated to match the input speed of the DISG, or the driveline disconnect clutch engagement/slip is controlled by controlling the clutch pressure to pull the engine up to the DISG input speed. As the driveline disconnect clutch closes, a large torque disturbance may be generated at the driveline disconnect clutch output which may then be transmitted to the DISG output. A torque disturbance can be potentially transmitted to the transmission output and the wheels, thereby degrading vehicle drivability and NVH.

Various approaches may be used to reduce the impact of this engine restart torque disturbance, such as those that have already been described herein. Alternatively, or additionally, one method to reduce the amplitude of the engine restart torque disturbance at the driveline disconnect clutch output is to match the engine crankshaft speed to the driveline disconnect clutch output, or DISG (as the two are connected by a shaft) speed, before the driveline disconnect clutch is closed. Such an approach makes use of the driveline disconnect clutch output torque to driveline disconnect clutch speed difference relationship. In particular, the driveline disconnect clutch output torque is effectively multiplied by the sign of the driveline disconnect clutch input and output speed difference. For example, it is approximately equal to the sign (crankshaft speed−DISG speed). The closer these speeds are matched, the lower the driveline disconnect clutch output torque.

While such an approach can be used to reduce the driveline disconnect clutch output toque disturbance, it operates to accelerate the engine speed to driveline disconnect clutch output speed. The driveline disconnect clutch output speed may vary from 750 to 3,000 RPM. Accelerating the engine to a speed in this range may delay engine-powered launch and the response to a driver tip-in. For example, until the driveline disconnect clutch is closed, the engine either provides no torque at the transmission input or acts as a drag (e.g., if crankshaft speed<DISG speed, then the driveline disconnect clutch output torque is negative). If the driver tips-in (e.g., depressed the accelerator pedal) and the DISG does not have sufficient torque capacity at the present DISG speed, then the desired torque may not be provided until the driveline disconnect clutch is closed and the engine is able to provide a positive torque.

Thus, under some conditions, is may be desirable to use to the driveline disconnect clutch to pull the engine speed up to the DISG speed to more rapidly close the driveline disconnect clutch and provide positive engine torque at the DISG output. The difficulty with closing the driveline disconnect clutch while the engine is accelerating to the DISG speed is that the torque at the driveline disconnect clutch output is a function of sign (crankshaft speed−DISG speed). If the DISG is being used to accelerate the crankshaft and dual mass flywheel inertia, then the difference between the engine combustion torque and the DISG torque that is applied to achieve a given acceleration level will appear at the DISG output as a negative torque that will then suddenly change sign to a positive torque when the crankshaft (or dual mass flywheel output) speed exceeds the DISG speed.

A change in the driveline disconnect clutch output torque may create a torque spike at the DISG input which may be transferred to the transmission input and/or wheels. Therefore, the DISG can be operated as a torque disturbance rejection device to reduce the engine restart torque increase. The torque at the DISG output is the sum of the DISG output torque and the driveline disconnect clutch output torque. Control of the DISG may be based on detection of the torque disturbance at one or more of the driveline disconnect clutch output, at the DISG output, at the torque converter output, and/or at the transmission output. The torque sensor may allow the DISG to reject the torque disturbance directly. Such torque sensing can be provided by a non-contacting transmission shaft torque sensor.

If such a sensor is applied to the shaft between the driveline disconnect clutch and the DISG rotor, the sensed torque can be input to the DISG control to create an opposite torque to cancel the engine restart driveline disconnect clutch output torque spike. Alternatively, the torque sensor can be located on the shaft between the DISG rotor and the torque converter (or impeller). In such an example, the inertia and acceleration of the DISG rotor are included and accounted for in the disturbance rejection torque calculation. Further, a transmission input or output shaft torque sensor may be applied. If a transmission output shaft torque sensor is applied the disturbance rejection torque term may include compensation for the transmission inertias and optionally the clutch states.

Referring now to FIG. 4, a flowchart of an example method to operate a vehicle driveline with the methods of FIGS. 5-47 is shown. The method of FIG. 4 and subsequent methods may be stored as executable instructions in non-transitory memory of controller 12 shown in FIGS. 1-3. Further, vertical markers such as $T_0$-$T_8$ shown in FIG. 10 indicate times of interest during the following illustrated sequences.

At 402, method 400 determines operating conditions. Operating conditions may include but are not limited to torque demand, engine speed, engine torque, DISG speed and torque, vehicle speed, ambient temperature and pressure, and battery state of charge. Torque demand may be derived from accelerator pedal 130 and controller 12 of FIG. 1. Method 400 proceeds to 404 after operating conditions are determined.

At 404, method 400 adjusts driveline operation and operating parameters according to the methods of FIGS. 5-8. In particular, method 400 adjusts driveline operation in response to driving route conditions and/or driver behavior. Method 400 proceeds to 406 after driveline operation and operating conditions are adjusted.

Figure 9:
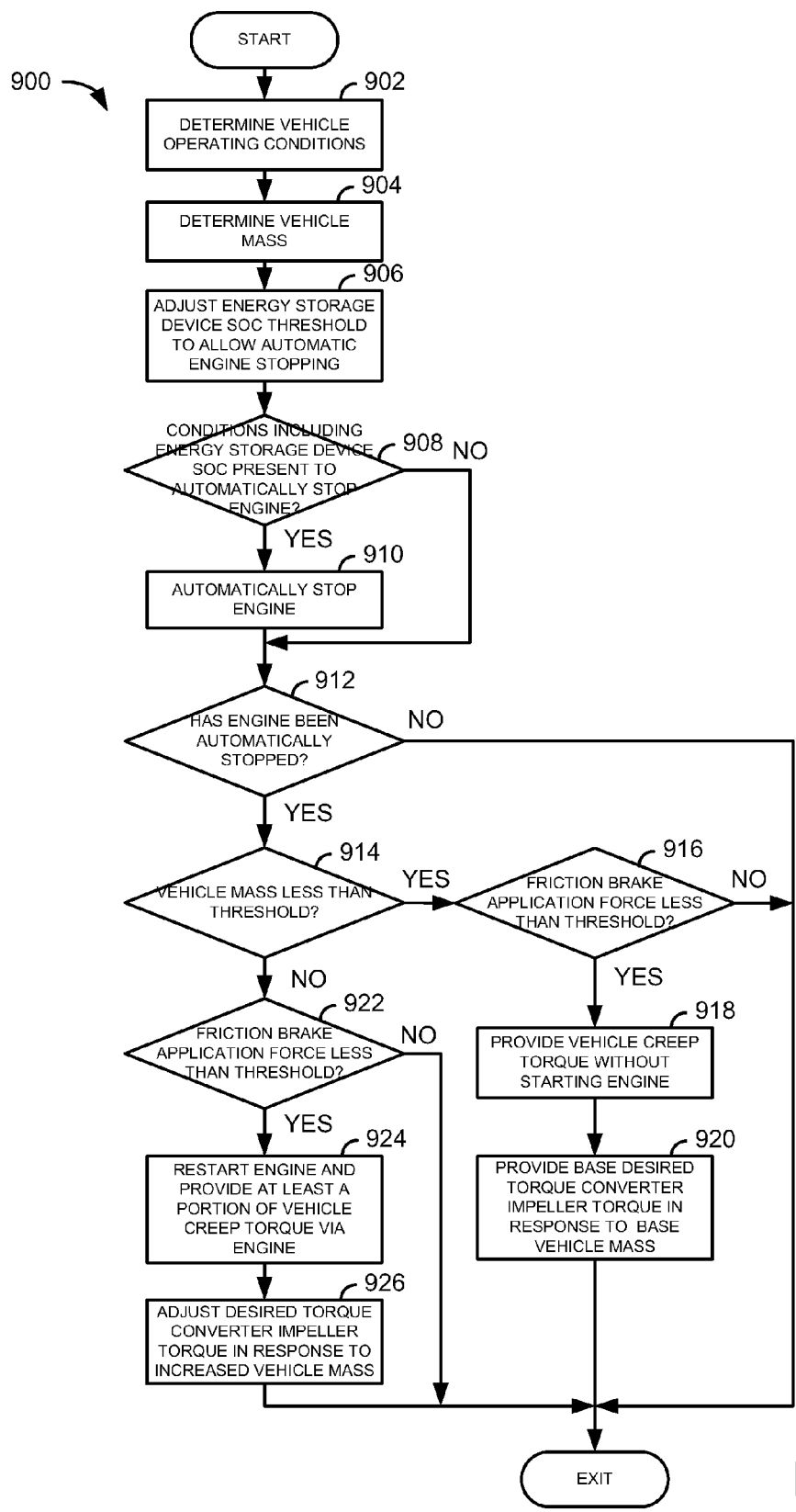
FIGS. 9 and 10 show a method and prophetic sequence for adjusting powertrain operation in response to vehicle mass.
Figure 10:
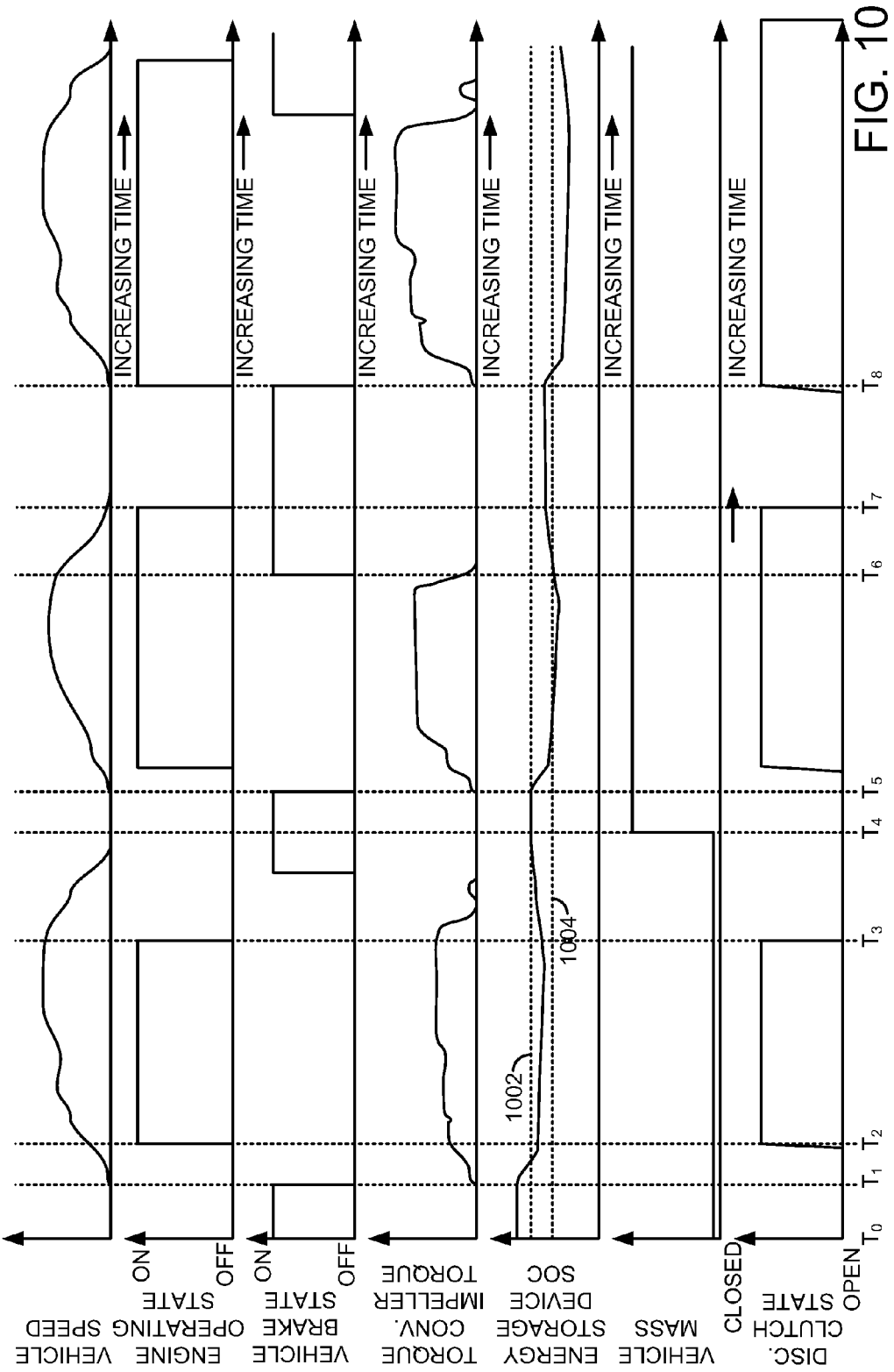

At 406, method 400 adjusts driveline or powertrain operation for vehicle mass as described in FIGS. 9 and 10. In one example, timing and conditions for engine stopping may be adjusted in response to vehicle mass so that driveline wear and the number of driveline disconnect clutch state changes may be reduced. Method 400 proceeds to 408 after driveline operation for vehicle mass is adjusted.

At 408, method 400 judges whether or not an engine start is desired. An engine start may be requested via an operator key or pushbutton input that has a sole function of requesting an engine start and/or stop. Alternatively, an engine restart may be automatically requested by controller 12 based on operating conditions not including driver operation of a device that has a sole function of requesting engine stopping or starting. For example, controller 12 may request an engine start in response to a driver releasing a vehicle brake pedal or in response to a battery state of charge. Thus, a request to restart the engine may be initiated via inputs that have functions other than solely requesting an engine start. If method 400 judges that an engine restart is requested, method 400 proceeds to 410. Otherwise, method 400 proceeds to 418.

Figure 11:
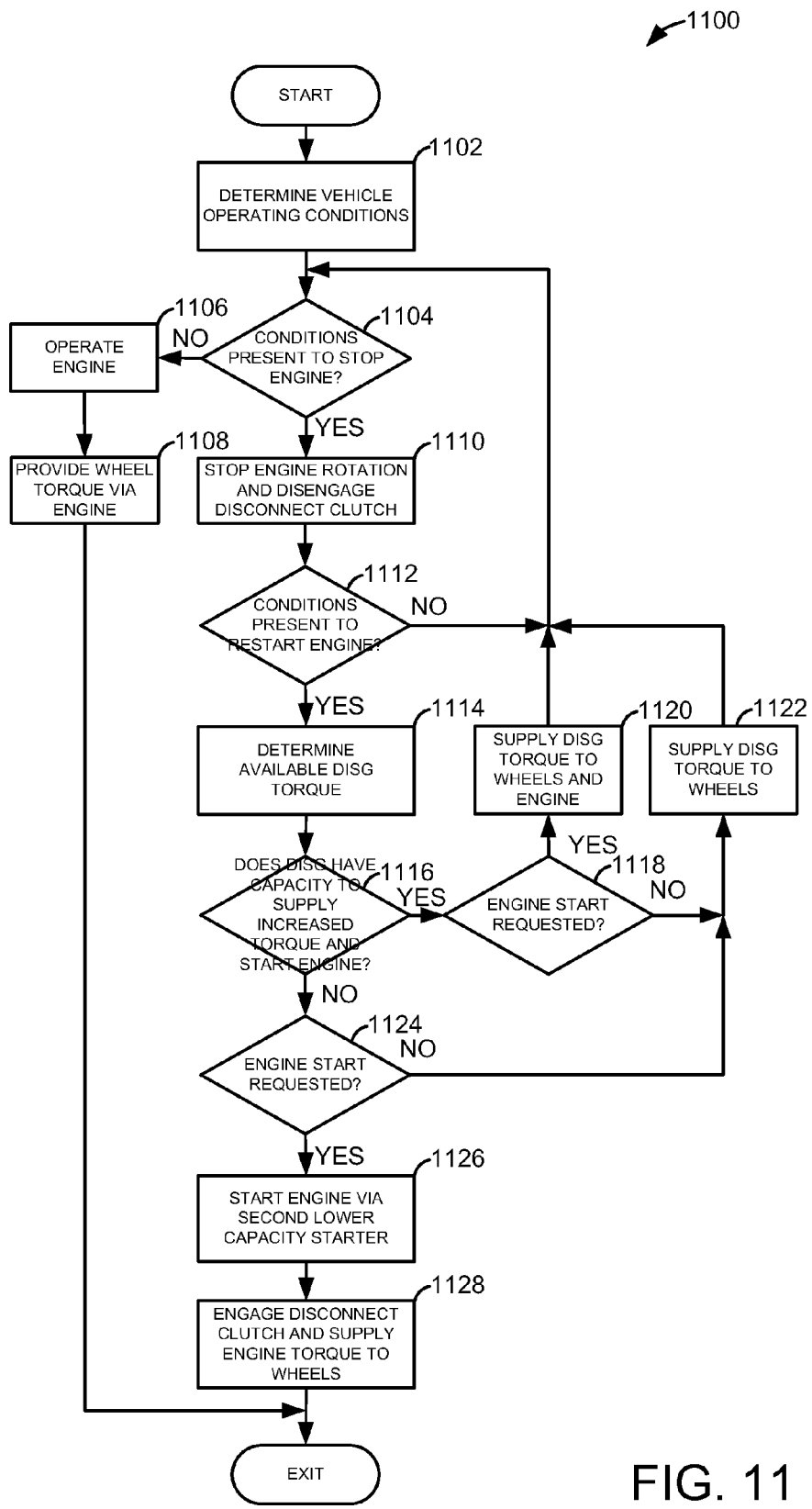
FIGS. 11 and 12 show a method and prophetic sequence for starting a hybrid vehicle.
Figure 12:
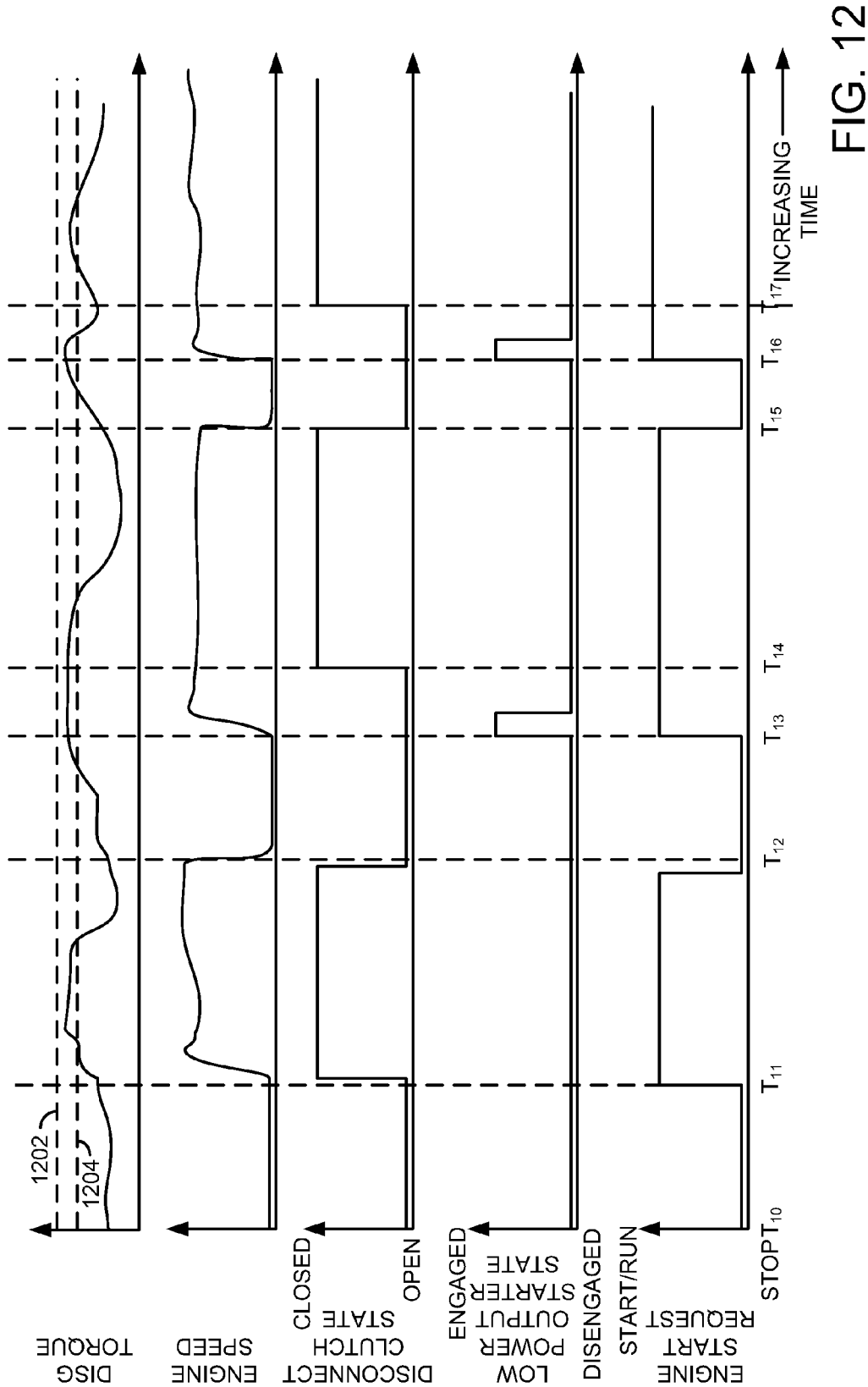

At 410, method 400 selects a device for starting an engine as described in FIGS. 11 and 12. In one example, the engine may be started via a starter that has a lower power output than the DISG. In another example, the engine may be started via the DISG while the starter with lower power output remains deactivated. Method 400 proceeds to 412 after the engine starting means is selected.

Figure 13:
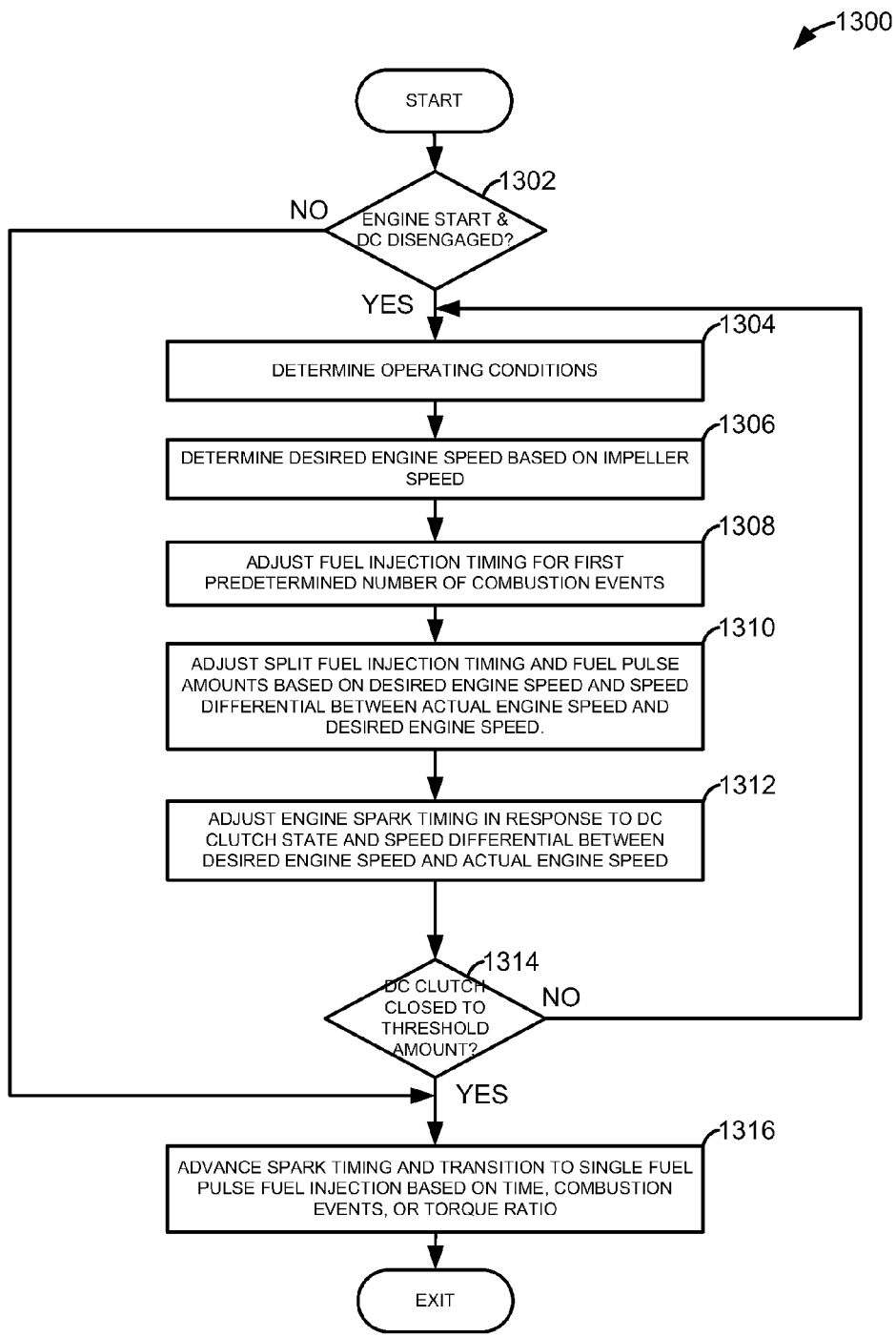
FIGS. 13 and 14 show a method and prophetic sequence for adjusting fuel to a hybrid powertrain during engine starting.
Figure 14:
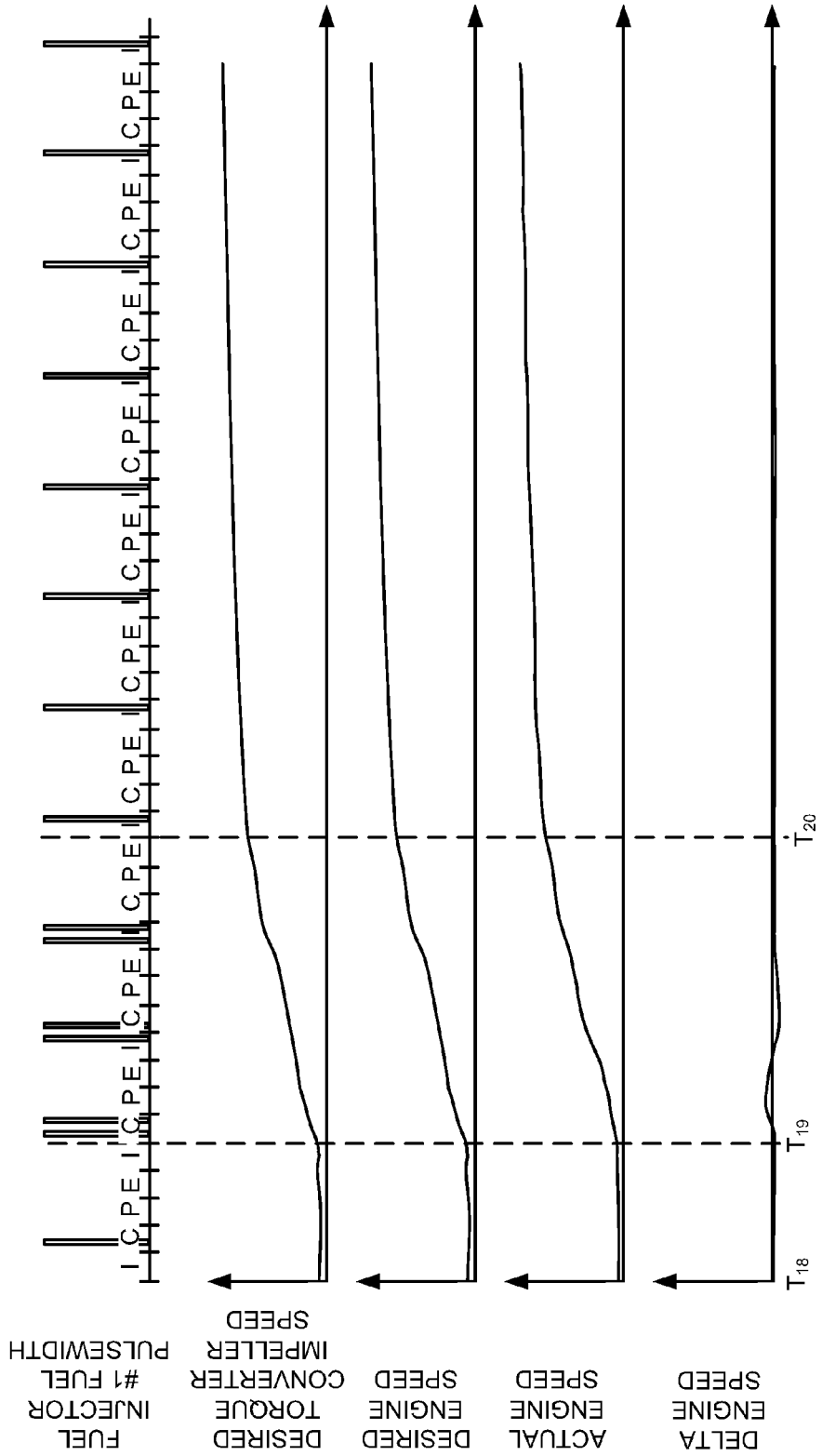

At 412, method 400 adjusts fuel injection timing of one or more direct fuel injectors supplying fuel to an engine as described in FIGS. 13 and 14. The fuel injection timing is adjusted to provide a single or multiple fuel injections during a cycle of a single cylinder. By adjusting the fuel injection timing, the engine speed profile during engine run-up (e.g., engine acceleration from cranking speed (e.g., 250 RPM)) to the desired engine idle speed. Method 400 proceeds to 414 after fuel injection timing is adjusted.

At 414, method 400 judges whether or not the engine start is transmission shift related. For example, method 400 judges if it is desirable to start the engine based on shifting from one transmission gear to another transmission gear. If method 400 judges that it is desirable to start the engine based on transmission shifting or forecasted transmission shifting, method 400 proceeds to 416. Otherwise, method 400 proceeds to 418.

At 416, method 400 starts the engine during transmission shifting as described in FIGS. 15-18. In one example, the engine may be started before gear clutches are opened or closed during a shift. Method 400 proceeds to 418 after starting the engine.

At 418, method 400 provides dual mass flywheel (DMF) compensation. Further, method 400 may provide driveline disconnect clutch compensation. DMF compensation may dampen torque transfer across the DMF by controlling the DISG torque and/or speed as well as driveline disconnect clutch torque. DMF compensation is provided as described in FIGS. 19-22. Method 400 proceeds to 420 once DMF compensation is initiated.

At 420, method 400 judges whether or not it is desirable to stop the engine from rotating. Method 400 may judge that it is desirable to stop the engine from rotating during low torque demand conditions and/or other conditions. Method 400 proceeds to 422 if it is judged desirable to stop the engine from rotating. Method 400 proceeds to 420 if it is judged not to stop the engine from rotating.

At 422, method 400 adjusts the engine stopping profile. In one example, engine speed during engine deceleration to zero rotational speed is adjusted so that the engine position at zero engine speed is desirable for restarting the engine. The engine stopping profile may be adjusted as described in FIGS. 23-26. Method 400 proceeds to 424 after the engine stopping profile has been selected and/or adjusted.

At 424, method 400 adjusts powertrain operation for hill holding conditions. In one example, the powertrain is selectively adjusted in response to vehicle road grade. Method 400 proceeds to exit after the powertrain is adjusted in response to vehicle road grade.

At 430, method 400 judges whether or not vehicle braking via the driveline is desired. Method 400 may judge that it is desirable to provide vehicle braking via the driveline when the vehicle is descending a hill or during other conditions. If method 400 judges that it is desirable to brake the vehicle via the driveline, method 400 proceeds to 432. Otherwise, method 400 proceeds to 434.

At 432, method 400 adjusts DISG and engine operation to provide a desired level of vehicle braking via the driveline as described in FIGS. 29A-36. In one example, vehicle braking is provided via the DISG when battery state of charge (SOC) is less than a threshold level. Method 400 proceeds to 434 after vehicle braking via the driveline is provided.

At 434, method 400 judges whether or not to enter or exit sailing mode. In one example, sailing mode may be described as when the engine is operating at sailing idle speed (e.g., combusting air and fuel) while the driveline disconnect clutch is open. The sailing idle speed is lower than the engine idle speed when engine is combusting an air-fuel mixture and the driveline disconnect clutch is closed. Additionally, the engine may be operated in an Atkinson cycle mode while in sailing mode. Further, in some examples spark timing may be advanced to near or at minimum spark timing for best engine torque (MBT). In one example, sailing mode may be entered when DISG torque is within a predetermined range of a threshold DISG torque. Method 400 proceeds to 436 if it is judged desirable to enter or exit sailing mode. Otherwise, method 400 proceeds to 438.

Figure 38:
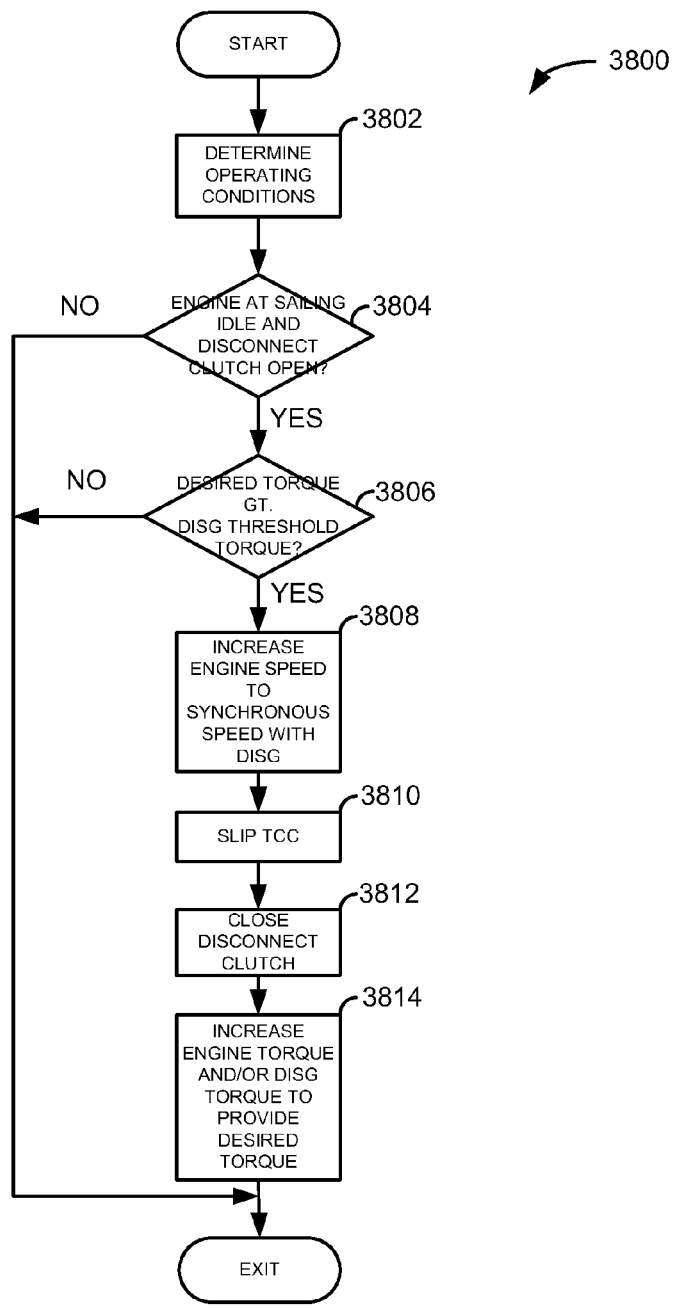

At 436, method 400 may operate the engine and driveline in a sailing mode where the engine operates at an efficient operating condition and where the driveline disconnect clutch is open while the DISG is providing torque to the vehicle driveline as described in FIG. 38. Alternatively, method 400 may exit the sailing mode as described in FIG. 39. Method 400 proceeds to 438 after sailing mode has been entered or exited.

At 438, method 400 judges whether or not to adjust the transfer function of the driveline disconnect clutch. In one example, method 400 judges whether or not to adapt the transfer function of the driveline disconnect clutch during selected conditions such as during engine idle or engine stop conditions. If method 400 judges that it is desirable to adjust the transfer function of the driveline disconnect clutch, method 400 proceeds to 444. Otherwise, method 400 proceeds to 440.

At 444, method 400 adjusts or adapts the transfer function of the driveline disconnect clutch as described in FIGS. 42-45. In one example, the driveline disconnect clutch transfer function describes the torque transfer of the driveline disconnect clutch based on torque input to the driveline disconnect clutch and the pressure supplied to the clutch (e.g., the hydraulic oil pressure supplied to the driveline disconnect clutch or the duty cycle of an electrical signal supplied to the driveline disconnect clutch). Method 400 proceeds to exit after the driveline disconnect clutch transfer function is adjusted or adapted.

At 440, method 400 operates the engine and DISG to provide a desired torque to the input of the transmission. In one example, the engine and DISG are operated depending on driveline torque demand provided by a driver and/or controller. For example, if 35 N-m of driveline torque at the torque converter impeller is requested the DISG may provide 10 N-m to the driveline while the engine provides the remaining 25 N-m to the driveline. Alternatively, the DISG or engine may provide all 35 N-m to the driveline. Operating conditions of the engine and/or DISG may also be considered to determine the amounts of torque output by the engine and DISG. Method 400 proceeds to 442 after the engine and DISG operating modes, speeds, and torques are output.

At 442, method 400 adjusts engine and DISG torque to provide a desired torque at the torque converter impeller. In one example, torque at the torque converter impeller is estimated via a torque sensor. In other examples, the torque converter operating state is a basis for estimating torque at the torque converter impeller. The torque converter impeller torque estimate is as described in FIG. 21. The estimated transmission impeller torque is subtracted from a desired transmission impeller torque to provide a torque converter impeller torque error. Engine torque and/or DISG torque are adjusted in response to the torque converter impeller torque error to reduce the torque converter impeller torque error toward zero. Method 400 proceeds to exit after the driveline torque is adjusted.

Figure 5:
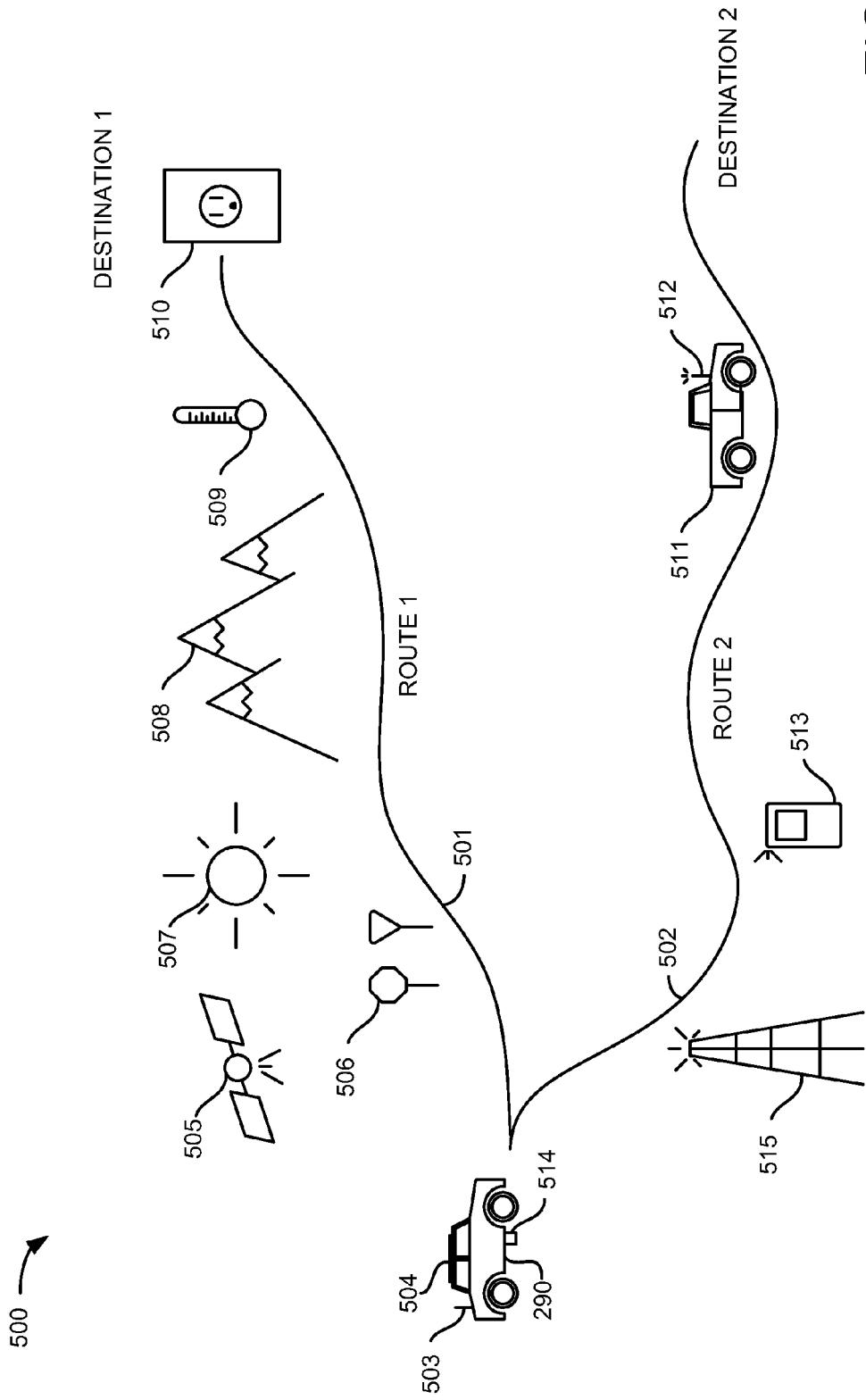
FIGS. 5-8 show flowcharts and conditions for operating a hybrid vehicle powertrain in response to driving route conditions.
Figure 6:
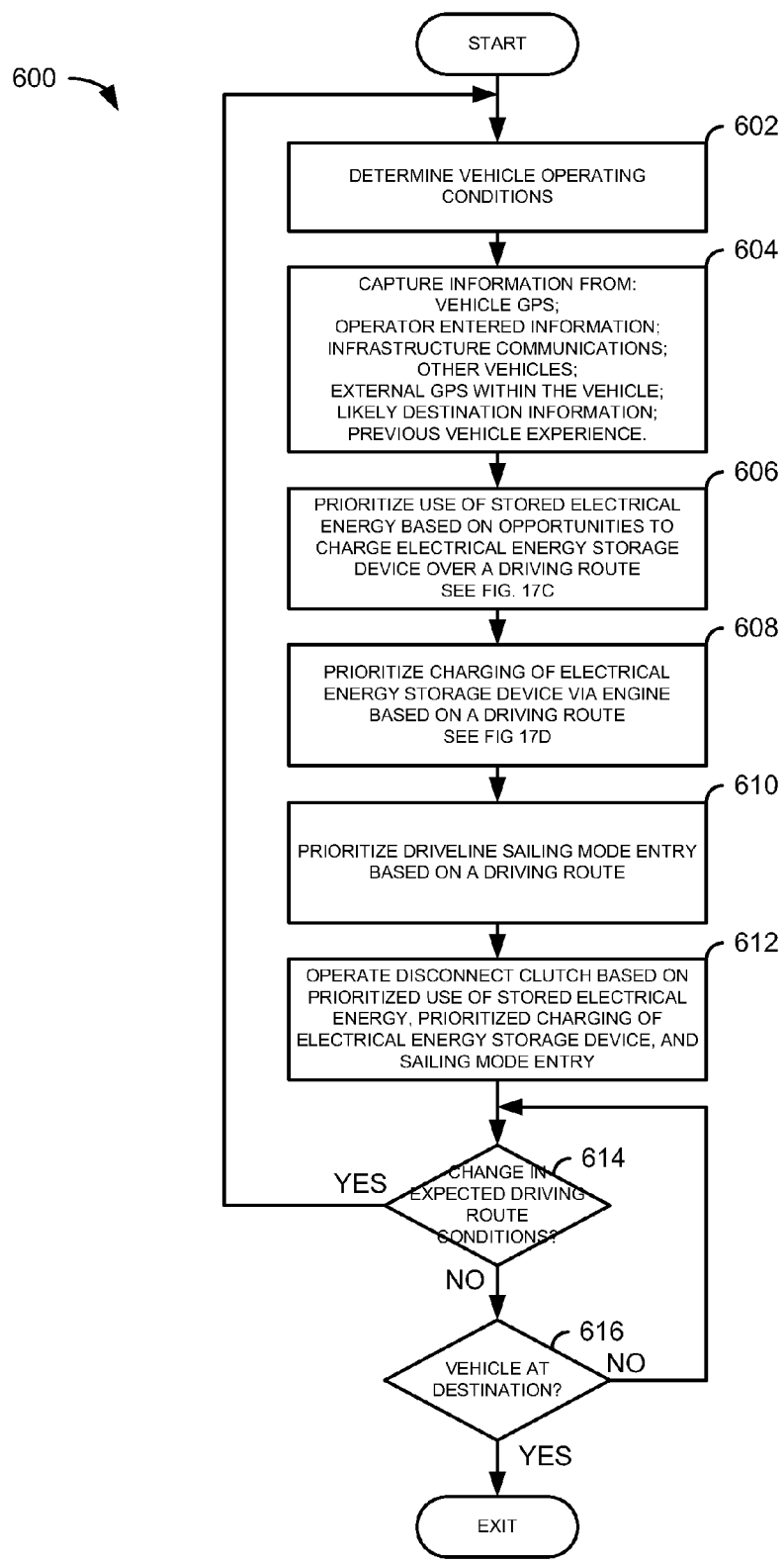

Referring now to FIG. 5, a schematic diagram of example information that may be encountered during driving from one location to another location is shown. The sources of information shown in FIG. 5 are available to the methods shown in FIGS. 6-8. Further, the sources of information and devices shown in FIG. 6 are available to the systems shown in FIGS. 1-3.

In this example, vehicle 290 may travel route number one 501 or route number two 502 to first and second destinations respectively. Vehicle 290 may include a solar charging system 504 for charging energy storage device 275 shown in FIG. 2. The solar charging system may include solar panels and other related devices. Additionally, vehicle 290 may include an inductive charging system 514 for charging energy storage device 275 shown in FIG. 2. Inductive charging system 514 may receive charge from a power source external to the vehicle while the vehicle is moving. Vehicle 290 also includes a receiver 503 for receiving signals that originate from external or within the vehicle 290.

Vehicle route number one includes several sources of information, objects, and elements that may be the basis for selectively operating certain driveline components. For example, vehicle 290 may receive global positioning system (GPS) information from satellite 505 during a course of a trip. The GPS system may provide information that allows processor 12, as shown in FIG. 1, to determine road grades and distances along route number one. Processor 12 may also store information regarding vehicle stops that are based on signs or signals 506 during a course of a trip so that when vehicle 290 travels route number one again the information is available to determine when the vehicle will stop, start, accelerate, decelerate, or cruise at a substantially constant speed (e.g., ±5 MPH).

Vehicle 290 may also estimate an amount of charge provided by solar system 504 via sun 507 during driving route number one to energy storage device 275. For example, if the vehicle begins to travel route number one making 1 watt/minute at 1:00 P.M. and it is expected that it will take one hour to travel route number one, it may be estimated that 60 watts will be produced during the course of traveling route number one. Further, the estimated power produced during the course of the trip may be adjusted based on the time of day and forecasted whether. For example, an amount of electrical power produced at specific time of day can be extrapolated to an amount of power that will be produced later that day based on empirically determined solar tables and the time of day.

Vehicle 290 may also record and store to memory or receive road conditions 508 from external sources such as GPS. Road conditions 508 may include road grade information, road surface information, and speed limits. Vehicle 290 may also receive or measure ambient temperature from temperature sensor 509. Temperature sensor 509 may be incorporated into vehicle 290 or it may be external to vehicle 290.

Finally on route number one, vehicle 290 may receive electrical power at power source 510. Power source 510 may be a residential or commercial power source that supplies power to vehicle 290 from an electrical grid at destination one. Vehicle 290 may have stored information including a stored database and/or information stored from previous trips to destination one that indicate vehicle 290 may be recharged at destination one. Such information is useful for determining how electric charge stored in vehicle 290 is used during the course of a trip.

In another example, vehicle 290 may travel to destination two via route number two. Vehicle 290 may be programmed to recognize that it is traveling to destination two. Along route number two, vehicle 290 may receive weather, road conditions, ambient temperature, and GPS data from infrastructure 515. Infrastructure may include but is not limited to radio broadcast towers and highway/road broadcast devices. Vehicle 290 may also receive road conditions from hand held devices 513 such as phones, computers, tablet devices, and/or personal organizers. In some situations, vehicle 290 may receive road conditions and destination information (e.g., availability of electrical charging stations) from other vehicles 511 that supply information via a transmitter 512.

Thus, a vehicle may receive information at the beginning of a trip and throughout the trip that may be a basis for controlling driveline operation. For example, the sources of information described in FIG. 5 may be the basis for operating driveline disconnect clutch 236, DISG 240, and engine 10 shown in FIG. 2.

Referring now to FIG. 6, a flowchart of a method for operating a hybrid powertrain in response to information encountered during driving from one location to another location is shown. The method of FIG. 6 may be stored in non-transitory memory as executable instructions in the system of FIGS. 1-3.

At 602, method 600 determines vehicle operating conditions. Vehicle operating conditions may include but are not limited to engine speed, vehicle speed, ambient temperature, driver demand torque (e.g., torque demanded by a driver via an input and may also be referred to as desired driveline torque in some examples), and energy storage device SOC. Further, operating conditions may include selecting a route to a destination based on driver input or by matching a present driving route to driving routes taken during previous trips. Method 600 proceeds to 604 after vehicle operating conditions are determined.

At 604, method 600 captures driving route information. Method 600 may receive driving route information such as road grade, traffic signal locations, speeds of other vehicle, traffic backup locations, electrical charging station locations, ambient temperature, and related traffic information from a variety of sources. The information sources may include but are not limited to internal memory of a controller in the vehicle, hand held personal devices (e.g., personal organizers, tablets, computers, phones), satellites, infrastructure, other vehicles, and traffic communication devices. In one example, a vehicle's driving route may be compared to driving routes stored in controller memory. If the vehicle's present driving route matches a driving route stored in controller memory, the controller selects the destination and driving conditions (e.g., traffic signals, road grade, charging facilities, etc.) from the driving route stored in memory without driver input. Method 600 proceeds to 606 after driving route information is captured.

Figure 7:
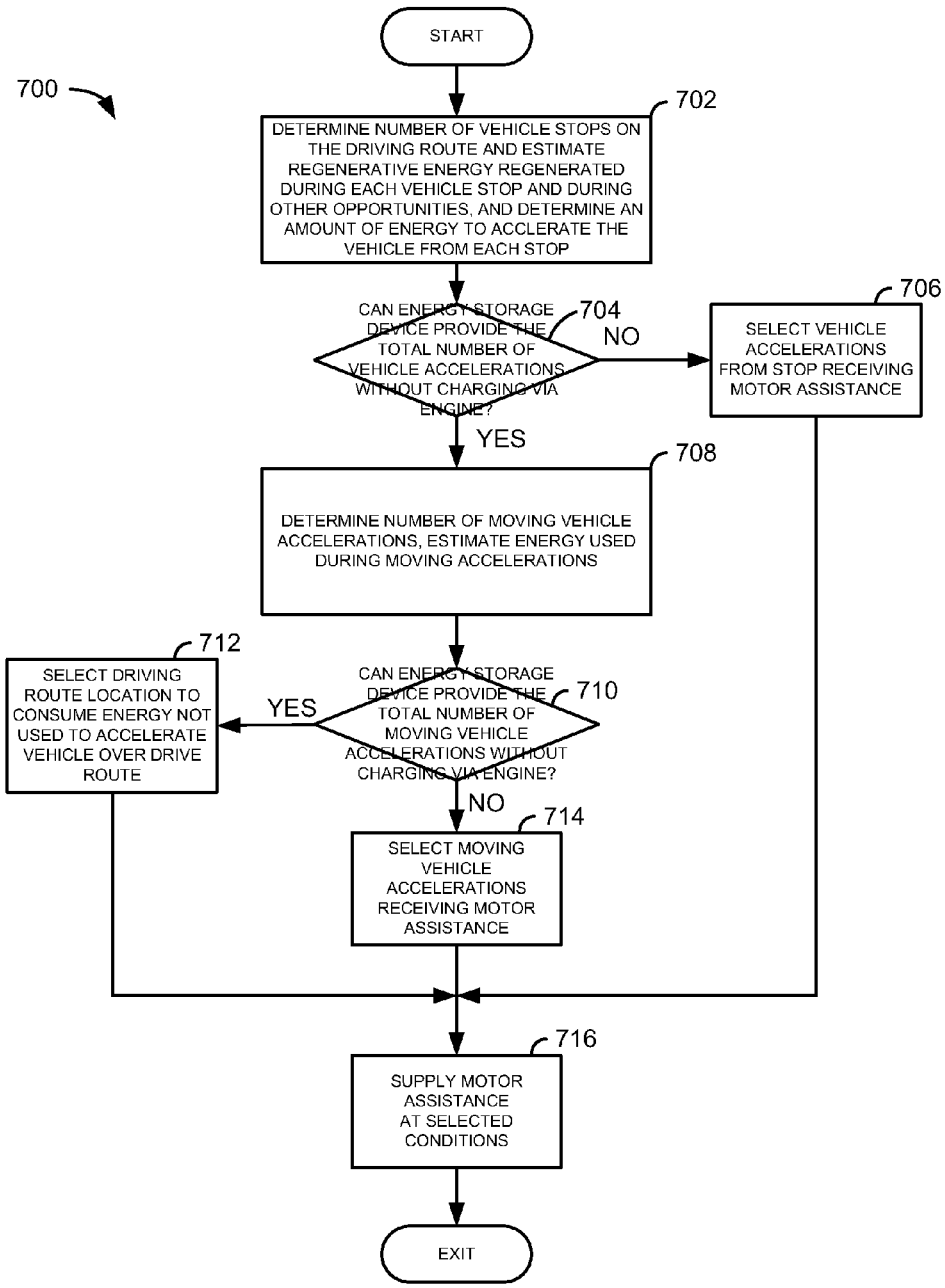

At 606, method 600 prioritizes use of stored electrical energy based on opportunities to charge the electrical energy storage device along a selected driving route. FIG. 7 shows one way to prioritize use of stored electrical energy. Prioritizing use of stored electrical energy may include only using electrical energy during selected vehicle accelerations so that hydrocarbon fuel usage may be reduced as compared to simply basing electrical energy use based on desired torque demand. Further, prioritizing use of stored electrical energy may include using substantially all available stored charge (e.g., reduce energy storage device charge down to a threshold amount of charge) in the electrical energy storage device when the vehicle is within a predetermined distance of a way of externally charging the energy storage device or during conditions where the energy storage device may be charged via kinetic energy (e.g., a hill descent). Method 600 proceeds to 608 after use of stored electrical energy is prioritized. In this way, method 600 schedules use of stored electrical energy before the vehicle arrives at driving route conditions that facilitate using the stored electrical energy.

Figure 8:
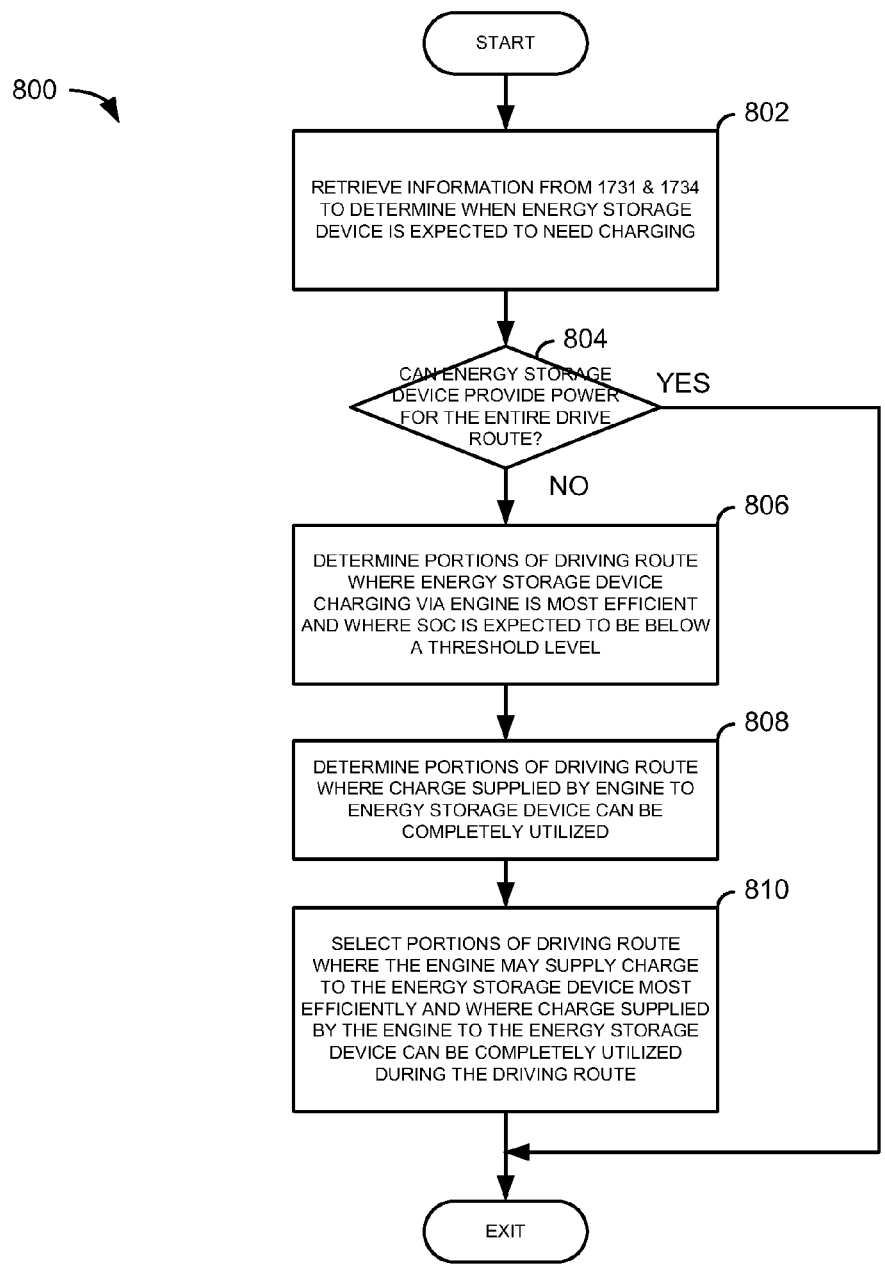

At 608, method 600 prioritizes charging of the electrical energy storage device via an engine based on a driving route. For example, method 600 may operate an engine to propel a vehicle when an energy storage device SOC is low. Further, method 600 may operate the engine without charging the energy storage device when method 600 determines that the energy storage device may be charged a short time later using the vehicle's kinetic energy during vehicle deceleration. FIG. 8 shows one way to prioritize charging the electrical energy storage device. Method 600 proceeds to 610 after electrical energy storage device charging has been prioritized. In this way, method 600 schedules electrical energy storage device charging before the vehicle arrives at driving route conditions that facilitate electrical energy storage device charging.

At 610, method 600 prioritizes driveline sailing mode entry based on the vehicle's driving route. In one example, method 600 retrieves information from 702 of method 700 to determine when the vehicle is expected to stop for less than a threshold amount of time. Further, method 600 may receive information pertaining to when the vehicle is expected to accelerate above a threshold rate after the vehicle stops for less than the threshold amount of time. Method 600 schedules entry into sailing mode (e.g., engine at idle, driveline disconnect clutch open, and DISG providing requested torque to the vehicle driveline) based on locations in the drive route where the vehicle is expected to stop for less than a threshold amount of time and where the vehicle is expected to accelerate from the vehicle stop at a rate that is greater than a threshold rate. Method 600 proceeds to 612 after sailing mode entry is scheduled. In this way, method 600 schedules sailing mode entry before the vehicle arrives at driving route conditions that facilitate sailing mode.

At 612, method 600 operates the driveline disconnect clutch, DISG, and engine based on scheduled and prioritized use of electrical energy stored in the energy storage device, prioritized charging of the electrical energy storage device via the engine, and sailing mode entry. In other words, method 600 may open and close the driveline disconnect clutch, operate the DISG, and operate the engine based on expected vehicle and road conditions along a driving route. For example, if method 600 schedules entry into sailing mode at a particular stop during a driving route, method 600 opens the driveline disconnect clutch and enters sailing mode when the vehicle stops at the particular location. Further, method 600 opens the driveline disconnect clutch when the DISG is scheduled to provide torque to accelerate the vehicle without assistance from the engine in response to prioritizing use of electrical energy stored in the electrical energy storage device. Further still, method 600 opens the driveline disconnect clutch in response to the vehicle being within a threshold distance before arriving at an electrical charging station so that energy from the electric storage device may be used to propel the vehicle rather than the engine and hydrocarbons. Additionally, method 600 may open the driveline disconnect clutch in response being within a threshold distance before arriving at a downhill grade. Method 600 proceeds to 614 after driveline disconnect clutch operation is scheduled and carried out based on vehicle and driving route conditions.

At 614, method 600 judges whether or not there has been a substantial change in driving route and/or vehicle conditions. A substantial change in driving route or vehicle conditions may be a presence of an unexpected condition (e.g., an extended vehicle stop or unexpected loss of battery charge) or absence of an expected condition (e.g., no vehicle stop when a vehicle stop is expected). If method 600 judges that there has been a change in driving route or vehicle conditions, the answer is yes and method 600 returns to 602 so that prioritization of stored electrical energy, energy device charging, and sailing mode entry may be determined again. Otherwise, the answer is no and method 600 proceeds to 616.

At 616, method 600 judges whether or not the vehicle is at its final destination for the trip. In one example, method 600 compares the vehicle's present location with a programmed destination. In another example, method 600 compares the vehicle's present location with an expected destination. If method 600 judges that the vehicle is at its destination, method 600 proceeds to exit. Otherwise, method 600 returns to 614.

In this way, operation of a hybrid powertrain may be adjusted according to a driving route and conditions along the driving route. Adjustments to the hybrid powertrain may include but are not limited to opening and closing a driveline disconnect clutch, charging an energy storage device via the engine, entering sailing mode, and entry and exit into or out of other driveline operating modes.

Referring now to FIG. 7, a flowchart of a method for prioritizing use of stored electrical energy in a hybrid vehicle is shown. The method bases use of stored electrical energy on opportunities to charge an electrical energy storage device over a driving route. The method of FIG. 7 may be stored in non-transitory memory as executable instructions in the system of FIGS. 1-3.

At 702, method 700 determines a number of vehicle stops and their locations on a driving route and estimates regenerative energy supplied to the electric energy storage device during vehicle stops and during other opportunities (e.g., vehicle decelerations and during hill decent). Method 700 may also estimate an expected amount of battery charging via a solar charging system. Further, method 700 determines a number of vehicle accelerations from stop and an estimate of electrical energy to accelerate from each vehicle stop. Additionally, method 700 may store information of vehicle stops that are less than a threshold time duration.

In one example, the number of vehicle stops and their locations are estimated based on a number of traffic signals and/or signs along the travel route as determined from the information sources described in FIG. 5. In particular, in one example, the number of vehicle stops is determined from the number of traffic signals and/or signs along a travel route multiplied by a value representing a reasonable percentage (e.g., 60%) of the traffic signals at which the vehicle will actually stop. The number of accelerations from stop equals the estimated number of vehicle stops. The amount of energy regenerated during each vehicle stop may be calculated based on vehicle speed before the stop, road grade, and vehicle mass (e.g., using $E=\frac{1}{2} mv^2$, where E is energy, m is vehicle mass, and v is vehicle velocity, or alternatively $F=m \cdot a+m \cdot g \cdot \sin(\Theta)$ over the time interval where m is vehicle mass, a is vehicle acceleration, g is acceleration due to gravity, and θ is the road angle which can be converted to grade). Likewise, the amount of energy to accelerate the vehicle may be calculated based on the speed limit, road grade, and vehicle mass (e.g., using $F=m \cdot a+m \cdot g \cdot \sin(\Theta)$ over the time interval, or $E=\frac{1}{2} mv^2$) and then converted into electrical charge. Further, energy obtained from solar or inductive devices along the route may be added to the total amount of charge available during driving the route. The number of traffic signals, their locations, and the road grade information may be determined via the information sources shown in FIG. 5. Method 700 proceeds to 704 after the number of vehicle stops, vehicle accelerations, energy regenerated, and energy used to accelerate the vehicle at each vehicle stop location is determined.

At 704, method 700 judges whether or not the energy storage device can provide energy to accelerate the vehicle to the speed limit after every vehicle stop determined at 702. In one example, the energy stored in the energy storage device plus the amount of regenerative energy estimated available along the driver route are added together. Driveline losses are subtracted from the sum of stored energy and regenerative energy and the result is compared to the amount of energy estimated to accelerate the vehicle from all vehicle stops. If the amount of energy to accelerate the vehicle from all vehicle stops is greater than the sum of stored energy and regenerative energy, it may be determined that engine assistance may be necessary along the drive route and that the energy storage device may not have sufficient power stored to complete the trip over the route. If the energy storage device may not have sufficient power to accelerate the vehicle from all stops along the selected route, the answer is no and method 700 proceeds to 706. Otherwise, the answer is yes and method 700 proceeds to 708.

At 706, method 700 selects which accelerations from stop will be performed using energy from the energy storage device. In other words, method 700 decides during which vehicle accelerations the DISG will provide torque to the driveline. In one example, the choice of vehicle accelerations where the DISG is operated is based on which accelerations from stop when combined require an amount of energy that most closely matches the amount of energy available from the energy storage device. For example, if at the beginning of a trip an energy storage device is storing X coulombs of charge, and the first twenty three vehicle accelerations are expected to use X coulombs of energy, the first twenty three vehicle accelerations will be provided via the DISG and the energy storage device. However, it should be noted that the selected vehicle accelerations do not have to be consecutive in order. Rather, individual vehicle accelerations powered via the DISG and energy storage device may be selected from any acceleration during the scheduled vehicle route.

In another example, the accelerations from vehicle stop where the DISG is operated with charge from the energy storage device are based on when energy from regeneration is available to charge the energy storage device and an expected amount of energy stored at the time of vehicle stopping. For example, if only a small amount of regenerative energy is expected during a vehicle deceleration and the energy storage device charge is expected to be less than a threshold level at a vehicle stop, the DISG is not scheduled to accelerate the vehicle from that particular vehicle stop. Method 700 proceeds to 716 after vehicle accelerations from vehicle stop where the DISG is operated with charge from the energy storage device are determined.

At 708, method 700 determines a number of and locations of vehicle moving accelerations not from vehicle stop. Method 700 also estimates an amount of energy to accelerate the vehicle during each moving vehicle acceleration. The locations and number of vehicle moving accelerations may be determined from where changes in speed limit over the course of the driving route occur. Thus, a number of moving vehicle accelerations may be determined from every increase in travel route posted speed limit. The change in vehicle route speed may be stored in a map database and retrieved from memory. Further, the vehicle route may be determined based on the shortest distance or time between the vehicle's present location and a requested destination.

Method 700 also determines the energy to accelerate the vehicle at each of the vehicle acceleration locations. The amount of energy to accelerate the vehicle may be calculated based on the speed limit, road grade, and vehicle mass (e.g., using $F=m \cdot a+m \cdot g \cdot \sin(\Theta)$ over the time interval, or $E=\frac{1}{2} mv^2$). Method 700 proceeds to 710 after the number of moving accelerations, locations of the moving vehicle accelerations, and energy estimated to accelerate the vehicle at each moving vehicle acceleration location is determined.

At 710, method 700 judges whether or not the energy storage device can provide energy to accelerate the vehicle to the speed limit after each moving vehicle acceleration is determined at 708. In one example, any remainder in the amount of energy stored in the energy storage device plus the amount of regenerative energy estimated to be available along the driver route minus the energy to accelerate the vehicle at each stop determined from 702 is compared to an amount of energy to accelerate the vehicle at all moving vehicle acceleration locations. If the amount of energy to accelerate the moving vehicle at each location is greater than the remainder from 702, it may be determined that engine assistance may be necessary along the drive route and that the energy storage device may not have sufficient power stored to provide electrical power over the route. If the energy storage device does not have sufficient power to accelerate the vehicle from all moving vehicle accelerations along the selected route, the answer is no and method 700 proceeds to 714. Otherwise, the answer is yes and method 700 proceeds to 712.

At 712, method 700 selects where during the driving route the remaining energy stored in the energy storage device and produced during regeneration (e.g., during vehicle deceleration) may be consumed. For example, if the energy storage device has X coulombs of charge remaining above a threshold amount of charge and a charging source is available at the vehicle destination, method 700 determines at what location along the drive route the remaining charge is consumed. In one example, consumption of the remaining charge stored in the energy storage device and not used to accelerate the vehicle is consumed beginning at a location that is based on the destination. For example, if it is expected that the vehicle will have Z coulombs of excess charge and the vehicle uses 1/Z coulombs per mile, the driveline disconnect clutch is opened and DISG begins discharging the Z coulombs Z miles away from the destination and the engine is stopped. In this way, method 700 lowers energy stored in the energy storage device in a way that may reduce hydrocarbon fuel consumption since consumed stored electrical energy is increased by consuming energy storage charge down to a threshold level of charge (e.g., a minimum battery charge level). Further, since the vehicle may be recharged via the grid at the destination, the energy storage device may be charged with power from a more efficient source than the engine.

On the other hand, if method 700 determines that there is no charging source at the destination, the driveline disconnect clutch is closed and the energy may remained stored in the electrical energy storage device. Method 700 proceeds to 716 after it is determined where excess charge not consumed during vehicle acceleration will be consumed.

At 714, method 700 selects which moving vehicle accelerations will be performed with energy from the energy storage device. In other words, method 700 decides during which moving vehicle accelerations (e.g., vehicle accelerations not from stop) the DISG will provide torque to the driveline. In one example, the choice of moving vehicle accelerations where the DISG is operated is based on which moving vehicle accelerations when combined require an amount of energy that most closely matches the amount of energy remaining after vehicle accelerations from vehicle stop are provided energy to accelerate the vehicle. For example, if at the beginning of a trip an energy storage device is storing X coulombs of charge, and there are twenty three vehicle accelerations from stop that are expected to use Y coulombs of energy (e.g., where Y is smaller than X), the first twenty three vehicle accelerations from vehicle stop will be provided via the DISG and the energy storage device. If Z coulombs are expected to be left after accelerating the vehicle at each stop, and the energy consumption sum of moving vehicle acceleration energy is greater than Z coulombs, the first moving vehicle accelerations taking up to Z coulombs of charge are provided the Z coulombs of charge. However, it should be noted that the selected moving vehicle accelerations where the excess charge is delivered do not have to be consecutive in order. Method 700 proceeds to 716 after moving vehicle accelerations receiving DISG assistance and charge from the energy storage device are selected.

At 716, method 700 schedules DISG assistance to the driveline to accelerate or to keep the vehicle moving based on the determined locations of accelerations and steady state energy use. The DISG assistance may be provided when the driveline disconnect clutch is in an open state or during a closed state. Further, the DISG may provide all or only a portion of the torque to propel the vehicle.

In this way, it is possible to schedule and prioritize use of stored electrical energy. In this example, vehicle accelerations from zero speed have a higher priority than moving vehicle accelerations or of using stored electrical energy during cruise conditions. Such operation may allow the engine to operate at more efficient operating conditions such as steady speed and load conditions.

Referring now to FIG. 8, a flowchart of a method for scheduling and prioritizing charging of an electrical energy storage device via an engine based on a driving route is shown. The method of FIG. 8 may be stored in non-transitory memory as executable instructions in the system of FIGS. 1-3.

At 802, method 800 retrieves information from 702 and 708 of FIG. 7 to determine when the electrical energy storage device is expected to need charging. In particular, if it is determined at 702 of FIG. 7 that the vehicle may not accelerate from all zero speed conditions, method 800 may determine that the electrical energy storage device needs to be recharged at a location of vehicle acceleration along the drive route where SOC is reduced to less than a threshold level. Likewise, method 800 may estimate where along the drive route SOC is reduced to less than a threshold level during a moving acceleration or during cruise conditions. Method 800 proceeds to 804 after determining when the electric energy storage device is expected to need recharging.

At 804, method 800 judges whether or not the electrical energy storage device has sufficient charge to propel the vehicle over the entire trip. In one example, the SOC is compared against an estimate of energy to operate the vehicle over the entire trip based on $F=m \cdot a + m \cdot g \cdot \sin(\Theta)$ over the time interval, or $E = \frac{1}{2} mv^2$. If method 800 judges that the electric energy storage device has sufficient stored charge to operate the DISG over the entire driving route, the answer is yes and method 800 proceeds to exit. Otherwise, the answer is no and method 800 proceeds to 806.

At 806, method 800 determines portions and locations of the driving route where charging the energy storage device via the engine will be most efficient and where the SOC is expected to be low. The SOC may be expected to be low at locations determined at 702, 708, and 714 of FIG. 7. The locations and portions of the driving route where charging the energy storage device may be most efficient may be based on empirically determined engine speeds and loads where the engine consumes least fuel for each mile driven. For example, if it is determined that the engine operates consuming least fuel for each mile driven at 2200 RPM between an engine load of 0.2 and 0.3, it may be determined that the energy storage device should be recharged via the engine at a vehicle speed where the engine is at 2200 RPM and between 0.2 and 0.3 load when the DISG is charging the energy storage device. Thus, in one example, method 800 selects locations and portions of the driving route to charge the energy storage device based on locations of roads having constant vehicle speeds (e.g., a 55 MPH speed limit) for extended durations (e.g., 10 miles) that correspond to efficient engine operating conditions. In some examples, vehicle speeds are selected where engine efficiency is expected to be greater than a threshold efficiency. The engine efficiency at a particular vehicle speed may be empirically determined and stored in memory. Method 800 proceeds to 808 after portions of the drive route where charging the energy storage device via the engine is most efficient are determined.

At 808, method 800 determines locations and portions of the driving route where charge supplied by the engine to the energy storage device may be completely utilized. For example, method 800 estimates the amount of energy that may be used to propel the vehicle from its present location, where charging the energy storage device via the engine is being considered, to the final destination. The energy storage device may be recharged at any location along the driving route where engine efficiency is greater than a threshold efficiency and where the amount of energy to propel the vehicle from its present location to its destination is greater than a threshold amount of charge (e.g., the charge capacity of the energy storage device). Method 800 proceeds to 810 after portions of the driving route where charge supplied by the engine to the energy storage device may be completely utilized.

At 810, method 800 selects locations and portions of the driving route where the engine may supply charge to the energy storage device most efficiently and where charge supplied by the engine to the energy storage device can be completely utilized during the driving route. For example, if it is determined that the energy storage device stores enough energy to propel the vehicle for 10 miles and the vehicle is 20 miles from the destination and operating at an efficiency that is greater than a threshold efficiency, the location 20 miles from the destination may be selected as a location for charging the energy storage device via the engine. The driveline disconnect clutch is closed when the engine is charging the electrical energy storage device via the engine. Method 800 proceeds to exit after locations where for charging the electrical energy storage device via the engine are selected.

In this way, energy storage device charging via the engine may be prioritized based on where the engine may operate efficiently during charging and based on the vehicle location being a distance away from the destination that allows for utilizing any charge that may be supplied to the energy storage device via the engine. Further, the prioritization may be the basis for determining locations of driveline mode changes.

Thus, the methods and systems of FIGS. 1-8 provide for operating a hybrid vehicle, comprising: operating a driveline disconnect clutch in response to a vehicle destination. In this way, driveline operation may be enhanced. The method includes where operating the driveline disconnect clutch includes opening the driveline disconnect clutch in response to information that a charging device is available at the vehicle destination. The method further comprises stopping an engine and reducing an amount of charge stored in an energy storage device in response to an estimate of energy the hybrid vehicle driveline will use to reach the vehicle destination. The method includes where the amount of charge is reduced via operating a driveline integrated starter/generator. The method includes where operating the driveline disconnect clutch includes closing the driveline disconnect clutch in response to information indicating that a charging device is not available at the destination. The method further comprises closing the driveline disconnect clutch and charging an energy storage device in response to a location of the vehicle destination.

The methods and systems of FIGS. 1-8 also provide for operating a hybrid vehicle, comprising: receiving driving route information at a controller; and selectively operating a driveline disconnect clutch in response to the driving route information. The method includes where the driving route information includes whether or not a charging station is available at a destination, and where selectively operating the driveline disconnect clutch includes opening the driveline disconnect clutch in response to an amount of energy the hybrid vehicle is expected consume to reach the destination.

In some examples, the method includes where the driving route information includes an indication of a downhill grade, and where the driveline disconnect clutch is held open in response to the indication of the downhill grade. The method includes where the driving route information is stored in the controller from a previous trip over the driving route. The method further comprises accessing the driving route information based on a present route of a vehicle and opening or closing the driveline disconnect clutch in response to availability of charging facilities at a destination. The method also includes where selectively operating the driveline disconnect clutch includes opening and closing the driveline disconnect clutch in response to a number of expected vehicle stops during a driving routes.

In one example, the method includes where selectively operating the driveline disconnect clutch includes opening and closing the driveline disconnect clutch in response to a number of moving vehicle accelerations not including vehicle accelerations from vehicle stop. The method includes where selectively operating the driveline disconnect clutch includes opening and closing the driveline disconnect clutch in response to a number of vehicle accelerations from vehicle stop. Further, the method includes where the driving route information includes road grade information, and further comprising storing charge in an electric energy storage device in response to the driving route information.

The methods and systems of FIGS. 1-8 additionally provide for operating a hybrid vehicle, comprising: assessing a state of charge (SOC) of an electric energy storage device; receiving driving route information at a controller; and scheduling charging the electrical energy storage device at a first location in response to the SOC and the driving route information before reaching the first location. The method also includes where the hybrid vehicle receives driving route information from a different vehicle other than the hybrid vehicle. The method further comprises operating a driveline disconnect clutch in response to the driving route information. The method further comprises updating scheduling charging the electric energy storage device in response to a change in driving conditions. The method also further comprises scheduling discharging the electrical energy storage device at a second location before reaching the second location.

Referring now to FIG. 9, a flowchart of a method for an example sequence for operating a hybrid vehicle powertrain in response to a varying vehicle mass is shown. The method of FIG. 8 may be stored as executable instructions in non-transitory memory in the system of FIGS. 1-3. Further, the method of FIG. 9 may provide the sequence illustrated in FIG. 10.

At 902, method 900 determines vehicle operating conditions. Vehicle operating conditions may include but are not limited to engine speed, vehicle speed, energy storage device SOC, engine load, engine torque demand, and vehicle acceleration. The operating conditions may be determined or inferred from the sensors described in FIGS. 1-3. Method 900 proceeds to 904 after vehicle operating conditions are determined.

At 904, method 900 determines vehicle mass. In one example, vehicle mass based on the following equations:
Where vehicle acceleration is zero, Engine/driveline torque≈road load+grade based torque Using: $T\_wh1 = R\_rr \cdot M\_v \cdot g \cdot \sin(\theta_1) + T\_rl1$ Where:
T_wh1=Wheel Torque on grade angle=$\theta_1$
T_wh2=Wheel Torque on grade angle=$\theta_2$
R_rr=Driven wheel rolling radius
M_v=vehicle mass estimate
g=gravity constant
$\theta_1$=grade angle
T_rl1=Road load torque at the driven wheel on grade 1
T_rl2=Road load torque at the driven wheel on grade 2
Then the vehicle mass estimate is:

$$M\_v = [(T\_wh1 - T\_wh2) + (T\_rl2 - T\_rl1)] / [R\_rr * g * (\theta_1 - \theta_2)]$$

In some examples, the vehicle mass includes mass of a vehicle and of a trailer being towed by the vehicle. In other examples, the vehicle mass is the mass of only the vehicle without a trailer. Further, in some examples, the vehicle mass may include mass of passengers in the vehicle and vehicle cargo. The engine\driveline torque may be estimated from empirically determined torque maps or functions that are indexed using engine speed and load. For example, engine torque may be estimated by indexing a map of engine torque output that is indexed by engine speed and load. Method 900 proceeds to 906 after vehicle mass is estimated.

At 906, method 900 adjusts the energy storage device SOC threshold where automatic engine stopping is allowed. In one example, the energy storage device SOC threshold is raised when the vehicle's mass is increased so that the vehicle's engine will stop during vehicle deceleration conditions when the energy storage device is greater than a first threshold level. If the vehicle's mass is reduced, the energy storage device SOC threshold is reduced so that the vehicle's engine will stop during vehicle deceleration conditions when the energy storage device is greater than a second threshold level, the second threshold level less than the first threshold level. The energy storage device SOC threshold may be adjusted proportionately with a change in vehicle mass or as a function of vehicle mass. FIG. 10 shows two SOC threshold levels that are based on different vehicle masses. Method 900 proceeds to 908 after the energy storage device SOC threshold for engine stopping is adjusted.

At 908, method 900 judges whether or not conditions for automatically stopping the engine are present. In some examples, conditions for automatically stopping the engine include conditions indicating vehicle deceleration, brake pedal depression, absence of accelerator pedal depression, and energy storage device SOC greater than a threshold level. If method 900 judges that conditions for automatically stopping the engine are met, the answer is yes and method 900 proceeds to 910. Otherwise, the answer is no and method 900 proceeds to 912.

At 910, method 900 automatically stops the engine. The engine may be automatically stopped via stopping fuel and/or spark to the engine without the driver requesting engine stop via a device that has a sole function of stopping and/or starting the engine. Method 900 proceeds to 912 after the engine is stopped.

At 912, method 900 judges whether or not the engine has been automatically stopped. In one example, a bit is set in controller memory when the engine is automatically stopped. If method 900 judges that the engine has been automatically stopped, the answer is yes and method 900 proceeds to 914. Otherwise, the answer is no and method 900 exits.

At 914, method 900 judges whether or not vehicle mass is less than a threshold mass. In one example, the threshold mass is the vehicle mass of an unloaded vehicle plus mass accommodations for one or more persons and a specified amount of cargo. If method 900 judges that vehicle mass is less than a threshold mass, the answer is yes and method 900 proceeds to 916. Otherwise, the answer is no and method 900 proceeds to 922.

At 916, method 900 judges whether or not friction brake application force is less than a threshold. Alternatively, method 900 judges whether or not a brake pedal is applied at 916. If friction brake application force is less than a threshold or if the brake pedal is not applied, the answer is yes and method 900 proceeds to 918. Otherwise, the answer is no and method 900 proceeds to exit.

At 918, method 900 leaves the engine in a stopped state and provides a threshold amount of creep torque (e.g., torque that moves the vehicle at a predetermined slow rate of speed (2 mi/hr) on a flat grade) to vehicle wheels via the DISG. Method 900 proceeds to 920 after creep torque is output via the DISG.

At 920, method 900 provides a base amount of torque converter impeller torque in response to driver demand torque. The base amount of torque converter impeller torque does not account for any change in vehicle mass. Further, in one example, the base amount of torque converter impeller torque is based on driver input to an accelerator pedal (e.g., driver demand torque) and an amount of accelerator pedal deflection is converted into a torque converter impeller torque. In other examples, wheel torque, engine brake torque, and/or other driveline related torques may take the place of torque converter impeller torque. The torque converter impeller torque is converted into a desired DISG current and the current is supplied to the DISG to provide the torque converter impeller torque.

At 922, method 900 judges whether or not friction brake application force is less than a threshold. Alternatively, method 900 judges whether or not a brake pedal is applied at 922. If friction brake application force is less than a threshold or if the brake pedal is not applied, the answer is yes and method 900 proceeds to 924. Otherwise, the answer is no and method 900 proceeds to exit.

At 924, the engine is restarted, the driveline disconnect clutch is closed, and at least a portion of vehicle creep torque is provided by the engine. In some examples, the vehicle creep torque may be provided via the engine and the DISG. In other examples, the vehicle creep torque is provided solely via the engine. Method 900 proceeds to 926 after the engine is started and at least a portion of vehicle creep torque is provided by the engine.

At 926, method 900 provides a vehicle mass adjusted amount of torque converter impeller torque in response to driver demand torque. For example, method 900 provides a base amount of torque converter impeller torque plus an additional amount of torque that is based on the increase in vehicle mass. In one example, the additional amount of torque is empirically determined and stored in a table or function in controller memory that is indexed by the vehicle mass that exceeds the base vehicle mass. The torque converter impeller torque may be provided solely via the engine or via the engine and the DISG. In one example, the desired torque converter impeller torque is provided by opening the engine throttle and supplying fuel to the engine in response to the desired torque converter impeller torque. In other examples, the desired torque converter impeller torque is provided via supplying the DISG with an amount of current and the engine with fuel and a throttle opening amount. Method 900 proceeds to exit after the desired torque converter impeller torque is provided.

In this way, engine and driveline disconnect operation may be adjusted in response to a change in vehicle mass. Further, conditions for stopping the engine based on SOC may also be adjusted based on vehicle mass.

Referring now to FIG. 10, an example sequence for operating a hybrid vehicle powertrain in response to varying vehicle mass is shown. The sequence of FIG. 10 may be performed via the method shown in FIG. 10 executed in the system described in FIGS. 1-3.

The first plot from the top of FIG. 10 is a plot of vehicle speed versus time. The Y axis represents vehicle speed and vehicle speed increases in the direction of the Y axis arrow. The X axis represents time and time increases in the direction of the X axis arrow.

The second plot from the top of FIG. 10 is a plot of engine operating state versus time. The Y axis represents engine operating state. The engine is on and operating combusting an air-fuel mixture when the trace is at a higher level. The engine is off and not combusting when the trace is at a lower level. The X axis represents time and time increases in the direction of the X axis arrow.

The third plot from the top of FIG. 10 is a plot of vehicle brake application state versus time. The Y axis represents vehicle brake state. The vehicle brake pedal is applied when the trace is at a higher level. The vehicle brake pedal is not applied when the trace is at a lower level. The X axis represents time and time increases in the direction of the X axis arrow.

The fourth plot from the top of FIG. 10 is a plot of desired torque converter impeller torque versus time. The Y axis represents desired torque converter impeller torque and desired torque converter impeller torque increases in the direction of the Y axis arrow. The X axis represents time and time increases in the direction of the X axis arrow.

The fifth plot from the top of FIG. 10 is a plot of energy storage device state of charge (SOC) versus time. The Y axis represents energy storage device SOC and energy storage device SOC increases in the direction of the Y axis arrow. The X axis represents time and time increases in the direction of the X axis arrow. Horizontal marker 1002 represents a minimum energy storage device SOC level where the engine may be stopped and the driveline disconnect clutch opened when vehicle mass increases via increasing vehicle payload, for example. Horizontal marker 1004 represents a minimum energy storage device SOC level where the engine may be stopped and the driveline disconnect clutch opened when vehicle mass is that of the base unloaded vehicle. Thus, the engine may be stopped and the driveline disconnect clutch opened at lower SOC levels when the vehicle it at its base mass. On the other hand, when the vehicle mass increases, the engine may be stopped and the driveline disconnect clutch opened at a higher SOC level so that the engine continues to operate unless the energy storage device is at a higher level SOC.

The sixth plot from the top of FIG. 10 is a plot of vehicle mass versus time. The Y axis represents vehicle mass and vehicle mass increases in the direction of the Y axis arrow. The X axis represents time and time increases in the direction of the X axis arrow.

The seventh plot from the top of FIG. 10 is a plot of driveline disconnect clutch state versus time. The driveline disconnect clutch is in an open state when the trace is at a lower level. The driveline disconnect clutch is in a closed state when the trace is at a higher level. The X axis represents time and time increases in the direction of the X axis arrow.

At time $T_0$, the vehicle speed is zero, the engine is stopped, the brake pedal is applied, the energy storage device SOC is relatively high, the driveline disconnect clutch is open, and the vehicle mass is at a lower level. In this example, the engine has been automatically stopped in response to vehicle speed being zero and the brake pedal being applied.

At time $T_1$, the driver releases the brake pedal and the vehicle speed gradually increases as the DISG (not shown) applies torque to the vehicle driveline in response to the driver releasing the brake pedal. The engine remains in an off state and the driveline disconnect clutch remains open. The desired torque converter impeller torque increases in response to the driver releasing the brake pedal and subsequently increasing a driver demand torque. The driver demand torque may be an engine brake torque, torque converter impeller torque, wheel torque or other driveline torque. The vehicle mass remains at a lower level and the energy storage device SOC starts to be reduced as the DISG solely propels the vehicle.

At time $T_2$, the desired torque converter impeller torque has increased to a level where the engine is automatically started and the driveline disconnect clutch is closed in response to a driver torque demand (not shown). The engine may be automatically started without direct operator input to a device that has a sole purpose of starting and/or stopping the engine (e.g., an ignition switch) when driver demand torque exceeds a threshold level of torque. The vehicle speed continues to increase in response to the increasing torque converter impeller torque. The vehicle mass remains at a lower level and the energy storage device SOC continues to be reduced as the vehicle accelerates. The vehicle brake pedal remains in an inactive position.

At time $T_3$, the vehicle begins to decelerate in response to a reduced driver torque demand. The vehicle mass is at a lower level and the energy storage device SOC is greater than the threshold level 1004 so the driveline disconnect clutch is opened and the engine is stopped in response to the vehicle entering a deceleration mode as the driver demand torque is reduced. The desired torque converter impeller torque is reduced in response to the reduced driver demand torque. The vehicle brake pedal state remains off and the energy storage device begins to charge via the DISG converting vehicle inertia into electrical energy.

Between time $T_3$ and time $T_4$, the vehicle stops and the vehicle brake is applied by the driver. The energy storage device SOC has increased and the driveline disconnect clutch remains in an open state. The engine also remains in an off state.

At time $T_4$, the vehicle mass is increased. The vehicle mass may increase when the driver or someone adds cargo or passengers to the vehicle, for example. The vehicle speed remains at zero and the engine remains off. The desired torque converter impeller torque remains at a lower level and the energy storage device SOC remains unchanged. The driveline disconnect clutch also remains in an open state.

At time $T_5$, the driver releases the brake pedal and the DISG torque output increases as the desired torque converter impeller torque increases. The desired torque converter impeller torque increases in response to the driver releasing the brake and increasing the driver demand torque. The energy storage device SOC begins to decrease as the DISG applies torque to the vehicle driveline. The vehicle speed begins to gradually increase. However, since the vehicle mass has increased the vehicle accelerates at a lower rate. The controller begins to estimate the change in vehicle mass based on the torque that is applied to the driveline and the rate of vehicle acceleration.

Between time $T_5$ and time $T_6$, the engine is automatically restarted in response to the torque converter impeller torque increasing to greater than a threshold level. The driveline disconnect clutch is also closed in response to the torque converter impeller torque being greater than a threshold level. The energy storage device SOC decreases and the DISG provides torque to the driveline.

At time $T_6$, the driver reduces the driver demand torque and applies the vehicle brake. The engine remains operating and the driveline disconnect clutch remains engaged so that the engine may provide braking during the vehicle deceleration. The engine remains operating because the vehicle mass has increased and because the energy storage device SOC is less than the threshold level 1002. Thus, the driveline disconnect clutch opening timing may be delayed or retarded as vehicle mass increases. Similarly, driveline disconnect clutch opening timing may be advanced as vehicle mass decreases. The vehicle mass remains at the higher level and the vehicle decelerates toward zero speed. The energy storage device SOC increases as the vehicle decelerates.

At time $T_7$, the driveline disconnect clutch is opened and the engine is stopped as vehicle speed approaches zero. The vehicle brake remains in an applied state and the desired torque converter impeller torque remains at a lower level. The vehicle mass remains unchanged as the vehicle is stopped.

At time $T_8$, the brake pedal is released by the driver and the engine is automatically started. In the present example, the driveline disconnect clutch is opened when the engine is stopped; however, in some examples the driveline disconnect clutch remains closed so that the engine and DISG accelerate to operating speed at the same time. The engine is restarted upon release of the brake pedal in response to the increased vehicle mass. In this way, it may be possible to reduce the possibility of accelerating the vehicle at less than a desired rate since the engine and DISG are available as the brake pedal is released. Further, the engine and the DISG may apply a creep torque that propels the vehicle at the same rate as when the vehicle is unloaded and when only propelled via the DISG when the driver does not depress the vehicle accelerator pedal.

The desired torque converter impeller torque is also increased in response to the increase in estimated vehicle mass. The desired torque converter impeller torque is increased so that the vehicle accelerates in a similar way as when the vehicle is accelerated at a time when the vehicle mass is less (e.g., at time $T_1$). Thus, for a similar accelerator pedal input, the vehicle accelerates similar to when the vehicle mass is reduced and the accelerator pedal input is the same. In this way, the driver may experience similar vehicle acceleration for an equivalent accelerator pedal input even when vehicle mass changes.

Thus, the methods and systems of FIGS. 1-3 and 9-10 provide for operating a hybrid vehicle, comprising: adjusting operation of a driveline disconnect clutch in response to a change in vehicle mass. The method further comprises adjusting engine stopping timing in response to the change in vehicle mass. The method includes where adjusting operation of the driveline disconnect clutch includes delaying driveline disconnect clutch opening timing in response to an increase in vehicle mass. The method includes where adjusting operation of the driveline disconnect clutch includes advancing driveline disconnect clutch opening timing in response to a decrease in vehicle mass. The method further comprises adjusting an energy storage device state of charge threshold in response to vehicle mass. The method includes where adjusting the energy storage device state of charge threshold includes increasing the energy storage device state of charge threshold in response to vehicle mass.

In another example, the methods and systems of FIGS. 1-8 provide for operating a hybrid vehicle, comprising: adjusting operation of a driveline disconnect clutch in response to a change in vehicle mass; and automatically stopping an engine at a time that is responsive to the change in vehicle mass. The method further comprises not restarting the engine in response to the vehicle mass when the vehicle mass is a first vehicle mass. The method further comprises restarting the engine in response to the vehicle mass when the vehicle mass is a second vehicle mass. The method includes where the second vehicle mass is greater than the first vehicle mass. The method further comprises supplying at least a portion of a creep torque via the engine after restarting the engine.

In some examples, the method includes where a creep torque is supplied solely via a DISG when the engine is not restarted and when the hybrid vehicle is moved. The method further comprises adjusting a desired torque converter impeller torque in response to the change in vehicle mass. The method includes where adjusting the desired torque converter impeller torque includes increasing the desired torque converter impeller torque when the change in vehicle mass increases vehicle mass. The method includes where adjusting the torque converter impeller torque includes decreasing the torque converter impeller torque when the change in vehicle mass decreases vehicle mass.

In another example, the methods and systems of FIGS. 1-8 provide for operating a hybrid vehicle, comprising: adjusting operation of a driveline disconnect clutch that is in communication with an engine in response to a change in vehicle mass; automatically stopping the engine in response to a first energy storage device state of charge being greater than a first threshold state of charge, the first threshold state of charge based on a first vehicle mass before the change in vehicle mass; and automatically stopping the engine in response to a second energy storage device state of charge being greater than a second threshold state of charge, the second threshold state of charge based on a second vehicle mass after the change in vehicle mass. Thus, the driveline disconnect clutch may be operated to improve vehicle performance based on vehicle mass.

In some examples, the method includes where the second threshold state of charge is greater than the first threshold state of charge. The method includes where the second vehicle mass is greater than the first vehicle mass. The method includes where the driveline disconnect clutch is open when the engine is stopped. The method also includes where the driveline disconnect clutch is closed when the engine is stopped.

Referring now to FIG. 11, a flowchart of a method for starting an engine via a first electric machine or a second electric machine is shown. The method of FIG. 11 may be stored in non-transitory memory of controller 12 of FIGS. 1-3 as executable instructions.

At 1102, method 1100 determines vehicle operating conditions. Vehicle operating conditions may include but are not limited to engine speed, DISG speed, vehicle speed, driveline torque demand, engine coolant temperature, and driveline disconnect clutch operating state (e.g., open, partially open, or closed). Method 1100 proceeds to 1104 after operating conditions are determined.

At 1104, method 1100 judges whether or not conditions are present to stop engine rotation. In one example, engine rotation may stop when the desired driveline torque (e.g., combined torque provided via the engine and/or the DISG) is less than a threshold amount of torque. If method 1100 judges that conditions are not present to stop engine rotation, method 1100 proceeds to 1106. Otherwise, method 1100 proceeds to 1110.

At 1106, method 1100 operates the engine. The engine is operated via providing spark and or fuel to the engine based on engine operating conditions. In some examples where the engine is a diesel engine or a homogeneous charge compression ignition (HCCI) engine, the engine may be operated without spark. Method 1100 proceeds to 1108 after the engine is operated.

At 1108, method 1100 provides torque from the engine to the vehicle wheels. Engine torque may be provided to the vehicle wheels by closing the driveline disconnect clutch and directing engine output through the transmission to vehicle wheels. In some examples, engine and DISG torque may be supplied to vehicle wheels simultaneously. Method 1100 proceeds to exit after engine torque is provided to vehicle wheels.

At 1110, method 1100 stops engine rotation and opens or disengages the driveline disconnect clutch. Engine rotation may be stopped by inhibiting fuel and/or air flow to engine cylinders. Method 1100 proceeds to 1112 after the engine is stopped. Note that the DISG may continue to provide torque to vehicle wheels in response to driver demand while the engine is stopped.

At 1112, method 1100 judges whether or not conditions are present to restart the engine. In one example, the engine may be restarted when the driveline torque command exceeds a threshold torque amount. In other examples, the engine may be started when a temperature of a catalyst is reduced to less than a threshold temperature. If method 1100 judges that selected conditions to restart the engine are present, method 1100 proceeds to 1114. Otherwise, method 1100 returns to 1104.

At 1114, method 1100 determines an available amount of torque from the DISG. The amount of torque available from the DISG is based on the rated DISG torque, battery state of charge, DISG speed, and DISG temperature. A table describing DISG available torque is stored in memory and is indexed via battery state of charge (e.g., battery voltage and amp hour rating), DISG speed, and DISG temperature. The table outputs the amount of available torque from the DISG. Method 1100 proceeds to 1116 after the amount of available DISG torque is determined.

At 1116, method 1100 judges whether or not the DISG has the capacity to start the engine and provided the desired amount of torque. In one example, the desired amount of torque is determined at least in part from an accelerator pedal which the driver can adjust to vary the desired driveline torque. The torque to start the engine may be empirically determined and stored in a table or function in memory. The table or function may be indexed via engine temperature and time since last engine stop. The table outputs a torque to reach a desired engine cranking speed (e.g., 250 RPM) from zero speed. The torque to start the engine is added to the desired driveline torque provided by the driver, and the amount of available DISG torque is subtracted from the sum of the torque to start the engine and the desired driveline torque. If the result is positive, the DISG lacks the capacity to provide the torque to start the engine and provide the desired driveline torque. Consequently, method 1100 proceeds to 1124. If the result is negative, the DISG has the capacity to provide the torque to start the engine and provide the desired driveline torque. Therefore, method 1100 proceeds to 1118.

At 1118, method 1100 judges whether or not an engine start has been requested. If so, method 1100 proceeds to 1120. Otherwise, method 1100 proceeds to 1122. Method 1100 may judge that an engine start request is made when an engine torque request increases or when a driver releases a brake pedal, for example.

At 1120, method 1100 supplies DISG torque to vehicle wheels and to the engine. The DISG torque is provided to the engine via closing the driveline disconnect clutch and transferring torque from the DISG to the engine. The driveline disconnect clutch may partially close to control engine speed during engine starting. The engine may rotate at a cranking speed (e.g., 250 RPM) or at a base idle speed (e.g., 800 RPM) before fuel and spark are delivered to the engine. Method 1100 returns to 1104 after DISG torque is provided to the engine and vehicle wheels.

At 1122, method 1100 supplies DISG torque to only vehicle wheels. The DISG torque provided to the vehicle wheels may be based on accelerator pedal input and/or input from a controller. Method 1100 returns to 1104 after DISG torque is provided to vehicle wheels.

At 1124, method 1100 judges whether or not an engine start request is present. An engine start request may be occur as is described at 1118. If an engine start is requested, method 1100 proceeds to 1126. Otherwise, method 1100 proceeds to 1122.

At 1126, method 1100 starts the engine via a second electrical machine that has a lower power output capacity than the DISG. For example, the engine may be started via a conventional starter that includes a pinion shaft and pinion gear that is selectively engaged to the engine flywheel to start the engine. The driveline disconnect clutch is closed when the second electrical machine is solely providing torque to rotate the engine. Further, fuel and spark are provided to the engine at 1126 to initiate combustion in the engine so that the engine rotates under its own power. Method 1100 proceeds to 1128 after the engine is started.

At 1128, method 1100 engages the driveline disconnect clutch to enable transfer of torque from the engine to vehicle wheels. In one example, the engine speed is increased until the engine speed matches the speed of the DISG. The driveline disconnect clutch is closed when the engine speed matches the DISG speed to reduce the possibility of introducing a torque disturbance to the driveline. Method 1100 proceeds to exit after the engine is started and delivering torque to vehicle wheels.

It should be noted that the method of FIG. 11 shows but one example of starting an engine solely via a lower power capacity electrical machine (starter motor) or solely via a higher capacity electrical machine (DISG). Other examples are also anticipated. For example, when both the DISG and lower power capacity starter motor are operational, the DISG and lower power capacity starter motor may start the engine during different operating conditions. However, if the DISG is deactivated, the lower power capacity starter may start the engine after the engine has been automatically stopped from rotating during conditions where the DISG would otherwise start the engine. For example, the lower power capacity starter may start the engine where the DISG is capable of starting the engine and providing torque to the driveline but for being deactivated. On the other hand, if the lower power capacity starter motor is deactivated, the engine may be started by the DISG when the driveline torque demand is at a lower threshold level since the lower power capacity starter motor is unavailable.

Referring now to FIG. 12, a plot of an example sequence for starting an engine according to the method of FIG. 11 is shown. The vertical markers $T_{10}$-$T_{17}$ represent times of interest in the sequence. The sequence of FIG. 12 may be provided by the system of FIGS. 1-3.

The first plot from the top of FIG. 12 represents DISG torque versus time. The X axis represents time and time increases from the left hand side of the figure to the right hand side of the figure. The Y axis represents DISG torque and DISG torque increases in the direction of the Y axis arrow. Horizontal line 1202 represents an amount of available DISG torque. Horizontal line 1204 represents an amount of torque the DISG may provide to the transmission input while the DISG is cranking the engine. The difference between horizontal lines 1202 and 1204 represents an amount of torque to crank the engine for starting.

The second plot from the top of FIG. 12 represents engine speed versus time. The X axis represents time and time increases from the left hand side of the figure to the right hand side of the figure. The Y axis represents engine speed and engine speed increases in the direction of the Y axis arrow.

The third plot from the top of FIG. 12 represents driveline disconnect clutch state (e.g., open or closed) versus time. The X axis represents time and time increases from the left hand side of the figure to the right hand side of the figure. The Y axis represents driveline disconnect clutch state and the driveline disconnect clutch state is open at the top side and closed near the X axis as indicated.

The fourth plot from the top of FIG. 12 represents low power output starter state versus time. The X axis represents time and time increases from the left hand side of the figure to the right hand side of the figure. The Y axis represents low power output starter state and low power output starter state is engaged when the trace is at a higher level and disengaged when the trace is at a lower level.

The fifth plot from the top of FIG. 12 represents engine start request state versus time. The X axis represents time and time increases from the left hand side of the figure to the right hand side of the figure. The Y axis represents engine start request state and engine start request state is asserted to start or run when the trace is at a higher level. The engine start request is not asserted or indicating engine stop when the trace is at a lower level.

At time $T_{10}$, the DISG torque is at a lower level in response to a low driveline torque demand (not shown). The driveline torque demand may originate from an accelerator pedal or other device and may be responsive to a driver input. The engine is also stopped and the driveline disconnect clutch is open. The lower power output starter is not engaged and there is no engine start request.

At time $T_{11}$, an engine start request is provided while DISG torque is less than threshold 1204. The engine start request may be made in response to a battery state of charge (SOC) or other condition. The low power output starter remains inactive and the driveline disconnect clutch is closed shortly thereafter. Closing the driveline disconnect clutch transfers torque from the DISG to the engine, thereby cranking the engine. The engine starts shortly after the DISG is at least partially closed. The driveline disconnect clutch may slip while the engine is being cranked and during engine run-up from engine stop to DISG speed.

At time $T_{12}$, the engine start/run request transitions to a low level in response to vehicle operating conditions (e.g., a charged battery and an applied vehicle brake pedal). The driveline disconnect clutch is opened and the engine is stopped in response to the engine start/run request. The DISG continues to supply torque to the vehicle driveline.

Between time $T_{12}$ and time $T_{13}$, the DISG torque output increases in response to an increased driver demand torque (not shown). The engine remains off and the driveline disconnect clutch remains open.

At time $T_{13}$, the engine start/run request is asserted in response to battery SOC being less than a threshold charge level (not shown). The low power output starter is activated as indicated since the DISG torque is greater than the threshold torque at 1204. The driveline disconnect clutch is open while the engine is cranked by the lower power output starter. The low power output starter is deactivated when engine speed exceeds engine cranking speed.

At time $T_{14}$, the driveline disconnect clutch is closed after the engine speed reaches the DISG speed. The engine start/run request remains asserted and both the DISG and engine provide torque to the vehicle driveline.

At time $T_{15}$, the engine start/run request transitions to a lower level to indicate the engine is to be stopped. Shortly thereafter, the engine is stopped and the driveline disconnect clutch is opened in response to the engine start/run request transitioning to a lower level. The DISG continues to deliver torque to the vehicle driveline.

At time $T_{16}$, the engine start/run request is asserted in response to the driver demand torque exceeding a threshold torque (not shown). The engine is restarted so that the engine may output torque to the driveline to augment DISG torque. The low power output starter is engaged in response to the engine start/run request transitioning to a higher level. The low power output starter is disengaged in response to engine speed exceeding a threshold speed.

At time $T_{17}$, the driveline disconnect clutch is closed in response to engine speed reaching DISG speed. The engine and DISG supply torque to the vehicle driveline after the driveline disconnect clutch is closed.

In this way, the engine may be started via the DISG or the lower power output starter. The lower power output starter allows the DISG to output a greater amount of torque to the driveline than would be possible if only the DISG had the capability of cranking the engine. Further, the lower power output starter allows the engine speed to reach DISG speed before the driveline disconnect clutch is closed so that little torque disturbance may be noticed in the vehicle driveline.

Thus, the methods and systems of FIGS. 1-3 and 11-12 provide for starting an engine, comprising: during a first condition, starting an engine with a first electrical machine while a driveline disconnect clutch is closed; and during a second condition, starting the engine with a second electrical machine while the driveline disconnect clutch is open. The method includes where the second electrical machine has a lower power output capacity than the first electrical machine. The method includes where the first electrical machine is a driveline integrated starter/generator (DISG), and where the driveline disconnect clutch has a first side mechanically coupled to a dual mass flywheel and a second side mechanically coupled to the DISG.

In some examples, the method includes where the first condition is a desired driveline torque that is less than a driveline torque during the second condition. The method includes where the driveline disconnect clutch is opened in response to a desired driveline torque. The method includes where the driveline disconnect clutch is closed when a sum of a desired driveline torque and an engine starting torque are greater than a threshold amount of torque. The method includes where the first electrical machine is positioned downstream of an engine and provides torque through a torque converter that rotates vehicle wheels, and where the second electrical machine is positioned at the engine and does not provide torque through the torque converter to rotate vehicle wheels above an engine cranking speed that is lower than engine idle speed.

In other examples methods and systems of FIGS. 1-3 and 11-12 provide for starting an engine, comprising: starting an engine via a first electrical machine when a desired torque demand is less than a first threshold amount; starting the engine via the second electrical machine when the desired torque demand is greater than the first threshold amount; and supplying torque sufficient to rotate vehicle wheels solely via the first electrical machine during selected operating conditions. Thus, different electrical machines may start the engine during different conditions.

The method includes where the first electric machine is a driveline integrated starter/generator (DISG) and where the DISG is located in the hybrid vehicle driveline at a location between a driveline disconnect clutch and a transmission. The method includes where the DISG provides torque to start rotation of the stopped engine via at least partially closing the driveline disconnect clutch. The method further comprises decoupling the second electrical machine from the engine when engine speed reaches a threshold speed. The method includes where the second electrical machine includes a pinion shaft and a pinion gear. The method includes where the first threshold amount varies with battery state of charge. The method also includes where the first threshold amount varies with speed of the first electrical machine.

The methods and systems of FIGS. 1-3 and 11-12 also provide for a hybrid vehicle system, comprising: an engine; a starter selectively engaged to the engine and including a pinion gear; a dual mass flywheel (DMF) including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; and a controller including non-transitory instructions executable to start the engine via the starter during a first start and via the DISG during a second start.

In some examples, the hybrid vehicle system further comprises additional instructions to start the engine via the starter during conditions of a desired torque greater than a threshold. The hybrid vehicle system includes where the engine is started by rotating the engine via the DISG, and further comprising additional instructions to decouple the DISG from the engine after a predetermined number of combustion events. The hybrid vehicle system further comprises additional instructions to couple the engine to the DISG after engine speed reaches DISG speed. The hybrid vehicle system includes where available power output from the starter is lower than available power output from the DISG. The hybrid vehicle system further comprises additional instructions to automatically stop the engine, and where the engine is started via the DISG based on an available amount of DISG output torque.

Referring now to FIG. 13, a flowchart of a method for adjusting fuel injection to provide a desired engine speed trajectory during an engine start is shown. The method of FIG. 13 may be stored as executable instructions in non-transitory memory of controller 12 shown in FIGS. 1-3.

At 1302, method 1300 judges whether or not engine starting is requested and the driveline disconnect clutch is disengaged. Method 1300 may judge that an engine start is desired when an engine starting variable is asserted in memory. Method 1300 may judge that the driveline disconnect clutch is disengaged when a driveline disconnect clutch state variable is not asserted in memory. If method 1300 judges that an engine start is desired and a driveline disconnect clutch is not engaged, method 1300 proceeds to 1304. Otherwise, method 1300 proceeds to 1316.

At 1304, method 1300 determines operating conditions. Operating conditions may include but are not limited to DISG speed, engine temperature, time since engine stop of rotation, and driveline disconnect clutch state. Method 1300 proceeds to 1306 after operating conditions are determined.

At 1306, method 1300 determines desired engine speed based on torque converter impeller speed. Further, a desired cylinder air charge may be determined at 1306 so that the desired engine speed may be achieved. In one example, the desired engine speed after engine run-up (e.g., from cranking speed to a desired idle speed) is adjusted to the torque converter impeller speed. Thus, after engine run-up during an engine start, the engine speed is controlled to the torque converter impeller speed so that the driveline disconnect clutch may be closed to transfer engine torque to vehicle wheels without creating a torque disturbance. The engine may be cranked via rotating the engine with a starter other than a DISG (e.g., a lower power output starter), if desired. Method 1300 proceeds to 1308 after the desired engine speed is selected. It should be noted that torque converter impeller speed is equivalent to DISG speed since the DISG is coupled to the torque converter impeller.

At 1308, fuel injection for the first combustion event is adjusted. In one example where the engine includes a near centrally located fuel injector at the top of the combustion chamber, fuel is injected to at least one cylinder via a single fuel pulse during a compression stroke of the cylinder and during a single cycle of the cylinder. The injected fuel then participates in a first combustion event since engine stop for the cylinder receiving the fuel. After the single fuel pulse is injected to the cylinder, fuel injections during run-up may be injected in a series of pulses during the intake and compression strokes of the cylinder receiving the fuel as described at 1310. In one example, a single fuel pulse is injected to each of a predetermined number of engine cylinders during the compression strokes of the cylinders. Thus, fuel is injected to each of the predetermined number of cylinders in one or more pulses during a cycle of the cylinder receiving the fuel. For example, for a four cylinder engine, two engine cylinders receive a single injection of fuel during the respective compression strokes of the cylinders receiving the single injection of fuel. The other two engine cylinders received multiple injections of fuel during intake and/or compression strokes of the cylinder receiving the fuel.

In a second example where the engine includes a fuel injection located at the side of the combustion chamber, multiple fuel injections for each cylinder are delivered to a predetermined number of engine cylinders during the compression stroke of the cylinder receiving the fuel for the first combustion event in the cylinder since engine stop. After a predetermined number of cylinders receive multiple fuel injections during the compression stroke of the cylinder receiving the fuel, multiple injections of fuel may be supplied to each cylinder during intake and/or compression strokes of the cylinder receiving the fuel. Additionally, the position of the engine throttle may be adjusted at 1308 based on the desired engine speed. In one example, the engine throttle opening amount is increased as the desired engine speed increases during engine cranking. Method 1300 proceeds to 1310 after fuel is injected for the first combustion events of each engine cylinder.

At 1310, method 1300 adjusts split fuel injection timing and fuel amounts based on desired engine speed and a speed differential between actual engine speed and desired engine speed. In particular, at lower engine speeds (e.g., between cranking speed 250 RPM and 400 RPM) two or more injections are supplied to each engine cylinder during the compression stroke of each cylinder receiving the fuel. At intermediate engine speeds (e.g., between 400 RPM and 700 RPM), multiple fuel injections are supplied during both intake and compression strokes of each cylinder receiving the fuel. At higher engine speeds (e.g., 700 RPM to 1000 RPM), multiple fuel injections are supplied solely during the intake stroke of the cylinder receiving the fuel. Of course, the lower, intermediate, and higher engine speeds may differ between applications. For example, the lower engine speed may be between 200 RPM and 300 RPM, the intermediate engine speed may be between 300 RPM and 800 RPM, and the higher engine speed may be between 800 RPM and 1100 RPM for other applications. Thus, if the desired engine speed is a higher engine speed, the fuel injection timing is adjusted to provide multiple fuel injections solely during the intake stroke of the cylinder receiving the fuel when the engine reaches the desired engine speed. If the desired engine speed is an intermediate engine speed the fuel injection timing is adjusted to provide multiple fuel injections during intake and compression strokes of the cylinder receiving the fuel. The split fuel injection timing at higher engine speeds provides for improved fuel mixing and reduced engine emissions. The split fuel injection during compression and intake strokes provides for improved combustion stability and reduced possibility of engine misfire.

As engine speed increases from cranking speed (e.g., 250 RPM) to the desired idle speed during engine run-up, the amount of time between end of injection (EOI) (e.g., the timing where the last fuel pulse injected to a cylinder during a cycle of the cylinder occurs) and spark initiation is held substantially constant (e.g., ±3 degrees). Since the time between different crankshaft positions decreases as engine speed increases, EOI timing is advanced with respect to crankshaft timing to maintain a substantially constant amount of time (e.g., ±0.05 seconds) between EOI and spark initiation. Further, when multiple fuel injections are performed, timing of each of the fuel injections during a cylinder cycle may be advanced as engine speed increases. Thus, start of fuel injection (SOI) during a cylinder cycle may be advanced as engine speed increases during engine run-up.

If the desired engine speed is greater than the actual engine speed, fuel injection amounts are increased via increasing fuel injection duration. Additional air may also be provided to the engine via opening the throttle. If the desired engine speed is less than the actual engine speed, fuel injection amounts are decreased via reducing fuel injection duration. The engine air amount may be reduced via closing the throttle. Further, the fuel injection timing and fuel amounts may be adjusted in response to driveline disconnect clutch operating conditions so as to preemptively adjust fuel injection timing. For example, if the driveline disconnect clutch is closing and the engine side of the driveline disconnect clutch is rotating slower than the DISG side of the driveline disconnect clutch, the fuel injection amount may be increased to accelerate the engine closer to DISG speed and thereby reduce driveline torque disturbances. On the other hand, if the driveline disconnect clutch is closing and the engine side of the driveline disconnect clutch is rotating faster than the DISG side of the driveline disconnect clutch, the fuel injection amount may be decreased to decelerate the engine closer to DISG speed. Further, if the driveline disconnect clutch is being opened, the fuel injection amount may be decreased as a function of driveline disconnect clutch application force to decelerate the engine to idle speed and thereby reduce driveline torque disturbances. Similarly, if the driveline disconnect clutch being opened, the fuel injection amount may be increased as a function of driveline disconnect clutch application force to accelerate the engine to idle speed and thereby reduce driveline torque disturbances.

In some examples, the fuel injection timing of an engine cylinder is adjusted to a stroke of a cylinder that varies as engine speed varies. For example, if a speed differential between actual and desired engine speed increases, method 1300 adjusts fuel from a compression stroke to an intake stroke. By varying the injection stroke based on a speed differential between actual and desired engine speed, it may be possible to improve air-fuel mixing and promote more complete combustion so that the speed differential may be reduced.

Additionally, the engine throttle position may be adjusted in response to timing of when fuel is injected to a cylinder. For example, a port throttle may be partially closed to increase charge motion when fuel is injected solely during an intake stroke. The port throttle may be partially opened as fuel injection transitions from injecting fuel during a compression stroke to injecting fuel during an intake stroke. Further, the amount of fuel injected to the cylinder during the cylinder cycle is adjusted based on an amount of air that flows through a throttle. Method 1300 proceeds to 1312 after fuel injection timing is adjusted.

At 1312, method 1300 adjusts spark timing in response to the state of the driveline disconnect clutch and the speed differential between the desired engine speed and the actual engine speed. In particular, when engine speed is substantially at DISG speed (e.g., ±100 RPM), the spark is retarded to a level to produce zero torque at the driveline disconnect clutch. Further, the spark retard may also be provided based on the speed difference between the DISG and the engine. As the speed differential between the engine and the DISG is reduced, the amount of spark retard is increased.

At 1314, method 1300 judges whether or not the driveline disconnect clutch has been closed to a threshold amount (e.g., 80% of clutch holding torque is provided). The driveline disconnect clutch may be closed when the engine speed is within a predetermined speed of the torque converter impeller speed so that torque disturbances though the driveline may be reduced. If method 1300 judges that the driveline disconnect clutch has been closed to a threshold amount, method 1300 proceeds to 1316. Otherwise, method 1300 returns to 1304.

At 1316, method 1300 advances spark timing and transitions to injection of fuel in a single fuel injection during a cycle of a cylinder based on a number of combustion events since engine stop or based on a torque ratio. For example, after the driveline disconnect clutch closes, method 1300 may transition from split fuel injection to single fuel injection during a cylinder cycle after 10 combustion events. Alternatively, method 1300 may transition from split fuel injection to single fuel injection during a cylinder cycle after spark timing has been advanced to timing where a torque ratio between spark timing and fuel injection timing is less than a threshold amount. Method 1300 proceeds to exit after fuel injection timing and spark timing are transitioned to base timings that are empirically determined and stored in memory.

Referring now to FIG. 14, a plot of an example sequence for supplying fuel to an engine according to the method of FIG. 13 is shown. The sequence of FIG. 14 may be provided by the system of FIGS. 1-3.

The first plot from the top of FIG. 14 represents fuel injection timing for cylinder number one. The X axis represents cylinder stroke for cylinder number one and individual cylinder strokes are indicated by representative letters. For example, intake stroke is represented by I, compression stroke is represented by C, power stroke is represented by P, and exhaust stroke is represented by E. The Y axis represents fuel injection.

The second plot from the top of FIG. 14 represents desired torque converter impeller speed versus cylinder number one stroke. The X axis timing is coincident with the timing of the first plot from the top of the figure. The Y axis represents desired torque converter impeller speed and desired torque converter impeller speed increases in the direction of the Y axis arrow.

The third plot from the top of FIG. 14 represents desired engine speed versus cylinder number one stroke. The X axis timing is coincident with the timing of the first plot from the top of the figure. The Y axis represents desired engine speed and desired engine speed increases in the direction of the Y axis arrow.

The fourth plot from the top of FIG. 14 represents actual engine speed versus cylinder number one stroke. The X axis timing is coincident with the timing of the first plot from the top of the figure. The Y axis represents actual engine speed and actual engine speed increases in the direction of the Y axis arrow.

The fifth plot from the top of FIG. 14 represents a difference between desired engine speed and actual engine speed (delta engine speed) versus cylinder number one stroke. The X axis timing is coincident with the timing of the first plot from the top of the figure. The Y axis represents desired engine speed and desired engine speed increases in the direction of the Y axis arrow.

At time $T_{18}$, the engine is stopped and the desired torque converter impeller speed is zero. The engine rotates after $T_{18}$ cycling through the different stroke of cylinder number one. A first single fuel injection amount is delivered directly to cylinder number one during the compression stroke of cylinder number one. The engine begins to accelerate from a first combustion event during the first compression stroke since engine stop.

At time $T_{19}$, two fuel injections are provided during the second compression stroke of cylinder number one. The fuel injection transitions to two injections in response to a speed difference between the desired engine speed and the actual engine speed. Further, the fuel injection is delivered during a cylinder stroke that depends on the speed difference between actual and desired engine speeds. In one example, fuel injection timing for cylinder stroke based on the difference between actual and desired engine speed is stored in a table and outputs a cylinder stroke based on the speed difference. By adjusting the cylinder stroke where fuel injection occurs based on a difference between actual and desired engine speed, it may be possible to improve fuel mixing and engine speed control during engine starting.

Between time $T_{19}$ and time $T_{20}$, fuel injection timing is adjusted further in response to the difference in desired engine speed and actual engine speed. It may be observed that fuel injection changes from injecting fuel twice during a compression stroke of the cylinder to injecting fuel once during and intake stroke and once during a compression stroke. Further, fuel injection transitions to injecting fuel twice during an intake stroke.

At time $T_{20}$, the engine speed error between desired engine speed and actual engine speed goes to zero and fuel is injected once per cylinder cycle. In this way, the fuel injection timing may be adjusted to deliver fuel during different engine strokes in response to engine speed error. Further, fuel injection timing and spark timing may be adjusted responsive to driveline disconnect clutch state or applied force as discussed with reference to FIG. 13.

The methods and systems of FIGS. 1-3 and 13-14 also provide for adjusting cylinder air charge of an engine, comprising: positioning a throttle for an engine start; and adjusting a fuel injection timing of a cylinder to a stroke of the cylinder that varies as a difference between a desired engine speed and an actual engine speed varies and adjusting an amount of fuel supplied to the cylinder in response to an amount of air passing the throttle. The method includes where the stroke of the cylinder varies from a compression stroke to an intake stroke. The method includes where the throttle is a port throttle.

In some examples, the method further comprises where the port throttle is at least partially closed during fuel injection during a compression stroke. The method further comprises where the port throttle is open during fuel injection during an intake stroke of the cylinder. The method also includes where the fuel injection timing provides at least two fuel injections during a cycle of the cylinder. The method includes where the fuel injection timing is supplied to a fuel injector that injects fuel directly into the cylinder.

The methods and systems of FIGS. 1-3 and 13-14 also provide for adjusting cylinder air charge of an engine, comprising: positioning a throttle for an engine start; providing a spark to a combustion chamber of a cylinder during a cycle of the cylinder; and adjusting a fuel injection timing to maintain a substantially constant amount of time between the spark and an end of fuel injection time as engine speed increases during engine run-up while injecting a plurality of fuel pulses during the cycle of the cylinder; and adjusting an amount of fuel supplied to the cylinder in response to an amount of air passing the throttle. In this way, combustion consistency may be maintained.

The method also includes where the fuel injection timing is advanced as engine speed increases. The method further comprises where the fuel injection timing is responsive to a desired engine speed, and where the desire engine speed is based on a torque converter impeller speed. The method further comprises closing a driveline disconnect clutch when engine speed is within a threshold speed of the torque converter impeller speed. The method includes where a cylinder stroke during which the plurality of fuel pulses are injected varies as engine speed varies. The method further comprises where the spark timing is varied during engine run-up. The method includes where the throttle is a port throttle located downstream of an intake manifold.

The methods and systems of FIGS. 1-3 and 13-14 also include a hybrid vehicle system, comprising: an engine; a dual mass flywheel (DMF) including a first side mechanically coupled to the engine; a driveline disconnect clutch including a first side coupled to a second side of the dual mass flywheel; a driveline integrated starter/generator (DISG) including a first side coupled to a second side of the driveline disconnect clutch; and a controller including non-transitory instructions executable to adjust fuel injection timing to a cylinder in response to a desired engine speed that is based on a torque converter impeller speed while the torque converter impeller is not mechanically coupled to the engine. By adjusting fuel injection timing based on torque converter impeller speed it may be possible to adjust fuel injection timing so that desired fuel injection timing is provided when the engine reaches the torque converter impeller speed. Such operation may improve engine emissions.

The hybrid vehicle system further comprises additional instructions to close the driveline disconnect clutch after engine speed is within a threshold speed of the torque converter impeller speed. The hybrid vehicle system includes where the engine is started by rotating the engine via a starter other than the DISG. The hybrid vehicle system further comprises additional instructions to adjusting the fuel injection timing to maintain a substantially constant amount of time between timing of a spark delivered to a cylinder and timing of end of fuel injection delivered to the cylinder during a cycle of the cylinder as engine speed increases during engine run-up and while injecting a plurality of fuel pulses during the cycle of the cylinder. The hybrid vehicle system also further comprises additional instructions to adjust the fuel injection timing of a cylinder to a stroke of the cylinder that varies as a difference between the desired engine speed and an actual engine speed varies and adjusting an amount of fuel supplied to the cylinder in response to an amount of air passing the throttle. The hybrid vehicle system further comprises additional instructions to inject a single pulse of fuel to the cylinder during a compression stroke of the cylinder before a first combustion event of the cylinder since engine stop.

Figure 15:
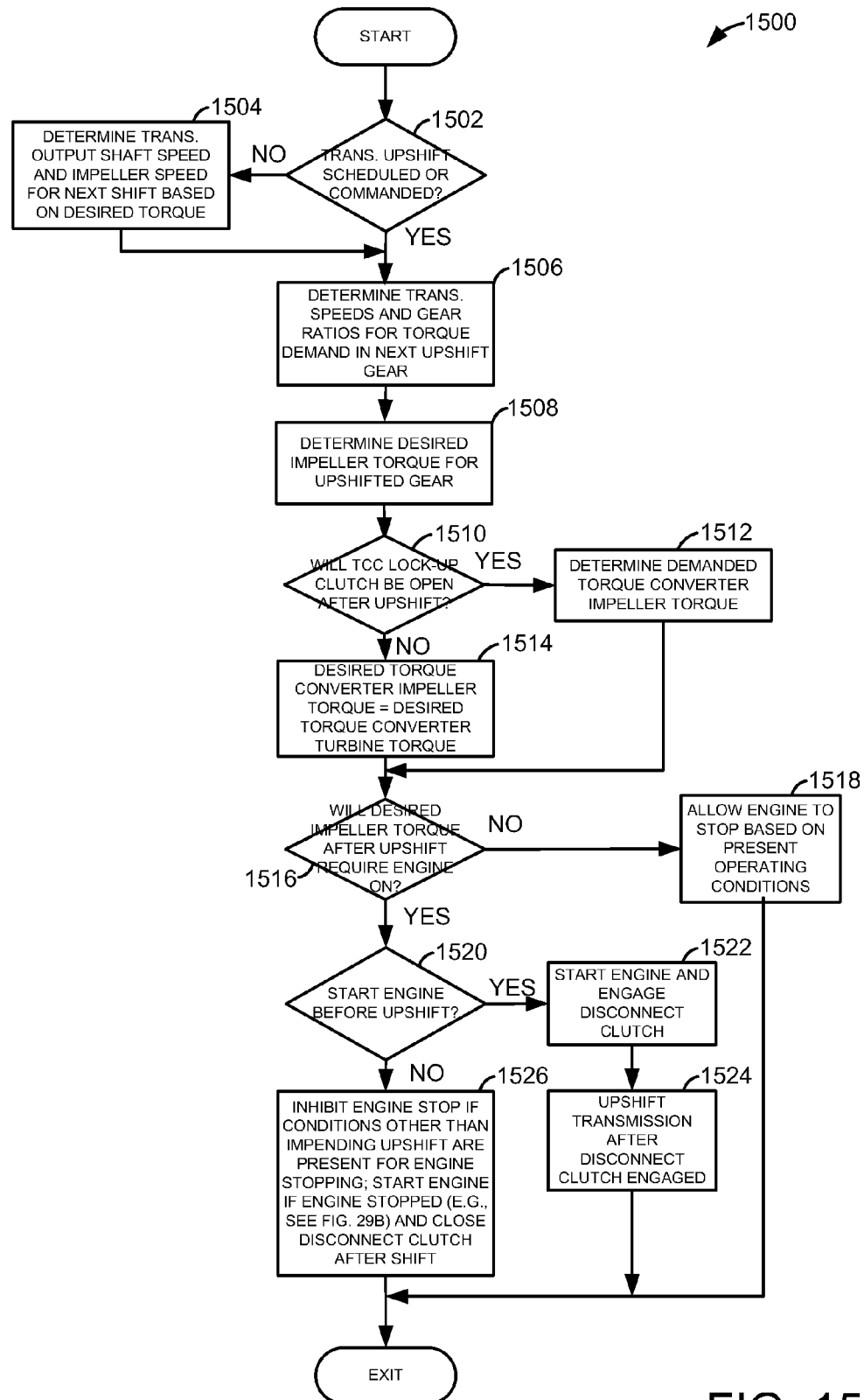
FIGS. 15-18 show methods and prophetic sequences for starting an engine of a hybrid vehicle during transmission shifting.

Referring now to FIG. 15, a flowchart of a method for starting an engine when torque provided via an electric machine may not provide a desired amount of torque after a transmission gear shift is shown. The method of FIG. 15 may be stored as executable instructions in non-transitory memory of controller 12 in FIGS. 1-3.

At 1502, method 1500 judges whether or not a transmission upshift is desired or commanded. In one example, a transmission upshift command may be determined via monitoring status of a control variable that changes state in response to vehicle speed, demand torque, and gear presently selected. If the control variable indicates that a transmission shift is desired, method 1500 proceeds to 1506. Otherwise, method 1500 proceeds to 1504.

At 1504, method 1500 determines transmission output shaft speed and torque converter impeller speed for a next impending transmission shift based on desired torque. In one example, the desired torque provided via an accelerator pedal, present selected transmission gear, and vehicle speed are the basis for determining transmission output speed and impeller speed for a next transmission upshift. In particular, transmission output speed and next gear may be determined from the present gear selected and the vehicle speed at which the transmission is scheduled to upshift to the next gear at a desired engine torque level. A shift schedule may be empirically determined and stored in memory which outputs which gear is selected at a present vehicle speed at a desired torque level. Vehicle speed can be extrapolated to a future time based on the present vehicle speed and the rate of change or slope of the vehicle speed according to the equation y=mx+b where y is the projected vehicle speed, m is the vehicle speed slope, and b is the vehicle speed offset. Similarly, the desired impeller speed can be extrapolated to a future time. As the extrapolation time increases (e.g., present time plus 0.2 seconds, and assuming an increasing vehicle speed and/or desired torque) from the present time, the shift schedule may command an upshift to a higher gear (e.g., from $1^{st}$ gear to $2^{nd}$ gear) as variables that index the shift schedule change. The extrapolated amount of time when the transmission shift occurs (e.g., the projected shift time) as well as the new gear number, the extrapolated vehicle speed, and the extrapolated desired torque are stored in memory when the selected transmission gear changes according to the shift schedule. The transmission output shaft speed is determined from the new gear (e.g., the upshift gear), any axle ratio, and vehicle speed. The transmission impeller speed may be predicted from the DISG speed since the DISG is mechanically coupled to the impeller. Method 1500 proceeds to 1506 after the, transmission impeller speed and transmission output shaft speed are determined.

At 1506, method 1500 determines transmission speeds (e.g., impeller speed and output shaft speed) and gear ratios for the torque demand in the next transmission upshift gear. In one example, method 1500 determines transmission output shaft speed based on the following equations:

OSS=OSS_when_commanded+
  OSS_rateofchange*time_to_shift;

Commanded_gear=gear$fn$(vs,dsd_tor);

TSS_after_upshift=OSS*Commanded_gear;

Where OSS is transmission output shaft speed, OSS_when_commanded is transmission output shaft speed when the upshift is commanded, time_to_shift is the amount of time it takes for a shift, Commanded_gear is the gear active after the upshift, gearfn is a function that returns commanded gear, vs is vehicle speed, dsd_tor is desired transmission input torque, and TSS_after_upshift is transmission output shaft speed after upshift. The function fn holds empirically determined gears with which the transmission operates. Method 1500 proceeds to 1508 after transmission speeds and gear ratio after the shift are determined.

At 1508, method 1500 determines desired transmission output shaft torque and transmission turbine shaft torque after an upshift. In one example, method 1500 determines transmission output torque and turbine shaft torque based on the following equations:

OUT$q$_dsd=out$fn$(accel_pedal,TSS_after_upshift);

Tur$q$_dsd=OUT$q$_dsd*mult+offset;

Where OUTq_dsd is desired transmission output shaft torque, outfn is a function that returns desired transmission output shaft torque, accel_pedal is accelerator pedal position which provides a desired torque, TSS_after_upshift is transmission output shaft speed after upshift, Turq_dsd is desired transmission turbine shaft torque, mult and offset are empirically determined parameters stored in functions that is indexed via commanded gear, transmission oil temperature, and transmission output shaft speed. Method 1500 proceeds to 1510 after desired transmission output shaft torque and transmission turbine shaft torque following the upshift are determined.

At 1510, method 1500 judges whether or not the torque converter clutch (TCC) will be open after an upshift. In one example, method 1500 judges whether or not the TCC will be open after an upshift based in an empirically determined shift schedule that is stored in memory. For example, based on the present gear, the next scheduled gear, and the desired torque, the shift schedule may schedule a closed torque converter. If method 1500 judges that the TCC will be open after the upshift, the answer is yes and method 1500 proceeds to 1512. Otherwise, the answer is no and method 1500 proceeds to 1514.

At 1512, method 1500 determines demanded torque converter impeller torque. In one example, the demanded torque converter impeller torque is retrieved from a table stored in memory. The table contains empirically determined values of torque converter impeller torque that are indexed via transmission output shaft speed after upshift and desired turbine shaft torque. Method 1500 proceeds to 1516 after demanded impeller torque is determined.

At 1514, method 1500 adjusts desired torque converter impeller torque to desired torque converter turbine torque since the TCC is in a locked state. Method 1500 proceeds to 1516 after desired torque converter impeller torque is determined.

At 1516, method 1500 judges whether or not the desired torque converter impeller torque following the transmission upshift will require the engine to be combusting an air-fuel mixture. In one example, method 1500 compares an amount of torque the DISG has the capacity to provide at the present state of battery charge to the desired torque converter impeller torque. If the desired torque converter impeller torque is greater than or within a threshold torque amount of the DISG torque capacity the answer is yes and method 1500 proceeds to 1520. Otherwise, the answer is no and method 1500 proceeds to 1518.

At 1518, method 1500 may allow the engine to stop rotating based on present operating conditions or method 1500 may allow the engine to continue to combust an air-fuel mixture. In one example, where the engine has reached warm operating conditions, the engine stops rotating since the desired torque converter impeller torque does not require engine operation. The engine may continue to combust when the engine has not reached warm operating conditions.

Method 1500 proceeds to exit after engine rotation is allowed or inhibited based on operating conditions not related to the transmission shift.

At 1520, method 1500 judges whether or not to start the engine before upshifting the transmission. The engine may be started before the states of transmission clutches (e.g., not including the driveline disconnect clutch 236) are adjusted so that engine torque may be transmitted to the vehicle wheels at the end of the gear upshift. Alternatively, the engine may be started during the upshift at a time when one or more transmission clutches are changing operating state. In one example, the engine may be started before engine upshift begins and before transmission clutches begin to change state when it is expected to take the engine a longer amount of time to produce positive torque than the time expected to shift gears. If method 1500 judges that it is desirable to start the engine before the transmission upshift, method 1500 proceeds to 1522. Otherwise, method 1500 proceeds to 1526.

At 1522, method 1500 starts the engine and engages the driveline disconnect clutch. The engine may be started via rotating the engine via a starter motor that has a lower power output capacity than the DISG or via cranking the engine via the DISG. Further, the transmission shift may be delayed until the engine speed is synchronous with the DISG or impeller speed. Delaying the transmission shift can reduce driveline torque disturbance that may occur if the engine torque increases before the off-going clutch is completely released. Method 1500 proceeds to 1524 after the engine is started and the driveline disconnect clutch is released.

At 1524, method 1500 upshifts the transmission after the driveline disconnect clutch is engaged. The transmission may be upshifted via applying and/or releasing pressure to one or more clutches that affect torque transfer through the transmission. Method 1500 exits after the transmission is shifted.

At 1526, method 1500 inhibits engine stopping if conditions other than the impending transmission upshift are present for stopping engine rotation. In other words, if the engine would be commanded to stop but for upshifting the transmission, then stopping engine rotation of the transmission is inhibited. Additionally, the engine may be started at a time after the upshift has commenced (e.g., during release of the off-going clutch (torque phase) or during application of the on-coming clutch (inertia phase)) to provide additional torque to the driveline to meet the torque request. Engine and DISG torque may be adjusted to provide the desired amount of torque converter impeller torque. Method 1500 proceeds to exit after engine stopping is inhibited or after the engine is started after upshifting the transmission commences.

In this way, method 1500 can forecast transmission shifting and desired torque converter impeller torque to determine when to closed the driveline disconnect clutch and start the engine. Method 1500 may allow engine torque to be seamlessly combined with DISG torque to provide smooth acceleration during transmission shifting.

Figure 16:
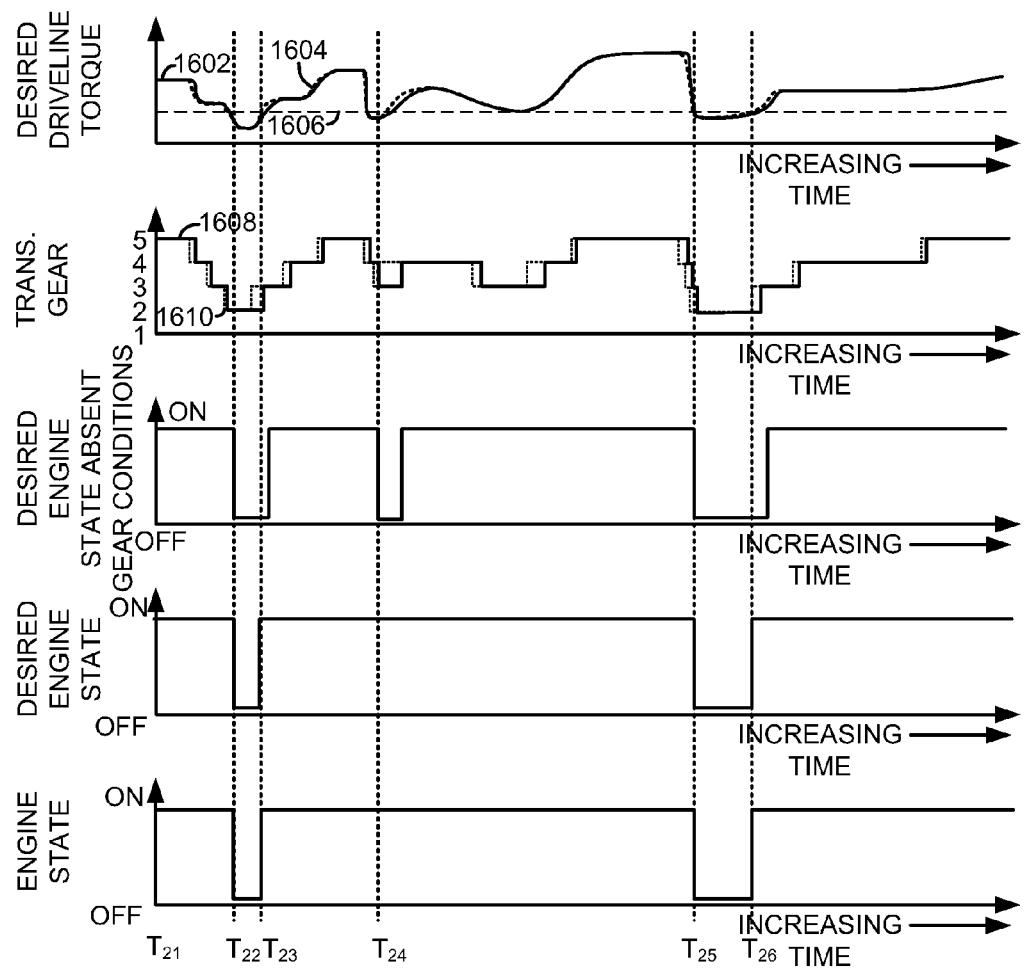

Referring now to FIG. 16, a plot of an example sequence for determining when to start an engine according to the method of FIG. 15 is shown. The sequence of FIG. 16 may be provided by the system of FIGS. 1-3.

The first plot from the top of FIG. 16 represents desired driveline torque versus time. Desired driveline torque may be a desired torque converter impeller torque, a desired torque converter turbine torque, desired wheel torque, or other driveline torque. The desired driveline torque may be determined from an accelerator pedal position or other input device. Solid trace 1602 represents desired driveline torque. Dashed trace 1604 represents forecasted desired driveline torque (e.g., desired driveline torque after a transmission gear shift). The Y axis represents desired driveline torque and desired driveline torque increases in the direction of the Y axis. The X axis represents time and time increases from the left hand side of the figure to the right hand side of the figure. Horizontal line 1606 represents a limit of torque that may be supplied to the driveline via the DISG.

The second plot from the top of FIG. 16 represents transmission gear versus time. The Y axis represents transmission gear and specific transmission gears are indicated along the Y axis. The X axis represents time and time increases from the left hand side of the figure to the right hand side of the figure. Solid trace 1608 represents the present or actual transmission gear. Dashed trace 1610 represents the forecasted or future transmission gear.

The third plot from the top of FIG. 16 represents desired engine state absent transmission gear shifting conditions versus time. The Y axis represents desired engine state and desired engine state is on for higher trace levels and off for lower trace levels. The X axis represents time and time increases from the left hand side of the figure to the right hand side of the figure.

The fourth plot from the top of FIG. 16 represents desired engine state based on all conditions versus time. The Y axis represents desired engine state and desired engine state is on for higher trace levels and off for lower trace levels. The X axis represents time and time increases from the left hand side of the figure to the right hand side of the figure.

The fifth plot from the top of FIG. 16 represents engine state versus time. The Y axis represents engine state and engine state is on for higher trace levels and off for lower trace levels. The X axis represents time and time increases from the left hand side of the figure to the right hand side of the figure.

At time $T_{21}$, the desired driveline torque is greater than an amount of torque that may be provided by the DISG to the driveline. The transmission is in $5^{th}$ gear and the desired engine state and the desired engine state absent gear conditions are both at higher levels indicating that the engine is desired to be operating. The engine state is at a higher level indicating that the engine is operating Between time $T_{21}$ and time $T_{22}$, the desired driveline torque decreases in response to a decreasing driver input (not shown). The transmission downshifts from $5^{th}$ to $2^{nd}$ gear and the forecasted transmission gear leads the present or actual transmission gear. The desired engine state absent gear conditions and the desired engine state remain at higher levels.

At time $T_{22}$, the desired transmission state absent gear conditions transitions to a lower level in response to vehicle speed and desired driveline torque to indicate that the engine may be stopped but for transmission gear conditions in response to vehicle and engine operating conditions (e.g., brake applied, accelerator pedal not applied, and vehicle speed less than a threshold speed). The desired engine state also transitions to a lower level to indicate to stop the engine in response to operating conditions including the forecasted transmission gear. The engine is stopped in response to the desired engine state.

Between time $T_{22}$ and time $T_{23}$, the desired driveline torque levels out and then increases. The forecasted transmission gear increases from $2^{nd}$ gear to $3^{rd}$ gear as the desired driveline torque increases. The present transmission gear is held in $2^{nd}$ gear. The engine remains stopped since the desired engine state and the desired engine state absent gear conditions remain at a lower level.

At time $T_{23}$, the desired engine state transitions to a higher level in response to the forecasted desired driveline torque increasing after the shift to a level greater than 1606. The engine is started in response to the transition of the desired engine state. The desired engine state absent gear conditions remains at a lower level to indicate that the engine would remain off but for the increase in desired driveline torque expected after the transmission shift.

Between time $T_{23}$ and time $T_{24}$, the desired driveline torque increases and then decreases in response to a reduced driver demand (not shown). The desired driveline torque decreases to a level less than 1606 and holds near level 1606. The transmission downshifts to $3^{rd}$ gear from $5^{th}$ gear. The desired engine state and the desired engine state absent gear conditions remain at higher levels so that the engine remains on.

At time $T_{24}$, the desired engine state absent gear conditions transitions to a lower level to indicate that the engine may be stopped in response to the desired driveline torque, vehicle speed (not shown), and brake applied (not shown). However, the desired engine state remains at a high level in response to the forecasted desired driveline torque increasing to a level greater than 1606 as forecast for the transmission shifting to $4^{th}$ gear. Consequently, engine stopping is inhibited. Such conditions may be present when a vehicle is moving and when a driver tips-out (e.g., releases or reduces) an accelerator pedal command.

Between time $T_{24}$ and time $T_{25}$, the desired driveline torque increases and then decreases. The transmission shifts gears between $3^{rd}$ and $5^{th}$ gears in response to driver demand torque, vehicle speed (not shown), and brake state (not shown). The desired engine state absent gear conditions and the desired engine state remain at higher levels in response to the desired driveline torque.

At time $T_{25}$, the desire driveline torque is reduced to less than level 1606 in response to a lower driver demand (not shown). The desired engine state absent gear conditions and the desired engine state transition to a lower level to indicate the engine is to be stopped in response to the desired driveline torque, brake pedal state (not shown), and vehicle speed (not shown). The engine is stopped in response to the desired engine state.

Between time $T_{25}$ and time $T_{26}$, the desired driveline torque gradually increases and the forecast transmission gear increases from $2^{nd}$ gear to $3^{rd}$ gear in response to the increasing desired driveline torque. The desired engine state and the desired engine state absent gear conditions remain at a lower level and the engine remains stopped.

At time $T_{26}$, the desired engine state transitions to a higher level and the engine is started in response to the increasing desired driveline torque and the forecasted transmission gear. The desired engine state absent gear conditions remains at a low level indicating that the engine would not be started but for the forecasted desired driveline torque being greater than 1606 after a forecasted transmission gear shift. By starting the engine before the actual gear shift, it may be possible to provide the desired driveline torque after a shift.

In this way, the engine may be started before a gear shift to provide a desired driveline torque after the gear shift. Further, the method forecasts shifting so that the engine may be started before the desired driveline torque is actually requested. Starting the engine early may allow the engine to reach conditions where it may output torque to meet the desired driveline torque.

The methods and systems of FIGS. 1-3 and 15-16 provide for a method of starting an engine, comprising: predicting a desired torque after a transmission upshift; and starting rotation of a stopped engine if the predicted desired torque after the transmission upshift is greater than a threshold amount of torque. The method includes where the desired torque is a torque converter impeller torque, and where the predicting the desired torque and starting rotation are during conditions where a driveline integrated starter/generator is providing torque to wheels and where the transmission is in a forward gear and where the vehicle is moving. The method includes where the desired torque is predicted based on a predetermined transmission shift schedule.

In some examples, the method includes where rotation of the engine is started via a driveline disconnect clutch. The method includes where the driveline disconnect clutch is disengaged prior to rotating the engine. The method includes where the driveline disconnect clutch is located in the hybrid vehicle driveline between a dual mass flywheel and a driveline integrated starter/generator. The method includes where the engine is rotated in response to the predicted desired driveline torque before a transmission is shifted.

The methods and systems of FIGS. 1-3 and 15-16 provide for starting an engine, comprising: providing a torque to a vehicle driveline via an electric machine; scheduling a transmission upshift; and starting rotation of a stopped engine in response to the scheduled transmission upshift if a desired torque after the scheduled transmission upshift is greater than a threshold amount of torque, and where the desired torque is based on driveline integrated starter/generator torque after a transmission upshift timing of engaging a transmission clutch relative to starting the engine. The method includes where the electric machine is a driveline integrated starter/generator (DISG) and where the DISG is located in the hybrid vehicle driveline at a location between a driveline disconnect clutch and a transmission.

In some examples, the method includes where the DISG provides torque to start rotation of the stopped engine via at least partially closing the driveline disconnect clutch. The method further comprises upshifting the transmission after starting rotation of the engine. The method also includes where the transmission is a dual layshaft-dual clutch transmission. The method includes where the transmission is an automatic transmission. The method further comprises allowing the engine to stop rotating if the desired torque after the transmission upshift timing of engaging a transmission clutch relative to starting the engine is less than the threshold amount of torque.

The methods and systems of FIGS. 1-3 and 15-16 provide for a hybrid vehicle system, comprising: an engine; a dual mass flywheel including a first side mechanically coupled to the engine; a driveline disconnect clutch mechanically including a first side coupled to a second side of the dual mass flywheel; a driveline integrated starter/generator mechanically including a first side coupled to a second side of the driveline disconnect clutch; and a controller including non-transitory instructions executable to start the engine via closing the driveline disconnect clutch in response to a desired torque after a scheduled transmission upshift, the engine started before the transmission shifts in response to the scheduled transmission upshift. Such a system may improve driveline response time.

In one example, the hybrid vehicle system further comprises additional instructions to inhibit stopping engine rotation if the engine is rotating before the scheduled transmission upshift. The hybrid vehicle system includes where the engine is started by rotating the engine via the driveline integrated starter/generator in response to closing the driveline disconnect clutch. The hybrid vehicle system further comprises additional instructions to upshift the transmission after the engine is started. The hybrid vehicle system further comprises additional instructions to allow the engine to stop rotating in response to the desired torque after the scheduled transmission upshift. The hybrid vehicle system further comprises additional instructions to delay starting the engine until the scheduled transmission upshift is scheduled for a time less than a threshold amount of time.

Figure 17:
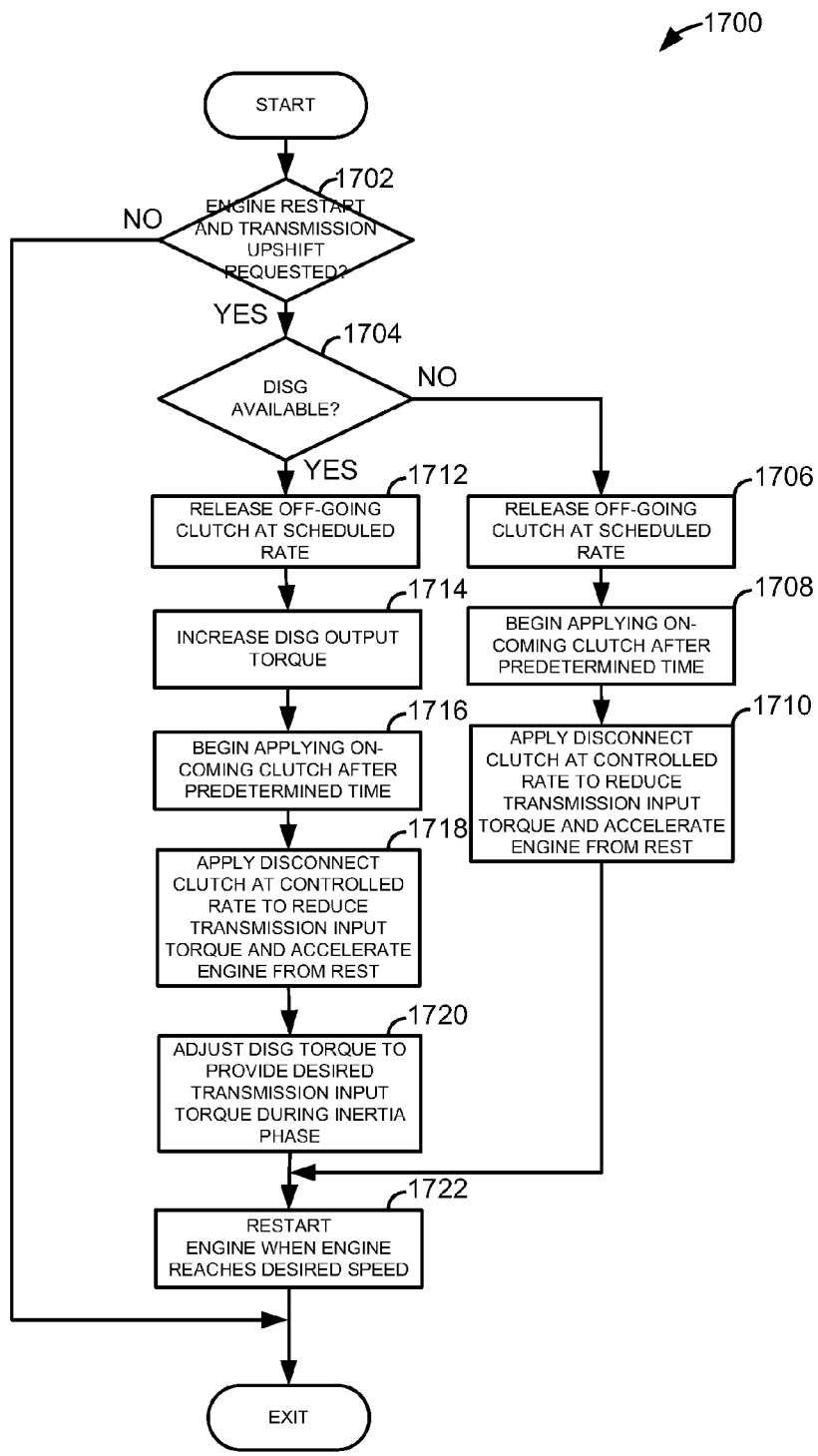

Referring now to FIG. 17, a flowchart of a method for starting an engine to reduce transmission input torque during a transmission shift is shown. The method of FIG. 17 may be stored as executable instructions in non-transitory memory in the system shown in FIGS. 1-3. The method of FIG. 17 may reduce the magnitude and/or number of times torque changes are made to a DISG during vehicle operation to limit torque applied to a transmission during transmission shifting.

At 1702, method 1700 judges whether or not an engine restart and transmission upshift are desired. An engine restart may be requested when a requested driveline torque is increased or when a driver releases a brake pedal, for example. A transmission upshift may be requested in response to vehicle speed and driveline torque demand, for example. In one example, a transmission shifting schedule is empirically determined and stored in memory to be indexed by vehicle speed and driveline torque demand. If method 1700 determines that a transmission upshift and engine start are requested, method 1700 proceeds to 1704. Otherwise, method 1700 proceeds to exit.

At 1704, method 1700 judges whether or not the DISG is available. Method 1700 may judge whether or not the DISG is available based on a DISG state flag stored in memory. Alternatively, method 1700 may judge whether or not a DISG is available based on operating conditions such as battery state of charge. For example, if SOC is less than a threshold level, the DISG may not be available. In another example, the DISG may not be available if DISG temperature is greater than a threshold. If method 1700 judges that the DISG is available the answer is yes and method 1700 proceeds to 1712. Otherwise, the answer is no and method 1700 proceeds to 1706.

At 1706, method 1700 releases an off-going clutch at a scheduled rate. The off-going clutch is a lower gear during an upshift. For example, the off-going clutch releases a $2^{nd}$ gear clutch during a $2^{nd}$ to $3^{rd}$ gear upshift. The clutch release rate may be empirically determined and stored in memory so that when the upshift occurs the off-going clutch can be released at a rate that is stored in memory. The off-going clutch may be released via lowering oil pressure supplied to the off-going clutch. Method 1700 proceeds to 1708 after the off-going clutch is released.

At 1708, method 1700 begins to apply the on-coming clutch to engage a higher gear after a predetermined amount of time since release of the off-going clutch commenced. The on-coming clutch may be applied by increasing pressure of oil supplied to the on-coming clutch. The predetermined amount of time may be empirically determined and stored in memory for use during an upshift. In one example, the on-coming clutch is applied at a time that reduces the possibility of wearing of the off-going clutch by speeding up the output side of the off-going clutch. Method 1700 proceeds to 1710 after application of the on-coming clutch is initiated.

At 1710, method 1700 applies or begins to close the driveline disconnect clutch at a controlled rate to reduce transmission input shaft torque. In particular, the engine applies a load to the input side of the torque converter by closing the driveline disconnect clutch so as to reduce the speed of the torque converter impeller speed. In this way, the amount of torque transmitted through the torque converter to the transmission input shaft is decreased. In one example, the driveline disconnect clutch rate is adjusted based on the torque converter impeller speed as the driveline disconnect clutch is applied. For example, the driveline disconnect clutch application pressure is increased until torque converter impeller speed is reduced to a threshold amount and then the driveline disconnect clutch application pressure is not further increased. Since the driveline disconnect clutch transfers torque from the input side of the transmission to the engine, the amount of torque transferred to the engine from the transmission is limited based on the impeller speed. Method 1700 proceeds to 1722 after the driveline disconnect clutch application pressure is increased and the driveline disconnect clutch is at least partially closed.

At 1712, method 1700 releases an off-going clutch at a scheduled rate. Releasing the off-going clutch allows a higher gear to be applied without torque being transferred via two different gears. The off-going clutch release rate may be empirically determined and stored in memory for retrieval during upshifting. Method 1700 proceeds to 1714 after release of the off-going clutch is initiated.

At 1714, method 1700 increases DISG output torque to increase the torque supplied to the torque converter impeller. In one example, the DISG torque is increased by an amount of torque used to accelerate the engine to a desire engine speed. The DISG torque may be increased via increasing an amount of current supplied to the DISG. In other examples, the DISG output torque may be reduced to lower transmission input torque. Method 1700 proceeds to 1716 after DISG torque is increased.

At 1716, method 1700 begins to apply the on-coming clutch to engage a higher gear after a predetermined amount of time since release of the off-going clutch commenced. The on-coming clutch may be applied by increasing pressure of oil supplied to the on-coming clutch. The predetermined amount of time may be empirically determined and stored in memory for use during an upshift. In one example, the on-coming clutch is applied at a time that reduces the possibility of wearing of the off-going clutch by speeding up the output side of the off-going clutch. Method 1700 proceeds to 1718 after application of the on-coming clutch is initiated.

At 1718, method 1700 applies or begins to close the driveline disconnect clutch at a controlled rate to reduce transmission input torque and accelerate the engine to a desired cranking speed. In particular, the engine applies a load to the input side of the torque converter by closing the driveline disconnect clutch so as to reduce the speed of the torque converter impeller. The driveline disconnect clutch apply pressure may be modulated to control the torque transfer across the driveline disconnect clutch. Further, the driveline disconnect clutch may be applied any time during the inertia phase of shifting when the on-coming clutch is being closed.

In one example, the driveline disconnect clutch application rate may be adjusted based on the torque converter impeller speed as the driveline disconnect clutch is applied. Since the driveline disconnect clutch transfers torque from the input side of the transmission to the engine, the amount of torque transferred to the engine is limited based on the impeller speed. In another example, a transfer function of the driveline disconnect clutch that relates torque transferred based on the amount of input torque supplied to the driveline disconnect clutch and driveline disconnect clutch apply pressure is multiplied by the DISG torque to determine an amount of torque transferred to the engine to start the engine. The driveline disconnect clutch application rate may be adjusted such that a desired cranking torque is provided to the engine via the DISG and driveline disconnect clutch.

In still another example, the driveline disconnect clutch application rate may be controlled based on speed of the DISG and a desired engine speed run-up rate. For example, a driveline disconnect clutch application rate may be retrieved from an empirically determined table that outputs driveline disconnect clutch application rate when indexed via DISG speed and desired engine acceleration. Method 1700 proceeds to 1720 after driveline disconnect clutch application is initiated.

At 1720, method 1700 adjusts DISG torque to provide a desired transmission input torque via the torque converter impeller during or after the inertia phase of the transmission upshift. If the engine mass is relatively high, DISG output may be increased so that the transmission input torque is not reduced more than is desired. If the engine mass is relatively low, the DISG torque may be reduced so that transmission input torque is reduced by a desired amount. The DISG torque may be adjusted by increasing or decreasing current supplied to the DISG. Method 1700 proceeds to 1722 after DISG torque is adjusted.

At 1722, method 1700 starts the engine when engine speed reaches a threshold speed by supplying fuel and spark to the engine. In some examples, a starter other than the DISG may be engaged to the engine to provide torque additional to the torque provided by the driveline disconnect clutch to the engine when the engine is being started so that a desired engine cranking speed may be achieved. Method 1700 proceeds to exit after the engine is started.

In this way, transmission output shaft torque may be reduced during an inertia phase of shifting so that driveline torque disturbances may be reduced. Starting the engine via closing the driveline disconnect clutch reduces the transmission input shaft torque so that the transmission output shaft torque may be reduced during the inertia phase of shifting.

Figure 18:
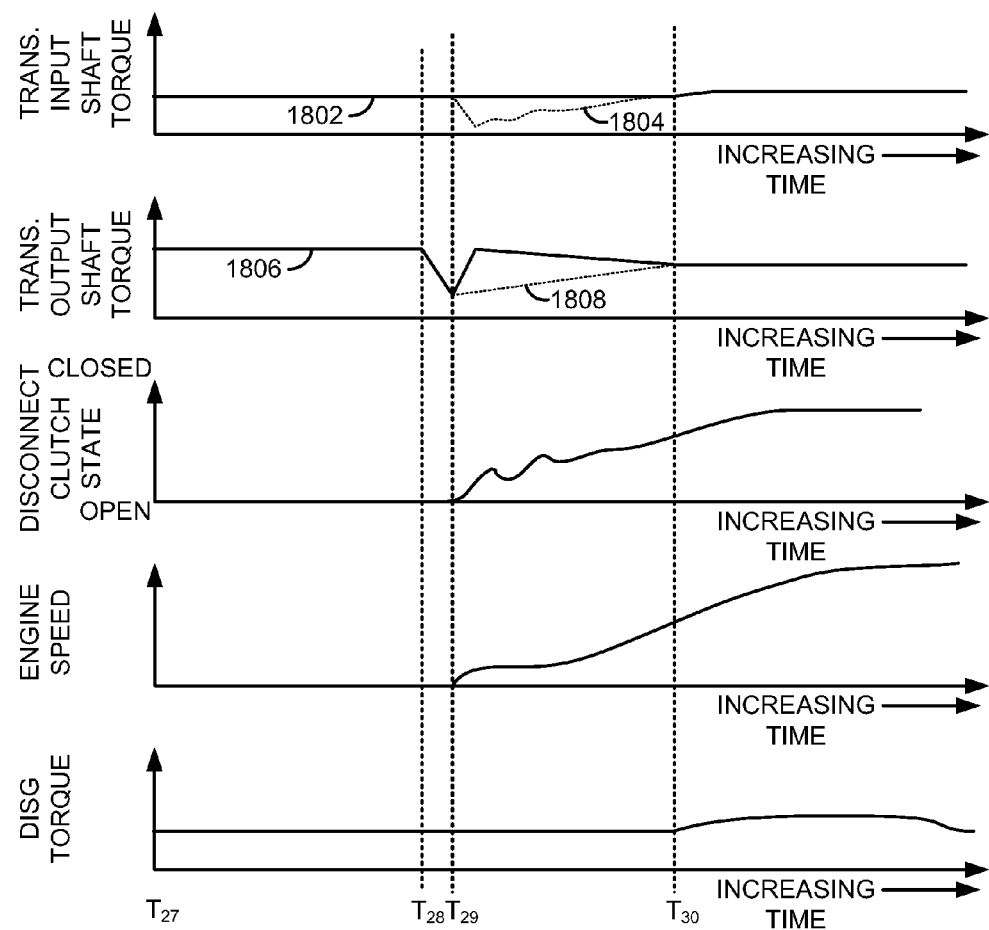

Referring now to FIG. 18, an example sequence of starting an engine during transmission gear shifting according to the method of FIG. 17 is shown. The sequence of FIG. 18 may be provided by the system of FIGS. 1-3. The dashed traces are equivalent to the solid traces when the dashed traces are not visible.

The first plot from the top of FIG. 18 represents transmission input shaft torque versus time. The torque at the transmission input shaft is equal to transmission torque converter turbine torque. The Y axis represents transmission input shaft torque and transmission input shaft torque increases in the direction of the Y axis. The X axis represents time and time increases from the left hand side of the figure to the right hand side of the figure. Solid trace 1802 represents transmission input shaft torque without starting the engine via closing the driveline disconnect clutch or providing transmission input shaft torque reduction. Dashed trace 1804 represents the transmission input shaft torque when starting the engine via closing the driveline disconnect clutch and shifting to a higher gear.

The second plot from the top of FIG. 18 represents transmission output shaft torque versus time. The Y axis represents transmission output shaft torque and transmission output shaft torque increases in the direction of the Y axis arrow. The X axis represents time and time increases from the left hand side of the figure to the right hand side of the figure. Solid trace 1806 represents transmission output shaft torque without starting the engine via closing the driveline disconnect clutch or providing transmission input shaft torque reduction. Dashed trace 1808 represents the transmission output shaft torque when starting the engine via closing the driveline disconnect clutch and shifting to a higher gear.

The third plot from the top of FIG. 18 represents driveline disconnect clutch state versus time. The Y axis represents driveline disconnect clutch state where the driveline disconnect clutch is open near the X axis and closed near the top of the Y axis. The amount of torque transferred through the driveline disconnect clutch increases as the driveline disconnect clutch is closed. The X axis represents time and time increases from the left hand side of the figure to the right hand side of the figure.

The fourth plot from the top of FIG. 18 represents engine speed versus time. The Y axis represents engine speed and engine speed increases in the direction of the Y axis arrow. The X axis represents time and time increases from the left hand side of the figure to the right hand side of the figure.

The fifth plot from the top of FIG. 18 represents DISG torque versus time. The Y axis represents DISG torque and DISG torque increases in the direction of the Y axis arrow. The X axis represents time and time increases from the left hand side of the figure to the right hand side of the figure.

At time $T_{27}$, the transmission is not shifting and the engine is stopped. The DISG is outputting torque to the driveline and transmission input shaft and output shaft torques are constant.

At time $T_{28}$, the transmission begins to shift in response to a transmission shift schedule, desired driveline torque (not shown), and vehicle speed (not shown). The shift begins by releasing an off-going clutch. For example, during an upshift from $2^{nd}$ gear to $3^{rd}$ gear, the $2^{nd}$ gear clutch (off-going clutch) releases before the $3^{rd}$ gear (on-coming clutch) is applied. The transmission input shaft torque is held constant, although it may be increased in some examples to better maintain transmission output shaft torque. The transmission output torque begins to decrease in response to releasing the off-going clutch. The driveline disconnect clutch is shown being open and the engine is stopped. The DISG torque is shown being maintained at a constant value.

At time $T_{29}$, the inertia phase begins by applying the on-coming clutch in response to releasing the off-going clutch. The driveline disconnect clutch begins to close as the on-coming clutch is applied and begins to close. The transmission input shaft torque is also shown decreasing in response to the driveline disconnect clutch closing since some DISG torque is transferred via the driveline disconnect clutch to rotate the engine. The engine speed begins to increase in response to driveline torque being applied to the engine. The DISG torque is shown at a constant level.

Between time $T_{29}$ and time $T_{30}$, the driveline disconnect clutch state is shown being modulated to control the amount of driveline torque being applied to the engine. The driveline disconnect clutch apply pressure may be modulated in response to engine speed and/or transmission output shaft speed so as to reduce driveline torque disturbances during shifting and engine starting. Spark and fuel (not shown) are also supplied to the engine so that engine speed approaches DISG speed. The transmission output shaft torque gradually increases when the driveline disconnect clutch is applied to restart the engine as indicated by dashed line 1808. If the driveline disconnect clutch is not applied during the inertia phase, the transmission output shaft torque increases in response to the gear ratio change. Thus, applying the driveline disconnect clutch during the inertia phase may reduce driveline torque disturbances.

At time $T_{30}$, the inertia phase of transmission shifting is complete as the on-coming clutch (not shown) is fully applied as indicated by the transmission output torque converging to a constant value. The DISG torque is also shown increasing in response to completion of the shift so that vehicle acceleration may resume.

In this way, a driveline torque disturbance during shifting may be reduced. Further, energy in the driveline may be applied to start the engine so that the DISG may supply less torque to start the engine.

The methods and systems of FIGS. 1-3 and 17-18 provide for shifting a transmission, comprising: coupling an engine to a transmission in response to a request to upshift the transmission. In this way, transmission input shaft torque can be reduced to control transmission output shaft torque during a shift. The method includes where the engine is not coupled to the transmission prior to the request to upshift the transmission, where the transmission is in a moving vehicle and in a forward drive gear, and where the vehicle continues to move and where the transmission is upshifted to a higher gear. The method includes where the engine is coupled to the transmission via a driveline disconnect clutch positioned in a driveline between the engine and a torque converter.

In some examples, the method includes where the engine is coupled to the transmission during an inertia phase of the upshift. The method includes where the engine is coupled to the transmission after release of an off-going clutch is initiated during the upshift. The method further comprises starting the engine when engine speed reaches a threshold speed. The method includes where the transmission is an automatic transmission, and where input torque to the automatic transmission is reduced during the upshift.

The methods and systems of FIGS. 1-3 and 17-18 also provide for shifting a transmission, comprising: reducing input torque to a transmission in response to a transmission upshift request via selectively coupling an engine to an input shaft of the transmission, the engine not coupled to the transmission prior to the transmission upshift request. The method includes where the engine is coupled to the transmission via a driveline disconnect clutch. The method further comprises a torque converter in a driveline positioned between the engine and the transmission. The method further comprises increasing or decreasing torque of a driveline integrated starter/generator during the upshift. The method includes where torque from the driveline integrated starter/generator is increased to hold an impeller speed of a torque converter greater than a threshold speed. The method includes where engine rotation is stopped prior to the transmission upshift request.

The methods and systems of FIGS. 1-3 and 17-18 also provide for a hybrid vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch and a second side; a transmission coupled to the DISG; and a controller including non-transitory instructions executable to initiate a transmission shift request and to couple the engine to the transmission in response to the transmission shift request.

In some examples, the hybrid vehicle system further comprises a torque converter located in a driveline between the transmission and the DISG. The hybrid vehicle system further comprises additional instructions to start the engine. The hybrid vehicle system further comprising additional instructions to couple the engine to the transmission via the driveline disconnect clutch. The hybrid vehicle system further comprises additional instructions to increase DISG torque in response to the transmission upshift request. The hybrid vehicle system further comprises additional instructions to reduce DISG torque in response to the transmission upshift request. The hybrid vehicle system further comprises additional instructions to accelerate the engine to a desired cranking speed.

Figure 19:
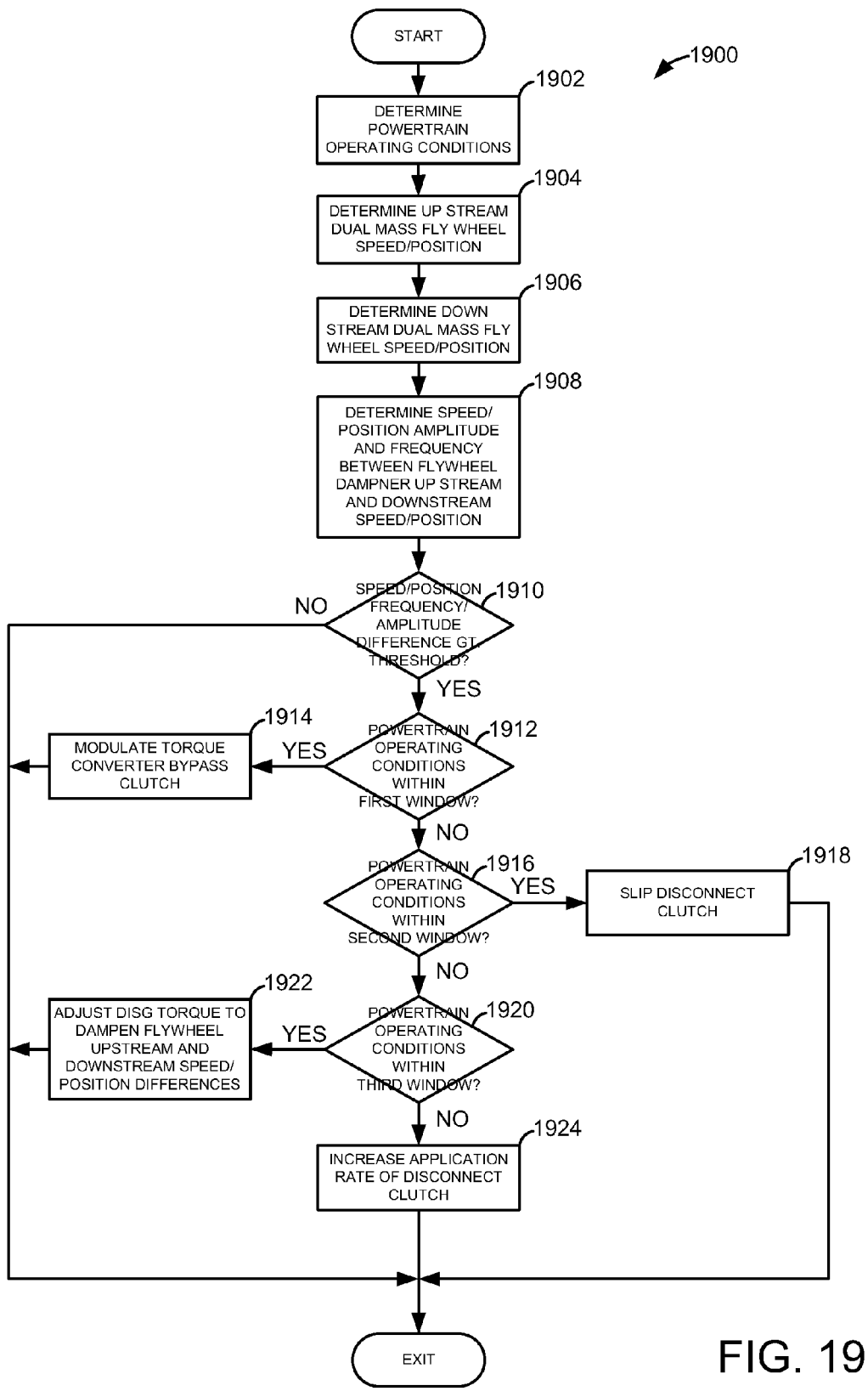
FIGS. 19-22 show methods and prophetic sequences for providing flywheel and driveline disconnect clutch compensation.

Referring now to FIG. 19, a method for improving vehicle driveline response when the driveline includes a dual mass flywheel is shown. The method of FIG. 19 may be stored as executable instructions in non-transitory memory of controller 12 shown in FIGS. 1-3.

At 1902, method 1900 determines operating conditions. Operating conditions may include but are not limited to engine speed, DMF input and output speeds, requested driveline torque, DISG torque, driveline disconnect clutch state, and engine torque. Method 1900 proceeds to 1904 after operating conditions are determined.

At 1904, method 1900 determines speed and/or position of the upstream or engine side of the DMF. In alternative examples, the torque on the upstream side of the DMF may be determined. The speed and/or position may be determined from a position sensor. Torque may be determined via a torque sensor. Method 1900 proceeds to 1906 after speed and/or position of the upstream side of the DMF is determined.

At 1906, method 1900 determines speed and/or position downstream or on the driveline disconnect clutch side of the DMF. Alternatively, the torque on the downstream side of the DMF may be determined. The speed and/or position at the downstream side of the DMF may be determined via a position sensor. Torque on the downstream side of the DMF may be determined via a torque sensor. Method 1900 proceeds to 1908 after the downstream side speed and/or position of the DMF is determined.

At 1908, method 1900 determines a speed, position, or torque difference between the upstream side of the DMF and the downstream side of the DMF. In one example, the driveline disconnect clutch side of the DMF is a desired speed and/or position side of the DMF. The speed and/or position on the engine side of the DMF is subtracted from the speed and/or position of the engine side of the DMF to provide a DMF speed and/or position error across the DMF. Alternatively, torque on the engine side of the DMF may be subtracted from torque on the upstream side of the DMF to provide a torque error. In some examples, a difference in a speed/position between a first side of the DMF and a second side of the DMF during driveline operation is compared to a position of the first side of the DMF and position of the second side of the DMF when no torque is transferred across the DMF.

In another example, a fast Fourier transform of the DMF upstream and downstream speed signals may be performed to determine amplitude or magnitude and frequency of any speed oscillations on the upstream and downstream sides of the DMF. Method 1900 proceeds to 1910 after the speed error across the DMF and/or the frequencies and amplitudes of speed upstream and downstream of the DMF are determined.

At 1910, method 1900 judges whether the speed and/or position error or the amplitudes and frequencies on the upstream and downstream sides of the DMF are greater than threshold levels. If so, method 1900 proceeds to 1912. Otherwise, method 1900 proceeds to exit.

At 1912, method 1900 judges whether or not driveline operating conditions are within a first operating window. For example, if the upstream and downstream DMF speed error is greater than a first threshold level. In other examples, the torque difference or position difference across the DMF may be the basis of determining whether or not the driveline operating conditions are within a first operating window. In still other examples, the frequencies or frequency amplitudes are compared to threshold values. If driveline operating conditions are within a first operating window, method 1900 proceeds to 1914. Otherwise, method 1900 proceeds to 1916.

At 1914, method 1900 method 1900 modulates the transmission torque converter clutch (TCC) to dampen speed and/ or torque oscillations across the DMF. The TCC is modulated via varying a duty cycle of TCC command signal. In other examples, the frequency of the TCC is adjusted. The duty cycle of the TCC control command is reduced to increase slip across the torque converter clutch, thereby increasing the dampening of the DMF. However, if the TCC is slipping by a threshold amount when the speed/position difference is detected across the DMF, the TCC may be commanded to a locked position by increasing the TCC duty cycle command. The amount of TCC adjustment may be based on an error between a desired value and an actual value. For example, the TCC duty cycle may be adjusted based on a difference between upstream and downstream DMF speeds. Method 1900 proceeds to exit after the TCC is adjusted.

At 1916, method 1900 judges whether or not driveline operating conditions are within a second operating window. For example, if the upstream and downstream DMF speed error is greater than a second threshold level. If driveline operating conditions are within a second operating window, method 1900 proceeds to 1918. Otherwise, method 1900 proceeds to 1920.

At 1918, method 1900 adjusts slip of the driveline disconnect clutch to adjust dampening across the DMF. In one example, the amount of slip across the driveline disconnect clutch is increased to increase dampening across the DMF. However, if the driveline disconnect clutch is slipping by a threshold amount when the speed/position error is detected, the driveline disconnect clutch is fully closed to stiffen the driveline. The driveline disconnect clutch application force or pressure may be adjusted based on a difference between upstream and downstream DMF speeds or differences between desired and actual values of previously discussed variables such as driveline frequency amplitude. Method 1900 proceeds to exit after the driveline disconnect clutch application force or pressure is adjusted. Method 1900 proceeds to exit after the driveline disconnect clutch is adjusted.

At 1920, method 1900 judges whether or not driveline conditions are within a third operating window. For example, if the upstream and downstream DMF speed error is greater than a third threshold level. If so, method 1900 proceeds to 1922. Otherwise, method 1900 proceeds to 1924.

At 1922, method 1900 adjusts torque of the DISG to compensate for the speed/position or torque differential across the DMF. In one example, torque output of the DISG is increased if the speed on the engine side of the DMF is greater than the speed on the driveline disconnect clutch side of the DMF. The torque output from the DISG is decreased if the speed in the on the engine side of the DMF is less than the speed on the driveline disconnect clutch side of the DMF. In one example, the DMF speed, position, or torque error is input to a function or table that outputs a current demand to adjust DISG torque. Further, the DISG torque is increased when the sign of the error signal is negative. The DISG torque is decreased when the sign of the error signal is positive. If an undesirable frequency or magnitude is determined, the torque supplied to the DISG may be adjusted toward being 180 degrees out of phase of the speed signal error to dampen the undesired speed oscillations. Method 1900 proceeds to exit after the DISG torque is adjusted.

At 1924, method 1900 increases the application rate of the driveline disconnect clutch if the driveline disconnect clutch is not closed. The driveline disconnect clutch may be closed and the application pressure increased by increasing a duty cycle of driveline disconnect clutch control signal. Method 1900 proceeds to exit after the driveline disconnect clutch is closed.

In other examples, slip of the driveline disconnect clutch, TCC, and DISG torque may be adjusted simultaneously to adjust dampening across the DMF. In this way, method 1900 may adjust one or more actuators to increase damping or stiffen a driveline when a speed/position, frequency, or torque differential or error across a DMF is greater than a threshold level.

Figure 20:
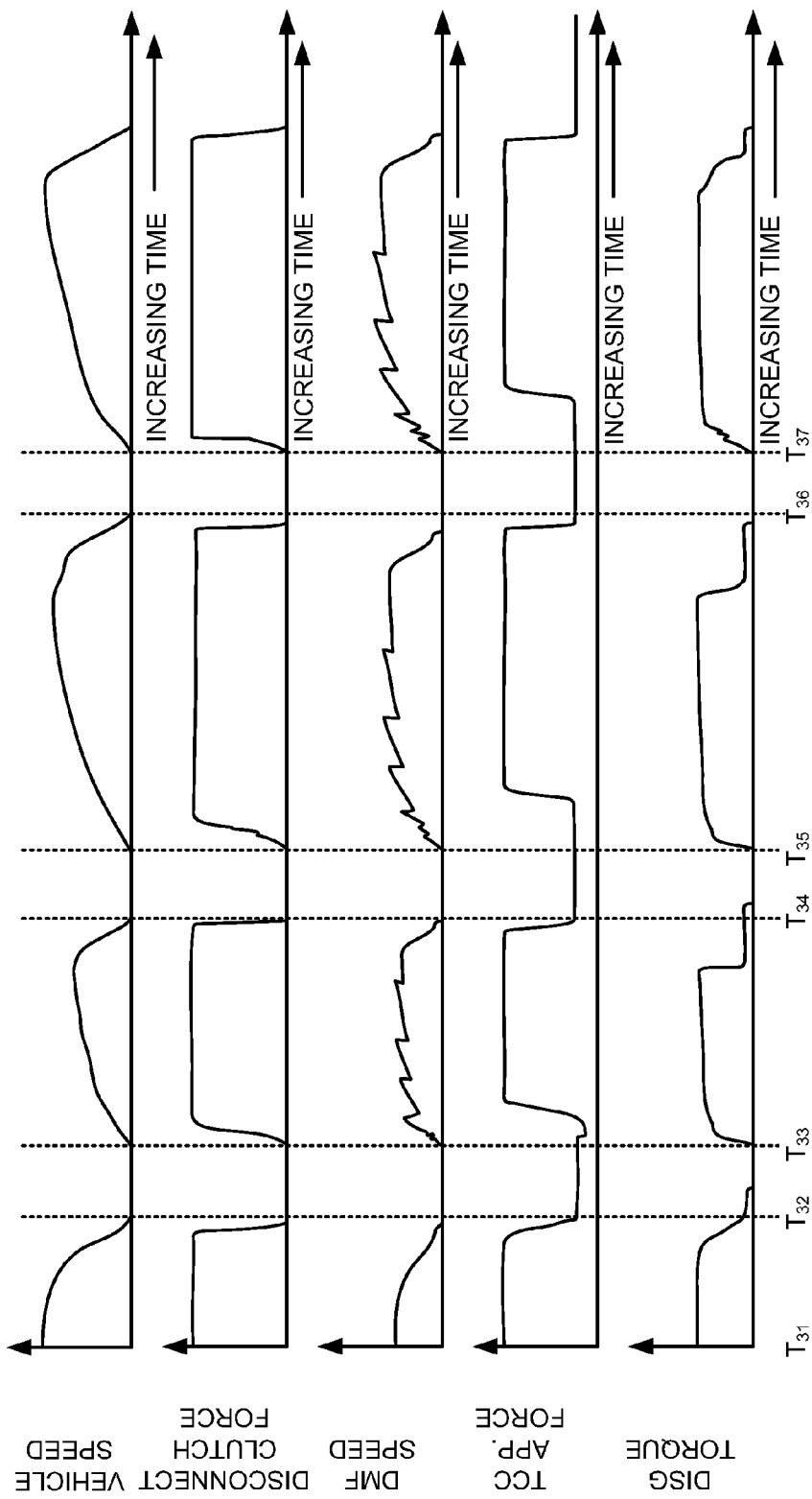

Referring now to FIG. 20, an example sequence for compensating for a DMF in a driveline according to the method of FIG. 19 is shown. The sequence of FIG. 20 may be provided by the system of FIGS. 1-3.

The first plot from the top of FIG. 20 represents vehicle speed versus time. The Y axis represents vehicle speed and vehicle speed increases in the direction of the Y axis. The X axis represents time and time increases from the left hand side of the figure to the right hand side of the figure.

The second plot from the top of FIG. 20 represents driveline disconnect clutch application force versus time. The Y axis represents driveline disconnect clutch force and driveline disconnect clutch application force increases in the direction of the Y axis arrow. The X axis represents time and time increases from the left hand side of the figure to the right hand side of the figure.

The third plot from the top of FIG. 20 represents DMF speed versus time. The Y axis represents DMF speed and DMF speed increases in the direction of the Y axis arrow. The X axis represents time and time increases from the left hand side of the figure to the right hand side of the figure.

The fourth plot from the top of FIG. 20 represents TCC application force versus time. The Y axis represents TCC application force and TCC application force increases in the direction of the Y axis arrow. The X axis represents time and time increases from the left hand side of the figure to the right hand side of the figure.

The fifth plot from the top of FIG. 20 represents DISG torque versus time. The Y axis represents DISG torque and DISG torque increases in the direction of the Y axis arrow. The X axis represents time and time increases from the left hand side of the figure to the right hand side of the figure.

At time $T_{31}$, vehicle speed is elevated and the driveline disconnect clutch is fully applied which is indicated by the driveline disconnect clutch application force being at the elevated level. The DMF speed is also at a higher level and the TCC clutch is closed as indicated by the TCC application force being at the elevated level. The DISG torque is also at a higher level indicating that the DISG is supplying torque to the vehicle driveline.

At time $T_{32}$, vehicle speed reaches zero and the driveline disconnect clutch is opened to allow the engine to stop in response to a low driveline torque demand (not shown). The DMF speed is also reduced to zero as engine speed goes to zero. The TCC application force is reduced so that slippage across the torque converter is present. The DISG torque is also reduced, but the DISG continues to provide torque to the driveline so that oil pressure may be maintained in the transmission. In other words, DISG torque is transferred through the torque converter while the vehicle and engine are stopped. The DISG torque rotates the transmission oil pump to maintain transmission oil pressure.

At time $T_{33}$, the DISG torque increases in response to an increasing demand torque requested by the driver (not shown). The vehicle speed begins to increase in response to the increased DISG torque and the driveline disconnect clutch begins to close in response to the increasing demand torque. The DMF speed increases as the driveline disconnect clutch application force increases to close the driveline disconnect clutch. The actual DMF speed begins to oscillate and an error between desired DMF speed and actual DMF speed or between desired driveline oscillation amplitude and actual driveline oscillation increases to a level greater than a first threshold. The TCC application force is reduced further to reduce the DMF oscillations and/or speed error.

Between time $T_{33}$ and time $T_{34}$, the engine and DISG supply torque to the vehicle driveline. Further, the driveline disconnect clutch remains fully closed and the DMF speed varies as engine speed varies.

At time $T_{34}$, vehicle speed reaches zero and the driveline disconnect clutch is opened to allow the engine to stop in response to a low driveline torque demand (not shown). The DMF speed is also reduced to zero as engine speed goes to zero. The TCC application force is again reduced so that slippage across the torque converter is present. The DISG torque is also reduced.

At time $T_{35}$, the DISG torque increases in response to an increasing demand torque requested by the driver (not shown). The vehicle speed begins to increase in response to the increased DISG torque and the driveline disconnect clutch begins to close in response to the increasing demand torque. The DMF speed increases as the driveline disconnect clutch application force increases to close the driveline disconnect clutch. The actual DMF speed begins to oscillate with greater amplitude than at time $T_{33}$ and an error between desired DMF speed and actual DMF speed or between desired driveline oscillation amplitude and actual driveline oscillation increases to a level greater than a second threshold. The driveline disconnect clutch application force is reduced to lower the DMF oscillations and/or speed error.

Between time $T_{35}$ and time $T_{36}$, the engine and DISG supply torque to the vehicle driveline. Further, the driveline disconnect clutch remains fully closed and the DMF speed varies as engine speed varies.

At time $T_{36}$, vehicle speed reaches zero and the driveline disconnect clutch is opened to allow the engine to stop in response to a low driveline torque demand (not shown). The DMF speed is also reduced to zero as engine speed goes to zero. The TCC application force is again reduced so that slippage across the torque converter is present. The DISG torque is also reduced.

At time $T_{37}$, the DISG torque increases in response to an increasing demand torque requested by the driver (not shown). The vehicle speed begins to increase in response to the increased DISG torque and the driveline disconnect clutch begins to close in response to the increasing demand torque. The DMF speed increases as the driveline disconnect clutch application force increases to close the driveline disconnect clutch. The actual DMF speed begins to oscillate with greater amplitude than at time $T_{35}$ and an error between desired DMF speed and actual DMF speed or between desired driveline oscillation amplitude and actual driveline oscillation increases to a level greater than a third threshold. The DISG output torque is adjusted (e.g., modulated) to dampen the DMF speed, frequency, or torque errors. Additionally, the application rate of increasing driveline disconnect clutch application force may be increased to stiffen the driveline.

In this way, different actuators may be adjusted to control driveline torque disturbances that may be present at a DMF. The different actuators may be adjusted according to the disturbance (e.g., speed error, torque error, oscillations) measured at the DMF.

The methods and systems of FIGS. 1-3 and 19-20 provide for adjusting operation of a hybrid vehicle driveline, comprising: adjusting an actuator in response to a speed or torque differential across a dual mass flywheel (DMF) positioned in the hybrid vehicle driveline between an engine and a driveline disconnect clutch where the DMF is driveline component positioned between the engine and the driveline disconnect clutch. In this way driveline NVH may be reduced.

In one example, the method includes where the actuator is a torque converter clutch. The method includes where the actuator is a driveline integrated starter/generator. The method includes where the actuator is a driveline disconnect clutch. The method includes where the speed differential across the DMF is determined from and engine position sensor and a positions sensor located in the hybrid vehicle driveline between the DMF and a driveline disconnect clutch. The method includes where the driveline disconnect clutch is located in the hybrid vehicle driveline between the DMF and a driveline integrated starter/generator. The method includes where the driveline disconnect clutch selectively disengages the engine from a driveline integrated starter/generator and a transmission.

The methods and systems of FIGS. 1-3 and 19-20 also provide for adjusting operation of a hybrid vehicle driveline, comprising: engaging a driveline disconnect clutch to rotate an engine via an electric machine; and adjusting an actuator in response to a speed or torque differential across a dual mass flywheel (DMF) positioned in the hybrid vehicle driveline between the engine and a driveline disconnect clutch, where the DMF is a driveline component between the engine and the driveline disconnect clutch. The method includes where the electric machine is a driveline integrated starter\generator (DISG) located in the hybrid vehicle driveline at a location between the driveline disconnect clutch and a transmission. The method includes where the actuator is the DISG. The method includes where the DMF transfers engine torque to an automatic transmission or a dual layshaft-dual clutch transmission. The method includes where the actuator is a different actuator for different conditions. The method includes where a frequency component of an engine speed signal is a basis for adjusting the actuator. The method includes where the frequency component is determined via a fast Fourier transform (FFT).

The methods and systems of FIGS. 1-3 and 19-20 provide for a hybrid vehicle system, comprising: an engine; a dual mass flywheel (DMF) including a first side mechanically coupled to the engine; a driveline disconnect clutch mechanically including a first side coupled to a second side of the dual mass flywheel; a driveline integrated starter\generator (DISG) including a first side coupled to a second side of the driveline disconnect clutch; and a controller including non-transitory instructions executable to adjust an actuator in response to a difference across the DMF.

In one example, the hybrid vehicle system further comprises a transmission coupled to a second side of the DISG. The hybrid vehicle system includes where the difference is a position difference between a first side of the DMF and a second side of the DMF as compared to a position of the first side of the DMF and position of the second side of the DMF when no torque is transferred across the DMF. The hybrid vehicle system includes where the actuator is the DISG. The hybrid vehicle system further comprises additional executable instructions to increase slip across the driveline disconnect clutch when a difference in speed between the first side and the second side of the DMF exceeds a threshold speed. The hybrid vehicle system further comprises additional executable instructions to increase slip across a torque converter clutch when a difference in speed between the first side and the second side of the DMF exceeds a threshold speed.

The methods and systems of FIGS. 1-3 and 19-20 also provide for adjusting operation of a vehicle driveline, comprising: adjusting an actuator in response engagement of a driveline disconnect clutch to dampen oscillation of a dual mass flywheel (DMF) positioned between an engine and the driveline disconnect clutch, and where the DMF is between the engine and the driveline disconnect clutch.

Figure 21:
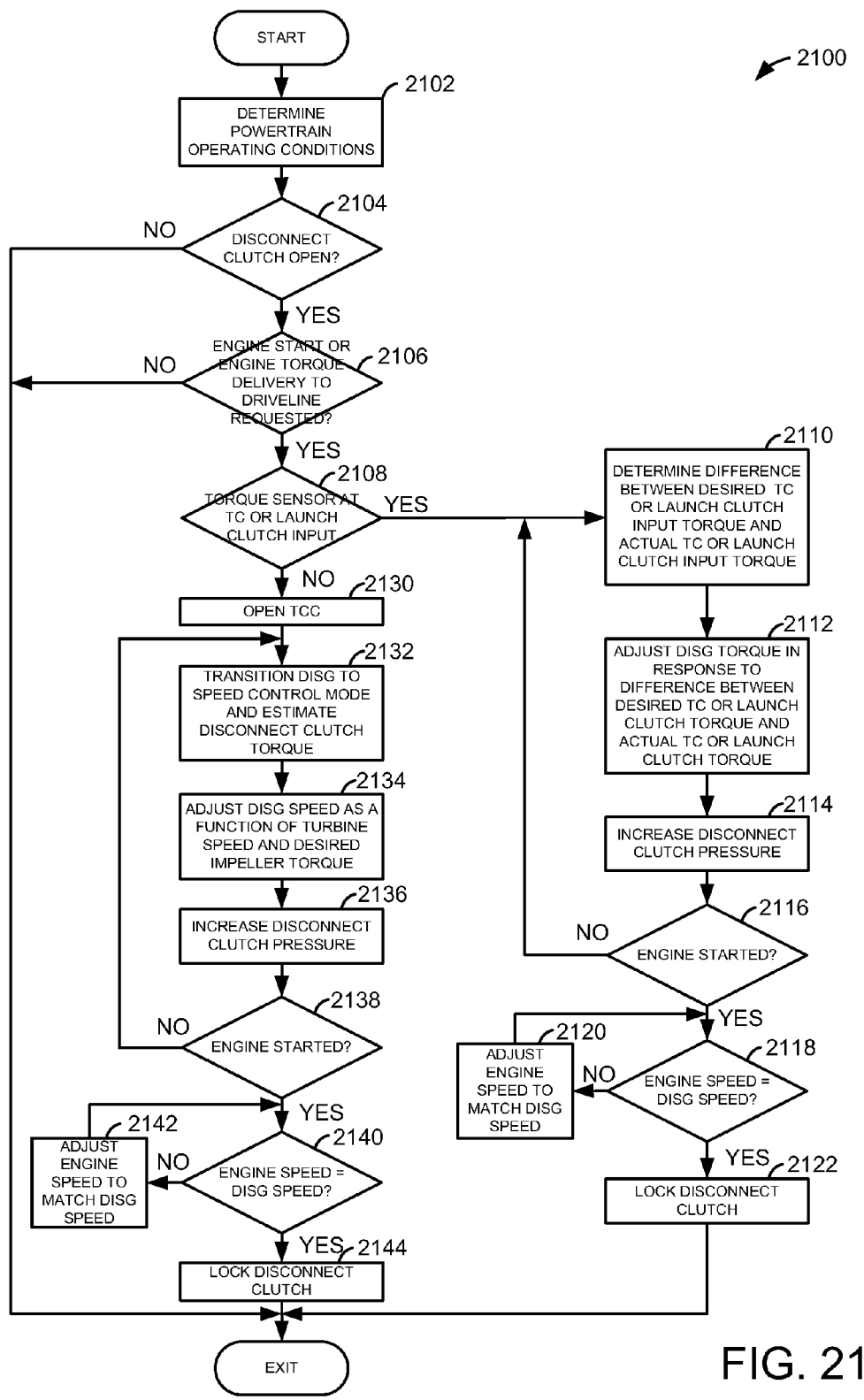

Referring now to FIG. 21, a method is shown for rejecting driveline torque disturbances related to application of a driveline disconnect clutch and its transfer function. The method of FIG. 21 may be stored as executable instructions in non-transitory memory of controller 12 shown in FIGS. 1-3.

At 2102, method 2100 determines operating conditions. Operating conditions may include but are not limited to engine speed, DMF input and output speeds, requested driveline torque, DISG torque, DISG speed, driveline disconnect clutch state, engine speed, torque converter impeller speed, torque converter turbine speed, and engine torque. Method 2100 proceeds to 2104 after operating conditions are determined.

At 2104, method 2100 judges whether or not a driveline disconnect clutch is open. A driveline disconnect clutch may be determined to be open based on a variable stored in memory or based on a difference between engine speed and DISG speed. If method 2100 judges that the driveline disconnect clutch is not open, the answer is no and method 2100 proceeds to exit. If method 2100 judges that the driveline disconnect clutch is open, the answer is yes and method 2100 proceeds to 2106.

At 2106, method 2100 judges whether or not an engine start is requested via the DISG or if engine torque is to be applied to the driveline. An engine start may be requested when demanded driveline torque is greater than a threshold torque. Likewise, a request to provide engine torque to the driveline may be present when demanded driveline torque is greater than a threshold torque. If method 2100 judges that an engine start is requested via the DISG, or if engine torque is to be applied to the driveline, the answer is yes and method 2100 proceeds to 2108. Otherwise, the answer is no and method 2100 proceeds to exit.

At 2108, method 2100 judges whether or not a torque sensor is present in the vehicle driveline at the locations described in FIGS. 1-3. If a torque sensor is judged to be present, the answer is yes and method 2100 proceeds to 2110. Otherwise, the answer is no and method 2100 proceeds to 2130.

At 2110, method 2100 determines a difference between a desired driveline input torque and actual driveline input torque at a selected location along the driveline. In some examples, the selected location for the driveline input torque may be at a torque converter impeller, a location between a driveline disconnect clutch and a DISG, at a transmission output shaft, at a torque converter turbine, at a launch clutch input, or other driveline location. The actual or measured driveline input torque at the selected driveline location is determined from a torque sensor. The desired driveline input torque may be determined from an accelerator pedal position or other source. The difference in torque is the desired driveline input torque minus actual driveline input torque.

Alternatively, if the torque sensor is placed in the driveline between the DISG and the driveline disconnect clutch, the torque measured by a torque sensor may be added to a DISG torque command so that the DISG outputs additional torque to start the engine so that the transmission is provided a the desired transmission input torque. Method 2100 proceeds to 2112.

At 2112, method 2100 adjusts current supplied to the DISG so that the desired driveline input torque is provided to the driveline at a specified location even if the driveline disconnect clutch transfer function is degraded. If the driveline torque sensor is used to feedback driveline input torque, the DISG torque is increased when actual driveline input torque is less than desired driveline input torque. The DISG torque is decreased when actual driveline input torque is greater than desired driveline input torque. In this way, the DISG torque is adjusted in response to a difference between desired driveline input torque and actual or measured driveline input torque.

If the driveline torque sensor is implemented as a feed forward sensor, torque sensor output is combined with desired DISG torque to provide the desired DISG torque at the transmission input or other specified driveline location. In this way, a torque sensor may be deployed as a feedback or feed forward device. Method 2100 proceeds to 2114 after DISG torque is adjusted.

At 2114, method 2100 increases the driveline disconnect clutch pressure to close the driveline disconnect clutch so that the engine may be cranked by the DISG or driveline. The driveline disconnect clutch pressure is adjusted by indexing a function that outputs a driveline disconnect command or application force based on a desired torque to transfer through the driveline disconnect clutch. Spark and fuel may also be supplied at 2114 after the engine is at a predetermined speed or position. Method 2100 proceeds to 2118 after the driveline disconnect clutch pressure begins to increase.

At 2116, method 2100 judges whether or not the engine has started. In one example, the engine may be judged to be started when engine speed exceeds a threshold speed. If method 2100 judges that the engine has started, the answer is yes and method 2100 proceeds to 2118. Otherwise, the answer is no and method 2100 returns to 2110.

At 2118, method 2100 judges whether or not engine speed has accelerated up to and is equal to DISG speed. Engine speed may be judged to be equal to DISG speed when an engine speed sensor and a DISG speed sensor read substantially the same speed (e.g., ±20 RPM). If method 2100 judges engine speed equal to DISG speed, the answer is yes and method 2100 proceeds to 2122. Otherwise, the answer is no and method 2100 proceeds to 2120.

At 2120, method 2100 adjusts engine speed to DISG speed. Engine speed may be adjusted to DISG speed via adjusting engine torque via a throttle and fuel injection. Further, engine speed may be adjusted to reach DISG speed via fully closing the driveline disconnect clutch. However, completely closing the driveline disconnect clutch before engine speed matches DISG may increase driveline torque disturbances. Method 2100 returns to 2118 after the engine is adjusted to match the DISG speed.

At 2122, method 2100 locks the driveline disconnect clutch. The driveline disconnect clutch may be locked by supplying more than a threshold amount of pressure to the driveline disconnect clutch. Method 2100 proceeds to exit after the driveline disconnect clutch is locked.

At 2130, method 2100 opens the torque converter clutch (TCC). The torque converter clutch is opened so that torque at the torque converter impeller may be estimated based on torque converter operating conditions. Alternatively, torque converter turbine torque may be estimated, if desired. Method 2100 proceeds to 2132 after the TCC is opened.

At 2132, method 2100 transitions the DISG into a speed control mode from a torque control mode so that the DISG follows a desired speed. The DISG follows the desired speed by making torque adjustments to the DISG that are based on a difference between desired DISG speed and actual DISG speed. Thus, the DISG speed is controlled via adjusting DISG torque in response to actual or measured DISG speed. Additionally, method 2100 estimates an amount of torque the driveline disconnect clutch supplies to start the engine. The desired amount of torque to start the engine may be empirically determined and stored as a transfer function in memory. The desired amount of torque to start the engine may be transferred to the engine via the driveline disconnect clutch by indexing a function that describes a driveline disconnect clutch transfer function. The function outputs a driveline disconnect clutch actuation command that delivers the desired driveline disconnect clutch torque. The function is indexed via the desired driveline disconnect clutch torque. Method 2100 proceeds to 2134 after the DISG enters speed control mode from torque control mode and determines an amount of torque to supply the engine via the driveline disconnect clutch so that the engine may be cranked.

At 2134, method 2100 commands the DISG to a desired speed that is a function of torque converter turbine speed and desired torque converter impeller torque to achieve a desired torque converter impeller torque. The desired torque converter impeller torque may be determined from an accelerator input or a controller (e.g., desired driveline torque). The desired DISG speed is determined via indexing one or more functions that describe operation of a torque converter (e.g., see FIGS. 45-47). In particular, a ratio of torque converter turbine speed to torque converter impeller speed is multiplied by a torque converter capacity factor (e.g., a torque converter transfer function). The result is then be multiplied by the torque converter impeller speed squared to provide torque converter impeller torque.

Thus, when the torque converter capacity factor, torque converter impeller torque, and torque converter turbine speed are known, the torque converter impeller speed that provides the torque converter impeller torque may be determined. In this way, the torque converter transfer function is the basis for providing a desired torque converter impeller torque when a driveline torque sensor is not provided. The DISG is commanded to the torque converter impeller speed that may provide the desired torque converter impeller torque even if the driveline disconnect clutch application force that provides a desired engine cranking torque is incorrect. Additionally, the amount of torque determined to be applied by the driveline disconnect clutch at 2132 may be added to the DISG torque command that provides the desired DISG speed in speed control mode. In this way, the torque transferred from the DISG to the engine via the driveline disconnect clutch can be added to the DISG torque command so that the DISG achieves the desired torque converter impeller speed and torque even as the driveline disconnect clutch is applied. Method 2100 proceeds to 2136 after the DISG speed is adjusted.

At 2136, method 2100 increase the driveline disconnect clutch pressure to close the driveline disconnect clutch so that the engine may be cranked by the DISG or driveline. The driveline disconnect clutch pressure is closed to provide the desired amount of torque to crank the engine as determined at 2132. The driveline spark and fuel may also be supplied at 2136 after the engine is at a predetermined speed or position. Method 2100 proceeds to 2138 after the driveline disconnect clutch pressure begins to increase.

At 2138, method 2100 judges whether or not the engine has started. In one example, the engine may be judged to be started when engine speed exceeds a threshold speed. If method 2100 judges that the engine has started, the answer is yes and method 2100 proceeds to 2140. Otherwise, the answer is no and method 2100 returns to 2132.

At 2140, method 2100 judges whether or not engine speed has accelerated up to and is equal to DISG speed. Engine speed may be judged to be equal to DISG speed when an engine speed sensor and a DISG speed sensor read substantially the same speed (e.g., ±20 RPM). If method 2100 judges engine speed equal to DISG speed, the answer is yes and method 2100 proceeds to 2144. Otherwise, the answer is no and method 2100 proceeds to 2142.

At 2142, method 2100 adjusts engine speed to DISG speed. Engine speed may be adjusted to DISG speed via adjusting engine torque via a throttle and fuel injection. Further, engine speed may be adjusted to reach DISG speed via fully closing the driveline disconnect clutch. However, completely closing the driveline disconnect clutch before engine speed matches DISG may increase driveline torque disturbances. Method 2100 returns to 2140 after the engine is adjusted to match the DISG speed.

At 2144, method 2100 locks the driveline disconnect clutch. The driveline disconnect clutch may be locked by supplying more than a threshold amount of pressure to the driveline disconnect clutch. Method 2100 proceeds to exit after the driveline disconnect clutch is locked.

In this way, the torque converter transfer function may be a basis for estimating and providing a desired torque converter impeller torque when no driveline torque sensor is present and if the driveline disconnect clutch torque transfer function is degraded. On the other hand, if a driveline torque sensor is available, the torque sensor output may be a basis for adjusting DISG torque so that a desired torque converter impeller torque may be provided even if the driveline disconnect clutch torque transfer function is degraded.

Figure 22:
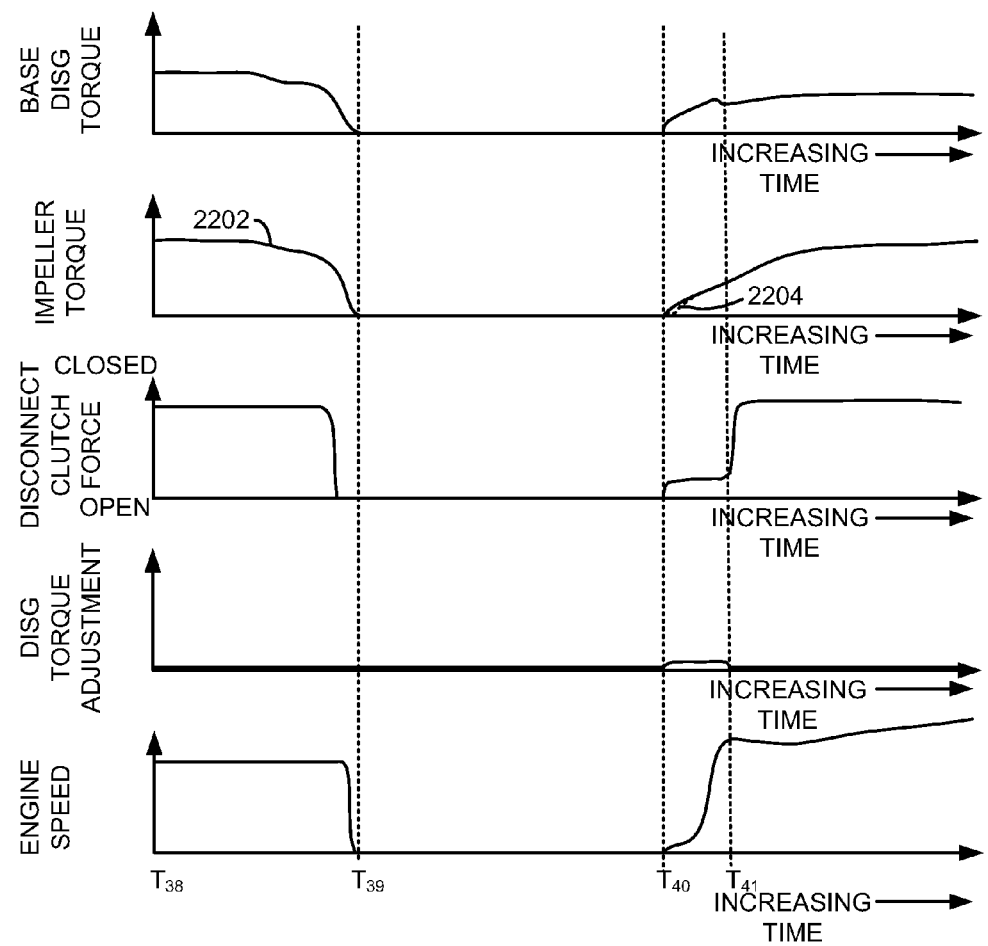

Referring now to FIG. 22, an example sequence for compensating for a driveline disconnect clutch transfer function according to the method of FIG. 21 is shown. The sequence of FIG. 22 may be provided by the system of FIGS. 1-3.

The first plot from the top of FIG. 22 represents base DISG torque demand versus time. In one example, base DISG torque demand is DISG torque that is provided to the driveline without feedback from a driveline torque sensor or feedback of torque converter operating conditions. The Y axis represents base DISG torque and base DISG torque increases in the direction of the Y axis. The X axis represents time and time increases from the left hand side of the figure to the right hand side of the figure.

The second plot from the top of FIG. 22 represents torque converter impeller torque versus time. The Y axis represents torque converter impeller torque and torque converter impeller torque increases in the direction of the Y axis arrow. The X axis represents time and time increases from the left hand side of the figure to the right hand side of the figure. Solid trace 2202 represents desired torque converter impeller torque. Dashed trace 2204 represents actual torque converter impeller torque. Actual torque converter impeller torque equals desired torque converter impeller torque when only desired torque converter impeller torque is visible.

The third plot from the top of FIG. 22 represents driveline disconnect clutch force versus time. The Y axis represents driveline disconnect clutch force and driveline disconnect clutch force increases in the direction of the Y axis arrow. The driveline disconnect clutch is closed at higher force and is open at lower force. The X axis represents time and time increases from the left hand side of the figure to the right hand side of the figure.

The fourth plot from the top of FIG. 22 represents a DISG torque adjustment versus time. An increase in the torque adjustment increases DISG torque. The Y axis represents DISG adjustment torque and DISG adjustment torque increases in the direction of the Y axis arrow. The X axis represents time and time increases from the left hand side of the figure to the right hand side of the figure.

The fifth plot from the top of FIG. 22 represents engine speed versus time. The Y axis represents engine speed and engine speed increases in the direction of the Y axis arrow. The X axis represents time and time increases from the left hand side of the figure to the right hand side of the figure.

At time $T_{38}$, DISG torque is at a higher level as is torque converter impeller torque. The driveline disconnect clutch is closed and there is no DISG torque adjustment since the actual torque converter impeller torque matches the desired torque converter impeller torque. Engine speed is at an elevated level to indicate that the engine is operating.

At time $T_{39}$, the base DISG torque is reduced to zero; however, in some examples the base DISG torque may be greater than zero to provide transmission oil pressure. The engine is stopped and the torque converter impeller torque is also reduced to zero. The driveline disconnect clutch is opened so that the engine is decoupled from the DISG. Between time $T_{39}$ and time $T_{40}$, the engine and DISG remain off.

At time $T_{40}$, the base DISG torque increases in response to an increasing driver demand torque (not shown) and in response to the driveline disconnect clutch force which may be converted into an amount of torque transferred through the driveline disconnect clutch to the engine. The engine is also rotated to be started in response to the driver demand torque. The engine is rotated by increasing the driveline disconnect clutch application force in response to the driver demand torque so that torque from the DISG may be transferred to rotate the engine. The DISG torque transferred to the engine is estimated based on driveline disconnect clutch force. In particular, an empirically determined transfer function indexed by driveline disconnect clutch force outputs a driveline disconnect clutch torque. The commanded DISG torque is the sum of the driveline disconnect clutch torque and the driver demand torque. In one example, the driver demand torque is a desired torque converter impeller torque. If the driveline disconnect clutch torque is overestimated or underestimated, the actual torque converter impeller torque varies from the desired torque converter impeller torque.

In this example, the actual torque converter impeller torque is less than the desired torque converter impeller torque as the driveline disconnect clutch force is increased. Thus, the driveline disconnect clutch torque has been underestimated and less torque is delivered from the DISG to the torque converter impeller. As a result, the DISG torque is increased to correct the difference between the desired torque converter impeller torque and the actual torque converter impeller torque. The DISG torque increase is shown in the DISG torque adjustment plot which is added to the base DISG torque demand shown in the first plot and output to the DISG. Further, in some examples, the estimated driveline disconnect clutch transfer function is adjusted in response to the DISG torque adjustment. For example, if the DISG torque is increased by 2 N-m the driveline disconnect clutch transfer function is adjusted to reflect that the driveline disconnect clutch transfers an additional 2 N-m at the present driveline disconnect clutch application force.

The actual torque converter impeller torque may be determined via a torque sensor or alternatively from torque converter impeller speed, torque converter turbine speed, and the torque converter capacity factor as described with regard to FIGS. 21 and 45-47. The desired torque converter impeller torque may be determined from an accelerator pedal position or controller demand.

At time $T_{41}$, the engine is started and the engine has accelerated to the same speed as the DISG. Further, the driveline disconnect clutch is closed in response to the engine speed matching the DISG speed. The DISG torque adjustment is reduced after the driveline disconnect clutch is closed in response to the actual torque converter impeller torque substantially equaling (e.g., ±10 N-m) the desired torque converter impeller torque.

Thus, the methods and systems of FIGS. 1-3 and 21-22 provide for operating a hybrid vehicle driveline, comprising: opening a torque converter clutch in response to an engine start request; and adjusting a driveline integrated starter/generator (DISG) speed in response to a desired torque converter impeller speed. In this way, compensation for a driveline disconnect clutch may be provided. The method includes where adjusting the DISG speed includes adjusting the DISG speed as a function of torque converter turbine speed and desired torque converter impeller torque. The method includes where the desired torque converter impeller torque is based on a driver demand torque. The method includes where the DISG speed is adjusted via adjusting a DISG torque.

In some examples, the method further comprises adjusting the DISG torque in response to an estimated driveline disconnect clutch torque. The method includes where the estimated driveline disconnect clutch torque is based on a driveline disconnect clutch application force. The method further comprises operating the DISG in a speed control mode when adjusting the DISG speed.

The methods and systems of FIGS. 1-3 and 21-22 provide for operating a hybrid vehicle driveline, comprising: opening a torque converter clutch in response to an engine start request; operating a driveline integrated starter/generator (DISG) in a speed control mode; adjusting DISG speed in response to a desired torque converter impeller speed; and starting an engine via closing a driveline disconnect clutch. The method includes where the driveline disconnect clutch is partially closed in response to a driveline disconnect clutch application force, and where driveline disconnect clutch torque is estimated based on a driveline disconnect clutch application force.

In some examples, the method includes where DISG torque is adjusted in response to the estimated driveline disconnect clutch torque. The method further comprises adjusting DISG speed in response to a desired torque converter impeller torque. The method includes where the DISG speed is adjusted contemporaneously with closing the driveline disconnect clutch. The method further comprises adjusting a driveline disconnect clutch transfer function in response to a DISG adjustment torque output during closing the driveline disconnect clutch. The method includes where starting the engine via closing the driveline disconnect clutch includes partially closing the driveline disconnect clutch and then fully closing the driveline disconnect clutch so that driveline disconnect clutch input speed matches driveline disconnect output speed when engine speed substantially equals DISG speed.

The methods and systems of FIGS. 1-3 and 21-22 provide for a hybrid vehicle driveline system, comprising: a torque converter; a driveline integrated starter/generator (DISG); an engine; a driveline disconnect clutch positioned in a driveline between the engine and the DISG; and a controller including executable non-transitory instructions for operating the DISG in a speed control mode and providing a desired torque converter impeller torque via adjusting the DISG speed in response to a torque converter turbine speed and the desired torque converter impeller torque.

In some examples, the hybrid vehicle driveline system further comprises additional executable non-transitory instructions for closing the driveline disconnect clutch at a first time engine speed substantially equals DISG speed after an engine stop. The hybrid vehicle driveline system further comprises additional executable non-transitory instructions for closing the driveline disconnect clutch in response to a request to start the engine. The hybrid vehicle driveline system further comprises additional executable non-transitory instructions for estimating driveline disconnect clutch torque based on a driveline disconnect clutch application force. The hybrid vehicle driveline system further comprises a DISG speed sensor and a torque converter turbine speed sensor for determining the torque converter turbine speed. The hybrid vehicle driveline system includes where the speed control mode includes adjusting DISG torque to adjust DISG speed.

The methods and systems of FIGS. 1-3 and 21-22 provide for operating a hybrid vehicle driveline, comprising: adjusting torque output of a driveline integrated starter/generator (DISG) in response to a difference between a desired driveline torque and an actual driveline torque during at least partially closing a driveline disconnect clutch. In this way, a desired torque may be provided even if estimation of driveline disconnect torque includes an error. The method includes where desired driveline torque is a desired torque converter impeller torque and where the actual driveline torque is an actual torque converter impeller torque.

In one example, the method includes where the desired driveline torque is based on a driver demand torque. The method further comprises adjusting torque output of the DISG based on an open-loop estimate of driveline disconnect clutch torque. The method includes where the open-loop estimate of driveline disconnect clutch torque is based on a driveline disconnect clutch application command. The method further comprises cranking an engine via closing the driveline disconnect clutch. The method further comprises starting the engine via supplying fuel and spark to the engine before the driveline disconnect clutch is fully closed.

The methods and systems of FIGS. 1-3 and 21-22 provide for operating a hybrid vehicle driveline, comprising: adjusting torque output of a driveline integrated starter/generator (DISG) in response to a difference between a desired driveline torque and an actual driveline torque during at least partially closing a driveline disconnect clutch; and adjusting a driveline disconnect clutch transfer function based on the difference between the desired driveline torque and the actual driveline torque. The method includes where the transfer function describes a driveline disconnect clutch torque as a function of driveline disconnect clutch application force.

In some examples, the method further comprises cranking an engine via at least partially closing the driveline disconnect clutch. The method further comprises starting the engine via supplying spark and fuel to the engine before fully closing the driveline disconnect clutch. The method further comprises fully closing the driveline disconnect clutch in response to engine speed substantially equaling DISG speed a first time since engine stop. The method includes where the desired driveline torque is based on an accelerator pedal input. The method includes where the actual driveline torque is based on output of a torque sensor.

The methods and systems of FIGS. 1-3 and 21-22 provide for a hybrid vehicle driveline system, comprising: a driveline torque sensor; a driveline integrated starter/generator (DISG); an engine; a driveline disconnect clutch positioned in a driveline between the engine and the DISG; and a controller including executable non-transitory instructions for adjusting DISG torque output in response to a difference between a desired driveline torque and an output of the driveline torque sensor during application of the driveline disconnect clutch. The hybrid vehicle driveline system further comprises additional executable non-transitory instructions for closing the driveline disconnect clutch at a first time engine speed substantially equals DISG speed after an engine start.

In some examples, the hybrid vehicle driveline system further comprises additional executable non-transitory instructions for closing the driveline disconnect clutch in response to a request to start the engine. The hybrid vehicle driveline system further comprises additional executable non-transitory instructions for adjusting a driveline disconnect clutch transfer function in response to the difference between the desired driveline torque and the output of the driveline torque sensor. The hybrid vehicle driveline system includes where the driveline torque sensor is positioned between a torque converter impeller and the DISG. The hybrid vehicle driveline system includes where the driveline torque sensor is positioned between at torque converter turbine and a transmission gear set.

Figure 23:
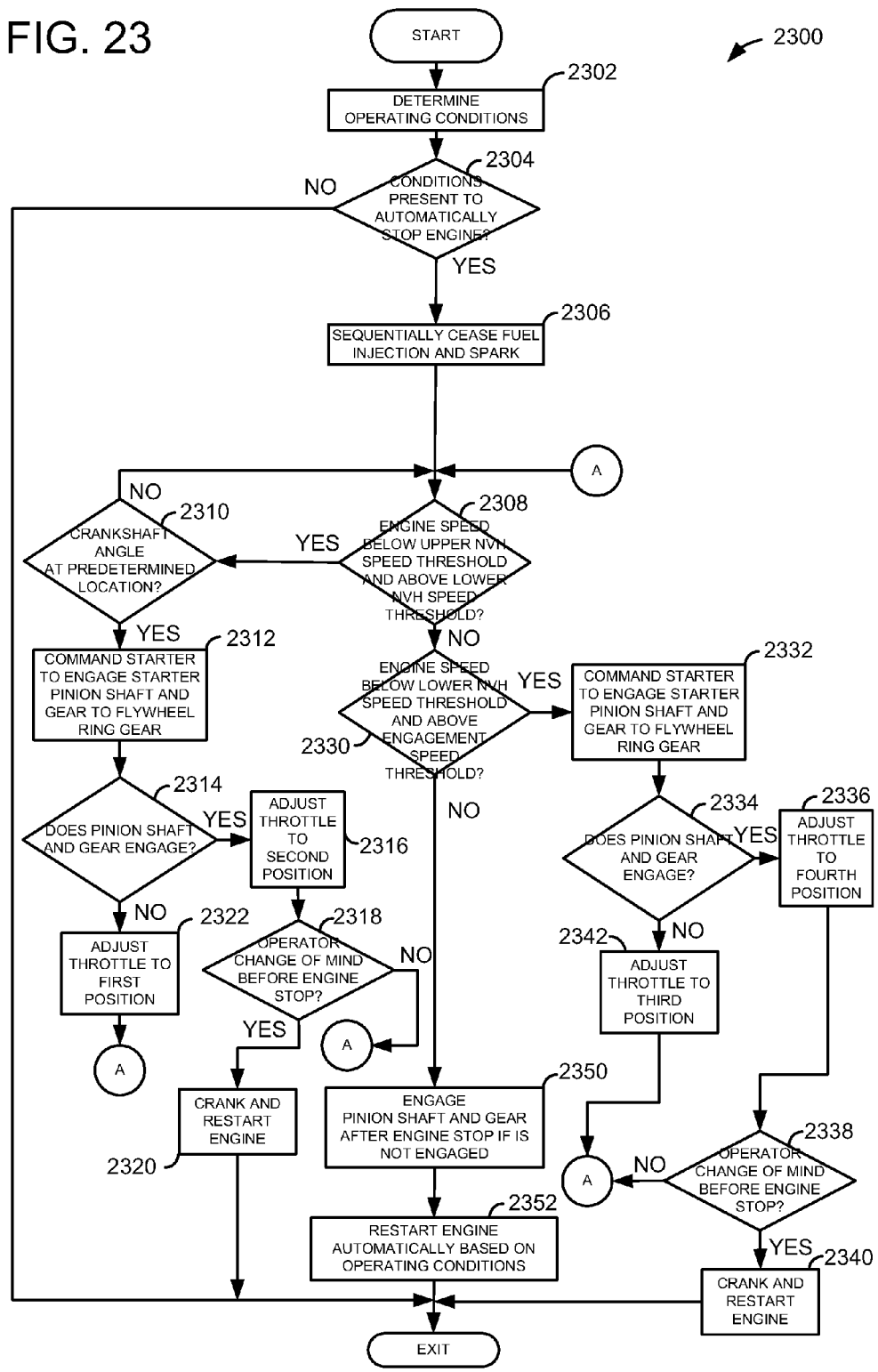
FIGS. 23-26 show methods and prophetic sequences for stopping an engine of a hybrid vehicle.

Referring now to FIG. 23, a flowchart of a method for improving engine restart after stopping combustion in an engine is shown. The method of FIG. 23 may be stored as executable instructions in non-transitory memory of controller 12 in FIGS. 1-3.

At 2302, method 2300 determines operating conditions. Operating conditions may include but are not limited to engine speed, engine position, driveline disconnect clutch state, DISG speed, and ambient temperature. Method 2300 proceeds to 2304 after operating conditions are determined.

At 2304, method 2300 judges whether or not conditions are present to automatically stop the engine from rotating. In one example, engine rotation may stop when desired driveline torque is less than a threshold. In another example, engine rotation may be stopped when vehicle speed is less than a threshold speed and when engine torque is less than a threshold torque. If method 2300 judges conditions are present to automatically stop engine rotation, method 2300 proceeds to 2306. Otherwise, method 2300 proceeds to exit.

At 2306, method 2300 sequentially ceases fuel injection to engine cylinders so that combustion of fuel in engine cylinders is not stopped midway during injection of fuel to a particular cylinder. Method 2300 proceeds to 2308 after fuel injection is ceased.

At 2308, method 2300 judges whether or not engine speed is below an upper noise vibration and harshness (NVH) threshold speed and above a lower NVH threshold speed. If so, the answer is yes and method 2300 proceeds to 2310. Otherwise, the answer is no, and method 2300 returns to 2330.

At 2310, method 2300 judges whether or not the engine crankshaft angle is at a predetermined location as the engine rotates. In one example, the predetermined position is a crankshaft angle within a predetermined number of crankshaft degrees after a particular cylinder rotates through top-dead-center compression stroke (e.g., within 90 crankshaft degrees after top-dead-center compression stroke of a cylinder for a four cylinder engine). If method 2300 judges that the engine crankshaft angle is not at a predetermined location, the answer is no and method 2300 returns to 2308. Otherwise, the answer is yes and method 2300 proceeds to 2312.

At 2312, method 2300 commands the starter engage the starter pinion shaft and pinion gear to the engine flywheel ring gear. The starter pinion shaft may be moved via a solenoid, and the starter pinion gear may begin to rotate when the pinion shaft is fully extended. In other examples, the starter pinion shaft and pinion ring gear may be separately controlled to allow independent activation. Method 2300 proceeds to 2314 after the starter pinion shaft and pinion gear are commanded to be engaged to the engine.

At 2314, method 2300 judges whether or not the pinion shaft and pinion gear fully engage the engine flywheel. In one example, the pinion shaft and the pinion gear may be determined to have engaged the engine via sensor outputs (e.g., a limit switch) or via starter current. If method 2300 judges that the pinion shaft and pinion gear have engaged the engine, the answer is yes and method 2300 proceeds to 2316. Otherwise, the answer is no and method 2300 proceeds to 2322.

At 2316, method 2300 adjusts the engine throttle to a second position based on the pinion shaft and pinion gear engaging the engine flywheel in preparation for a possible operator change of mind to stop the engine. In one example, the second throttle position is more open than a first throttle position at 2322. The engine throttle position is adjusted to a more open position so as to provide higher engine torque if an operator change of mind occurs after starter engagement. Engine torque may be affected when the pinion engages the flywheel. Adjusting the engine air amount may compensate for the affect an engaged pinion may have on engine restarting and engine deceleration. Method 2300 proceeds to 2318 after the engine throttle position is adjusted.

At 2318, method 2300 judges whether or not an operator change of mind has occurred since engagement of the starter pinion shaft and starter pinion gear has been commanded. An operator change of mind indicates that a driver wishes to continue applying torque to vehicle wheels to maintain or increase vehicle speed. In one example, an operator change of mind may be indicted by releasing a brake pedal or increasing an engine torque command via an accelerator pedal. If method 2300 judges that an operator change of mind is requested before engine rotation stops, the answer is yes and method 2300 proceeds to 2320. Otherwise, the answer is no and method 2300 returns to 2308.

At 2320, method 2300 cranks the engine via the starter and restarts the engine since the starter pinion shaft and the pinion gear have engaged the engine flywheel. Fuel and spark are also once again supplied to the engine cylinders to facilitate combustion in engine cylinders. Method 2300 exits after the engine is cranked and restarted.

At 2322, method 2300 adjusts the engine throttle to a first position based on the pinion shaft and pinion gear not engaging the engine flywheel. In one example, the first throttle position is more closed than a second throttle position at 2316. The engine throttle position is adjusted to a more closed position so as to reduce engine air flow and reduce oxidation within an exhaust system catalyst. Method 2300 returns to 2308 after the engine throttle position is adjusted to the first position.

At 2330, method 2300 judges whether or not engine speed is lower than the lower NVH speed threshold and whether engine speed is above an engagement speed threshold. The engagement speed is an engine speed below which the engine may rotate in a reverse direction while the engine is being stopped. If engine speed is above engagement speed and below the lower NVH speed threshold, the answer is yes and method 2300 proceeds to 2332. Otherwise, the answer is no and method 2300 proceeds to 2350. Method 2300 also ceases to attempt to engage the starter at engine speeds below the engagement speed and above zero engine speed.

At 2332, method 2300 commands the starter pinion shaft and pinion gear to engage the engine flywheel ring gear. The starter pinion shaft and pinion gear may be commanded to engage the engine flywheel ring gear as described at 2312. Method 2300 proceeds to 2334 after the starter pinion shaft and pinion gear are commanded to engage the engine flywheel.

At 2334, method 2300 judges whether or not the pinion shaft and the pinion gear engage the engine flywheel ring gear. Method 2300 judges if the pinion shaft and pinion gear engage the flywheel ring gear as described at 2314. If method 2300 judges that the flywheel is engaged by the pinion gear and pinion shaft, the answer is yes and method 2300 proceeds to 2336. Otherwise, the answer is no and method 2300 proceeds to 2342.

At 2336, method 2300 adjusts the throttle position to a fourth position. Since engaging the starter pinion shaft and pinion gear to the engine flywheel occurs at a lower engine speed, it may be desirable to adjust engine braking via controlling the engine air amount via the throttle to a different amount as compared to when engagement of the starter pinion shaft and pinion gear to the engine flywheel ring gear is attempted at a higher engine speed. Further, adjusting the engine air amount may compensate for engaging the pinion. In one example, the fourth position is a position where the throttle is more closed than the first and second positions at 2322 and 2316. Further, the fourth throttle position is more open than the third throttle position at 2342 to prepare for an operator change of mind condition. Adjusting the throttle based on engine speed may also provide finer control of engine position at engine stop. Method 2300 proceeds to 2338 after the throttle is adjusted to the fourth position.

At 2338, method 2300 judges whether or not an operator change of mind is present. An operator change of mind may be determined as described at 2318. If method 2300 judges that an operator change of mind is present, the answer is yes and method 2300 proceeds to 2340. Otherwise, the answer is no and method 2300 returns to 2310.

At 2340, method 2300 cranks the engine for starting and supplies spark and fuel to the engine. Method 2300 may crank the engine via the starter or the DISG as described at 2320. Method 2300 proceeds to exit after the engine is cranked and restarted in response to the operator change of mind.

At 2342, method 2300 adjusts the throttle to a third position. The third position may be a throttle position that is closed open than the fourth position described at 2336. The third position may also be a throttle position that is more closed than the first and second positions described at 2322 and 2316. Method 2300 returns to 2310 after the engine throttle position is adjusted.

At 2350, method 2300 commands the starter pinion shaft and pinion gear to engage the engine flywheel ring gear after the engine has stopped rotating if it is not engaged. Engaging the starter pinion shaft and pinion gear after engine stop may reduce starter and/or ring gear wear. Further, by engaging the starter pinion shaft and pinion gear before the engine is restarted it may be possible to reduce engine starting time. Method 2300 proceeds to 2352 after the starter pinion shaft and pinion gear have been commanded to engage the engine flywheel ring gear.

At 2352, the engine is restarted automatically in response to operating conditions after the engine ceases to rotate. The engine may be restarted in response to an engine torque request by an operator or in response to an operator releasing a brake. An automatic engine start occurs when the engine is restarted without an operator actuating or operating a device that has a sole function of starting an engine (e.g., a start key switch). An automatic engine start may be initiated by an operator actuating or operating a device that has more than one function such as a brake pedal which can apply vehicle brakes or secondarily as an indication when to start the engine. Method 2300 restarts the engine via a starter motor or via the DISG and proceeds to exit.

In this way, the method of FIG. 23 may adjust a position of a throttle in response to starter engagement to further improve engine restarting in case of an operator change of mind. Further, the method of FIG. 23 adjusts the throttle position during engine stopping according to engine speed so as to improve the engine stopping position by limiting engine reverse rotation.

Figure 24:
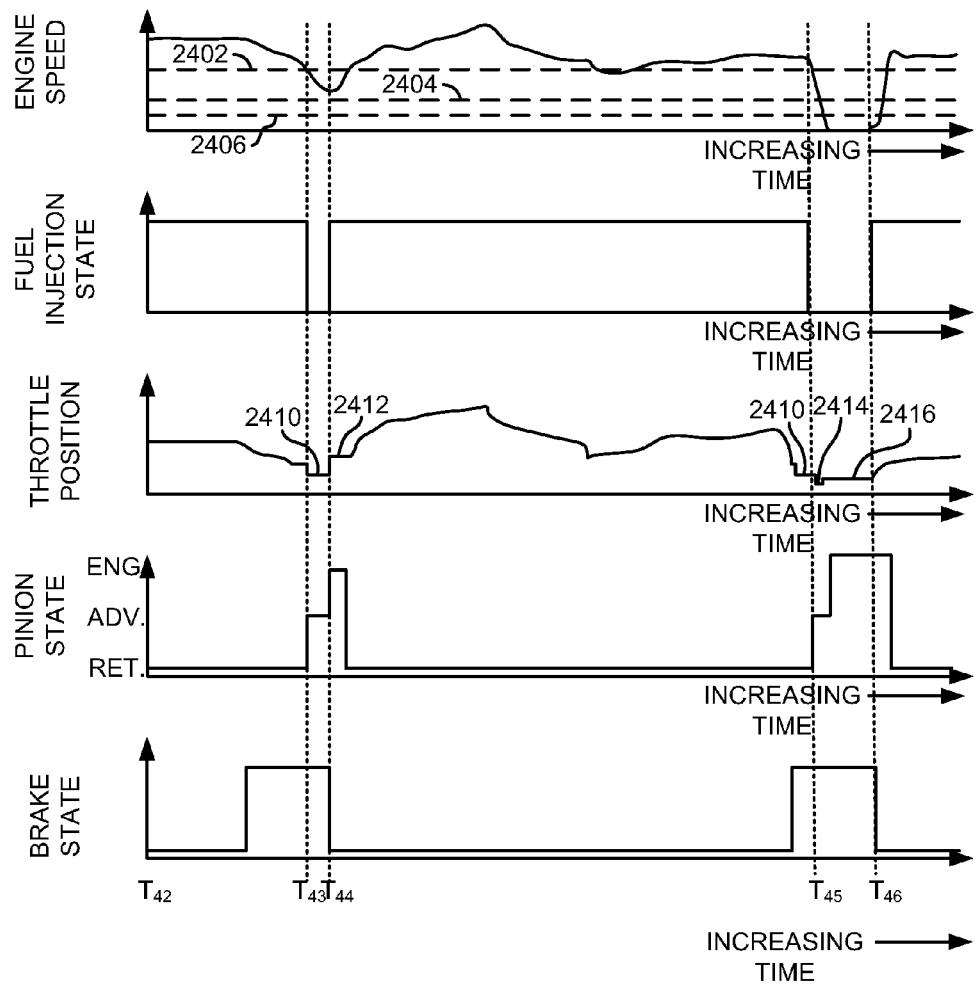

Referring now to FIG. 24, an example sequence for improving engine restarting and engine after stopping combustion according to the method of FIG. 23 is shown. The sequence of FIG. 24 may be provided by the system of FIGS. 1-3.

The first plot from the top of FIG. 24 represents engine speed versus time. The Y axis represents engine speed and engine speed increases in the direction of the Y axis. The X axis represents time and time increases from the left hand side of the figure to the right hand side of the figure. Horizontal line 2402 represents an upper NVH engine speed threshold. Horizontal line 2404 represents a lower NVH engine speed threshold. Horizontal line 2406 represents a pinion engagement speed threshold where the pinion is not engaged if engine speed is below horizontal line 2406 unless the engine has stopped rotating. The engagement threshold may reduce starter degradation.

The second plot from the top of FIG. 24 represents fuel injection state versus time. The Y axis represents fuel injection state. Fuel injection is active when the trace is at a higher level. Fuel injection is stopped when the trace is at a lower level. The X axis represents time and time increases from the left hand side of the figure to the right hand side of the figure.

The third plot from the top of FIG. 24 represents engine throttle position versus time. The Y axis represents engine throttle position and engine throttle position increases in the direction of the Y axis arrow. The X axis represents time and time increases from the left hand side of the figure to the right hand side of the figure.

The fourth plot from the top of FIG. 24 represents starter pinion state versus time. The Y axis represents starter pinion state and levels of engagement are described next to the Y axis. The pinion is returned when the trace is at the level of RET. The pinion is advanced but not engaged when the trace is at the level ADV. The pinion is engage with the engine flywheel when the trace is at the level ENG. The X axis represents time and time increases from the left hand side of the figure to the right hand side of the figure.

The fifth plot from the top of FIG. 24 represents vehicle brake state (e.g., friction brake state) versus time. The Y axis represents vehicle brake state and the brake is applied when the trace is at a higher level. The brake is released when the trace is at a lower level. The X axis represents time and time increases from the left hand side of the figure to the right hand side of the figure.

At time $T_{42}$, engine speed is elevated, fuel injection is active, the throttle is partially open, the starter is not engaged, and the brake is not applied. These conditions are indicative of a vehicle that is cruising at a moderate speed (e.g. 40 MPH). Between time $T_{42}$ and time $T_{43}$, the vehicle brakes are applied to slow the vehicle. In the illustrated conditions, the vehicle may be moving or may have stopped between time $T_{42}$ and time $T_{43}$.

At time $T_{43}$, engine combustion is stopped in response to applying the vehicle brake and a reduction in throttle position which is based on driver demand torque. As a result, engine speed is reduced to being at or less than the upper NVH engine speed threshold 2402. The starter pinion is commanded to engage the engine flywheel, but the pinion only advances and does not fully engage the engine flywheel. The throttle position is reduced in response to engine speed being less than the upper NVH threshold and being greater than the lower NVH threshold. Further, the throttle position is adjusted in response to the starter pinion position being advanced but not engaged. The throttle is opened to a first position 2410. The engine speed continues to decrease and the pinion engages the flywheel just before time $T_{44}$. The engine throttle position is adjusted to a second position 2412 in response to the pinion engaging the engine flywheel. The second throttle position is more open than the first position. By opening the throttle more after the pinion is engaged, it may be possible to prepare for an operator change of mind so that engine restarting may be improved.

At time $T_{44}$, the brake pedal is release by the operator which is interpreted as an operator change of mind to stop the engine. The fuel injection is reactivated and the starter provides the engine starting torque via the engaged pinion. The engine restarts and the pinion is returned shortly thereafter. Between time $T_{44}$ and time $T_{45}$, the engine is accelerated and decelerated over varying driving conditions. The brake is applied again just before time $T_{45}$.

At time $T_{45}$, combustion is stopped in the engine and the engine begins to decelerate. Shortly thereafter, engine speed is reduced to less than the upper NVH engine speed threshold 2402. The pinion is advanced in response to engine speed being less than the NVH upper engine speed threshold and being greater than the lower NVH engine speed threshold, but the pinion does not fully engage the engine flywheel. The engine throttle is adjusted to a first position 2410 in response to the engine speed and pinion state. The engine speed continues to decrease and the throttle is adjusted to a third position 2414 when engine speed is less than lower NVH engine speed threshold 2404 and greater than engagement threshold 2406. The third position 2414 is less open than the first position 2410 and second position 2412. The pinion engages the engine flywheel while engine speed is less than lower NVH engine speed threshold 2404 and greater than engagement threshold 2406. Consequently, the throttle is adjusted to a fourth position in response to pinion position and engine speed. The fourth position 2416 is more open than the third position 2414. The fourth position may provide additional air to the engine so that the engine may be restarted easier in case of an operator change of mind. The engine speed reaches zero without an operator change of mind and the pinion remains engaged.

At time $T_{46}$, the operator releases the brake and the engine is restarted via the engaged pinion in response to the brake being released. Fuel injection is also reactivated in response to releasing the brake and a subsequent request to start the engine.

In this way, a position of an engine throttle may be adjusted to improve engine restarting while an engine is being stopped. Adjusting engine throttle position in response to engine speed and pinion state during engine stopping may help to provide the engine with an amount of air that may improve engine starting. Additionally, if the pinion does not engage before engine stopping, the adjusted throttle position may improve engine stopping by controlling engine air amount predictably during engine stopping.

The methods and systems of FIGS. 1-3 and 23-24 provide for stopping rotation of an engine, comprising: ceasing fuel delivery to engine cylinders combusting air and fuel; commanding engagement of a starter from a state not engaged with the engine to engaged with the engine; and adjusting a position of a throttle based on whether or not the starter engages the engine. In this way, the engine may be more prepared to start if an operator has a change of mind. The method includes where the starter engages the engine via a pinion gear. The method includes where the throttle is adjusted to a first position when the starter does not engage the engine within a first engine speed range. The method includes where the throttle is adjusted to a second position when the starter engages the engine within the first engine speed range, the second position more open than the first position.

In some examples, the method further comprises where the starter is commanded to engage the engine within a predetermined crankshaft angular window. The method includes where the crankshaft angular window is within ±40 crankshaft degrees of top-dead-center of a cylinder stroke. The method includes where the engine speed is decreasing during commanding engagement of the starter.

The methods and systems of FIGS. 1-3 and 23-24 provide for stopping rotation of an engine, comprising: ceasing fuel delivery to engine cylinders combusting air and fuel; commanding engagement of a starter that is not engaged to the engine to engage the engine; and adjusting a position of a throttle based on whether or not the starter engages the engine and engine speed. The method includes where the throttle position is adjusted to a more closed position at engine speeds less than a threshold speed and to a more open position at engine speeds greater than the threshold speed. The method includes where the throttle is adjusted to a first position when the starter does not engage the engine within a first engine speed range. The method includes where the throttle is adjusted to a second position when the starter engages the engine within the first engine speed range, the second position more open than the first position. The method includes where the throttle is adjusted to a third position when the starter does not engage the engine within a second engine speed range. The method includes where the throttle is adjusted to a fourth position when the starter engages the engine within the second engine speed range, the fourth position more open than the third position.

The methods and systems of FIGS. 1-3 and 23-24 provide for a vehicle system, comprising: an engine including a throttle; a dual mass flywheel (DMF) including a first side mechanically coupled to the engine; a driveline disconnect clutch mechanically including a first side coupled to a second side of the dual mass flywheel; a starter including a base state where the starter is not engaged to the engine; a transmission selectively coupled to the engine via the driveline disconnect clutch; and a controller including non-transitory instructions executable to adjust a position of the throttle during an engine stop based on whether or not the starter engages the engine in response to an engine stop request and before an engine stop.

In some examples, the vehicle system includes where the throttle is adjusted to a first position in response to the starter does not engage the engine. The vehicle system includes where the throttle is adjusted to a second position in response to the starter engaging the engine, the second position more open than the first position. The vehicle system further comprises additional instructions to adjust the throttle position in response to an engine speed. The vehicle system further comprises additional instructions to engage the starter at a predetermined crankshaft location. The vehicle system includes where the predetermined crankshaft location is ±40 crankshaft degrees from top-dead-center of a cylinder compression stroke. The vehicle system further comprises additional instructions to stop attempting to engage the starter at engine speeds below an engagement speed and above zero engine speed.

Figure 25:
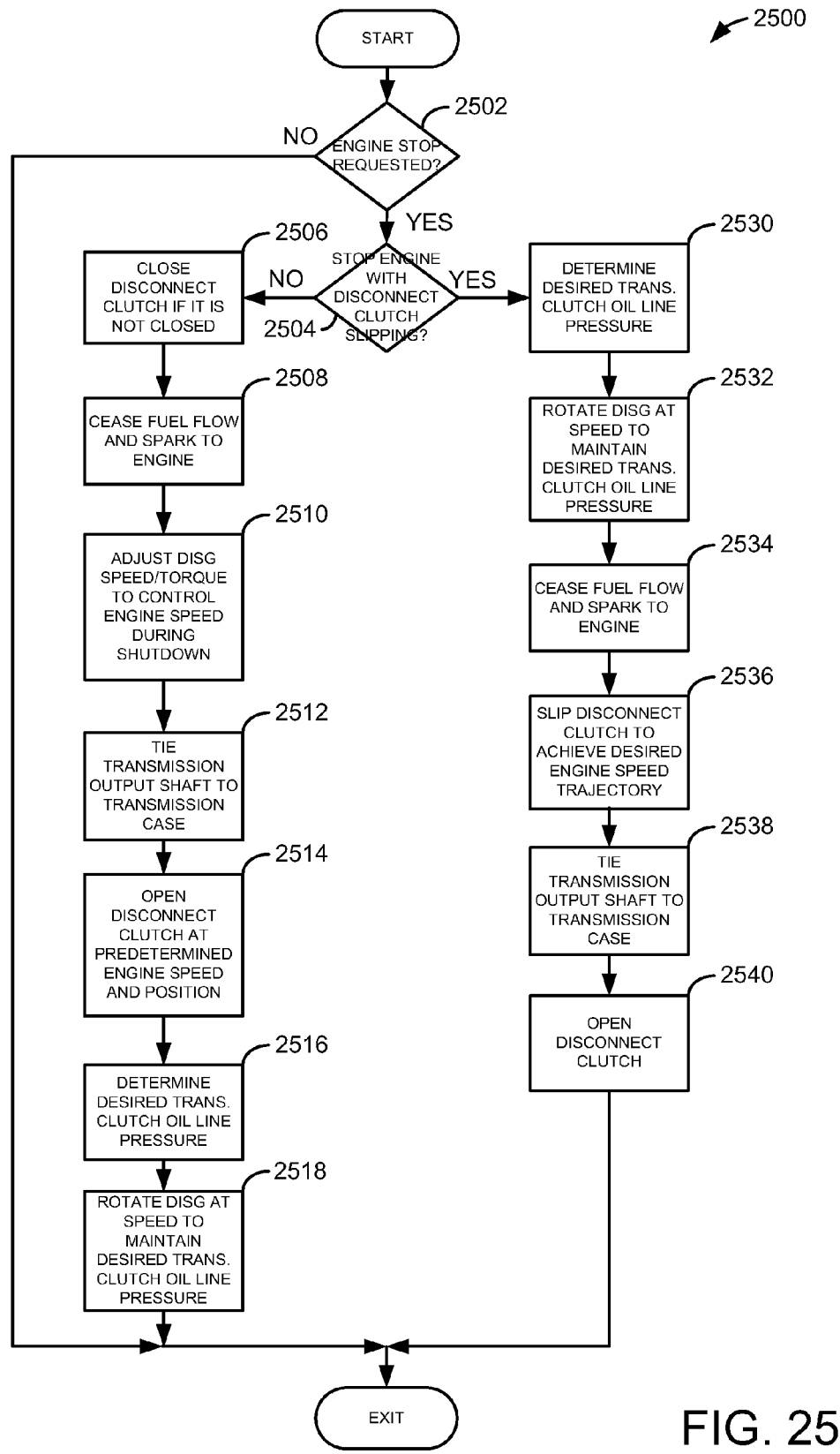

Referring now to FIG. 25, a flowchart of a method for adjusting engine shutdown speed profile and engine rotation stop position is shown. The method of FIG. 25 may be stored as executable instructions in non-transitory memory of controller 12 in FIGS. 1-3.

At 2502, method 2500 judges whether or not an engine stop rotation request has occurred. An engine stop rotation request may be provided by a controller or an operator. The controller may automatically stop the engine without the operator supplying input from a dedicated actuator that has a sole function of stopping and/or starting the engine. For example, an automatic engine stop does not occur when an operator sets an ignition switch to an off state. Alternatively, an automatic engine stop may occur when an operator releases an accelerator pedal. If method 2500 judges that an engine stop is requested, the answer is yes and method 2500 proceeds to 2504. Otherwise, the answer is no and method 2500 proceeds to exit.

At 2504, method 2500 judges whether or not engine rotation is to be stopped with the driveline disconnect clutch slipping. Method 2500 judges whether or not the engine should be stopped while the driveline disconnect clutch is slipping based on operating conditions. In one example, the engine may be stopped without a slipping driveline disconnect clutch when it is desirable to stop the engine in a short period of time. For example, it may be desirable to stop the engine quickly when engine speed is relatively low at the time of the engine stop request. On the other hand, the engine may be stopped while the driveline disconnect clutch is slipping when engine speed is relatively high at the time of the engine stop request. It should also be mentioned that engine rotation can be stopped with an open driveline disconnect clutch during some conditions. If method 2500 judges that engine rotation is to be stopped with the driveline disconnect clutch slipping, the answer is yes and method 2500 proceeds to 2530. Otherwise, the answer is no and method 2500 proceeds to 2506.

At 2530, method 2500 determines desired transmission clutch oil line pressure. In one example, the desired transmission clutch oil line pressure may be based on an amount of clutch pressure that will hold a vehicle stopped on a road while the engine has stopped rotating. Thus, the desired transmission clutch oil line pressure may increase if the vehicle is stopped on a hill. In one example, the desired transmission clutch oil line pressure is empirically determined and stored in a table or function that is indexed by road grade and vehicle mass. The table outputs the desired transmission clutch oil line pressure in response to road grade and vehicle mass. Method 2500 proceeds to 2532 after the desired transmission clutch oil line pressure is determined.

At 2532, method 2500 rotates the DISG at a speed that provides the desired transmission clutch oil line pressure by rotating the transmission oil pump. The DISG is coupled to a torque converter impeller, and the torque converter impeller is fluidly coupled to the torque converter turbine. The transmission oil pump is driven by the torque converter impeller, and the transmission oil pump supplies oil pressure to transmission clutches when rotated. In one example, the desired transmission oil line pressure indexes a table that includes empirically determined values of DISG speed that provide the desired transmission clutch oil line pressure. The DISG speed is output from the table and the DISG is speed is controlled to the value output from the table. Method 2500 proceeds to 2534 after the DISG begins rotating at the desired speed.

At 2534, method 2500 stops fuel flow and spark to engine cylinders. Fuel flow to cylinders may be stopped by closing fuel injectors. Further, fuel flow may be stopped in a sequential order based on engine combustion order so that cylinders are not partially fueled when engine rotation is commanded to stop. Method 2500 proceeds to 2536 after fuel flow and spark to engine cylinders stops.

At 2536, method 2500 slips the driveline disconnect clutch to achieve a desired engine speed trajectory. In one example, an empirically determined driveline disconnect clutch apply or slip trajectories are stored in a memory and are applied to the driveline disconnect clutch when stop of engine is requested. The slip trajectory table applies pressure to the driveline disconnect clutch at different rates depending on the engine speed when the engine stop request is made. Alternatively, an empirically determined transfer function that outputs a driveline disconnect clutch application force or pressure based on a desired driveline disconnect clutch pressure that is the basis for operating the driveline disconnect clutch. Additionally, the slip trajectory may include timing of when the pressure is to be supplied to the driveline disconnect clutch. For example, the pressure may be applied to the driveline disconnect clutch a specified number of crankshaft degrees after a last amount of fuel is delivered to an engine cylinder before engine stop. Thus, the initial time of driveline disconnect clutch pressure application and the rate at which pressure is applied to the driveline disconnect clutch is stored in memory and applied when an engine stop request is issued. Method 2500 proceeds to 2538 after application of the driveline disconnect clutch pressure profile is initiated.

At 2538, method 2500 commands transmission clutches to tie the transmission output shaft to the transmission case. The transmission output shaft may be tied to the transmission by simultaneously applying to transmission clutches other than the driveline disconnect clutch at the same time as described in U.S. patent application Ser. No. 12/833,788. Method 2500 proceeds to 2540 after the transmission is commanded to a tied state.

At 2540, method 2500 opens the driveline disconnect clutch. The driveline disconnect clutch may be opened when engine speed is at substantially zero (e.g., 100 RPM or less) and the engine has stopped at a desired position. Alternatively, the driveline disconnect clutch may be opened when engine speed falls to a predetermined value. Thus, by varying operation of the driveline disconnect clutch, method 2500 can control the engine speed trajectory partially or completely down to zero engine speed. Method 2500 proceeds to exit after the driveline disconnect clutch is opened.

At 2506, method 2500 closes the driveline disconnect clutch if the driveline disconnect clutch is not already closed. The driveline disconnect clutch may be closed by increasing a duty cycle signal that increases the driveline disconnect clutch apply pressure. Method 2500 proceeds to 2508 after the driveline disconnect clutch is closed.

At 2508, method 2500 stops fuel flow and spark to engine cylinders. Fuel flow and spark may be stopped as is described at 2534. Method 2500 proceeds to 2510 after fuel and spark delivery to engine cylinders is stopped.

At 2510, method 2500 adjusts DISG speed and torque to provide a desired engine speed profile during stopping of engine rotation. In one example, an empirically determined group of engine speed trajectories are stored in a memory and are used as a basis to stop the engine. For example, if engine speed is greater than that of the engine speed trajectory retrieved from memory, DISG torque absorbing is increased to direct the engine speed to the desired engine speed profile. If engine speed is less than that of the engine speed trajectory retrieved from memory, DISG torque is increased to direct the engine speed to the desired engine speed profile. The engine speed trajectory table slows the engine speed at different rates depending on the engine speed when the engine stop request is made. Additionally, the engine speed trajectory may include timing of when the engine speed trajectory is to be controlled via the DISG. For example, the engine speed trajectory may be controlled by the DISG for a specified number of crankshaft degrees after a last amount of fuel is delivered to an engine cylinder before engine stop. Thus, the initial application time of engine speed profile and the rate at of engine speed reduction is stored in memory and controlled by the DISG when an engine stop request is issued. Method 2500 proceeds to 2512 after application of the driveline disconnect clutch pressure profile is initiated.

At 2512, method 2500 commands transmission clutches to tie the transmission output shaft to the transmission case. The transmission output shaft may be tied to the transmission by simultaneously applying to transmission clutches other than the driveline disconnect clutch at the same time as described in U.S. patent application Ser. No. 12/833,788 which is hereby fully incorporated by reference. Method 2500 proceeds to 2514 after the transmission is commanded to a tied state.

At 2514, method 2500 opens the driveline disconnect clutch at a predetermined engine speed. The driveline disconnect clutch is opened so that the engine can coast to zero speed while the DISG continues to rotate and supply pressure to transmission clutches while the engine is stopped. In one example, the driveline disconnect clutch is opened at predetermined engine speed that is based on the engine speed where the engine stop was initiated (e.g., the engine speed where fuel flow to engine cylinders stopped) and the rate of engine speed decay. Further, the driveline disconnect clutch may be opened at a particular crankshaft angle to further control engine stopping position. A table or function indexed by rate of engine speed decay and engine speed where engine stop was requested outputs the engine position where the driveline disconnect clutch is opened. In one example, the position corresponds to an engine position that improves the possibility of stopping at the desired engine position (e.g., during a predetermined crankshaft interval of a cylinder in a compression stroke). Method 2500 proceeds to 2516 after the driveline disconnect clutch is opened.

At 2516, method 2500 determines a desired transmission clutch line pressure. The desired transmission clutch line pressure is determined as is described at 2530. Method 2500 proceeds to 2518 after the desired transmission clutch oil line pressure is determined.

At 2518, method 2500 rotates the DISG to maintain the desired transmission clutch oil line pressure. The DISG may be rotated as is described at 2532. Method 2500 proceeds to exit after the DISG is commanded to supply the desired transmission clutch oil line pressure. It should be noted that the DISG may be periodically stopped and restarted to maintain transmission clutch oil line pressure. If the transmission clutch oil line pressure has a slow leak rate, the DISG may be commanded off. The DISG may be reactivated if the transmission clutch oil line pressure declines to a threshold level.

In this way, engine stopping position may be controlled for a hybrid vehicle. The driveline disconnect clutch may adjust an engine stopping profile from idle speed to zero speed via periodically providing torque from the DISG to the engine so that the engine stops at a desired position.

Figure 26:
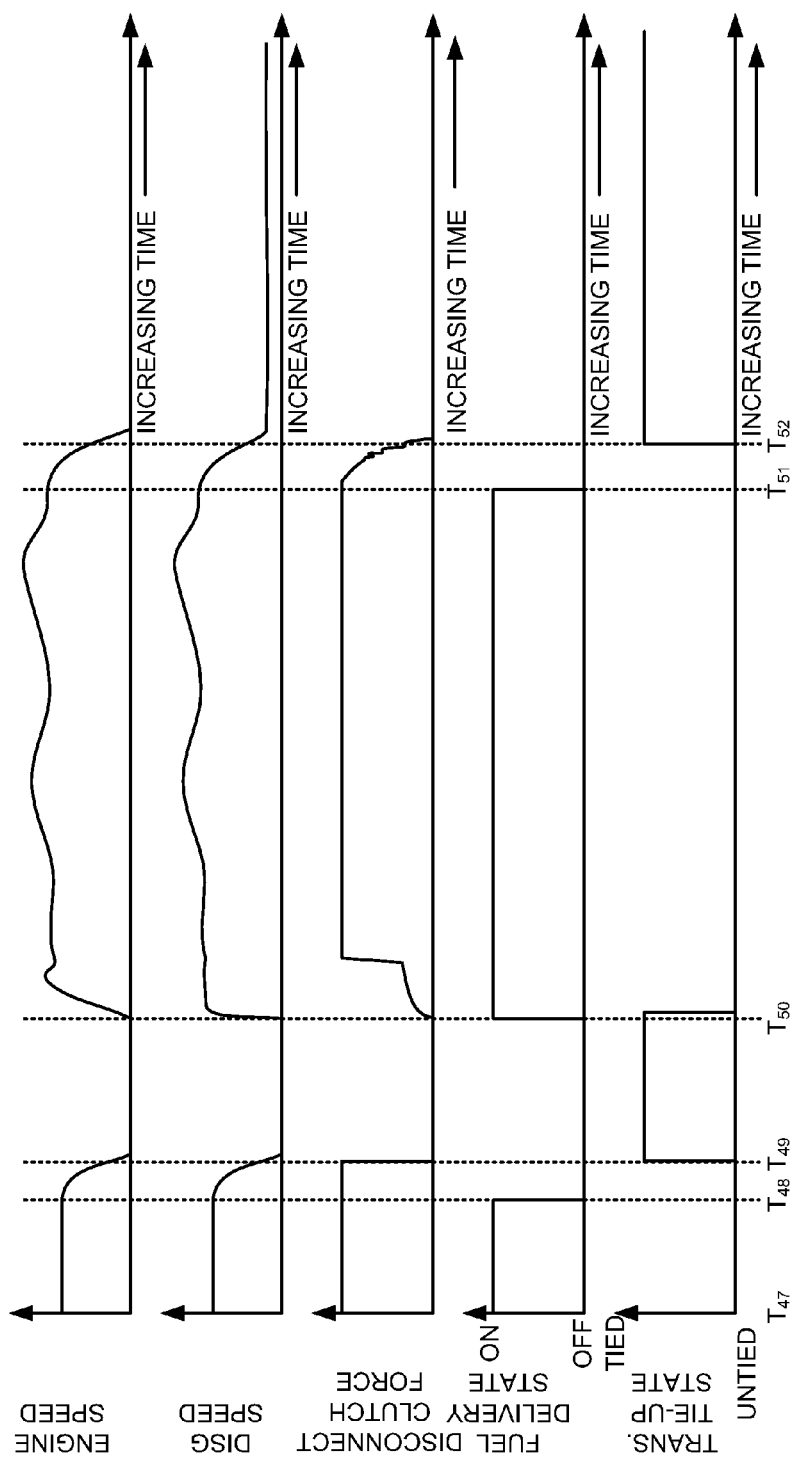

Referring now to FIG. 26, an example sequence for stopping an engine according to the method of FIG. 25 is shown. The sequence of FIG. 26 may be provided by the system of FIGS. 1-3.

The first plot from the top of FIG. 26 represents engine speed versus time. The Y axis represents engine speed and engine speed increases in the direction of the Y axis. The X axis represents time and time increases from the left hand side of the figure to the right hand side of the figure.

The second plot from the top of FIG. 26 represents DISG speed versus time. The Y axis represents DISG speed and DISG speed increases in the direction of the Y axis. The X axis represents time and time increases from the left hand side of the figure to the right hand side of the figure.

The third plot from the top of FIG. 26 represents driveline disconnect clutch application force (e.g., force applied to close the driveline disconnect clutch) versus time. The Y axis represents driveline disconnect clutch application force and driveline disconnect clutch application force increase in the direction of the Y axis. The X axis represents time and time increases from the left hand side of the figure to the right hand side of the figure.

The fourth plot from the top of FIG. 26 represents fuel delivery state versus time. The Y axis represents fuel delivery state and fuel is delivered to the engine when the trace is at a higher level. Fuel is not delivered to the engine when the trace is at a lower level. The X axis represents time and time increases from the left hand side of the figure to the right hand side of the figure.

The fifth plot from the top of FIG. 26 represents transmission tie-up state versus time. The Y axis represents transmission tie-up state and the transmission is tied-up when the trace is at a higher level. The transmission is not tied-up when the trace is at a lower level. The X axis represents time and time increases from the left hand side of the figure to the right hand side of the figure.

At time $T_{47}$, engine speed and DISG speed are equal and at an elevated level. The engine is mechanically coupled to the DISG via the driveline disconnect clutch. The driveline disconnect clutch is fully closed when driveline disconnect clutch input speed is equal to driveline disconnect clutch output speed. Further, the driveline disconnect clutch is fully closed when the driveline disconnect force is at a higher level. Fuel is being delivered to the engine as indicated by the fuel delivery state being at higher level. The transmission is not tied-up since the transmission tie-up state is at a lower level.

At time $T_{48}$, the engine is commanded to an off state in response to operating conditions (e.g., a low engine torque demand and an applied vehicle brake). Fuel delivery to the engine is stopped as indicated by the fuel delivery state transitioning to a lower level. Additionally, the DISG speed/torque are adjusted to control the engine speed and position trajectory in response to the request to stop the engine. In one example, an engine speed/position trajectory is stored in memory and DISG torque is adjusted in response to a difference between actual engine speed and the desired engine speed trajectory that is stored in memory. For example, if the actual engine speed is less than the desired engine speed at a particular time after the engine stop request, DISG torque is increased to move actual engine speed to the desired engine speed. In another example, if a particular engine position (e.g., cylinder number one top-dead-center compression stroke) is ahead of where it is desired at a particular time after requesting engine stop, DISG negative torque may be increased to slow the engine at a greater rate.

At time $T_{49}$, the driveline disconnect clutch is opened in response to the engine reaching a predetermined speed. Further, clutches of the transmission begin to be applied so that the transmission output shaft is tied to the transmission case and the vehicle chassis. By opening the driveline disconnect clutch at a predetermined speed, it may be possible to better control engine speed during engine stopping while allowing the DISG to operate. In this example, the DISG is stopped but in other examples it may continue to rotate so as to provide motive force to operate the transmission oil pump. The engine and DISG are stopped shortly after the disconnect clutch is opened.

In this way, an engine may be stopped such that engine position may be controlled during stopping. By controlling the engine stop position, it may be possible to improve the engine restart performance consistency.

At time $T_{50}$, the DISG is accelerated and provides torque to the vehicle driveline in response to an operator releasing a brake pedal (not shown). Further, the DISG helps to start the engine. In particular, the driveline disconnect clutch is partially closed to transfer torque from the DISG to the engine. Fuel and spark are provided to the engine to support combustion in the engine as indicated by the fuel delivery state transitioning to a higher level. Finally, the transmission clutches are also opened so as to untie the transmission in response to releasing the brake. The driveline disconnect clutch is fully closed when the engine speed reaches the DISG speed.

In this way, the engine may be restarted while torque is being provided to the vehicle driveline to accelerate the vehicle. Further, the driveline disconnect clutch is operated in a way that may reduce driveline torque disturbances.

Between time $T_{50}$ and time $T_{51}$, the engine and DISG supply torque to the vehicle driveline based on operator demand. In this example, the driveline disconnect clutch remains closed; however, it may also open without stopping the engine on occasion.

At time $T_{51}$, the engine is commanded to an off state in response to operating conditions (e.g., a low engine torque demand and an applied vehicle brake). Fuel delivery to the engine is stopped as indicated by the fuel delivery state transitioning to a lower level. The driveline disconnect clutch is also commanded to slip via reducing the driveline disconnect clutch application force. In one example, the driveline disconnect clutch slip rate is stored in memory as a function of time since engine stop request. The slip rate may be increased or decreased if the engine speed varies from a desired engine speed. For example, if engine speed is less than a desired engine speed at a particular time after the engine stop request, driveline disconnect clutch slip may be reduced by increasing the driveling disconnect clutch application force. In this way, additional torque may be provided by the DISG to the engine so that engine speed matched desired engine speed. The DISG speed is commanded to a speed that allows the transmission oil pump to provide a desired oil pressure.

At time $T_{52}$, engine speed reaches a predetermined speed and transmission clutches are applied to tie the transmission output shaft to the vehicle chassis. The DISG continues to rotate so that oil pressure is provided to transmission clutches.

In this way, a driveline disconnect clutch may slip during an engine stopping procedure to provide a desired engine stopping position. In some examples, the desired engine stopping position is where a particular cylinder piston stops within a predetermined number of degrees before top-dead-center compression stroke of the cylinder.

The methods and systems of FIGS. 1-3 and 25-26 provide for an engine stopping method, comprising: adjusting a speed of a driveline integrated starter/generator (DISG) to a desired speed that provides a desired transmission clutch oil line pressure in response to a request to stop engine rotation; and slipping a driveline disconnect clutch in a driveline between the DISG and the engine to stop the engine at a desired position. The method includes where the desired position a predetermined number of crankshaft degrees before top-dead-center compression stroke of a selected cylinder. The method further comprises ceasing fuel flow and spark to engine cylinders in response to the request to stop engine rotation. The method further comprises tying a transmission output shaft to a transmission case in response to the request to stop engine rotation.

In some examples, the method further comprises opening the driveline disconnect clutch at substantially zero engine speed. The method also further comprises continuing to rotate the DISG while the engine is at zero speed. The method further comprises activating and deactivating the DISG while the engine speed is zero.

The methods and systems of FIGS. 1-3 and 25-26 also provide for an engine stopping method, comprising: closing a driveline disconnect clutch in response to a request to stop engine rotation; adjusting a speed of a driveline integrated starter/generator (DISG) to a desired engine speed profile that decelerates toward zero engine speed; and opening the driveline disconnect clutch at a predetermined engine speed. The method further comprises tying a transmission output shaft to a transmission case in response to the request to stop the engine. The method further comprises ceasing fuel flow and spark to engine cylinders in response to the request to stop the engine. The method includes where the driveline disconnect clutch is in a driveline positioned between an engine and the DISG.

In some examples, the method further comprises opening the driveline disconnect clutch at a predetermined position. The method includes where speed of the DISG is increased when engine speed is less than the desired engine speed profile. The method includes where speed of the DISG is decreased when engine speed is greater than the desired engine speed profile.

The methods and systems of FIGS. 1-3 and 25-26 provide for a vehicle system, comprising: an engine; a dual mass flywheel (DMF) including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to adjust operation of the driveline disconnect clutch in response to a request to stop engine rotation.

In some examples, the vehicle system includes where the driveline disconnect clutch is at least partially closed. The vehicle system includes where the driveline disconnect clutch is fully closed. The vehicle system further comprises additional instructions to open the driveline disconnect clutch at a predetermined engine speed. The vehicle system further comprises operating the DISG at a speed that provides a desired transmission clutch oil line pressure. The vehicle system further comprises additional instructions to selectively deactivate the DISG at zero engine speed.

Figure 27:
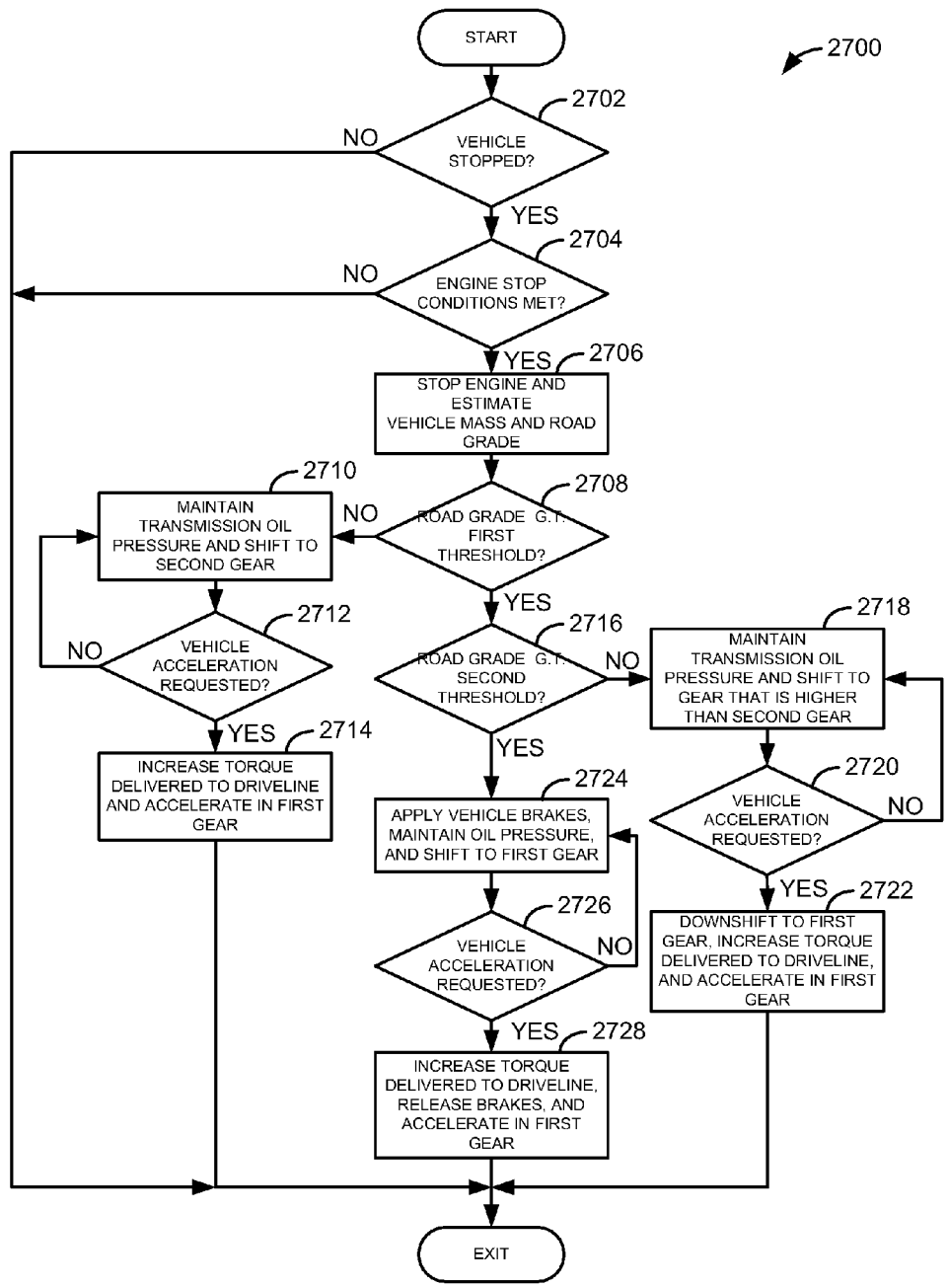
FIGS. 27 and 28 show a method and prophetic sequence for holding a hybrid vehicle with a stopped engine on a hill.

Referring now to FIG. 27, a method for stopping an engine when a vehicle in which the engine operates is parked on varying grades is shown. The method of FIG. 27 may be stored as executable instructions in non-transitory memory of controller 12 in FIGS. 1-3.

At 2702, method 2700 judges whether or not a vehicle in which an engine is operated is stopped. In one example, the vehicle may be determined to be stopped when vehicle speed is zero. If method 2700 judges that the vehicle is stopped the answer is yes and method 2700 proceeds to 2704. Otherwise, the answer is no and method 2700 proceeds to exit.

At 2704, method 2700 judges whether or not engine stopping conditions are met. In one example, engine stopping conditions may include but are not limited to driver demand torque being less than a threshold torque, engine speed being less than a threshold speed, and vehicle brake applied. In other examples, other engine stopping conditions may be applied. If engine stopping conditions are present the answer is yes and method 2700 proceeds to 2706. Otherwise, the answer is no and method 2700 proceeds to exit.

At 2706, method 2700 estimates road grade and vehicle mass. In one example road grade may be determined via an inclinometer. Vehicle mass may be determined as described at 904 of FIG. 9. Additionally, method 2700 stops engine rotation. Method 2700 proceeds to 2708 after vehicle mass and road grade are determined.

At 2708, method 2700 judges whether or not road grade is greater than a first threshold road grade. In one example, the first threshold and other threshold road grades may be a function of vehicle mass. For example, if the vehicle mass increases the first threshold road grade may decrease. If method 2700 judges that the present road grade is greater than a first threshold road grade, the answer is yes and method 2700 proceeds to 2716. Otherwise, the answer is no and method 2700 proceeds to 2710.

At 2710, method 2700 maintains transmission oil pressure to allow transmission gear shifting and shifts from a lower gear (e.g., first gear) to a higher gear (e.g., second gear) if the transmission is not already in second gear. By shifting to a higher gear, the vehicle mass is effectively increased at the vehicle wheels so that it is more difficult to move the vehicle. The transmission oil pressure may be maintained via an electric oil pump. Method 2700 proceeds to 2712 after the transmission is shifted.

At 2712, method 2700 judges whether or not vehicle acceleration or an increased torque demand is requested. In one example, increased driver demand is determined from accelerator pedal position. If method 2700 judges that vehicle acceleration or increased torque demand is requested, the answer is yes and method 2700 proceeds to 2714. Otherwise, method 2700 returns to 2710.

At 2714, method 2700 increases torque delivered to the driveline and downshifts the transmission to a lower gear (e.g., first gear) to accelerate the vehicle. Driveline torque may be increased via the DISG or via the engine after starting the engine. The engine may be started via cranking by the DISG or a starter with lower power output capacity. Method 2700 proceeds to exit after the transmission is shifted to first gear and torque to the driveline is increased.

At 2716, method 2700 judges whether or not road grade is greater than a second threshold road grade. If method 2700 judges that the present road grade is greater than a second threshold road grade, the answer is yes and method 2700 proceeds to 2724. Otherwise, the answer is no and method 2700 proceeds to 2718.

At 2718, method 2700 maintains transmission oil pressure to allow transmission gear shifting and shifts to a higher gear than second gear (e.g., $3^{rd}$ gear) if the transmission is not already in a higher gear. By shifting to a higher gear than second gear, the vehicle mass is effectively increased at the vehicle wheels so that it is more difficult to move the vehicle. The transmission oil pressure may be maintained via an electric oil pump. Method 2700 proceeds to 2718 after the transmission is downshifted.

At 2720, method 2700 judges whether or not vehicle acceleration or an increased torque demand is requested. In one example, increased driver demand is determined from accelerator pedal position. If method 2700 judges that vehicle acceleration or increased torque demand is requested, the answer is yes and method 2700 proceeds to 2722. Otherwise, method 2700 returns to 2718.

At 2722, method 2700 increases torque delivered to the driveline and downshifts the transmission to first gear to accelerate the vehicle. Driveline torque may be increased via the DISG or via the engine after starting the engine. The engine may be started via cranking by the DISG or a starter with lower power output capacity. Method 2700 proceeds to exit after the transmission is shifted to first gear and as the amount of torque delivered to the driveline is increased.

At 2724, method 2700 applies vehicle brakes, maintains transmission oil pressure to allow transmission gear shifting, and shifts to first if it is not already in first gear. By shifting to first gear and applying the brakes the vehicle may be ready to accelerate while being stopped on a grade. Further, by not applying brakes on lower grades, brake wear may be reduced while reducing vehicle movement. The transmission oil pressure may be maintained via an electric oil pump. Method 2700 proceeds to 2726 after the vehicle brakes are applied.

At 2726, method 2700 judges whether or not vehicle acceleration or an increased torque demand is requested. If method 2700 judges that vehicle acceleration or increased torque demand is requested, the answer is yes and method 2700 proceeds to 2728. Otherwise, method 2700 returns to 2724.

At 2728, method 2700 increases torque delivered to the driveline and releases vehicle brakes so that the vehicle may accelerate. Driveline torque may be increased via the DISG or via the engine after starting the engine. The engine may be started via cranking by the DISG or a starter with lower power output capacity. Method 2700 proceeds to exit after the vehicle brakes are released.

As described herein, engine shutdown or stop operation, such as when coming to or at a vehicle stop, may be used to conserve fuel. During such operation, the driveline disconnect clutch may be opened. Therefore when the vehicle is at rest, possibly on an uphill grade, the engine is often shutdown to rest. Thus, an alternative pressure source, other than the engine, may be used to maintain the transmission hydraulic pressure while the engine is off. In some examples, an electric auxiliary pump may be used to maintain the transmission hydraulic pressure. In other examples, the DISG speed does not drop to zero when the vehicle is stopped, but is held at low speed, typically well below idle (e.g., 200-500 RPM) to maintain the transmission hydraulic pressure. Under these conditions, the torque converter output torque is either zero (as the input speed is zero), or is a value that may not be sufficient to prevent the vehicle from rolling backwards when the brake is released. One approach applies the wheel brakes to prevent the vehicle from rolling backwards; however, while effective in some cases this can also lead to degraded vehicle launch performance, or require a grade sensor.

Another issue may be that when the operator depresses the brake pedal, one or both of vehicle brakes and regenerative braking may be applied, based on operating conditions. For example, the braking torque generated by the DISG during regenerative braking (with or without the engine shutdown and the driveline disconnect clutch opened) may be balanced with the friction wheel brake torque to provide desired rate of deceleration that corresponds to the brake pedal pressure. Since when the vehicle comes to a stop the regenerative brake torque diminishes to perform a hill hold function, a greater portion of the friction brake torque has to be "reserved" thus reducing the benefit of regenerative braking. Thus, alternative hill holding approaches may be desirable in order to increase the ability to utilize regenerative braking.

In one example, the torque converter based automatic transmission may be equipped with a one-way clutch. In this way, if the transmission fluid pressure is maintained while the vehicle is stationary and if the transmission is held in gear (as opposed to neutral, for example), then the one way clutch acts as a mechanical hill holding device to prevent the vehicle from rolling backwards when the vehicle is on an uphill grade. However, depending upon the vehicle mass and the grade angle, holding the transmission in a lower gear, e.g. first gear, may only slow the vehicle roll back when the brake is released on a steeper grade, e.g. 6%. In this example, if the transmission is in first gear, the torque which is a function of the sine of the grade angle and the vehicle mass may be sufficient to overcome the one-way clutch holding torque. Thus, in one example, the transmission may be held in a gear that is higher than first gear if this is required to prevent the vehicle from rolling backwards on the maximum design grade. For example, the transmission may be shifted to a higher gear before coming to a stop so as to enable hill holding, such as based on an estimated grade during vehicle travel.

Above a pre-determined grade, e.g. 6%, the longitudinal sensor based grade detection system may be used to determine grade. Thus, in some examples, the controller may determine if the current grade is in excess of an upper limit, and if so, the brake system may be applied in addition to assist in hill holding operation to prevent vehicle roll back.

For heavier vehicles or vehicle that may have higher loads, such as a pick-up truck, it may be advantageous to apply multiple clutches in the transmission to increase the maximum transmission holding torque. By applying two or more clutches while the vehicle is stationary, the transmission input can be "tied" to the transmission housing. This approach can also be used as part of an engine restart vehicle launch technique to shape the transmission output torque as the vehicle pulls away from a stop. Therefore by maintaining the transmission hydraulic pressure while the vehicle is stopped and applying the clutch(s) to either hold a gear or to put the transmission in a tie-up state, the vehicle can be prevented from rolling backwards when the operator releases the brake.

Figure 28:
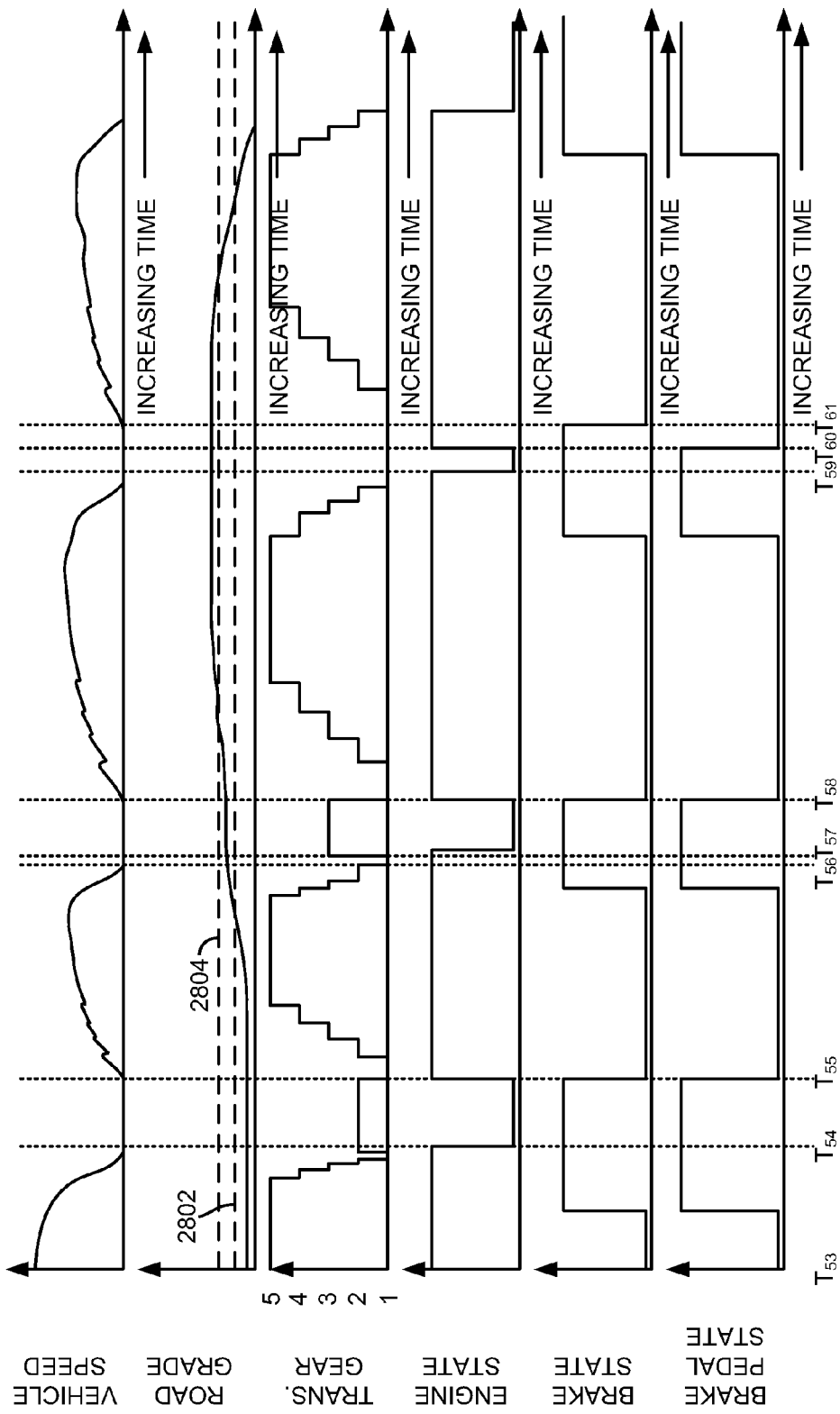

Referring now to FIG. 28, an example sequence for stopping an engine when a vehicle in which the engine operates is parked on a grade according to the method of FIG. 27 is shown. The sequence of FIG. 28 may be provided by the system of FIGS. 1-3.

The first plot from the top of FIG. 28 represents vehicle speed versus time. The Y axis represents vehicle speed and vehicle speed increases in the direction of the Y axis. The X axis represents time and time increases from the left hand side of the figure to the right hand side of the figure.

The second plot from the top of FIG. 28 represents road grade versus time. The Y axis represents road grade and road grade increases in the direction of the Y axis. The X axis represents time and time increases from the left hand side of the figure to the right hand side of the figure. Horizontal line 2802 represents a first threshold grade. Horizontal line 2804 represents a second threshold grade that is greater than the first threshold grade.

The third plot from the top of FIG. 28 represents transmission gear versus time. The Y axis represents transmission gear and the respective transmission gears are identified along the Y axis. The X axis represents time and time increases from the left hand side of the figure to the right hand side of the figure.

The fourth plot from the top of FIG. 28 represents engine state versus time. The Y axis represents engine state and the engine is operating when the engine state trace is at a higher level. The engine is stopped when the engine state trace is at a lower level. The X axis represents time and time increases from the left hand side of the figure to the right hand side of the figure.

The fifth plot from the top of FIG. 28 represents vehicle brake state (e.g., friction brake state) versus time. The Y axis represents vehicle brake state and the vehicle brake is applied when the brake state trace is at a higher level. The brake is not applied when the brake state is at a lower level. The X axis represents time and time increases from the left hand side of the figure to the right hand side of the figure.

The sixth plot from the top of FIG. 28 represents vehicle brake pedal state versus time. The Y axis represents vehicle brake pedal state and the vehicle brake pedal is applied when the brake pedal state trace is at a higher level. The brake pedal is not applied when the brake pedal state is at a lower level. The X axis represents time and time increases from the left hand side of the figure to the right hand side of the figure.

At time $T_{53}$, vehicle speed is elevated, road grade is near zero, and the transmission is in $5^{th}$ gear indicating that the vehicle is cruising at speed. The engine is operating and the brake pedal and brakes are not applied.

Between time $T_{53}$ and time $T_{54}$, the vehicle decelerates and downshifts from $5^{th}$ gear to $1^{st}$ gear in response to a lower driver demand torque (not shown). The vehicle brake is applied as is the brake pedal. Shortly before time $T_{54}$, the transmission is shifted to $2^{nd}$ gear in response to the road grade and an engine stop request after the vehicle is stopped.

At time $T_{54}$, the engine is stopped and the transmission is held in $2^{nd}$ gear to increase the vehicle's effective mass as presented to the vehicle's wheels. The vehicle brake pedal and brakes remain applied; however, in some examples after the vehicle is stopped, the vehicle brake may be released when the brake pedal is applied after the transmission is shifted to a higher gear. The road grade remains near zero and below the first grade threshold 2802.

At time $T_{55}$, the brake pedal is released by a driver. The vehicle brakes are released in response to releasing the brake pedal. The transmission is also downshifted into first gear to improve vehicle acceleration in response to the driver releasing the brake. The engine is also started in response to the driver releasing the brake. The vehicle begins to accelerate a short time after the brake pedal is release in response to an increasing driver demand torque.

Between time $T_{55}$ and time $T_{56}$, the vehicle accelerates and then decelerates in response to a driver demand torque and application of the brake pedal and brakes as indicated by the brake state and the brake pedal state. The transmission also shifts from $1^{st}$ through $5^{th}$ gear while the vehicle is accelerating and decelerating. The road grade also increases and is greater than first threshold road grade 2802 by time $T_{56}$. The brake pedal and brakes are applied by the driver to decelerate the vehicle.

At time $T_{56}$, the vehicle stops and the transmission is downshifted to $1^{st}$ gear as indicated by the vehicle speed and transmission traces. The engine continues to operate when the vehicle stops.

At time $T_{57}$, the transmission is upshifted to $3^{rd}$ gear in response to vehicle grade being greater than the first threshold grade 2802 and a request to stop the engine. Shifting the transmission increases the vehicle's effective mass at the vehicle wheels so that it is more difficult to roll down the increased grade. The engine is stopped shortly after the transmission is upshifted. The brake pedal and vehicle brakes remain applied by the driver; however, in some examples after the vehicle is stopped, the vehicle brake may be released when the brake pedal is applied after the transmission is shifted to a higher gear.

At time $T_{58}$, the driver releases the brake pedal and the brakes are released in response to the brake pedal being released. The transmission is downshifted from $3^{rd}$ gear to $1^{st}$ gear and the engine is started as indicated by the transition in engine state. The brakes and engine change state in response to the brake pedal being released. The vehicle begins to accelerate shortly after the brake pedal is released in response to an increasing driver demand torque (not shown).

Between time $T_{58}$ and time $T_{59}$, the vehicle accelerates and then decelerates in response to a driver demand torque and to application of the brake pedal and brakes as indicated by the brake state and the brake pedal state. The transmission also shifts from $1^{st}$ through $5^{th}$ gear while the vehicle is accelerating and decelerating. The road grade also increases and is greater than second threshold road grade 2804 by time $T_{59}$. The brake pedal and brakes are applied by the driver to decelerate the vehicle. The vehicle comes to a stop before time $T_{59}$.

At time $T_{59}$, the engine is stopped and the vehicle brakes are applied in response to the brake pedal, a low driver demand torque, and the road grade being greater than threshold road grade 2804. The brake pedal trace and the brake state trace are at higher levels to indicate that both the brakes and the brake pedal are applied.

At time $T_{60}$, the driver releases the brake pedal and the engine is started in response to the released brake pedal. The brake state remains at a higher level to indicate that the brakes are applied. The brakes remain applied in response to the road grade being greater than the second road grade threshold 2804 and driver demand torque being less than a threshold torque (not shown). The vehicle is stationary as indicated by the vehicle speed trace being zero.

At time $T_{61}$, the driver demand torque increases (not shown) and the vehicle brake is released in response to the increased driver demand torque. The vehicle also begins to accelerate in response to the increased driver demand torque as indicated by the vehicle speed increasing.

In this way, the vehicle and drivetrain may respond to changing vehicle grade so that a vehicle remains substantially stationary when the engine is stopped while the vehicle is on a grade. As the vehicle is stopped on increasing grades, vehicle movement reducing measures are progressively increased.

The methods and systems of FIGS. 1-3 and 27-28 provide for a vehicle stopping method, comprising: upshifting a transmission to a gear in response to a road grade when a vehicle is stationary; and automatically stopping an engine of the vehicle in response to vehicle conditions. The method includes where the gear number increases as the road grade increases. The method includes where automatically stopping the engine includes stopping the engine in response to a low driver demand torque. The method includes where automatically stopping the engine further includes stopping the engine in response to vehicle speed. The method includes where automatically stopping the engine includes stopping the engine in response to a vehicle brake pedal state. The method includes where the transmission is shifted without a driver shift request, and where the transmission is an automatic transmission. The method further comprises downshifting the transmission in response to an increasing driver demand torque after upshifting the transmission.

The methods and systems of FIGS. 1-3 and 27-28 also provide for a vehicle stopping method, comprising: during a first condition, upshifting a transmission to a first gear ratio in response to a first road grade when a vehicle is stationary; during a second condition, upshifting the transmission to a second gear ratio in response to a second road grade when the vehicle is stationary; and automatically stopping an engine in response to vehicle conditions. The method includes where the first gear ratio is a lower gear ratio than the second gear ratio, and where the transmission is not in first gear when the transmission is shifted to the first gear ratio. The method further comprises downshifting the transmission in response to an increasing driver demand torque after upshifting the transmission during the first and second conditions.

In some examples, the method includes where the second road grade is greater than the first road grade. The method further comprises maintaining transmission oil pressure while shifting the transmission. The method includes where the engine is stopped before the transmission is shifted, and where the transmission oil pressure is maintained via a driveline integrated starter/generator. The method further comprises selecting the first gear ratio and the second gear ratio in response to vehicle mass.

The methods and systems of FIGS. 1-3 and 27-28 provide for a vehicle system, comprising: an engine; a transmission in selective mechanical communication with the engine; and a controller including executable instructions stored in non-transitory memory for shifting the transmission to a gear in response to road grade while a vehicle in which the engine operates is stationary, the controller also including instructions to apply vehicle brakes in response to road grade. The vehicle system includes where the engine is stopped before the transmission is shifted, and where the transmission oil pressure is maintained via a driveline integrated starter/generator. The vehicle system further comprises additional instructions for selecting the first gear ratio and the second gear ratio in response to vehicle mass.

In some examples, the vehicle system further comprises additional instructions for downshifting the transmission in response to an increasing driver demand torque after the vehicle is stationary. The vehicle system further comprises additional instructions for releasing the vehicle brakes in response to an increasing driver demand torque after the vehicle is stationary. The vehicle system includes where the transmission is an automatic transmission.

Figure 29A:
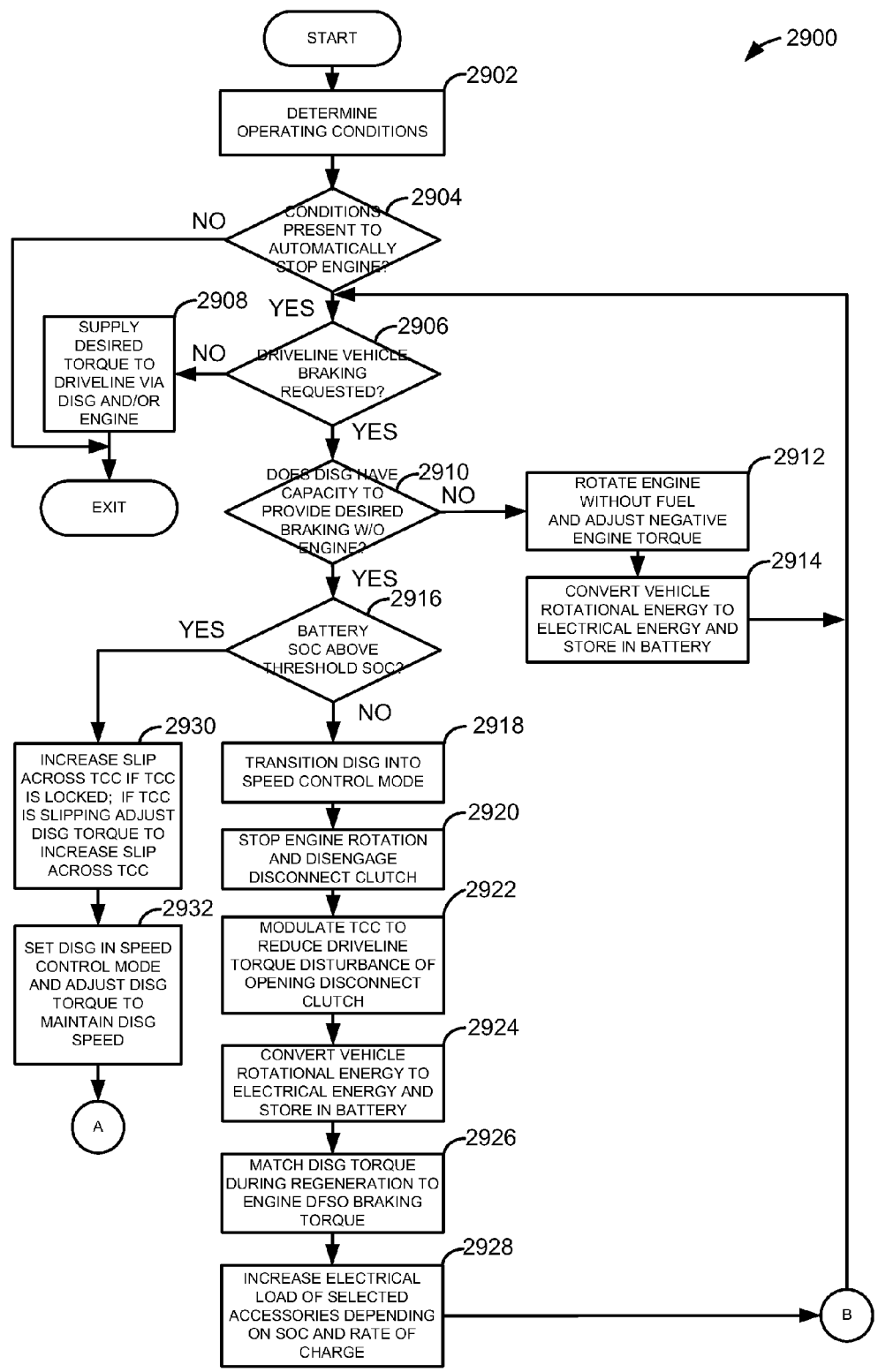
FIGS. 29A-36 show methods and prophetic sequences for operating a hybrid powertrain with driveline braking.
Figure 29B:
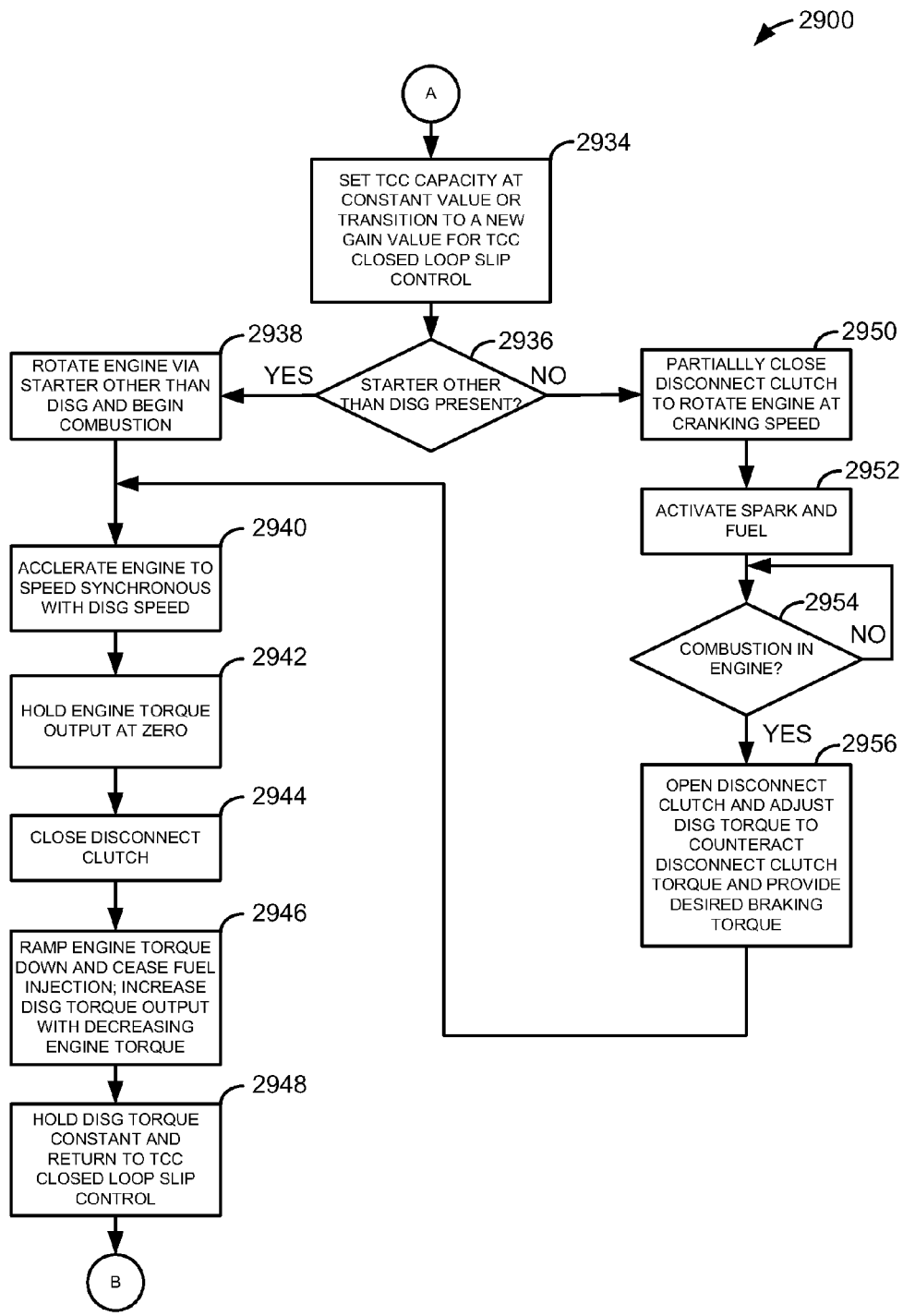

Referring now to FIGS. 29A and 29B, a flowchart of a method for providing vehicle braking via the vehicle driveline is shown. The method of FIGS. 29A and 29B may be stored as executable instructions non-transitory memory in the system of FIGS. 1-3.

At 2902, method 2900 determined operating conditions. Operating conditions may include but are not limited to vehicle speed, engine speed, brake pedal position, desired driveline torque, DISG speed, and battery state of charge. Method 2900 proceeds to 2904 after operating conditions are determined.

At 2904, method 2900 judges whether or not conditions are present to automatically stop the engine. The engine may be automatically stopped in response to vehicle conditions and not in response to an input that has a sole function of starting and/or stopping engine rotation (e.g., an off/on key switch). For example, when an operator turns an engine stop key to the engine, the engine is not automatically stopped. However, if the operator releases an accelerator pedal, which has a function of supplying a driveline torque demand, the engine may be automatically stopped in response to a low torque demand. If method 2900 judges that conditions are present to automatically stop the engine, the answer is yes and method 2900 proceeds to 2906. Otherwise, the answer is no and method 2900 proceeds to exit.

At 2906, method 2900 judges whether or not driveline vehicle braking is requested. Driveline vehicle braking may be requested during vehicle deceleration to reduce the amount of wheel braking used to decelerate the vehicle. For example, driveline braking via an engine or DISG may be provided when a vehicle is descending a hill so that a smaller amount of wheel braking may be used to decelerate the vehicle. In one example, method 2900 may judge that driveline braking is requested when the vehicle is accelerating and a low driveline torque request is present. If method 2900 judges that driveline braking is requested, the answer is yes and method 2900 proceeds to 2910. Otherwise, the answer is no and method 2900 proceeds to 2908.

At 2908, method 2900 supplies a desired torque to the driveline via the DISG and/or the engine. Positive engine torque may be supplied by the engine combusting an air-fuel mixture and rotating the driveline. The DISG may provide torque in response to an amount of current flowing to the DISG. Method 2900 proceeds to exit after the desired torque is supplied to the driveline.

At 2910, method 2900 judges whether or not the DISG has a capacity to provide the desired amount of vehicle braking without the engine. In one example, method 2900 judges whether or not the DISG has the capacity for providing the desired amount of vehicle braking without the engine braking in response to vehicle speed, selected transmission gear, and DISG torque absorbing capacity. In particular, a table describing empirically determined torque absorbing capacity of the DISG is indexed by DISG speed, as determined from vehicle speed and selected gear. If method 2900 judges that the DISG has the capacity for providing the desired amount of driveline braking without the engine providing braking, the answer is yes and method 2900 proceeds to 2916. Otherwise, the answer is no and method 2900 proceeds to 2912.

At 2912, method 2900 rotates the engine without providing fuel to the engine and engine rotational losses are increased so that driveline braking may be increased. The engine rotational losses may be increased by adjusting valve timing. In one example, intake valves are opened near top-dead-center intake stroke and exhaust valves are opened early in the expansion stroke (e.g., before 90 crankshaft degrees after top-dead-center compression stroke) to increase engine rotational losses and increase driveline braking. The engine is rotated by closing the driveline disconnect clutch which couples the engine to the remaining portion of the driveline as shown in FIGS. 1-3. Method 2900 proceeds to 2914 after the engine is rotated and engine rotating losses are increased.

At 2914, method 2900 converts vehicle kinetic energy into electrical energy. In particular, the DISG is put in a generator mode where rotational energy from vehicle wheels is converted into electrical energy and stored to a battery or other energy storage device. In one example, the rotational energy provided by the driveline from the vehicle wheels, through the transmission, through the torque converter, and to the DISG is converted to electrical energy generating current flow through a stator. The electrical energy may then be stored in an energy storage device. Method 2900 returns to 2906 after vehicle kinetic energy begins to be converted to electrical energy.

At 2916, method 2900 judges whether or not energy storage device SOC is greater than a threshold charge amount. In one example, SOC may be estimated based on a voltage across the energy storage device. If method 2900 judges that the energy storage device SOC is greater than a threshold amount, the answer is yes and method 2900 proceeds to 2930. Otherwise, the answer is no and method 2900 proceeds to 2918.

Additionally, at 2916 method 2900 can proceed to 2930 when a driver requests increased driveline braking. For example, if a driver presses a button to enter a hill decent mode, method 2900 proceeds to 2930 to increase driveline braking.

At 2918, method 2900 transitions the DISG to a speed control mode from torque control mode. In speed control mode, DISG torque output is adjusted in response to DISG speed so that DISG speed converges to a desired DISG speed. In one example, DISG torque is increased when DISG speed is less than actual DISG speed. Likewise, DISG torque is decreased when DISG speed is greater than actual DISG speed. The DISG is operated in a speed control mode so that the DISG can react to the driveline speed variations caused by the torque changes. As a result, the torque converter impeller may rotate at a desired constant speed during driveline disconnect clutch transitions so that torque transferred through the torque converter is more constant. In this way, the DISG reduces driveline torque disturbances that may be caused by the driveline disconnect clutch opening. Method 2900 proceeds to 2920 after the DISG is put into speed control mode.

At 2920, method 2900 stops engine rotation by opening or disengaging the driveline disconnect clutch and stopping fuel flow to engine cylinders. The driveline disconnect clutch may be opened before fuel flow to engine cylinders is stopped so that the non-combusting engine does not reduce driveline speed and torque at the torque converter impeller. Method 2900 proceeds to 2922 after engine rotation is stopped and the driveline disconnect clutch begins to open.

At 2922, method 2900 adjusts the torque capacity of torque converter clutch (TCC) to reject driveline disconnect clutch opening disturbances. When the driveline mode is changed to energy regeneration mode and the driveline disconnect clutch starts to open and instantaneous impeller speed may vary because the amount of torque transferred from the engine to the driveline is changed. In one example, the torque capacity of the TCC is modulated and controlled to obtain smooth transitions between changes in state of the driveline disconnect clutch. As such, a more consistent vehicle speed may be maintained when the driveline disconnect clutch is opened. For example, if the torque converter impeller speed begins to decrease when the disconnect clutch opens, the TCC may be adjusted slip an increased amount. Method 2900 proceeds to 2924 after the TCC is adjusted.

At 2924, method 2900 converts vehicle kinetic energy into electrical energy as described at 2914. The electrical energy is directed to an electrical energy conversion storage device where it is held and may be used at a later time. The electrical energy conversion device may be a battery or a capacitor. Method 2900 proceeds to 2926 after conversion of vehicle kinetic energy to electrical energy begins.

At 2926, method 2900 transitions to a torque control mode after any disturbance from opening the driveline disconnect clutch has been mitigated. Method 2900 also adjusts the DISG to provide negative torque in an amount that is equal to what the engine provides during deceleration fuel shut off.

An amount of braking torque that an engine may provide may be empirically determined and stored in memory. The engine braking amount may include adjustments for valve timing, engine oil temperature, engine speed, throttle position, and barometric pressure. The adjustments may be added to a base engine braking torque that is characterized at nominal valve timings, engine temperature, engine speed, throttle position, and barometric pressure. For example, engine braking torque may be determined at an engine oil temperature of 90° C., engine speed of 1500 RPM, base valve timing, closed throttle, and barometric pressure of 100 kPA. Engine braking torque may be adjusted from the base braking torque as operating conditions deviate from the base conditions.

Present engine operating conditions (e.g., oil temperature, valve timing, etc.) are determined and are the basis for indexing empirically determined tables and/or functions that output engine braking torque at the present operating conditions. Once the engine braking torque at present operating conditions is determined, DISG torque is adjusted to the engine braking torque. By adjusting the DISG torque to the engine braking torque, it may be possible to transition from providing braking torque using the DISG to providing braking torque via the engine without the DISG providing braking torque when energy conversion device SOC is greater than a threshold.

The engine conditions may be continuously monitored so that negative or regeneration DISG torque may be revised as engine operating conditions change. For example, if engine oil temperature decreases and engine friction increases, negative DISG torque that emulates engine braking torque when fuel flow is stopped to the engine may be increased to reflect the change in engine braking torque. Method 2900 proceeds to 2928 after negative DISG torque is adjusted to engine braking torque when the engine is rotated without fuel being supplied to the engine and when there is no combustion in the engine.

At 2928, method 2900 automatically activates and increases selected vehicle electrical loads to extent the amount of time the DISG may continue to provide driveline braking. For example, if the vehicle travels down a hill for an extended duration, the energy storage device may become fully charged so that it may not accept additional charge. During such conditions, the DISG may stop providing charge to the energy storage device to reduce the possibility of energy storage device degradation. However, it may be possible for the DISG to continue to provide charge to the energy storage device if additional charge is provided to vehicle systems so that the energy storage device charge does not increase.

In one example, current supplied to selected electrically operated vehicle systems is increased when energy storage device state of charge is greater than a threshold level. In other examples, current supplied to selected electrically operated vehicle systems is increased when charge provided by the DISG to the battery is greater than a threshold rate of charge. In some examples, when energy storage device state of charge is greater than a threshold level, the engine is rotated, the DISG ceases to operate in generation mode, and current supplied to the selected electrically operated vehicle systems continues until charge of the energy storage device is reduced to a second threshold level and then the DISG returns to generating mode. The engine stops rotating when charge of the energy storage device is less than a threshold level.

Selected electrically operated vehicle systems that may be automatically activated and turned on or supplied more current than requested. The selected electrically operated vehicle systems may include but are not limited to front and rear windshield defrosting devices, exhaust after treatment heating devices, electric pumps, and lights. For example, the front and rear windshield defrosters may be activated without notifying the driver so that the driver may be unaware electrical energy is being consumed to lengthen DISG operation in regeneration mode. Further, output of an electric pump (e.g., a fuel pump) may be increased by increasing pump current without the driver noticing. Likewise, emission system heaters and vehicle lights may be activated to extend DISG operation in regeneration mode. Method 2900 returns to 2906 after electrical loads are adjusted.

At 2930, method 2900 increases slip across a torque converter clutch (TCC) if the TCC is locked. If the TCC is slipping, slip across the TCC is further increased. Slipping the TCC reduces torque disturbances that may be introduced to the driveline via connecting and disconnecting the driveline disconnect clutch. In one example, the TCC is placed in a controlled slip mode at 2934 and the TCC is modulated in response to torque converter impeller speed changes. Method 2900 proceeds to 2932 after slip across the TCC is adjusted.

At 2932, method 2900 puts the DISG in speed control mode after exiting torque control mode and adjusts DISG torque to maintain DISG speed at a substantially constant value (e.g., ±50 RPM of a commanded DISG speed). In one example, DISG speed is compared against a desired DISG speed, and current supplied to the DISG is adjusted in response to a difference in DISG speed and desired DISG speed. If DISG speed is less than the desired DISG speed, additional current is supplied to the DISG to increase DISG torque and speed. If DISG speed is greater than the desired DISG speed, current supplied to the DISG is decreased to decrease DISG speed and torque supplied to the driveline. Putting the DISG in speed control mode allows the DISG to control driveline torque without causing driveline speed changes which may be undesirable to a driver. Method 2900 proceeds to 2934 after the DISG is put in speed control mode.

At 2934, method 2900 sets the TCC capacity at a constant value or transitions to a new control gain value for TCC closed loop slip control. For example, a signal controlling the amount of torque the TCC transfers across the torque converter is adjusted as torque converter impeller speed changes to reduce driveline disturbances. In one example, the TCC slip amount is adjusted according to a TCC transfer function that outputs a TCC control signal duty cycle. The TCC transfer function is indexed based on torque converter impeller speed and torque converter turbine speed. Method 2900 proceeds to 2936 after the TCC capacity is adjusted.

At 2936, method 2900 judges whether or not a starter other than the DISG is present. In some examples, if a starter other than the DISG is not available or in a degraded state, method 2900 may judge the non-DISG starter as not being present. If method 2900 judges that a starter other than the DISG is not present, the answer is no and method 2900 proceeds to 2950. Otherwise, the answer is yes and method 2900 proceeds to 2938.

At 2950, method 2900 at least partially closes the driveline disconnect clutch while the DISG is in speed control mode to rotate the engine. In one example, the driveline disconnect clutch is closed to a position that provides a desire engine cranking speed (e.g., 250 RPM). The desired cranking speed may vary depending on operating conditions and may be as high as the DISG speed in some examples. Closing the driveline disconnect clutch causes driveline torque to be transferred to the engine. Thus, current supplied to the DISG may be increased when the driveline disconnect clutch is engaged so as to maintain DISG speed. In this way, torque transferred across the torque converter may be maintained at a constant level since the torque converter impeller speed is constant. Method 2900 proceeds to 2952 after the driveline disconnect clutch is at least partially closed.

At 2952, method 2900 provides spark and fuel to engine cylinders to start the engine. In one example, fuel is provided to engine cylinders via direct fuel injectors. Method 2900 proceeds to 2954 after spark and fuel are supplied to engine cylinders.

At 2954, method 2900 judges whether or not combustion is occurring in engine cylinders. In one example, method 2900 judges that combustion is present in engine cylinders when engine torque output increases. An increase in engine speed may be indicative of combustion in engine cylinders. In other examples, combustion in engine cylinders may be determined via cylinder pressure sensors. If method 2900 determines combustion is present in engine cylinders, the answer is yes and method 2900 proceeds to 2956. Otherwise, the answer is no and method 2900 returns to 2954.

At 2956, method 2900 opens the driveline disconnect clutch and adjusts DISG torque. Opening the driveline disconnect clutch can reduce the amount of torque transferred from the DISG and driveline to start the engine when the driveline disconnect clutch is disengaged before the engine begins to produce more torque to accelerate the engine to the DISG speed. Opening the driveline disconnect clutch also reduces the amount of torque provided by the driveline to accelerate the engine. Therefore, the DISG torque may be reduced to keep the DISG at a constant speed when the driveline disconnect clutch is released. In examples where vehicle kinetic energy is rotating the DISG, the amount of torque absorbed by the DISG may be adjusted. Method 2900 proceeds to 2940 after the driveline disconnect clutch is opened.

At 2938, method 2900 rotates the engine via a starter other than the DISG. In one example, the starter has a lower power output capacity than the DISG and the starter selectively engages a flywheel coupled to an engine crankshaft. The starter provides an engine cranking speed of less than 250 RPM. Spark and fuel are also supplied to the engine at 2938. Method 2900 proceeds to 2940 after the engine begins to rotate.

At 2940, method 2900 accelerates the engine speed to a speed synchronous with the DISG. The engine is accelerated by adjusting fuel, spark, and the cylinder air amount to engine cylinders. Method 2900 proceeds to 2942 after engine speed reaches DISG speed.

At 2942, method 2900 holds the engine speed at DISG speed and provides substantially zero net torque (e.g., ±10 N-m) out of the engine crankshaft. In other words, the engine torque is adjusted just high enough to overcome engine losses and rotate the engine at the DISG speed. Method 2900 proceeds to 2944 after engine net torque is substantially zero.

At 2944, method 2900 closes the driveline disconnect clutch. Substantially no torque is transferred between the driveline and the engine when the driveline disconnect clutch is closed so that a smooth transition between not operating the engine and operating the engine is provided. The engine is operated at substantially DISG speed (e.g., ±25 RPM) when the driveline disconnect clutch is closed. Method 2900 proceeds to 2946 after the driveline disconnect clutch is closed.

At 2946, method 2900 ramps down engine combustion torque (e.g., engine torque provided by combustion) and then fuel injection is stopped so that the engine is not rotating under its own power. Engine output torque is ramped down by reducing cylinder air amounts and cylinder fuel amounts. Further, engine rotational losses are increased via adjusting engine valve timing. For example, intake valves of a cylinder may be opened near top-dead-center intake stroke and exhaust valves of the cylinder may be opened between top-dead-center compression stroke and 45 crankshaft degrees after top-dead-center compression stroke to increase engine rotational losses. Valves of other engine cylinders may be operated in a similar manner. Negative torque generated by the DISG during regeneration may be decreased to smooth the transition from the engine providing combustion torque and the engine providing braking torque during fuel shut off. Further, the negative DISG torque may be adjusted to maintain a constant torque converter impeller speed while the DISG is converting kinetic energy into electrical energy. In this way, the rotating engine may increase a load applied to the driveline to provide a desired amount of driveline braking to the vehicle. Method 2900 proceeds to 2948 after engine combustion torque is ramped down.

In one example, the amount of regenerative torque requested by the DISG should be consistent with the amount of engine braking torque that is presently available as described at 2926. The engine braking torque can be estimated based on the engine oil temperature, engine friction and pumping at the current impeller speed. Once the system converts to engine braking, the actual engine braking can be compared to the estimated engine braking and a correction can be made to the estimate. In this way, the vehicle may decelerate at the same rate for both engine braking and regenerative braking when the brake pedal is not being pressed.

At 2948, method 2900 holds DISG torque substantially constant and returns the TCC to closed loop slip control. For example, the TCC command signal may be adjusted to provide a desired speed differential between the torque converter impeller and the torque converter turbine. Method 2900 returns to 2906 after the TCC is returned to a closed loop slip control mode.

In an alternative example, engine rotation may commence and fuel and spark may be withheld from the engine while the engine rotates up to the DISG speed. The driveline disconnect clutch initially closes a small amount and a higher level of slip is present across the driveline disconnect clutch. The DISG may be transitioned from a generator state to a motor state to reduce any driveline torque disturbance as accelerating the engine provides additional negative torque to the driveline. Additional pressure is applied to the driveline disconnect clutch to increase the negative torque provided by the engine to the driveline. DISG torque is adjusted while the DISG is in speed control mode to provide the desired level of driveline braking. In one example, DISG current is adjusted to provide a desired vehicle deceleration rate.

In another example, 2936-2956 may be replaced with a step where the engine remains at zero rotation while vehicle braking via friction brakes (e.g., wheel brakes) is increased without driver input while DISG torque absorption (e.g., converting rotational mechanical energy into electrical energy) is decreased. The friction braking force may be increased proportional to the reduction in DISG driveline braking. Thus, vehicle brakes are automatically applied while the driveline braking provided by the DISG is reduced.

In this way, the method of FIGS. 29A-B provides driveline braking so that fuel may be conserved by converting kinetic energy into electrical energy. Further, the method may reduce driveline torque disturbances via controlling the DISG, TCC, and other driveline components.

Figure 30:
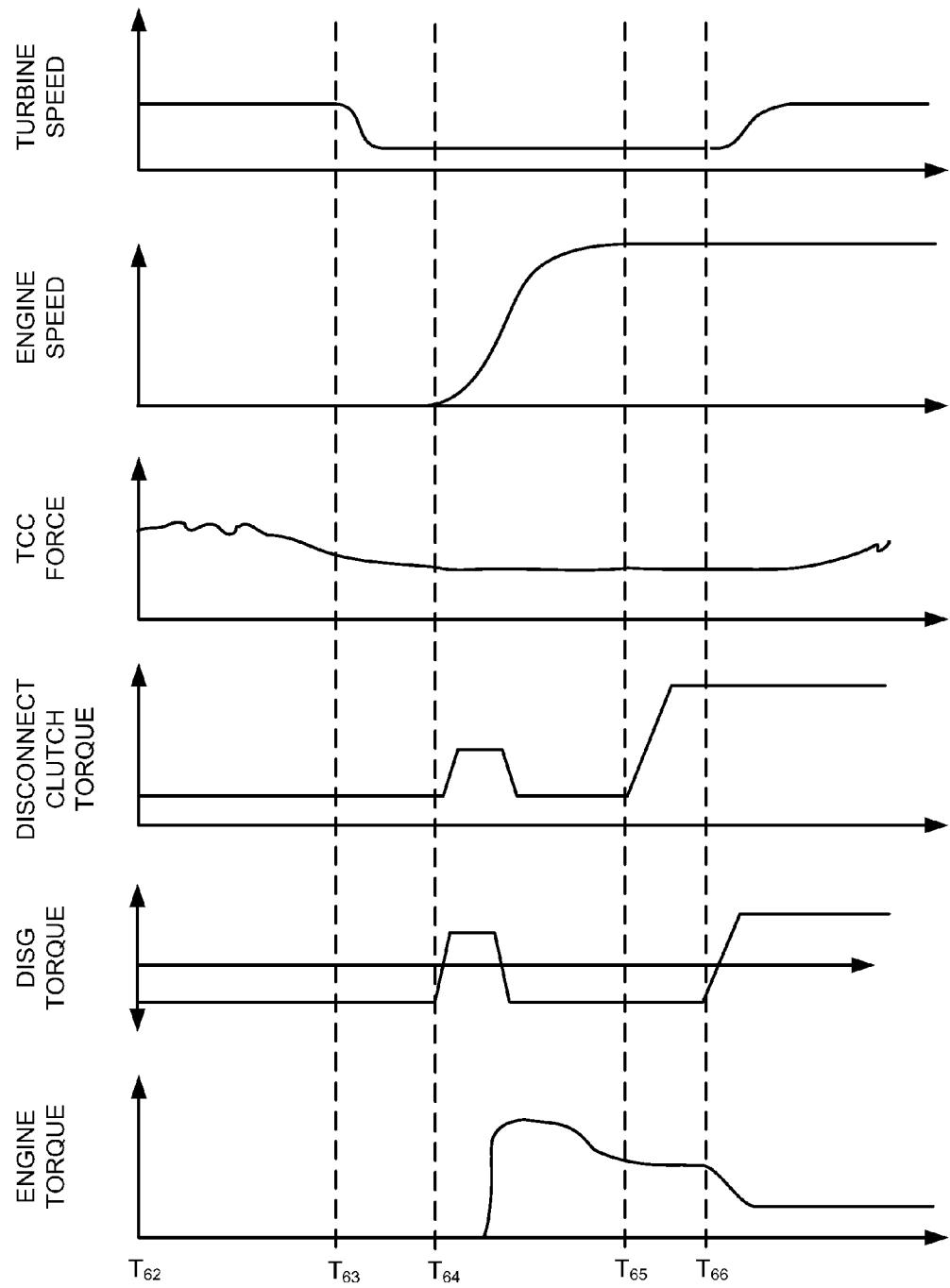

Referring now to FIG. 30, an example sequence for providing vehicle braking via a driveline according to the method of FIGS. 29A-B is shown. The sequence of FIG. 30 may be provided by the system of FIGS. 1-3.

The first plot from the top of FIG. 30 represents torque converter turbine speed versus time. The Y axis represents torque converter turbine speed and torque converter turbine speed increases in the direction of the Y axis arrow. The X axis represents time and time increases from the left hand side of the figure to the right hand side of the figure.

The second plot from the top of FIG. 30 represents engine speed versus time. The Y axis represents engine speed and engine speed increases in the direction of the Y axis arrow. The X axis represents time and time increases from the left hand side of the figure to the right hand side of the figure.

The third plot from the top of FIG. 30 represents torque converter clutch (TCC) application force versus time. The Y axis represents TCC application force and TCC application force increases in the direction of the Y axis arrow. The X axis represents time and time increases from the left hand side of the figure to the right hand side of the figure.

The fourth plot from the top of FIG. 30 represents driveline disconnect clutch torque versus time. The Y axis represents driveline disconnect clutch torque and driveline disconnect clutch torque increases in the direction of the Y axis arrow. The X axis represents time and time increases from the left hand side of the figure to the right hand side of the figure.

The fifth plot from the top of FIG. 30 represents DISG output torque versus time. The Y axis represents DISG output torque and DISG output torque increases in the direction of the Y axis arrow. The X axis represents time and time increases from the left hand side of the figure to the right hand side of the figure.

The sixth plot from the top of FIG. 30 represents engine torque versus time. The Y axis represents engine torque and engine torque increases in the direction of the Y axis arrow. The X axis represents time and time increases from the left hand side of the figure to the right hand side of the figure.

At time $T_{62}$, the engine is stopped, the turbine speed is elevated, and the DISG is providing a negative (e.g., braking torque) to the driveline. The TCC clutch is locked and the driveline disconnect clutch is open and not transmitting torque.

At time $T_{63}$, the torque converter clutch slip is increased in response to a request to restart the engine. The request to restart the engine is based on an increase in driver demand torque (not shown). The TCC force decreases as the torque converter clutch slip is increased. The engine speed remains constant, the driveline disconnect clutch remains open, and the DISG is charging a battery and supplying negative driveline torque.

Between time $T_{63}$ and time $T_{64}$, the DISG transitions from a torque control mode to a speed control mode in response to the increase in driver demand torque. The DISG is then adjusted to a desired speed. The TCC is also adjusted to provide a constant amount of slip.

At time $T_{64}$, the driveline disconnect clutch is at least partially closed to start the engine. The DISG torque is increased from a negative torque toward zero torque and then it goes positive to provide torque to start the engine. The amount of DISG torque increase depends on the amount of torque used to crank the engine. The engine speed increases as spark and fuel are supplied to the engine as the engine rotates.

Between time $T_{64}$ and time $T_{65}$, the engine output torque increases and combustion torque accelerates the engine. The DISG is transitioned back to braking mode and the driveline disconnect clutch is opened in response to combustion in the engine. Opening the driveline disconnect clutch allows the engine to accelerate to the DISG speed without affecting driveline torque.

At time $T_{65}$, the driveline disconnect clutch is closed in response to engine speed reaching DISG speed. Closing the driveline disconnect clutch after the engine reaches DISG speed may reduce driveline torque disturbances. Engine torque is also reduced via reducing a throttle opening amount or via adjusting cylinder valve timing.

At time $T_{66}$, the engine is transitioned to a deceleration fuel shutoff mode where the engine rotates without being fueled and without combusting an air-fuel mixture. The engine provides braking torque when it rotates without being fueled. The engine braking torque may be adjusted via adjusting intake manifold pressure via a throttle or cylinder valves. The DISG is also transitioned back to torque control mode.

Thus, the methods and systems of FIGS. 1-3 and 29-30 provide for controlling driveline braking, comprising: providing driveline braking via an electric machine while rotation of an engine is stopped; and starting rotation of the engine in response to a battery state of charge exceeding a threshold. In this way, engine braking may take over for DISG braking when energy storage device charge is greater than a threshold (e.g., fully charged). The method further comprises automatically stopping the engine and opening a driveline disconnect clutch between the engine and the electric machine while the engine is stopped, and further comprising providing engine braking torque to wheels after starting rotation of the engine and where the driveline disconnect clutch is at least partially closed to rotate the engine.

In one example, the method further comprises operating the electric machine in a speed control mode while converting vehicle kinetic energy into electrical energy. The method further comprises increasing slip of a torque converter clutch during starting rotation of the engine while engine speed is less than an idle speed of the engine. The method includes where the engine is rotated via a driveline integrated starter/generator. The method includes where a driveline disconnect clutch is engaged to couple the engine to the driveline integrated starter/generator. The method further comprises operating the electric machine in a speed control mode and adjusting electric machine torque to maintain driveline speed at a substantially constant torque.

The methods and systems of FIGS. 1-3 and 29-30 also provide for controlling driveline braking, comprising: providing driveline braking via a first electric machine while rotation of an engine is stopped; starting rotation of the engine in response to a battery state of charge exceeding a threshold, where rotation of the engine is performed via a second electric machine. The method includes where the second electric machine is not coupled to the engine before engine rotation is commanded. The method includes where the first electric machine is not mechanically coupled to the engine while engine rotation is stopped.

In one example, the method includes where the second electric machine is disengaged from the engine after engine speed reaches a threshold speed. The method further comprises closing a driveline disconnect clutch when engine speed is substantially equal to the first electric machine. The method further comprises increasing torque converter clutch slip during closing the driveline disconnect clutch. The method includes where a power output capacity of the second electric machine is lower than a power output capacity of the first electric machine.

The methods and systems of FIGS. 1-3 and 29-30 also provide for a vehicle system, comprising: an engine; a dual mass flywheel (DMF) including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a starter other than the DISG including a base state where the starter is not engaged to the engine; a transmission selectively coupled to the engine via the driveline disconnect clutch; and a controller including non-transitory instructions executable to automatically stop the engine, provide driveline braking via the DISG while engine rotation is stopped, rotate a stopped engine via the starter other than the DISG when the DISG is providing driveline braking and when battery state of charge is greater than a threshold level.

In some examples, the vehicle system further comprises additional instructions to increase slip of a torque converter clutch when the driveline disconnect clutch is at least partially closed. The vehicle system further comprises closing the driveline disconnect clutch after the engine is started. The vehicle system includes where the DISG has a power output capacity greater than the starter other than the DISG. The vehicle system further comprises a torque converter clutch and additional instructions for increasing slip of torque converter clutch during closing the driveline disconnect clutch. The vehicle system includes where the DISG is supplying charge to an energy storage device when providing driveline braking.

The methods and systems of FIGS. 1-3 and 29-30 also provide for controlling driveline braking, comprising: providing driveline braking via an electric machine while rotation of an engine is stopped; and adjusting a torque of the electric machine in response to a condition of engine. The method includes where the condition of the engine is an oil temperature. The method includes where the condition of the engine is a valve timing of the engine. The method includes where the condition of the engine is an engine coolant temperature. The method includes where the condition of the engine is an estimated engine brake torque. The method includes where the driveling braking is provided via operating the electric machine in a generator mode. The method includes where the torque of the electric machine is varied as the condition of the engine varies.

The methods and systems of FIGS. 1-3 and 29-30 also provide for controlling driveline braking, comprising: providing driveline braking via an electric machine while rotation of an engine is stopped; and adjusting a torque of the electric machine based a braking torque of the engine. The method includes where the braking torque of the engine is estimated based on engine oil temperature. The method includes where the braking torque of the engine is estimated based on a speed of the electric machine. The method includes where the torque of the electric machine is a negative torque. The method includes where the electric machine is in a generator mode. The method includes where the braking torque of the engine is a deceleration fuel shut-off braking torque. The method includes where the braking torque of the engine is based on a position of a throttle.

The methods and systems of FIGS. 1-3 and 29-30 also provide for a vehicle system, comprising: an engine; a dual mass flywheel (DMF) including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a starter other than the DISG including a base state where the starter is not engaged to the engine; a transmission selectively coupled to the engine via the driveline disconnect clutch; and a controller including non-transitory instructions executable to automatically stop the engine, provide driveline braking via the DISG while engine rotation is stopped, and adjust a torque of the DISG to an engine brake torque while providing driveline braking.

In some examples, the vehicle system further comprises additional instructions to accelerate the engine to a speed of the DISG. The vehicle system further comprises additional instructions to reduce a negative torque provided by the DISG in response to a negative torque provided by the engine to a driveline. The vehicle system further comprises additional instructions for starting the engine via the starter other than the DISG. The vehicle system further comprises additional instructions for stopping combustion in engine cylinders after starting the engine. The vehicle system further comprises additional instructions for adjusting engine braking after stopping combustion in engine cylinders.

The methods and systems of FIGS. 1-3 and 29-30 also provide for controlling driveline braking, comprising: providing driveline braking via an electric machine while rotation of an engine is stopped; and automatically activating a device to consume charge provided via the electric machine while the electric machine is providing driveline braking. The method includes where the device is activated in response to a state of charge of an electric storage device exceeding a threshold level.

In one example, the method includes where the device is a heating device. The method includes where the heating device is a window defroster. The method includes where the heating device is an emission device heater. The method includes where the device is a pump. The method includes where the pump is a fuel injection pump.

The methods and systems of FIGS. 1-3 and 29-30 also provide for controlling driveline braking, comprising: providing driveline braking via an electric machine while rotation of an engine is stopped; and increasing current supplied to a device while the electric machine is providing driveline braking. The method includes where the current increase is based on a rate of charge being output by the electric machine. The method includes where the electric machine is providing charge to an energy storage device while the electric machine is providing driveline braking. The method includes where the current increase is based on a state of charge of an energy storage device. The method includes where the device is a pump. The method includes where device is a heater. The method includes where the device is a light.

The methods and systems of FIGS. 1-3 and 29-30 also provide for controlling driveline braking, comprising: providing driveline braking via an electric machine while rotation of an engine is stopped; automatically activating a device to consume charge provided via the electric machine while the electric machine is providing driveline braking; rotating the engine in response to a state of charge of an energy storage device; and stopping to rotate the engine when the state of charge of the energy storage device is less than a threshold level.

In one example, the method includes where the device to consume charge provided via the electric machine is a device having an operating state that is not visible or audible by the driver. The method includes where the device to consume charge provided via the electric machine is a heater. The method includes where the heater provides heat to ambient air. The method includes where the heater provides heat to an exhaust system. The method further comprises stopping to provide driveline braking via the electric machine when the engine is rotating.

The methods and systems of FIGS. 1-3 and 29-30 also provide for controlling driveline braking, comprising: providing driveline braking via an electric machine while rotation of an engine is stopped; operating the electric machine in a speed control mode in response to a request to provide driveline braking via the engine; starting the engine; accelerating the engine to a speed of the electric machine; and closing an open driveline disconnect clutch in response to engine speed substantially equaling electric machine speed. The method includes where the engine is started via a starter other than the electric machine.

In some examples, the method includes where the request to provide driveline braking via the engine is based on a state of charge of an energy storage device. The method includes where the request to provide driveline braking via the engine is in response to the state of charge of the energy storage device being greater than a threshold amount of charge. The method further comprises adjusting slip of a torque converter clutch in response to closing the open driveline disconnect clutch. The method includes where the slip of the torque converter clutch is increased. The method includes where the electric machine provides torque to start the engine.

The methods and systems of FIGS. 1-3 and 29-30 also provide for controlling driveline braking, comprising: providing driveline braking via an electric machine while rotation of an engine is stopped; starting and rotating the engine; injecting fuel to the engine; accelerating the engine to a speed of the electric machine; and discontinuing to inject fuel to the engine and providing driveline braking via the engine while the electric machine outputs less than a threshold amount of current. The method further comprises closing a driveline disconnect clutch in response to engine speed substantially equaling electric machine speed.

In one example, the method further comprise operating the electric machine in a speed control mode during closing the driveline disconnect clutch. The method further comprises increasing slip of a torque converter clutch during closing the driveline disconnect clutch. The method includes where the engine is started in response to charge of an energy storage device exceeding a threshold charge. The method includes where electric machine torque is reduced in response to engine braking torque increasing after discontinuing to inject fuel to the engine. The method includes where the engine is started via a starter other than the electric machine.

The methods and systems of FIGS. 1-3 and 29-30 also provide for a vehicle system, comprising: an engine; a dual mass flywheel (DMF) including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a starter other than the DISG including a base state where the starter is not engaged to the engine; a transmission selectively coupled to the engine via the driveline disconnect clutch; and a controller including non-transitory instructions executable to automatically stop the engine, provide driveline braking via the DISG while engine rotation is stopped, start the engine in response to a state of charge of an energy storage device, stop combustion in the engine while the engine is rotating, and provide driveline braking via the engine. In this way, the system may converter to electric driveline braking to mechanical driveline braking.

In some examples, the vehicle system further comprises additional instructions to accelerate the engine to a speed of the DISG. The vehicle system further comprises additional instructions to close the driveline disconnect clutch when engine speed is substantially equal to DISG speed. The vehicle system further comprises additional instructions for starting the engine via the starter other than the DISG. The vehicle system further comprises additional instructions for stopping combustion in engine cylinders after starting the engine. The vehicle system further comprises additional instructions for adjusting engine braking after stopping combustion in engine cylinders.

Figure 31:
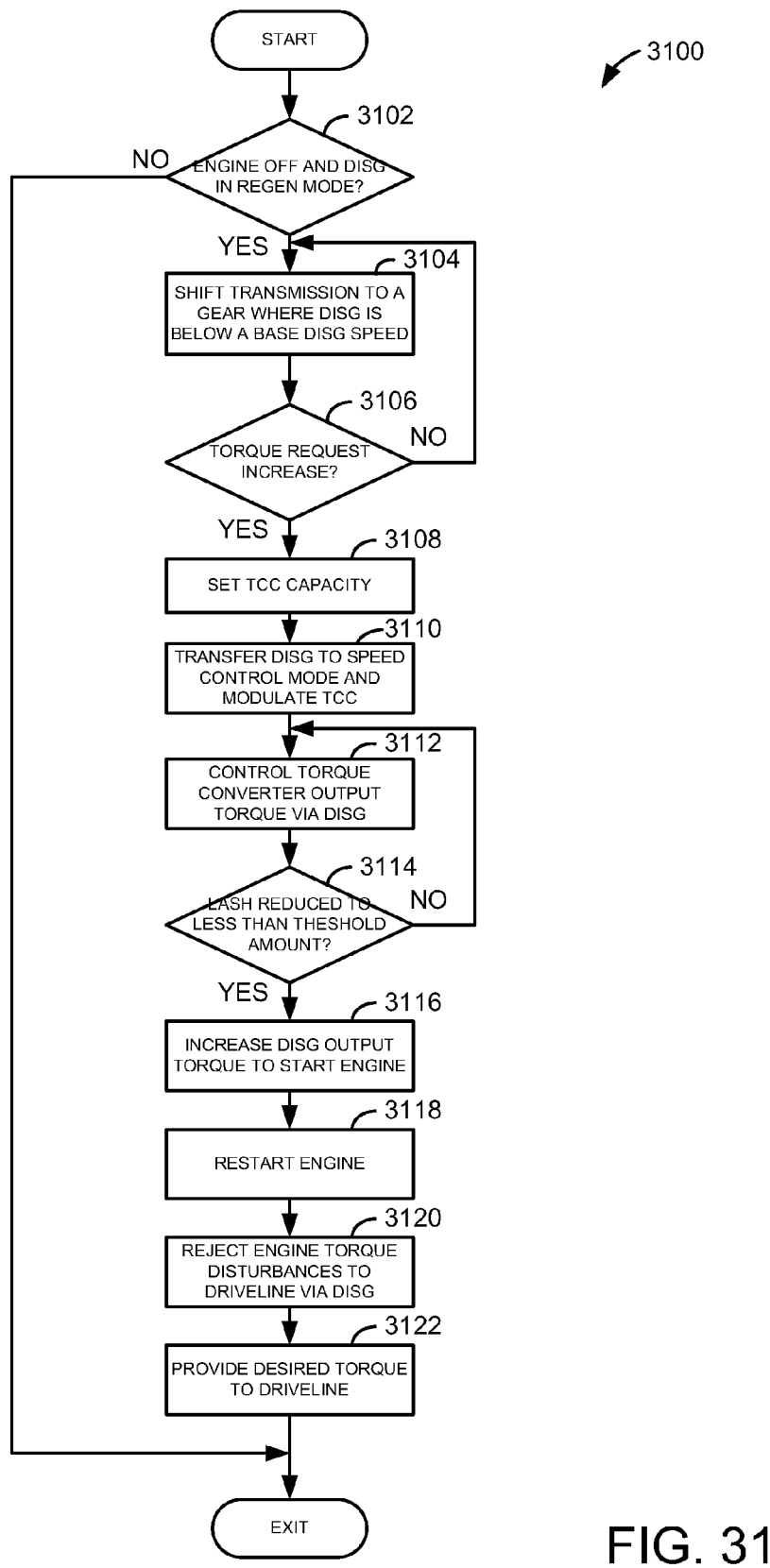

Referring now to FIG. 31, a flowchart of a method for controlling driveline lash during vehicle braking provided via the vehicle driveline is shown. The method of FIG. 31 may be stored as executable instructions non-transitory memory in the system of FIGS. 1-3.

At 3102, method 3100 judges whether or not the engine is off and the DISG is in a regeneration mode (e.g., where the DISG is converting the vehicle's kinetic energy into electrical energy). In one example, an engine may be judged to be stopped rotating when engine speed is zero. The DISG may be determined to be in a regeneration mode when current flows from the DISG and the DISG is providing negative torque to the driveline. If method 3100 judges that the engine is not rotating and the DISG is in regeneration mode, the answer is yes and method 3100 proceeds to 3104. Otherwise, the answer is no and method 3100 proceeds to exit.

At 3104, method 3100 shifts a transmission to a gear that allows DISG speed to stay below a base DISG speed. The base DISG speed is a speed below which the DISG may provide rated torque (e.g., maximum DISG torque). If DISG speed is greater than base DISG speed, DISG torque is inversely proportional to DISG speed. Thus, if the DISG speed is greater than base DISG speed, the transmission may be upshifted so that DISG speed is less than DISG base speed. If vehicle speed is such that DISG speed cannot be reduced to less than DISG base speed by upshifting the transmission, the transmission may be shifted to a gear that allows the DISG to rotate at a speed closest to DISG base speed. Additionally, in some examples, the DISG may be transitioned into a speed control mode at 3104 rather than waiting for an increase in driver demand torque. Method 3100 proceeds to 3106 after the transmission is shifted so that DISG speed is near or less than DISG base speed.

At 3106, method 3100 judges whether or not there is a request for increased positive driveline torque. A request for increased positive driveline torque may be in response to an increasing driver demand torque. The driver demand torque may be determined from an accelerator pedal or a controller. If method 3100 judges that there is a request for increased positive driveline torque (e.g., to accelerate the vehicle), the answer is yes and method 3100 proceeds to 3108. Otherwise, the answer is no and method 3100 returns to 3104.

At 3108, method 3100 adjusts the torque converter clutch (TCC) capacity. In one example, the TCC capacity is adjusted to the desired torque converter output torque minus a torque amount the torque converter would generate with a fully open TCC. The amount of torque the converter would generate with a fully open TCC may be determined from torque converter impeller speed and torque converter turbine speed. In particular, the torque converter impeller speed and the torque converter turbine speed index a function or table stored in memory that outputs torque converter torque output based on torque converter impeller speed and torque converter turbine speed. Once TCC capacity is determined it is output to the TCC. Method 3100 proceeds to 3110 after the TCC capacity is adjusted.

At 3110, the DISG is transitioned to a speed control mode from a torque control mode. In speed control mode, DISG torque is adjusted to provide a desired DISG speed. The desired DISG speed may be constant or it may change with vehicle operating conditions. Method 3100 proceeds to 3112 after the DISG is transitioned to a speed control mode.

At 3112, method 3100 adjusts DISG speed to adjust the torque converter output torque. In particular, torque converter torque is adjusted from a negative torque to a positive torque via adjusting DISG speed. In one example, a desired torque converter output torque profile is stored in memory and retrieved during a transition from driveline braking (e.g., negative driveline torque) to driveline acceleration (e.g., positive driveline torque). The desired torque converter output torque profile specifies torque converter output torque based on change in driver demand torque and present transmission gear. The desired torque converter output torque and turbine speed are input to a function or table that outputs torque converter impeller speed. The table or function describes a torque converter transfer function. The DISG is commanded to the torque converter impeller speed so that the torque converter outputs the desired torque converter output torque. After the DISG completes the desired torque converter output profile, the DISG torque is adjusted to provide the desired driver demand torque. In this way, the DISG speed is controlled as a function of torque converter turbine speed and desired torque converter output. Stated in another way, the actual torque converter output torque is controlled as a function of torque converter impeller speed and turbine speed.

In an alternative example, the DISG speed adjusts the torque converter output torque by varying torque converter impeller speed relative to torque converter turbine speed. In particular, the DISG increases the torque converter output torque from a negative torque to a positive torque via increasing DISG speed. Torque converter output torque is increased quickly to reduce lash between transmission and driveline gears. Torque converter output torque is reduced as lash between gear sets is reduced so that gear tooth to gear tooth impact may be reduced.

For example, gear lash crossing gear tooth to gear tooth speed is adjusted by adjusting the torque converter output torque as a function of estimated gear tooth to gear tooth speed. In one example, gear tooth speed to gear tooth speed is the difference between torque converter turbine speed and either the transmission output speed or the wheel speed. The speed difference between turbine speed and transmission output speed or wheel speed is relatively small until twist in driveline shafts is relieved. Positive torque converter output torque is increased via increasing DISG speed in response to a small difference in speed between the torque converter turbine and the transmission output speed or wheel speed. DISG output speed is increased quickly when the difference in the torque converter turbine and the transmission output speed or wheel speed is small so that gear teeth separate. The speed difference will increase as gear teeth transition from being in contact to not being in contact. The DISG speed is decreased as the difference in the torque converter turbine and the transmission output speed or wheel speed increases so that impact force between gear sets may be reduced.

In one example, once torque converter impeller speed minus transmission output shaft speed or wheel speed exceeds a threshold speed, the DISG speed is reduced to decrease tooth to tooth impact force. The DISG speed is increased after the difference between the torque converter turbine and the transmission output speed or wheel speed is less than a threshold speed so that gear teeth remain in contact after the transition from negative driveline torque to positive driveline torque. Method 3100 proceeds to 3114 after DISG lash adjustment begins.

At 3114, method 3100 judges whether or not gear lash is reduced to less than a threshold amount. In on example, gear lash is determined to be less than a threshold amount when positive torque has been applied to the driveline and a difference between the torque converter turbine speed and the transmission output speed or wheel speed is less than a threshold level. If method 3100 judges that gear lash is reduced to less than a threshold amount, the answer is yes and method 3100 proceeds to 3116. Otherwise, the answer is no and method 3100 returns to 3112.

At 3116, method 3100 increases the DISG output torque. Since the DISG is in speed control mode, the DISG output torque may be increased in response to driveline torque being transferred to the engine and decreasing driveline speed. In other words, DISG positive torque may be increased as DISG speed decreases from the desired DISG speed. In another example, DISG torque output may be increased while the DISG is in speed control mode by increasing DISG torque based on driveline disconnect clutch torque (e.g., the amount of torque transferred from the DISG to the engine via the DISG). The desired driveline disconnect clutch torque may be stored in memory in a function or table and the torque increase is applied to the DISG during and engine restart in response to disconnect clutch closing. Method 3100 proceeds to 3118 after DISG output torque is adjusted to start the engine.

At 3118, method 3100 restarts the engine. The engine is restarted via at least partially closing the driveline disconnect clutch and supplying spark and fuel to the engine. In some examples, closing the driveline disconnect clutch and increasing DISG output torque may occur simultaneously so that any driveline torque disturbance may be reduced. Method 3100 proceeds to 3120 after engine starting commences.

At 3120, method 3100 rejects engine torque disturbances that may be delivered to the driveline. For example, during engine starting, the engine may consume driveline torque so as to accelerate during starting. The engine torque disturbances may be rejected in response to a change in driveline speed at the DISG. Since the DISG is in speed control mode and following a desired speed, DISG torque may be increased when the engine consumes driveline torque and decelerates the driveline. Additionally, if the engine accelerates and delivers torque to the driveline after starting, DISG torque may be decreased so that the net torque supplied to the driveline via the DISG and engine remains substantially constant (e.g., ±30 Nm). In this way, the driveline speed may be controlled in a closed loop fashion via adjusting DISG torque.

In another example, driveline torque disturbances may be rejected via open loop DISG torque adjustments. For example, when the disconnect clutch begins to close, the DISG torque may be increased while the DISG is in speed control mode. In particular, DISG torque may be adjusted via adding the driveline disconnect clutch torque to the DISG torque command. The DISG torque command is further adjusted in response to the DISG speed. Thus, if the driveline disconnect clutch torque is under or overestimated, the DISG speed control loop will eliminate the error in driveline disconnect torque that was added to the DISG torque. The driveline torque disturbances rejected during engine starting may be rejected between the time engine cranking begins until the engine reaches DISG speed and the driveline disconnect clutch is fully closed. Method 3100 proceeds to 3122 after driveline disturbances during engine starting are rejected.

At 3122, method 3100 provides the desired torque to the driveline. The desired torque may be provided solely via the DISG, solely via the engine, or via the engine and the DISG. In one example, DISG torque and engine torque are provided as fractions of a driver demand torque as determined from an accelerator pedal. For example, if driver demand torque is determined to be 100 N-m at the torque converter impeller the engine may provide 80% of the driver demand torque or 80 N-m while the DISG provides 20% or 20 N-m so that 100 N-m is provided to the torque converter impeller. Method 3100 proceeds to exit after the desired torque is provided to the driveline.

It should be noted that in some examples, 3116-3120 may occur at the same time as 3108-3114 so that driveline torque may be more responsive to driver demand torque. Shifting the transmission to a gear that allows the DISG to operate below base DISG speed may increase the possibility that the DISG has the torque capacity to restart the engine and mitigate gear impact from driveline gear lash simultaneously.

Figure 32:
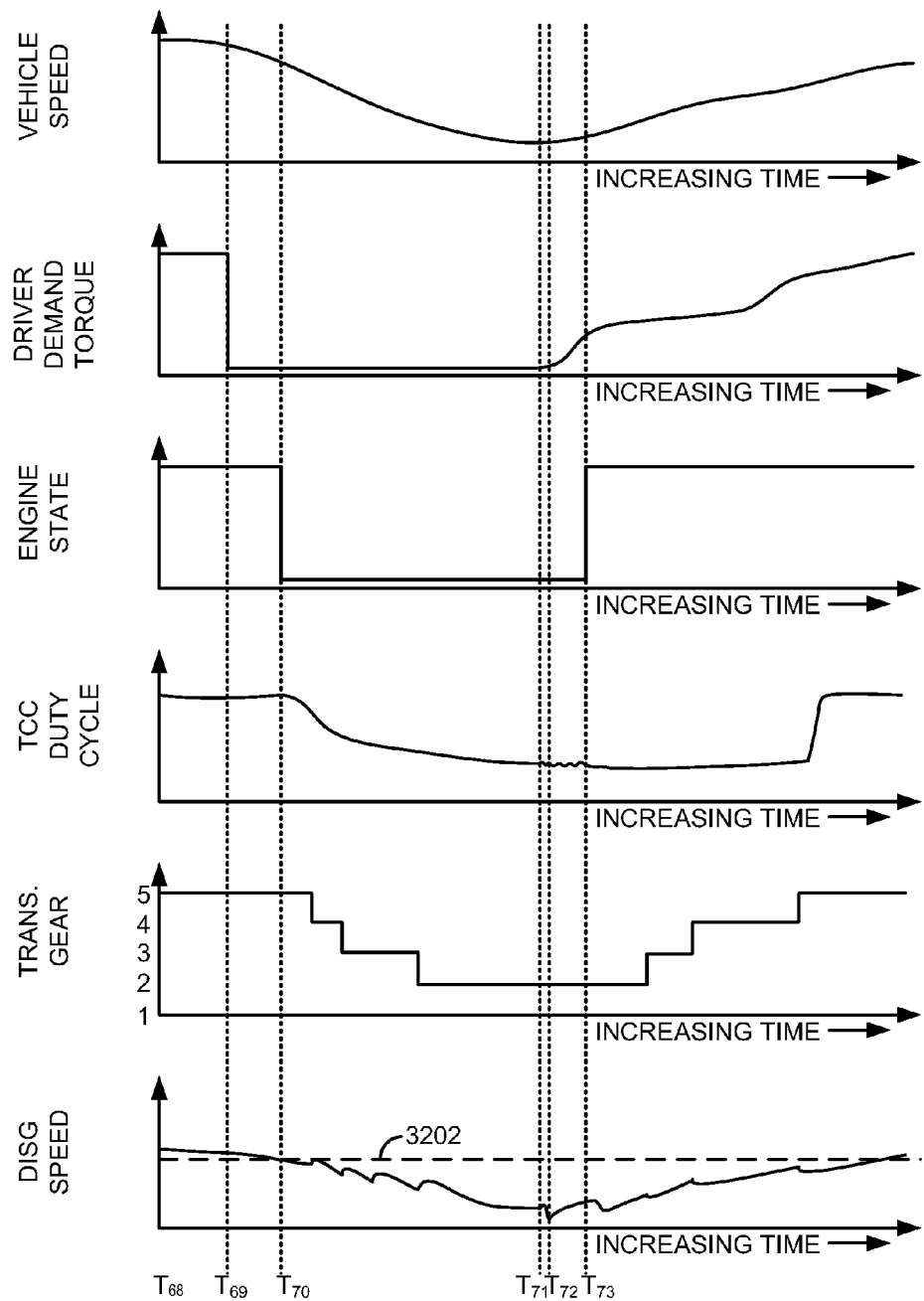

Referring now to FIG. 32, an example sequence for reducing gear lash impact of a driveline according to the method of FIG. 31 is shown. The sequence of FIG. 32 may be provided by the system of FIGS. 1-3.

The first plot from the top of FIG. 32 represents vehicle speed versus time. The Y axis represents vehicle speed and vehicle speed increases in the direction of the Y axis arrow. The X axis represents time and time increases from the left hand side of the figure to the right hand side of the figure.

The second plot from the top of FIG. 32 represents driver demand torque versus time. The Y axis represents driver demand torque and driver demand torque increases in the direction of the Y axis arrow. The X axis represents time and time increases from the left hand side of the figure to the right hand side of the figure.

The third plot from the top of FIG. 32 represents engine state versus time. The Y axis represents engine state and the engine is rotating when the engine state trace is at a higher level. The engine has stopped rotating when the engine state trace is at a lower level. The X axis represents time and time increases from the left hand side of the figure to the right hand side of the figure.

The fourth plot from the top of FIG. 32 represents torque converter clutch (TCC) duty cycle versus time. The Y axis represents TCC duty cycle and TCC duty cycle increases in the direction of the Y axis arrow. The X axis represents time and time increases from the left hand side of the figure to the right hand side of the figure. The TCC closing force increases as the TCC duty cycle increases. The TCC may transfer less torque between the DISG and the transmission as the TCC duty cycle increases because the torque converter torque multiplication may be reduced. The TCC is locked (e.g., torque converter impeller speed equals torque converter turbine speed) when the TCC trace is near the Y axis arrow.

The fifth plot from the top of FIG. 32 represents transmission gear versus time. The Y axis represents transmission gear and specific transmission gears are indicated along the Y axis. The X axis represents time and time increases from the left hand side of the figure to the right hand side of the figure.

The sixth plot from the top of FIG. 32 represents DISG speed versus time. The Y axis represents DISG speed and DISG speed increases in the direction of the Y axis arrow. The X axis represents time and time increases from the left hand side of the figure to the right hand side of the figure. Horizontal line 3202 represents base DISG speed.

At time $T_{68}$, vehicle speed is at an elevated level as is the driver demand torque. The engine is operating and combusting air-fuel mixtures. The TCC is locked as indicated by the TCC duty cycle being near the Y axis label. The transmission is in fifth gear and the DISG speed is at a medium level and above the DISG base speed 3202.

At time $T_{69}$, the driver demand torque is reduced to a low value in response to a driver releasing an accelerator pedal, for example. The vehicle speed, driver demand torque, engine state, TCC duty cycle, transmission gear, and DISG speed remain at similar levels as at time $T_{68}$. However, the DISG transitions from producing positive torque and consuming electrical energy to producing negative torque and generating electrical energy. Fuel and spark delivery to the engine are also stopped so that the engine decelerates but continues to rotate without receiving fuel.

Between time $T_{69}$ and time $T_{70}$, vehicle speed decreases as does DISG speed. The engine continues to rotate as indicated by the engine state staying at a higher level, and the TCC duty cycle also remains at a higher level where the TCC is locked. The transmission remains in $5^{th}$ gear and the driver demand torque remains at a lower level.

At time $T_{70}$, engine rotation is stopped in response to the low driver demand torque as indicated by the engine state flag transitioning to a lower level. The driveline disconnect clutch (not shown) is opened and the DISG is transitioned to a speed control mode in response to stopping the engine. The DISG speed and vehicle speed continue to be reduced, and the transmission remains in $5^{th}$ gear.

Between time $T_{70}$ and time $T_{71}$, vehicle speed and DISG speed continue to decrease. In this example, the transmission downshifts when downshifting will allow the DISG speed to remain under base DISG speed. The DISG speed is commanded to a speed based on driver demand torque, vehicle speed, and selected gear. For example, the transmission is held in $5^{th}$ gear and DISG speed is reduced to less than base DISG speed. DISG speed continues to decrease to a threshold speed at which the DISG will be below DISG base speed if the transmission is shifted into $4^{th}$ gear. The transmission is downshifted to $4^{th}$ gear when DISG speed is less than the threshold speed and DISG speed is increased to a speed that is based on DISG speed before the shift and the new gear ratio.

In some examples during the beginning of vehicle deceleration or a reduction in driver demand torque, the present DISG speed may be greater than DISG base speed. In these cases, the transmission may be upshifted at the beginning of vehicle deceleration or in response to the decrease in driver demand torque so that DISG speed is reduced to less than DISG base speed. By reducing DISG speed to less than DISG base speed, it may be possible to provide torque from the DISG to restart the engine to reduce gear tooth to gear tooth impact that is due to gear lash. The transmission gears are downshifted at times that allow the DISG speed to remain less than DISG base speed.

The TCC duty cycle is also reduced in response to driveline disconnect clutch state (not shown), vehicle speed, and driver demand torque. The TCC application force and TCC duty cycle are modulated to reduce any torque disturbance through the driveline that may result from opening the driveline disconnect clutch. The engine remains stopped as indicated by the engine state being at a lower level. The driver demand torque also remains low.

It should also be mentioned that driveline gear teeth may have transitioned from transmitting torque from front faces of gear teeth to rear faces of gear teeth as the driveline transitions from producing positive torque to providing a negative or braking torque. Gear tooth to gear tooth impact may result when the driveline transitions back to producing positive torque if the transitions is not managed in a desired manner.

At time $T_{71}$, the driver demand torque is increased in response to driver or controller input. The DISG speed is increased so as to separate teeth in the driveline. The DISG is accelerated as a function of gear tooth to gear tooth speed difference. In particular, the DISG is accelerated at a higher rate when gear teeth are at the same speed so as to separate the teeth.

At time $T_{72}$, the DISG acceleration is reduced and the DISG may decelerate as the speed difference between gear teeth increases. Decelerating the DISG may reduce gear tooth to gear tooth impact forces by lowering the velocity between gear teeth. Shortly after time $T_{72}$, the DISG acceleration is increased after the space or lash between gear teeth has been removed. By waiting to accelerate the DISG until after the gear teeth are in contact, it may be possible to reduce driveline torque disturbances and provide smoother negative to positive torque transitions. The TCC slip and application force between time $T_{71}$ and time $T_{73}$ is also adjusted and/or modulated to reduce torque disturbances in the driveline. Torque from the DISG begins to accelerate the vehicle and the DISG is transitioned into a torque control mode.

At time $T_{73}$, spark and fuel are supplied to the engine and the driveline disconnect clutch is closed so that the engine is started. The TCC duty cycle and application force are modulated to reduce any torque disturbance in the driveline that may result from closing the driveline disconnect clutch during engine starting. The TCC is locked after the engine is started so as to improve driveline efficiency. Further, the transmission begins shifting through gears to accelerate the vehicle.

In this way, lash and impact between driveline gear teeth may be reduced when a driveline is transitioned from a braking mode to a torque producing mode. By adjusting DISG speed and torque in this way, it may be possible to reduce driveline torque disturbances that may be apparent to a driver.

Thus, the methods and systems of FIGS. 1-3 and 31-32 provide for controlling driveline lash, comprising: shifting a transmission to a gear that permits an electric machine that is coupled to the transmission to operate at a lower speed than a base speed of the electric machine in response to a decrease in a driver demand torque; and reducing gear tooth to gear tooth impact via operating the electric machine in a speed control mode during a driveline torque transition from a negative torque to a positive torque. The method further comprises reducing a torque converter clutch application force during the driveline torque transition from the negative torque to the positive torque. The method further comprises stopping rotation of an engine in response to the decrease in driver demand torque.

In one example, the method further comprises opening a driveline disconnect clutch in response to the decrease in driver demand torque. The method further comprises adjusting speed of the electric machine in response to a difference in speed between a first gear tooth and a second gear tooth during the driveline torque transition from the negative torque to the positive torque. The method further comprises downshifting the transmission in response to vehicle speed. The method includes where the electric machine is operated in a torque control mode immediately before operating the electric machine in the speed control mode during the driveline torque transition from the negative torque to the positive torque.

The methods and systems of FIGS. 1-3 and 31-32 also provide for controlling driveline lash, comprising: reducing gear tooth to gear tooth impact via operating an electric machine in a speed control mode during a driveline torque transition from a negative torque to a positive torque; and accelerating the electric machine to separate a first gear tooth and a second gear tooth during the driveline torque transition from the negative torque to the positive torque. The method further comprises decelerating the electric machine in response to an increase in a speed difference between the first gear tooth and the second gear tooth. The method further comprises accelerating the electric machine in response to a decrease in the speed difference between the first gear tooth and the second gear tooth after decelerating the electric machine.

In one example, the method includes where the transition from the negative torque to the positive torque is in response to an increase in driver demand torque. The method further comprises opening a driveline disconnect clutch that is mechanically coupled to the electric machine before reducing the gear tooth to gear tooth impact in response to a decrease in driver demand torque. The method further comprises reducing a torque converter clutch application force in response to a decrease in driver demand torque before reducing the gear tooth to gear tooth impact. The method includes where the electric machine speed is controlled as a function of a speed difference between a first gear tooth and a second gear tooth.

The methods and systems of FIGS. 1-3 and 31-32 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including non-transitory instructions executable to automatically stop engine rotation, reduce a gear tooth to gear tooth impact via operating the DISG in a speed control mode during a driveline torque transition from a negative torque to a positive torque, and to start engine rotation while reducing the gear tooth to gear tooth impact.

In one example, the vehicle system includes where engine rotation is started via closing the driveline disconnect clutch. The vehicle system further comprises additional instructions to adjust a torque converter clutch application force while reducing the gear tooth to gear tooth impact. The vehicle system further comprises additional instructions to open the driveline disconnect clutch in response to a driver demand torque. The vehicle system further comprises additional instructions to at least partially close the driveline disconnect clutch to start the engine in response to a driver demand torque. The vehicle system further comprises additional instructions shift the transmission to a gear that rotates the DISG at a speed less than the DISG base speed during vehicle deceleration.

Figure 33:
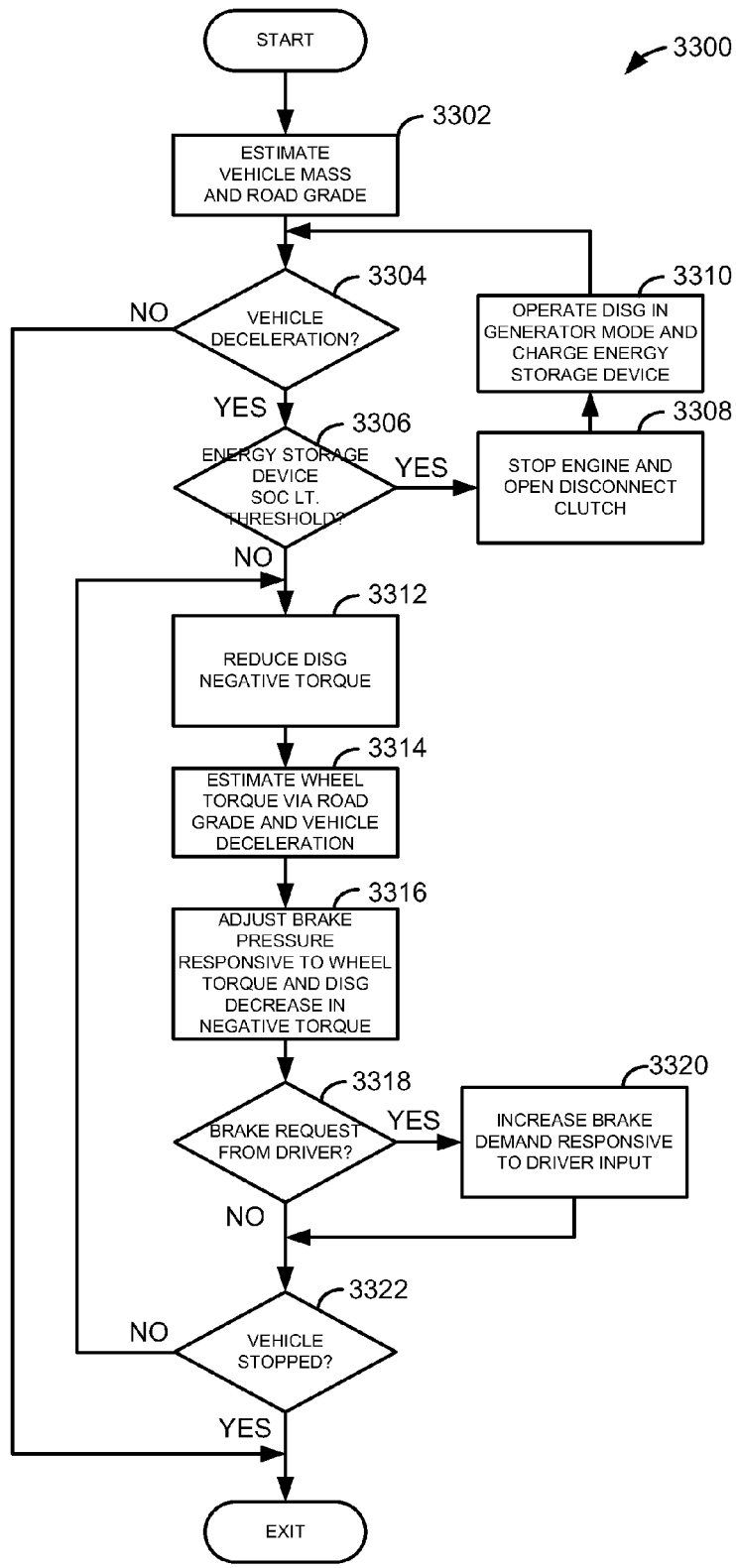

Referring now to FIG. 33, a flowchart of a method for transitioning vehicle braking from a driveline to friction brakes is shown. The method of FIG. 33 may be stored as executable instructions non-transitory memory in the system of FIGS. 1-3.

Referring now to 3302, method 3300 estimates vehicle mass and road grade. In one example, road grade may be estimated or determined via an inclinometer. Vehicle mass may be determined as described at 904 of method 900. Method 3300 proceeds to 3304 after vehicle mass and road grade are determined.

At 3304, method 3300 judges whether or not the vehicle is decelerating or if a driver has reduced a driver torque demand. In one example, vehicle deceleration may be determined via decreasing vehicle speed. A reduced driver demand torque may be determined from a release of an accelerator pedal. If method 3300 judges that vehicle deceleration or reduced driver demand is present, the answer is yes and method 3300 proceeds to 3306. Otherwise, the answer is no and method 3300 proceeds to exit.

At 3306, method 3300 judges whether or not state of charge (SOC) of an energy storage device is less than a threshold amount of charge. In one example, SOC may be determined via measuring battery voltage. If energy storage device SOC is less than a threshold amount of charge, the answer is yes and method 3300 proceeds to 3308. Otherwise, the answer is no and method 3300 proceeds to 3312.

At 3308, method 3300 stops engine rotation and opens the driveline disconnect clutch. The engine is stopped via discontinuing to supply the engine with spark and fuel. Method 3300 proceeds to 3310 after engine rotation is stopped and the driveline disconnect clutch is opened.

At 3310, method 3300 operates the DISG in generator mode and charges the energy storage device. The DISG provides a negative torque to the vehicle driveline in generator mode. In one example, the amount of negative torque the DISG provides to the driveline may be adjusted in response to vehicle speed and driver demand torque. In another example, the amount of negative torque the DISG provides to the DISG may be adjusted to an estimated braking torque of the engine as describe herein at the present operating conditions. The rate of vehicle deceleration may also be stored in memory at 3310. Method 3300 returns to 3304 after the DISG begins to charge the energy storage device.

At 3312, method 3300 begins to reduce the negative DISG torque. Further, in some examples, the driveline disconnect clutch may be closed so that the engine may provide driveline braking. In one example, the negative DISG torque is reduced toward zero torque in response to an amount of torque transferred to the engine via the driveline disconnect clutch. The reduction in DISG negative torque is based on a reduction in charging current. Method 3300 proceeds to 3314 after the DISG torque begins to be reduced.

At 3314, method 3300 estimates wheel torque via the present road grade and vehicle deceleration. The wheel torque may be estimated based on the following equations:

$$F = m \cdot a$$

$$\frac{T\_wh}{R\_rr} = F$$

so that, $$T\_wh = m \cdot a \cdot R\_rr + R\_rr \cdot g \cdot m \cdot \sin(\Theta)$$

Where F is equal to force to accelerate/decelerate the vehicle, m is vehicle mass, R_rr is rolling radius of the wheel, a represents vehicle acceleration, g is acceleration due to gravity, and θ is the angle of the road. Method 3300 proceeds to 3318 after wheel torque is determined.

At 3316, method 3300 adjusts brake supply oil pressure in response to vehicle wheel torque and the decrease in negative DISG torque (e.g., toward zero DISG torque). In particular, method 3300 simultaneously ramps up oil pressure supplied to the vehicle's friction brakes and reduces DISG negative torque. The vehicle friction brake force is increased at a rate that balances the reduction in DISG negative torque to provide an equivalent rate of vehicle deceleration. In one example, an open loop brake line oil pressure, which may be related to brake application force, is retrieved from a table or function that includes empirically determined brake line oil pressures in response to a desired wheel braking torque. The desired wheel braking torque provided by the friction brakes is the wheel torque from 3314 minus the reduction in DISG torque multiplied by the present transmission gear ratio and axle ratio. The brake line oil pressure is ramped up to the pressure that provides the desired wheel braking torque. In this way, close loop control over vehicle braking may be achieved based on wheel torque. Additionally, in some examples, the driveline disconnect clutch may be closed and the engine rotated without fuel to provide driveline braking torque in response to the decrease in DISG torque and other operating conditions. Method 3300 proceeds to 3318 after beginning to ramp up brake line oil pressure and after beginning to ramp down DISG negative torque.

In other examples, brake line oil pressure may be increased by an open loop estimate of brake application force and the brake application force may be further adjusted based on a difference between desired vehicle speed and actual vehicle speed. In this way, vehicle speed difference may be a closed loop parameter for adjusting friction braking force.

At 3318, method 3300 judges whether or not there is a brake request from the driver. In one example, a brake request from a driver may be determined from a position of a brake pedal. If method 3300 judges that there is a brake request from a driver, the answer is yes and method 3300 proceeds to 3320. Otherwise, the answer is no and method 3300 proceeds to 3322.

At 3320, brake line oil pressure is increased in response to driver demand input. In one example, brake line oil pressure to friction brakes is increased in proportion to displacement of a brake pedal. Method 3300 proceeds to 3322 after brake line oil pressure is increased in response to the driver brake command.

At 3322, method 3300 judges whether or not the vehicle is stopped. The vehicle may be judged stopped when vehicle speed is zero. If the vehicle is judged to be stopped, the answer is yes and method 3300 exits. If the vehicle is judged to be moving, the answer is no and method 3300 returns to 3312.

Figure 34:
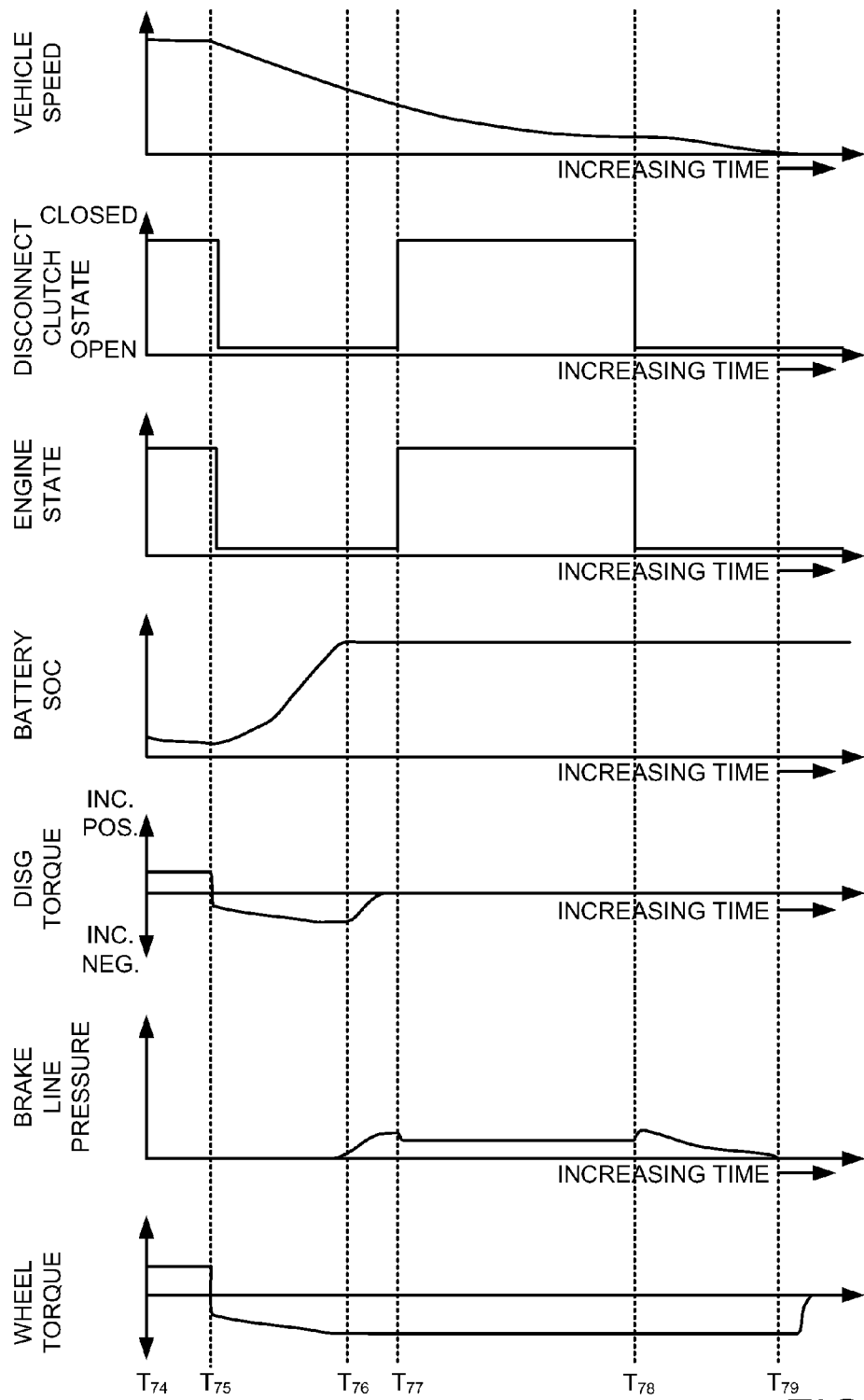

Referring now to FIG. 34, an example sequence for transitioning vehicle braking from a driveline to friction brakes according to the method of FIG. 33 is shown. The sequence of FIG. 34 may be provided by the system of FIGS. 1-3.

The first plot from the top of FIG. 34 represents vehicle speed versus time. The Y axis represents vehicle speed and vehicle speed increases in the direction of the Y axis arrow. The X axis represents time and time increases from the left hand side of the figure to the right hand side of the figure.

The second plot from the top of FIG. 34 represents driveline disconnect clutch state versus time. The Y axis represents driveline disconnect clutch state and the driveline disconnect clutch is closed when the driveline disconnect clutch state trace is near the Y axis arrow. The driveline disconnect clutch is open when the driveline disconnect clutch state trace is near the X axis. The X axis represents time and time increases from the left hand side of the figure to the right hand side of the figure.

The third plot from the top of FIG. 34 represents engine state versus time. The Y axis represents engine state and the engine is rotating when the engine state trace is at a higher level. The engine has stopped rotating when the engine state trace is at a lower level. The X axis represents time and time increases from the left hand side of the figure to the right hand side of the figure.

The fourth plot from the top of FIG. 34 represents battery state of charge (SOC) versus time. The Y axis represents battery SOC and SOC increases in the direction of the Y axis arrow. The X axis represents time and time increases from the left hand side of the figure to the right hand side of the figure.

The fifth plot from the top of FIG. 34 represents DISG torque versus time. The Y axis represents DISG torque and DISG torque may be positive or negative. The X axis represents time and time increases from the left hand side of the figure to the right hand side of the figure.

The sixth plot from the top of FIG. 34 represents brake line oil pressure of friction brakes versus time. The Y axis represents brake line oil pressure and brake line oil pressure increases in the direction of the Y axis arrow. The X axis represents time and time increases from the left hand side of the figure to the right hand side of the figure.

The seventh plot from the top of FIG. 34 represents vehicle wheel torque versus time. The Y axis represents vehicle wheel torque and vehicle wheel torque increases in the direction of the Y axis arrow. The X axis represents time and time increases from the left hand side of the figure to the right hand side of the figure.

At time $T_{74}$, vehicle speed is elevated, the engine is operating, and the driveline disconnect clutch is closed. The battery SOC is relatively low and decreasing as the DISG provides positive torque to the driveline. The friction brakes are not applied as indicated by the brake line oil pressure being at a low level. The wheel torque is positive.

At time $T_{75}$, the driver releases the accelerator pedal (not shown). Shortly thereafter, the DISG torque transitions from positive to negative in response to low driver demand torque from the accelerator pedal. By transitioning to a negative torque, the DISG provides driveline braking to slow the vehicle. Further, the DISG generates charge and supplies the charge to the battery as indicated by the increasing battery SOC. The friction brake line pressure remains at a low level indicating that the friction brakes are not applied. The wheel torque transitions from positive torque to negative torque in response to the DISG transitioning to providing negative torque. Additionally, the driveline disconnect clutch is opened and engine rotation is stopped. The engine is stopped to conserve fuel and the disconnect clutch is opened so that the DISG may provide all driveline braking. The amount of driveline braking the DISG provides may be empirically determined and stored in memory as a function of vehicle speed and driver demand torque.

In this example, the driver does not apply the brake pedal after releasing the accelerator pedal. However, in some examples, the driver may apply the brakes after releasing the accelerator pedal. In such examples, the brake line pressure may increase in response to the driver's brake command.

Between time $T_{75}$ and time $T_{76}$, the DISG negative torque gradually increases until a desired driveline braking torque is established. The negative wheel torque also increases as the driveline braking torque increases. The driver does not apply the brake pedal and the battery SOC increases. The driveline disconnect clutch remains open and engine stays in a stopped state.

At time $T_{76}$, the battery SOC reaches a threshold amount (e.g., fully charged) in response to the DISG providing charge to the battery. DISG negative torque is decreased and the amount of charge delivered to the battery is reduced. The brake line oil pressure is also increased so that wheel brake torque may be maintained via the friction brakes. The brake line oil pressure is increased based on the decrease in DISG negative torque. In one example, the friction braking force is adjusted based on wheel torque and the decrease in DISG torque. In some other examples, friction brake force applied to slow wheel rotation may be adjusted based on a difference between a desired vehicle speed and an actual vehicle speed. The vehicle speed continues to decrease and the driveline disconnect clutch remains open. Further, the engine remains stopped.

At time $T_{77}$, the driveline disconnect clutch is closed and the engine is rotated without fuel being injected in response to DISG negative torque being reduced and in response to operating conditions. For example, the engine may be rotated in response to the reduction in DISG torque and a time since the change in DISG torque. The engine is rotated without fuel to provide braking torque. And, engine braking torque may be adjusted via activating and deactivating valves and/or adjusting intake manifold pressure via a throttle and/or valves. The brake line oil pressure is reduced in response to the driveline braking torque that is provided by the engine. Specifically, the brake line oil pressure is reduced by an amount that reduces torque supplied by friction brakes such that equivalent vehicle braking is provided even though driveline braking is increased via rotating the engine without fuel.

At time $T_{78}$, vehicle speed is approaching zero speed. The driveline disconnect clutch is opened and engine rotation is stopped in response to vehicle speed being reduced to a threshold vehicle speed. The battery SOC remains at a higher level since the DISG is not providing positive torque to the driveline and draining battery charge. The brake line oil pressure increases as engine braking stops. The increase in brake line oil pressure increases the force applied by the friction brakes to the wheels.

At time $T_{79}$, the vehicle speed reaches zero and the wheel torque and brake line oil pressure are reduce to zero. In some examples, brake line oil pressure may be maintained when vehicle speed reaches zero so that the vehicle stays at zero speed until the driver increases the driver demand torque via the accelerator pedal. The engine remains stopped and the driveline disconnect clutch remains in an open state.

In this way, friction brakes may be applied to slow a vehicle when driveline braking is reduced in response to battery SOC. Further, engine rotation may be stopped and started to further control driveline braking. The friction brakes may be applied based on an estimated wheel torque and/or a difference between desired vehicle speed and actual vehicle speed.

Thus, the methods and systems of FIGS. 1-3 and 33-34 provide for vehicle braking, comprising: providing driveline braking torque to a vehicle without applying friction braking torque to the vehicle; and reducing driveline braking torque while increasing friction braking torque to the vehicle in response to an energy storage device state of charge, the friction braking torque is increased by the same amount the driveline braking torque is reduced. In this way, the vehicle may transition from driveline braking to friction braking in a manner that may be less noticeable to a driver.

In one example, the method includes where a rate that the driveline braking torque is reduced is equivalent to a rate the friction braking torque is increased. The method includes where an engine of the vehicle is not rotating while providing driveline braking torque to the vehicle. The method includes where a driveline disconnect clutch is open while providing driveline braking torque. The method includes where the driveline braking torque is provided in response to a driver demand torque that is less than a threshold torque. The method includes where the friction braking torque is further increased in response to a driver brake demand.

The methods and systems of FIGS. 1-3 and 33-34 also provide for vehicle braking, comprising: providing driveline braking torque to a vehicle without applying friction braking torque to the vehicle; estimating vehicle wheel torque; and reducing driveline braking torque while increasing friction braking torque to the vehicle in response to the estimated vehicle wheel torque and energy storage device state of charge. The method includes where the friction braking torque is increased in response to the estimated vehicle wheel torque. The method includes where the estimated vehicle wheel torque is based on an estimated vehicle mass.

In some examples, the method includes where the estimated vehicle wheel torque is based on vehicle acceleration. The method further comprises rotating an engine without fueling the engine. The method further comprises adjusting the friction braking torque in response to an estimate of engine braking torque. The method includes where an engine of the vehicle is stopped.

The methods and systems of FIGS. 1-3 and 33-34 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; friction brakes; and a controller including non-transitory instructions executable to automatically stop engine rotation, provide a driveline braking torque via the DISG, and apply the friction brakes while reducing the driveline braking torque.

In one example, the vehicle system includes further instructions to apply the friction brakes based on an estimated wheel torque. The vehicle system further comprising additional instructions to reduce the driveline braking torque in response to an energy storage device state of charge. The vehicle system includes where the driveline braking torque is reduced in response to the energy storage device state of charge being greater than a threshold amount of charge. The vehicle system includes further instructions to apply the friction brakes based on vehicle speed. The vehicle system includes where the friction brakes are applied via increasing brake line oil pressure. The vehicle system further comprises additional instructions to reduce friction brake application force in response to a vehicle speed of zero.

Figure 35:
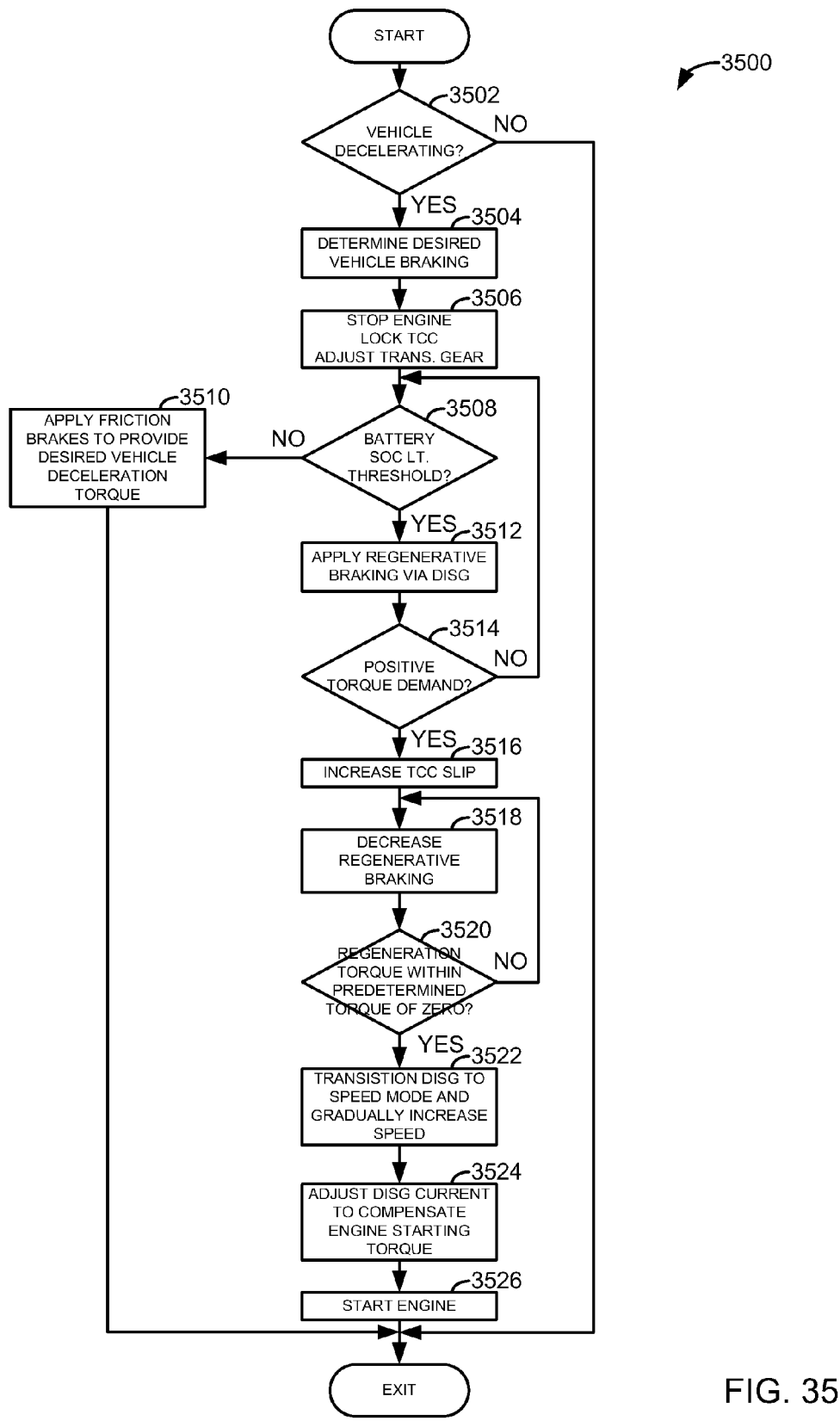

Referring now to FIG. 35, a flowchart of a method for reducing driveling torque disturbances related to gear lash when transitioning from driveline braking to vehicle acceleration while a transmission gear change does not occur. The method of FIG. 35 may be stored as executable instructions non-transitory memory in the system of FIGS. 1-3.

At 3502, method 3500 judges whether or not the vehicle is decelerating or if the driver has at least partially released the accelerator pedal. Method 3500 may judge that the vehicle is decelerating via monitoring vehicle speed. Method 3500 may judge that the driver has at least partially released the accelerator pedal in response to accelerator pedal position. If method 3500 judges that the driver has partially released the accelerator pedal or the vehicle is decelerating, the answer is yes and method 3500 proceeds to 3504. Otherwise, the answer is no and method 3500 proceeds to exit.

At 3504, method 3500 determines a desired amount of vehicle braking torque. The desired amount of vehicle braking torque may be empirically determined and stored in a function or table in memory that is indexed via vehicle speed and driver demand torque. Thus, the amount of vehicle braking torque may vary during vehicle deceleration. In one example, the vehicle braking torque is an amount of braking provided at vehicle wheels. Method 3500 proceeds to 3506 after the desired amount of vehicle braking torque is determined.

At 3506, method 3500 stops engine rotation and opens the driveline disconnect clutch to conserve fuel and so that a higher level of driveline braking may be provided via the DISG. A greater amount of driveline braking via the DISG may allow the energy storage device or battery to be recharged at a higher rate. The torque converter clutch (TCC) is adjusted to a locked state so that the DISG may be provided additional energy during vehicle deceleration. Method 3500 proceeds to 3508 after the engine is stopped, the driveline disconnect clutch opened, and the TCC locked.

At 3508, method 3500 judges whether or not the energy storage device or battery state of charge (SOC) is greater than a threshold amount of charge. If method 3500 judges that the energy storage device SOC is greater than a threshold SOC, the answer is yes and method 3500 proceeds to 3512. Otherwise, the answer is no and method 3500 proceeds to 3510.

At 3510, method 3500 applies friction brakes via increasing brake line oil pressure. Brake line oil pressure may be increased via a pump. The friction brakes apply a force that is based on the desired vehicle braking torque. In one example, a table or function outputs a brake line oil pressure that is estimated to provide the force that provides the desired vehicle braking torque. In some examples, the brake line pressure may be adjusted in response to estimated wheel torque or a difference between desired and actual vehicle speed as described herein. Method 3500 proceeds to exit after the friction brakes are adjusted.

At 3512, method 3500 enters a regeneration mode where the DISG provides negative driveline torque and charges an energy storage device. In particular, the negative torque output by the DISG is adjusted to provide the desired vehicle braking torque including adjustments for transmission gear selection. In one example, the DISG negative torque may be adjusted via adjusting DISG charging current. Method 3500 proceeds to 3514 after DISG negative torque is adjusted to provide the desired vehicle braking torque.

At 3514, method 3500 judges whether or not a positive driveline torque has been requested. A positive driveline torque may be requested via a driver depressing an accelerator pedal (e.g., increase in driver demand torque) or via a controller. If method 3500 judges that a positive driveline torque has been requested, the answer is yes and method 3500 proceeds to 3516. Otherwise, the answer is no and method 3500 returns to 3508.

At 3516, method 3500 increases torque converter clutch (TCC) slip via reducing the TCC application force. In one example, a duty cycle supplied to an electrical actuator is reduced to reduce the TCC application force. The TCC slip may be increased to a predetermined amount of empirically determined slip. In one example, the TCC slip is based on the amount of desired driveline torque increase. Method 3500 proceeds to 3518 after the TCC slip is increased.

At 3518, the amount of regenerative braking is decreased via reducing DISG negative torque. The regenerative braking torque is reduced toward zero DISG torque output. Method 3500 proceeds to 3520 after beginning to decrease the regenerative braking torque.

At 3520, method 3500 judges whether or not the regenerative braking torque is within a predetermined torque range of zero torque (e.g., ±2 N-m). In one example, the regenerative braking torque may be estimated based on DISG charging current. If method 3500 judges that regenerative braking torque is within a predetermined torque range of zero torque, the answer is yes and method 3500 proceeds to 3522. Otherwise, the answer is no and method 3500 returns to 3518 where regenerative braking is decreased further.

At 3522, method 3500 transitions from operating the DISG in torque control mode to operating the DISG in speed control mode. The DISG speed is set to a speed that is a speed that is a predetermined speed greater than the torque converter turbine speed. Since the DISG is coupled to the torque converter impeller, the torque converter impeller speed is greater than the torque converter turbine speed. By adjusting DISG speed to a speed greater than the turbine speed, a small positive torque is transmitted through the torque converter to the transmission input shaft. The small positive torque removes lash between transmission gears and axle gears so that impact between gears may be reduced. The DISG is commanded to the predetermined speed for a predetermined amount of time or until a speed differential between a first gear and a second gear is zero. The speed between the gears may be determined from the transmission input shaft speed and the transmission output shaft speed.

DISG speed is increased after the DISG has operated at the predetermined speed for a predetermined amount of time or after the speed difference between gears is zero. In one example, the DISG speed is increased based on a torque converter model. In particular, torque converter turbine speed and the desired amount of torque to transmit through the torque converter index one or more functions that output a DISG speed that provides the desired amount of torque. The desired amount of torque is based on the driver demand torque. Method 3500 proceeds to 3524 after the DISG speed is adjusted and the gear lash is removed.

At 3524, method 3500 remains in speed control mode and DISG current is adjusted based on an estimated amount of torque to start the engine. As previously described, when the DISG is in speed control mode, current supplied to the DISG is adjusted based on an error between a desired DISG speed and an actual DISG speed. Additionally at 3524, DISG current is increased in response to closing the driveline disconnect clutch to rotate and start the engine. In one example, an increase in DISG current is based on a driveline disconnect clutch transfer function that outputs a torque amount based on application force applied to the driveline disconnect clutch. For example, if the transfer function indicates that the driveline disconnect clutch is transferring 25 N-m at the present application force, the DISG current is increased to a level that provides an additional 25 N-m of positive torque. The driveline disconnect clutch application force may follow an empirically determined trajectory that is stored in controller memory. In this way, an open loop current based on the driveline disconnect clutch application force is provided to the DISG so that DISG speed varies less and so that the closed loop DISG speed controller may provide less speed correction. Method 3500 proceeds to 3526 after DISG speed and torque are adjusted.

At 3526, method 3500 starts the engine. The engine is started via supplying spark and fuel to the engine as the engine rotates. The engine is accelerated to the DISG speed and then the driveline disconnect clutch is closed. Engine torque and/or DISG torque are provided to the driveline after the driveline disconnect clutch is closed. The DISG also transitions from speed control mode to torque control mode after the driveline disconnect clutch is closed.

Figure 36:
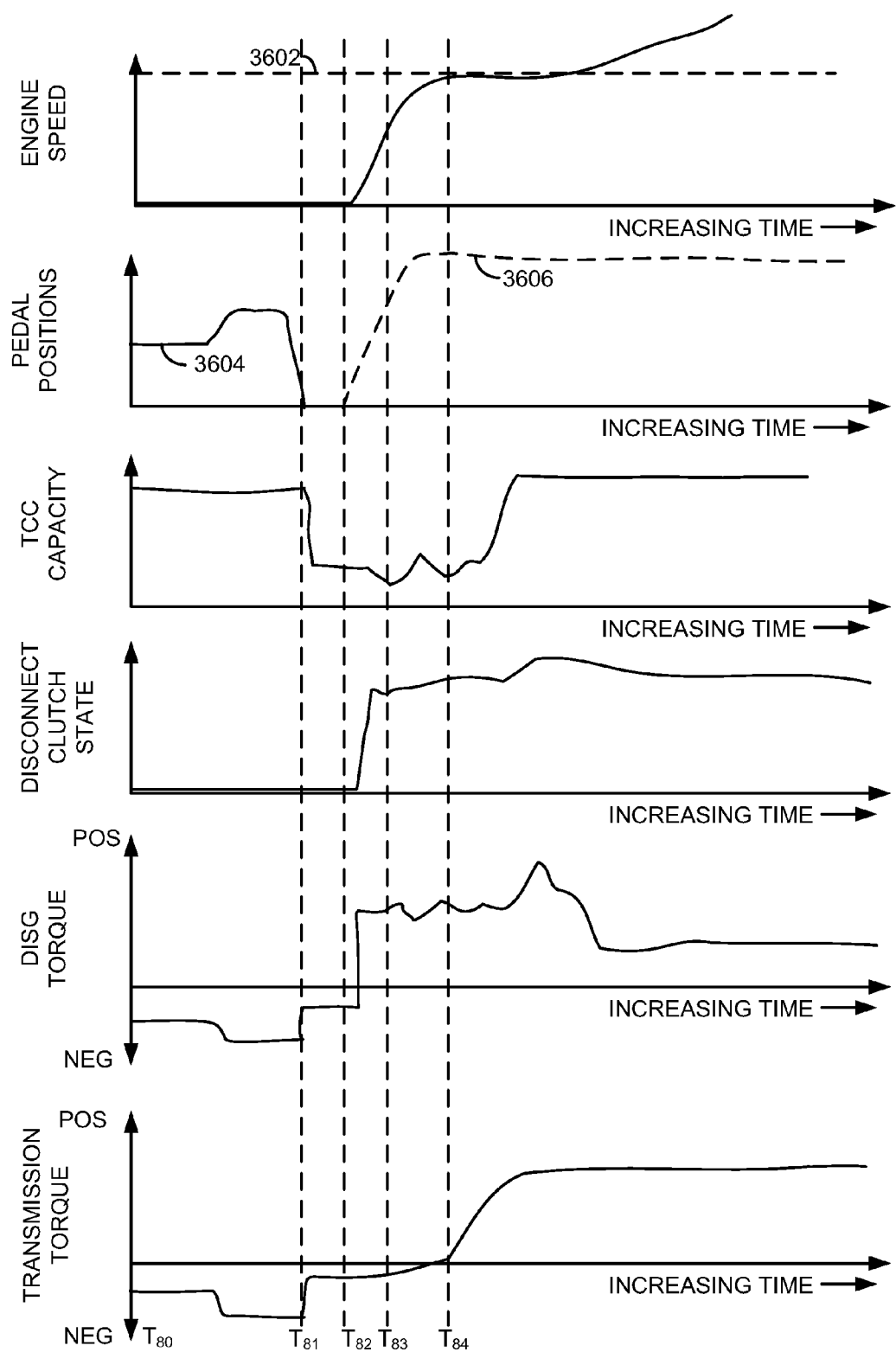

Referring now to FIG. 36, an example sequence for reducing gear lash impact of a driveline according to the method of FIG. 35 is shown. The sequence of FIG. 36 may be provided by the system of FIGS. 1-3.

The first plot from the top of FIG. 36 represents engine speed versus time. The Y axis represents engine speed and engine speed increases in the direction of the Y axis arrow. The X axis represents time and time increases from the left hand side of the figure to the right hand side of the figure. Horizontal line 3602 represents the speed of a torque converter impeller during the present sequence.

The second plot from the top of FIG. 36 represents pedal positions (e.g. accelerator pedal 3606 (driver demand torque) and brake pedal 3604) torque versus time. The Y axis represents pedal position and pedal position increases in the direction of the Y axis arrow. The X axis represents time and time increases from the left hand side of the figure to the right hand side of the figure.

The third plot from the top of FIG. 36 represents torque converter clutch capacity (TCC) versus time. The Y axis represents TCC capacity and TCC capacity increases in the direction of the Y axis arrow. The X axis represents time and time increases from the left hand side of the figure to the right hand side of the figure.

The fourth plot from the top of FIG. 36 represents driveline disconnect clutch state versus time. The Y axis represents driveline disconnect clutch state and driveline disconnect clutch state is fully applied when the trace is at a higher level near the Y axis arrow. The driveline disconnect clutch is released when the driveline disconnect clutch state in near the X axis. The driveline disconnect application pressure increases as the driveline disconnect clutch state increases. Further, the amount of torque transmitted across the driveline disconnect clutch increases as the driveline disconnect clutch state trace level increases. The X axis represents time and time increases from the left hand side of the figure to the right hand side of the figure.

The fifth plot from the top of FIG. 36 represents driveline integrated starter/generator (DISG) torque versus time. The Y axis represents DISG torque and DISG torque increases in the direction of the Y axis arrow. The X axis represents time and time increases from the left hand side of the figure to the right hand side of the figure.

The sixth plot from the top of FIG. 36 represents transmission torque at the transmission input shaft versus time. The Y axis represents transmission input shaft torque and transmission input shaft torque increases in the direction of the Y axis arrow. The X axis represents time and time increases from the left hand side of the figure to the right hand side of the figure.

FIG. 36 shows one example operation of an engine restart with modulated torque converter clutch operation to control transition through the transmission gear lash region (e.g., zero torque through the transmission) while maintaining transmission gear. One example includes a method where, the driveline disconnect clutch is engaged upon tip-in (e.g., depression of the accelerator pedal), and where the DISG spins the engine up to at least cranking speed (e.g., 250 RPM). Engine fueling and combustion provide torque to accelerate the engine while the engine speed continues to rise via DISG torque (as opposed to a starter motor type start). Such operation provides rapid engine torque for driving the vehicle. However, since such rapid increase in torque may cause clunk through the gear lash zone, the torque converter clutch is at least partially opened and optionally modulated to control the transition through the gear lash zone and reduce the rate of rise of wheel torque, until after transitioning through the gear lash zone. Additionally, the DISG output torque can be adjusted to control the driveline torque output during the transition through the gear lash zone.

Additional details of the adjustments made with regard to gear lash crossing, that may be used in the lash crossing control described above, are now described. As explained herein, the engine may be shutdown, and the driveline disconnect clutch opened when the vehicle is coming to a stop, stopped, or moving/driving when the torque from the DISG is sufficient to accelerate the vehicle and meet demanded torque, overcome the road load, as shown at time $T_{80}$.

Specifically, during events when the operator is not requesting driveline torque (e.g., closed accelerator pedal events), and the engine is not rotating, the DISG may be operated as a generator, providing regeneration, in place of, or in addition to, wheel braking as requested by an operator through actuation of the brake pedal. In this way, the DISG replaces the driveline braking that would have been present if the engine was rotating. The DISG re-charges the battery or supplies electrical power to accessory devices depending on the battery SOC. Then when the operator requests additional output by pressing the accelerator pedal, the engine may be restarted to supplement and/or replace the DISG output torque. Such transitions include crossing through the transmission gear lash region (e.g., in the transmission or the transmission final drive unit, and/or in the transmission rear differential). Specifically, as noted previously herein, when the operator presses the accelerator pedal during driveline braking, positive DISG and engine torque are applied to the driveline and the driveline experiences a torque reversal (e.g. a negative to positive torque transition). The torque reversal causes the driveline to cross the lash zone (e.g. the tooth to tooth gear spacing in the rear differential).

At time $T_{81}$, the brake pedal is released by the driver and the TCC capacity is reduced as indicated by the TCC capacity trace being reduced. Further, the DISG negative torque is reduced toward zero torque in response to less driveline braking is being called for as a result of the brake pedal being released. The transmission input shaft torque also decreases in response to DISG torque decreasing.

At time $T_{82}$, the driver depresses the accelerator pedal, thereby requesting an increase in driveline positive torque. Shortly thereafter, the DISG torque changes from negative to positive and the TCC capacity is reduced by increasing TCC slip. The driveline disconnect clutch also begins to close in response to the increase in accelerator pedal position. Closing the driveline disconnect clutch begins to accelerate the engine. The transmission input shaft torque is gradually reduced from a small negative torque toward zero torque. Between time $T_{82}$ and time $T_{83}$, the TCC capacity is reduced in response to an increase in a difference between a speed of a first gear tooth and a second gear tooth. The speed difference between gear teeth results from the driveline torque reversal.

At time $T_{83}$, the gear tooth to gear tooth speed difference between gears is at its greatest level and then begins to decrease as the gear lash is reduced. The TCC capacity is increased in response to the gear tooth speed difference between gears decreasing. The DISG torque is also increased in response to the speed difference between gear teeth decreasing so that the lash may be reduced. The driveline disconnect clutch state continues to increase indicating that an amount of torque the driveline disconnect clutch is capable of transferring is increasing. The accelerator pedal position and vehicle speed also continue to increase.

At time $T_{84}$, the engine speed reaches the torque converter impeller speed (same as DISG speed). The TCC capacity and driveline disconnect clutch are also increased in response to the engine speed reaching the torque converter impeller speed. By waiting until engine speed equals torque converter impeller speed to completely close the driveline disconnect clutch, it may be possible to reduce torque disturbances in the driveline. The torque at the transmission input shaft transitions from a negative torque to a positive torque in response to the driveline torque increasing. The DISG torque is also increased at a time after the transmission input shaft torque transitions to a positive torque in response to the driveline disconnect clutch fully closing.

The example approach of this sequence recognizes several seemingly unrelated piece of information, including (1) the engine and DISG torque are additive when the driveline disconnect clutch 236 is closed; (2) due to packaging constraints, especially associated with limits on the powertrain length and diameter, the torque capacity of the DISG tends to be significantly lower than the maximum engine torque; (3) DISG torque is a function of DISG speed which is equal to the engine speed when the clutch is fully closed; and (4) the DISG torque is relatively constant up to a threshold rotor speed of approximately 1,000±100 RPM, and then the DISG torque is inversely proportional to DISG speed, referred to as the constant power region, until frictional, eddy current and other losses cause the torque to decrease more rapidly with increasing rotor speed at higher threshold speed (e.g., about 3,000+−500 RPM).

Thus, if the powertrain is operating in a regenerative braking mode, during a closed pedal event (e.g., the accelerator is not applied) with the engine off, and then the operator presses the accelerator pedal. The engine may remain off if the DISG is capable of delivering the desired torque. Then, the driveline disconnect clutch may remain open and the DISG can be quickly transitioned to near zero torque. The DISG operates in a speed control mode and transitions slowly through the gear lash zone. The DISG quickly increases torque output after transitioning through the gear lash region to provide the desired torque. In this way, audible noise and torque impulses through a driveline may be reduced during a driveline torque transition from negative torque to positive torque.

Thus, the methods and systems of FIGS. 1-3 and 35-36 provide for operating a driveline, comprising: stopping rotation of an engine and providing regenerative braking via a driveline; transitioning from the regenerative braking to providing positive torque to the driveline; and operating a driveline integrated starter/generator in a speed control mode during the transition. The method includes where the driveline integrated starter/generator is operated in a torque control mode before and after operating the driveline integrated starter/generator in the speed control mode. The method includes where the driveline integrated starter/generator is adjusted to a speed based on a speed of a torque converter turbine.

In one example, the method further comprises opening a driveline disconnect clutch when the engine is stopped. The method further comprises closing a driveline disconnect clutch to start the engine after operating the driveline integrated starter/generator in the speed control mode. The method includes where the regenerative braking is provided when a state of charge of an energy storage device is less than a threshold charge. The method further comprises increasing slip of a torque converter clutch during the transitioning from the regenerative braking to providing positive torque to the driveline.

The methods and systems of FIGS. 1-3 and 35-36 provide for operating a driveline, comprising: stopping rotation of an engine and providing regenerative braking via a driveline integrated starter/generator; transitioning the driveline integrated starter/generator from providing the regenerative braking to providing positive torque to the driveline; and adjusting slip of a torque converter clutch in response to the transition from providing regenerative braking to providing positive torque to the driveline. The further comprises operating the driveline integrated starter/generator in a speed control mode during transitioning the driveline integrated starter/generator from providing the regenerative braking to providing positive torque to the driveline.

In one example, the method includes where the driveline integrated starter/generator is operated at a speed that is a predetermined speed greater than a torque converter turbine speed. The method further comprises increasing the speed in response to a reduction in gear lash. The method includes where adjusting slip of the torque converter includes increasing torque converter slip. The method includes where transitioning the driveline integrated starter/generator from providing the regenerative braking to providing positive torque to the driveline is in response to an increasing torque demand. The method further comprises starting the engine via closing a driveline disconnect clutch while adjusting slip of the torque converter clutch.

The methods and systems of FIGS. 1-3 and 35-36 also provide for a vehicle system, comprising: an engine; an electric machine; a driveline disconnect clutch positioned in a driveline between the engine and the electric machine; a transmission; a torque converter positioned in the driveline between the electric machine and the transmission; and a controller including executable instructions stored in non-transitory memory for reducing gear lash in the transmission via operating the electric machine in a speed control mode and adjusting a speed of the electric machine. The vehicle system further comprises a torque converter clutch and additional executable instructions to slip the torque converter clutch when the electric machine is operated in the speed control mode.

In some examples, the vehicle system further comprises additional executable instructions to operate the electric machine at a predetermined speed that is greater than a speed of a turbine of the torque converter. The vehicle system further comprises additional executable instructions to increase a speed of the electric machine after operating the electric machine at the predetermined speed. The vehicle system further comprises additional executable instructions to provide driveline brake torque via the electric machine. The vehicle system further comprises additional executable instructions to reduce driveline brake torque toward zero torque before operating the electric machine in the speed control mode.

Figure 37:
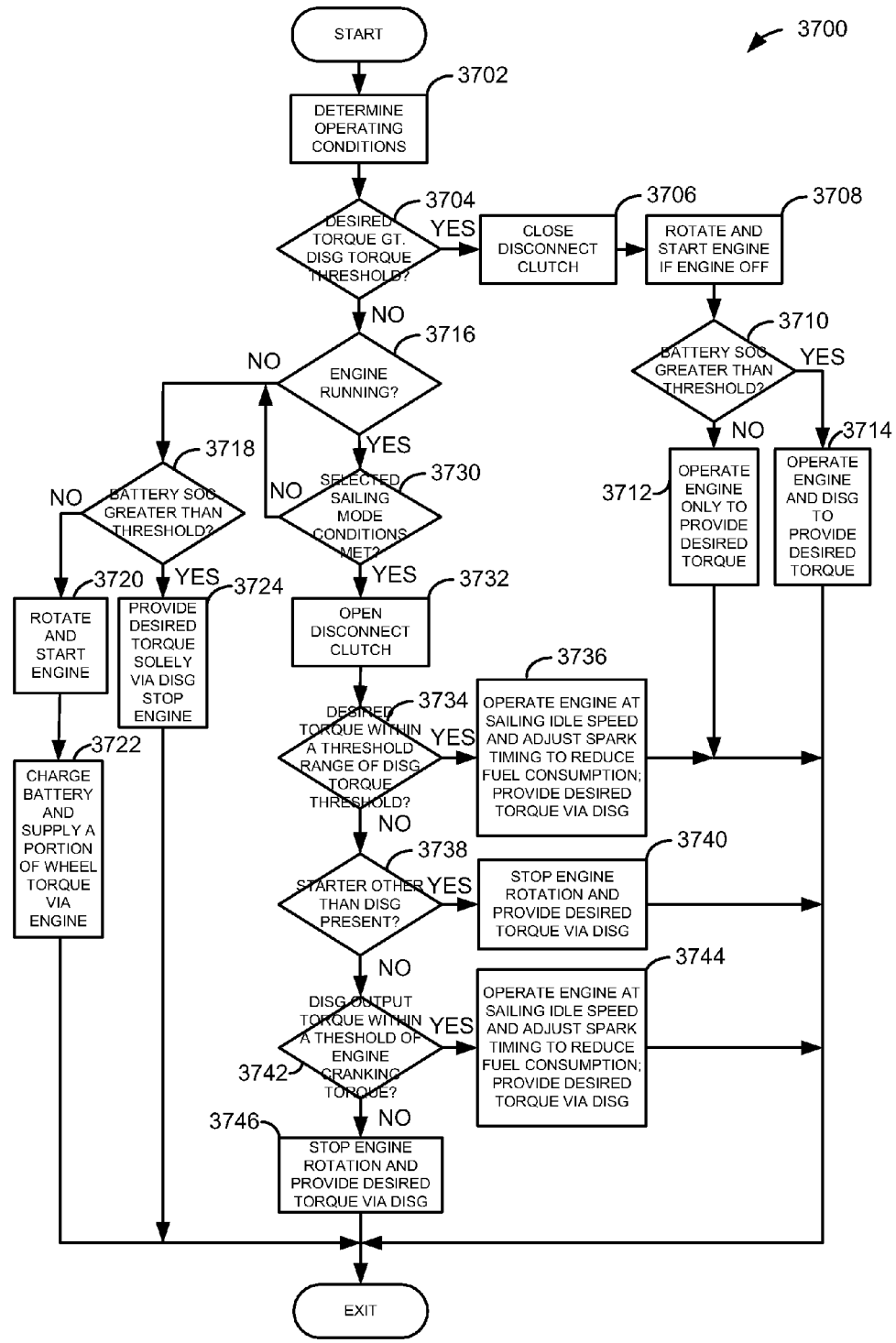
FIGS. 37-40 show methods and prophetic sequences for operating a hybrid powertrain in a sailing mode.

Referring now to FIG. 37, an example method for entering a sailing mode of driveline operation is shown. The method of FIG. 37 may be stored as executable instructions in non-transitory memory of controller 12 in FIGS. 1-3.

In one example, sailing mode may be characterized as combusting an air-fuel mixture in the engine while the driveline disconnect clutch is open so that the engine provides substantially no torque (e.g., less than ±5 N-m) to the DISG, torque converter, and transmission. Sailing mode may include a sailing idle speed that is a lower speed than a base idle speed that the engine operates at if the engine is coupled to the driveline via a closed driveline disconnect clutch. The idle speed in sailing mode is lower so that fuel may be conserved while in sailing mode. Further, spark timing in sailing mode may be more advanced than spark timing when the engine is operating at based idle speed and the driveline disconnect clutch is closed. Base idle speed may be described as engine idle speed when the engine is warm and no accessory loads are applied to the engine and when the engine is coupled to the DISG via the driveline disconnect clutch. The engine may be operated at a lower engine speed and with more spark advance in sailing mode than during conditions where base idle speed is used because less reserve torque to counteract transient loads that may be applied to the driveline may be necessary.

At 3702, method 3700 determines operating conditions. Operating conditions may include but are not limited to driveline torque demand, driveline disconnect clutch state, engine speed, vehicle speed, DISG torque, and battery state of charge. Method 3700 proceeds to 3704 after operating conditions are determined.

At 3704, method 3700 judges whether or not desired driveline torque is greater than a threshold amount of torque that may be provided to the driveline via the DISG. The threshold amount of torque may be slightly less (e.g., 10% less) than rated DISG torque. In one example, an available DISG torque amount may estimated from empirically determined values stored in a table that is indexed by DISG speed and DISG temperature. The table outputs a maximum or available amount of torque that may be provided to the driveline by the DISG. In other examples, the available or threshold DISG torque is less than the maximum DISG torque so that the engine may be held in the sailing mode in case the desired driveline torque approaches the maximum DISG torque. Further, the threshold DISG torque may increase or decrease in response to operating conditions such as DISG temperature. Method 3700 compares output from the table to the desired driveline torque amount. If method 3700 judges that desired driveline torque is greater than the threshold DISG torque, the answer is yes and method 3700 proceeds to 3706. Otherwise, the answer is no and method 3700 proceeds to 3716.

At 3706, method 3700 closes a driveline disconnect clutch to rotate and start the engine. The driveline disconnect clutch may be closed according to a predetermined closing trajectory that is stored in memory. Alternatively, the engine may be started via a starter other than the DISG and the driveline disconnect clutch is closed after the engine is accelerated to the speed of the DISG. The torque converter clutch slip may also be increased so as to reduce driveline torque disturbances in response to desired torque. Method 3700 proceeds to 3708 after the driveline disconnect clutch begins closing.

At 3708, method 3700 supplies fuel to the engine and the engine is started if it is not combusting an air-fuel mixture. Fuel and spark are provided to engine cylinders to facilitate combustion within the engine. Method 3700 proceeds to 3710 after engine rotation begins.

At 3710, method 3700 judges whether or not energy storage device (e.g., battery) state of charge is greater than a threshold amount. In one example, battery state of charge may be estimated from battery voltage. If method 3700 judges that battery state of charge is greater than a threshold amount, the answer is yes and method 3700 proceeds to 3714. Otherwise, the answer is no and method 3700 proceeds to 3712.

At 3714, method 3700 operates the engine and DISG to provide the desired amount of driveline torque. The fraction of torque provided by each of the engine and the DISG may vary depending on operating conditions. For example, if battery state of charge is low, a greater portion of driveline torque may be provided by the engine rather than the DISG. The amount of torque provided to the driveline by the engine may be estimated according to the method described in U.S. Pat. No. 7,066,121 which is hereby fully incorporated for all intents and purposes. The amount of torque provided to the driveline by the DISG may be estimated from an empirically determined table that is indexed via DISG current and speed. Method 3700 proceeds to exit after torque is provided to the driveline via the engine and the DISG.

At 3712, method 3700 operates the engine without operating the DISG to provide the desired torque to the driveline. Further, in some examples, the DISG may be transitioned to a battery charging mode where mechanical energy from the engine is converted into electrical energy via the DISG and stored in an electric energy storage device. In one example, engine air amount and engine fuel amount are adjusted to provide the desired amount of driveline torque. For example, if the desired amount of driveline torque is increased, the amount of air and fuel supplied to engine cylinders is increased. Method 3700 proceeds to exit after engine operation is adjusted to supply a desired amount of torque to the driveline.

At 3716, method 3700 judges whether or not the engine is running and combusting air-fuel mixtures in the engine cylinders. In one example, the engine may be determined to be combusting air-fuel mixtures when engine torque increases as may be evidenced by increasing engine speed. If method 3700 judges that the engine is combusting air-fuel mixtures and running, the answer is yes and method 3700 proceeds to 3730. Otherwise, the answer is no and method 3700 proceeds to 3718.

At 3718, method 3700 judges whether or not battery state of charge is greater than a threshold amount. In one example, battery voltage is a basis for estimating battery state of charge. If method 3700 judges that battery state of charge is greater than a threshold amount, the answer is yes and method 3700 proceeds to 3724. Otherwise, the answer is no and method 3700 proceeds to 3720.

At 3724, method 3700 provides the desired driveline torque via the DISG and without torque from the engine. Current is supplied to the DISG based on a table stored in memory that outputs a DISG current amount based on a desired DISG torque and DISG temperature. Values in the table may be empirically determined. Method 3700 proceeds to exit after the DISG torque is provided to the driveline.

At 3720, method 3700 rotates and starts the engine. The engine may be rotated via a starter motor other than the DISG or by the DISG. If the engine is rotated by the DISG, the driveline disconnect clutch is closed to transfer torque from the DISG to the engine. The engine is started by supplying fuel and spark to engine cylinders after the engine reaches cranking speed. Engine cranking speed may be varied for different operating conditions. For example, if the engine is rotated by the starter motor other than the DISG, the cranking speed is a speed less than 250 RPM. However, if the engine is rotated by the DISG, the cranking speed may be a speed less than 1200 RPM. Method 3700 proceeds to 3722 after the engine is rotated and started.

At 3722, method 3700 begins supplying at least a portion of engine torque to vehicle wheels and begins charging the battery to increase the battery state of charge. The driveline disconnect clutch is closed when the engine is providing torque to vehicle wheels and charging the battery. Further, engine torque output is adjusted to provide the desired driveline torque amount. The engine torque output may be increased or decreased by adjusting cylinder air amount and cylinder fuel amount. Method 3700 proceeds to exit after at least a portion of engine output is supplied to vehicle wheels.

At 3730, method 3700 judges whether or not selected conditions to enter sailing mode are present. In one example, sailing mode may be entered when engine temperature is greater than a threshold temperature. Further, other operating conditions such as engine speed and requested torque may be evaluated to determine if sailing mode may be entered. Additionally, in some examples, sailing mode may be entered when battery state of charge is less than a threshold state of charge.

For example, sailing mode may also be entered when the catalyst temperature is below a threshold and other conditions. The controller may selects to keep the engine at idle instead of turning off the engine because the emissions may increase if the engine is started with cool catalysts. The controller may select to keep the engine at idle instead of closing the driveline disconnect clutch and operating the engine to produce torque if battery SOC is high and/or the current operating point would be required to have the engine operate at a low fuel efficient point.

Sailing mode may also be entered when the fuel vapor canister requires purging. The controller may select to keep the engine at idle instead of turning off the engine because fuel vapor purge is scheduled to run. The controller may also select to keep the engine at idle instead of closing the driveline disconnect clutch and operating the engine to produce torque if battery SOC is high and/or the current operating point would be required to have the engine operate at a low fuel efficient point.

Sailing mode may also be entered when an increase in brake boost vacuum is desired. The controller may select to keep the engine at idle instead of turning off the engine because vacuum is desired, and the engine is operated to provide vacuum.

Sailing mode may be entered when engine coolant temperature (ECT) is low. The controller may select to keep the engine at idle instead of turning off the engine because ECT is low.

Sailing mode may be entered when faster tip-in response for sport driver mode is desired. The controller may select to keep the engine at idle instead of turning off the engine because the driving mode has been determined or selected as a sport mode. The response to driver accelerator tip-ins will be faster with the engine at sailing idle instead of if the engine is stopped.

If method 3700 judges that selected conditions are present to allow entry into sailing mode, the answer is yes and method 3700 proceeds to 3732. Otherwise, the answer is no and method 3700 proceeds to 3718.

At 3732, method 3700 opens the driveline disconnect clutch. The driveline disconnect clutch is opened so that any torque produced by the engine is not supplied to the remaining portion of the driveline including the DISG, the torque converter, and the transmission. Opening the driveline disconnect clutch allows the engine to be operated at a more efficient operating state than if the engine were coupled to the DISG, torque converter, and transmission since the engine may be operated with a smaller torque reserve. In one example, an engine torque reserve may be characterized as an amount of torque that is available from the engine when the engine is operating at a particular speed and air amount without providing the total amount of available engine torque.

For example, an engine may be producing 100 N-m of torque at 1200 RPM and at a prescribed cylinder air amount. However, the amount of engine torque available at 1200 RPM when the engine is inducting the prescribed cylinder air amount may be 125 N-m. The difference of 25 N-m may be explained by the engine operating at a spark timing that is retarded from MBT spark timing. The 25 N-m represents a torque reserve that may be held to compensate for torque disturbances that may be supplied to the engine. However, the 25 N-m also represents a loss of engine efficiency due to spark retard. The engine may be operated with a smaller torque reserve when the driveline disconnect clutch is open since fewer torque disturbances may be applied to the engine via the driveline. Method 3700 proceeds to 3734 after the driveline disconnect clutch is opened.

At 3734, method 3700 judges whether or not the desired driveline torque is within a threshold range of a DISG torque threshold. The DISG torque threshold may represent a maximum amount of torque available from the DISG or an amount of torque that is less than the total amount of available DISG torque. If method 3700 judges that the desired driveline torque is within a threshold torque range of the DISG torque threshold, the answer is yes and method 3700 proceeds to 3736. Otherwise, the answer is no and method 3700 proceeds to 3738.

At 3736, method 3700 operates the engine at a sailing idle speed and adjusts engine spark timing and valve timing to improve engine efficiency and fuel economy. The desired driveline torque is provided by the DISG when the driveline disconnect clutch is in an open state. The sailing idle speed may be lower than a based idle speed when the engine is coupled to the DISG and transmission. Further, spark timing while the engine is operated at sailing idle speed may be advanced as compared to when the engine is operated at base idle speed. Base idle speed may be applied when desired driveline torque is low and when the engine is coupled to the remaining portion of the driveline via a closed driveline disconnect clutch. Engine valve timing can be adjusted to operate the engine at an improved volumetric efficiency. In one example, valve timing is adjusted such that intake valve timing closes late to increase engine intake manifold pressure while cylinder air charge is relatively low. Method 3700 proceeds to exit after the engine enters sailing mode at 3736.

At 3738, method 3700 judges whether or not a starter other than the DISG is present in the system. In some examples, method 3700 may judge that a starter other than the DISG is not present if the starter other than the DISG is degraded. Method 3700 may also judges that a starter other than the DISG is present when a starter present bit is set in memory. If method 3700 judges that a starter other than the DISG is present, the answer is yes and method 3700 proceeds to 3740. Otherwise, the answer is no and method 3700 proceeds to 3740.

At 3740, method 3700 stops engine rotation and the desired driveline torque is provided via the DISG. Engine rotation is stopped by stopping fuel flow and spark to engine cylinders. The engine is stopped at 3740 so that additional fuel may be conserved and because the engine may be restarted without torque from the DISG. In this way, a greater amount of DISG torque may be supplied to the driveline because a portion of available DISG torque does not have to be held in reserve to restart the engine. Method 3700 proceeds to exit after the engine is stopped.

At 3742, method 3700 judges whether or not DISG output torque is within a threshold range of engine cranking torque (e.g., an amount of torque to rotate the engine from zero speed to a cranking speed of less than 250 RPM). For example, if engine cranking torque is 40 N-m and a threshold range is 5 N-m, the DISG is within the threshold range of engine cranking torque when the DISG output torque is 35.5 N-m. If method 3700 judges DISG output torque is within a threshold torque range of engine cranking torque, the answer is yes and method 3700 proceeds to 3744. Otherwise, the answer is no and method 3700 proceeds to 3746.

At 3746, method 3700 stops engine rotation and provides the desired driveline torque via the DISG. The engine is stopped to further reduce fuel consumption. Since the DISG has a sufficient amount of torque available to restart the engine, the engine may be stopped. If the desired driveline torque increases while the engine is stopped, the engine may be restarted via the DISG before the DISG does not have enough torque output capacity to start the engine and provide the desire driveline torque. However, in some examples, the engine may continue to idle at sailing mode idle speed if battery state of charge is less than a threshold and the vehicle requires additional vacuum, fuel vapor purging, higher catalyst temperature, or higher engine temperature. Method 3700 proceeds to exit after the engine is stopped.

At 3744, method 3700 operates the engine at sailing idle speed, adjusts spark timing, valve timing, and provides driveline torque via the DISG as described at 3736. Method 3700 proceeds to exit after the engine enters sailing mode.

It should be noted that when a driver reduces a driver demand torque (e.g., tips-out or reduces an accelerator input) the driveline may operate as follows according to the method of FIG. 37. Torque may be provided from an engine to a driveline coupled to vehicle wheels when driver demand torque is greater than a DISG threshold torque. The engine speed may be reduced to a sailing mode idle speed and the engine decoupled from the driveline in response to a decreasing driver demand torque. The DISG may enter a regeneration mode providing charge to a battery and a constant deceleration rate for the vehicle. In one example, the DISG threshold torque is greater than 75% of a rated DISG torque.

It should be noted that when a driver increases a driver demand torque (e.g., tips-in or increases an accelerator input) the driveline may operate as follows according to the method of FIG. 37. The engine may accelerate from a sailing idle speed to DISG speed in response to an increasing driver demand torque. The driveline disconnect clutch may be closed in response to the engine speed reaching the DISG speed.

It should be noted that when a driver increases a driver demand torque (e.g., tips-in or increases an accelerator input)

during vehicle launch the driveline may operate as follows according to the method of FIG. 37. DISG torque is provided to the vehicle driveline while the engine is not rotating in response to a driver demand torque. The engine may be started and idled at a sailing mode idle speed without providing engine torque to the driveline in response to the driver demand torque being within a threshold range of an engine cranking torque (e.g., where DISG torque is greater than 75% of engine cranking torque). The engine may be accelerated in a speed control mode to substantially match DISG speed (e.g., ±50 RPM) and the driveline disconnect clutch may be closed when engine speed substantially matches DISG speed (e.g., ±50 RPM). In some examples, engine speed may follow DISG speed when desired torque is between engine cranking torque and a threshold DISG torque (e.g., a torque between 75% of rated DISG torque and rated DISG torque).

Further, at 3736 and 3744 the engine may be operated in a speed control mode to follow DISG speed when desired driveline torque is within a predetermined torque range of the DISG threshold torque. By following the DISG speed, the driveline disconnect clutch may be closed sooner so as to improve driveline response.

In this way, the method of FIG. 37 provides an efficient engine operating mode that may reduce engine fuel consumption as compared to the engine operating at base idle speed. Further, the method of FIG. 37 provides for stopping the engine when additional fuel may be conserved. Additionally, the method maintains driveline torque response even though the engine may be operated more efficiently or stopped.

Referring now to FIG. 38, an example method for exiting a sailing mode of driveline operation is shown. The method of FIG. 38 may be stored as executable instructions in non-transitory memory of controller 12 in FIGS. 1-3.

At 3802, method 3800 determines operating conditions. Operating conditions may include but are not limited to driveline torque demand, driveline disconnect clutch state, engine speed, vehicle speed, DISG torque, and battery state of charge. Method 3800 proceeds to 3804 after operating conditions are determined.

At 3804, method 3800 judges whether or not the engine in sailing mode at a sailing idle speed and if the driveline disconnect clutch is open. The engine operating mode and driveline disconnect clutch operating state may be determined via making an inquiry of one or more bits or flags stored in memory. If method 3800 judges that the engine is not in sailing mode, the answer is no and method 3800 proceeds to exit. If method 3800 judges that the engine is in sailing mode and the driveline disconnect clutch is open, the answer is yes and method 3800 proceeds to 3806.

At 3806, method 3800 judges whether or not a desired driveline torque is greater than a DISG threshold torque. The DISG threshold torque may be equal to or less than the available amount of DISG torque. If method 3800 judges that the desired driveline torque is greater than the DISG threshold torque, the answer is yes and method 3800 proceeds to 3808. Otherwise, the answer is no and method 3800 proceeds to exit.

At 3808, method 3800 increases engine speed from sailing idle speed to a speed synchronous with DISG speed via increasing engine air amount and engine fuel amount (e.g., the amounts of air and fuel delivered to engine cylinders). Further, spark timing may be retarded away from MBT spark timing as the engine air amount and fuel amount are increased. Method 3800 proceeds to 3810 after engine air amount and fuel amount is increased so that engine torque is increased and so that the engine accelerated to the speed of the DISG.

At 3810, method 3800 increases an amount of torque converter clutch (TCC) slip. The torque converter clutch slip may be increased via decreasing torque converter clutch application force. By increasing TCC slip, driveline torque disturbances may be reduced. Method 3800 proceeds to 3812 after TCC slip is increased.

At 3812, method 3800 closes the driveline disconnect clutch. The driveline disconnect clutch may be closed when the engine speed reaches the DISG speed and after the engine speed has settled to the DISG speed for a predetermined amount of time. Method 3800 proceeds to 3814 after the driveline disconnect clutch is closed.

At 3814, method 3800 increases engine torque via increasing the engine air and fuel amounts. Additionally, the DISG torque may be increased to augment engine torque so that the desired driveline torque may be provided. Method 3800 proceeds to exit after engine torque and DISG torque are adjusted to provide the desired driveline torque.

In this way, the method of FIG. 38 provides for transitioning out of sailing mode in response to a tip-in (e.g., depression of an accelerator pedal to a higher torque demand) where the DISG is providing the torque to the wheels and the engine is at idle. For example, the driver tips-in and the new torque demand increases quickly to above the total torque capacity of the DISG. The engine accelerates in speed control mode towards the DISG speed, the TCC may be opened to allow torque multiplication and isolation of the driveline and the driveline disconnect clutch may be closed to bring the engine up to speed very quickly. The engine transitions to torque control after the engine substantially reaches DISG speed (e.g., ±100 RPM). Subsequently, the engine and the DISG may provide the desired torque.

Figure 39:
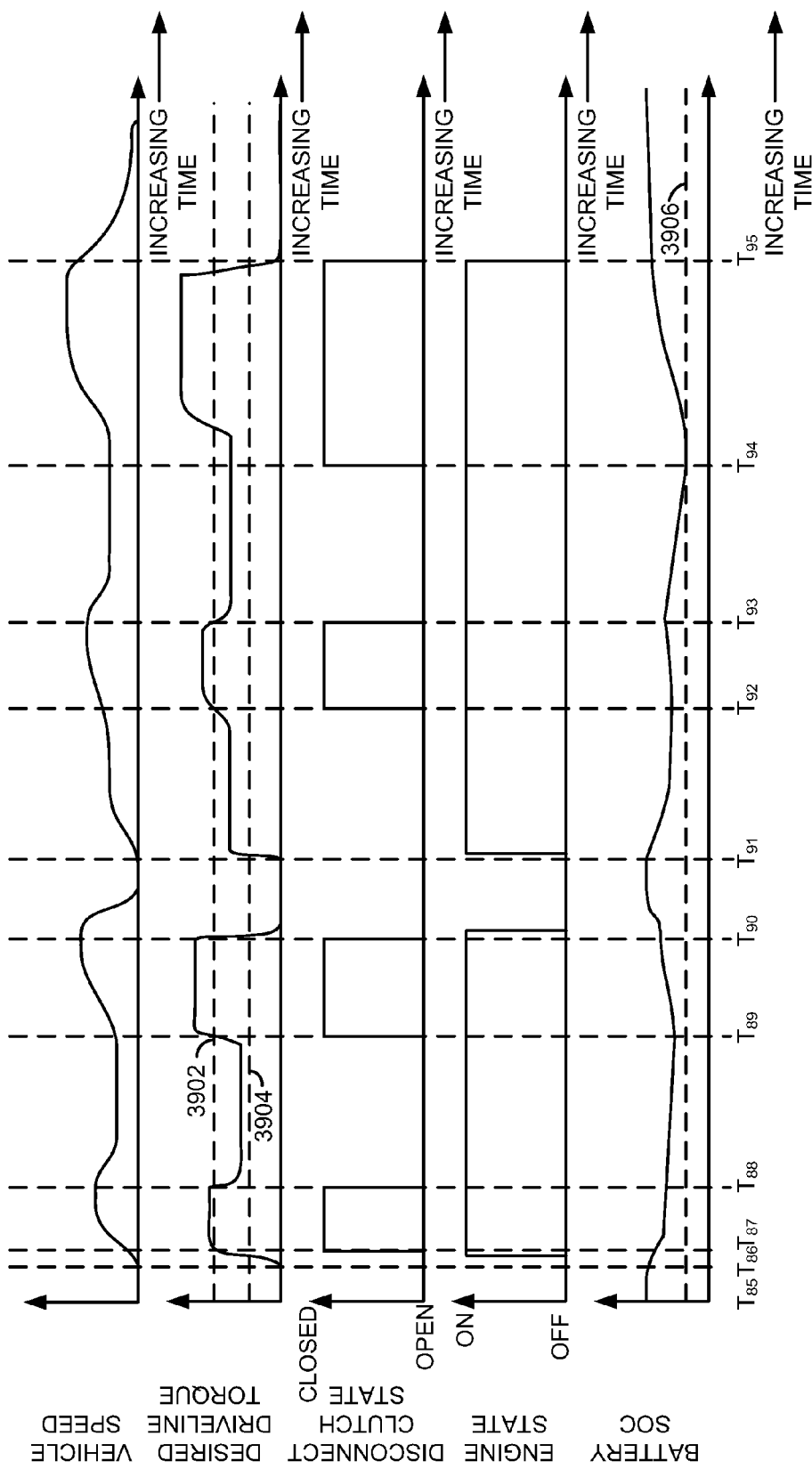

Referring now to FIG. 39, an example sequence for operating a driveline that includes a sailing mode according to the methods of FIGS. 37 and 38 is shown. The sequence of FIG. 39 may be provided by the system of FIGS. 1-3.

The first plot from the top of FIG. 39 represents vehicle speed versus time. The Y axis represents vehicle speed and vehicle speed increases in the direction of the Y axis arrow. The X axis represents time and time increases from the left hand side of the figure to the right hand side of the figure.

The second plot from the top of FIG. 39 represents desired driveline torque versus time. The desired driveline torque may be a torque at vehicle wheels, a torque converter impeller, a torque converter turbine, or at a driveline disconnect clutch. The Y axis represents desired driveline torque and desired driveline torque increases in the direction of the Y axis arrow. The X axis represents time and time increases from the left hand side of the figure to the right hand side of the figure. Horizontal line 3902 represents a threshold (e.g., a torque within a prescribed torque of rated or maximum DISG torque) driveline torque that a DISG has the capability to provide to the driveline. Horizontal line 3904 represents a threshold (e.g., a torque within a prescribed torque of engine cranking torque) amount of torque the DISG may provide while having the capacity to crank the engine at cranking speed (e.g., 250 RPM).

The third plot from the top of FIG. 39 represents the driveline disconnect clutch state versus time. The Y axis represents driveline disconnect state and the driveline disconnect clutch is closed when the driveline disconnect clutch state trace is at a higher level near the Y axis arrow. The driveline disconnect clutch is open when the driveline disconnect clutch state is at a lower level near the X axis. The X axis represents time and time increases from the left hand side of the figure to the right hand side of the figure.

The fourth plot from the top of FIG. 39 represents engine state versus time. The Y axis represents engine state and the engine is rotating when the engine state trace is at a higher level near the Y axis arrow. The engine is not rotating when the engine state trace is in near the X axis. The X axis represents time and time increases from the left hand side of the figure to the right hand side of the figure.

The fifth plot from the top of FIG. 39 represents energy storage device or battery state of charge (SOC) versus time. The Y axis represents battery SOC and battery SOC increases in the direction of the Y axis arrow. The X axis represents time and time increases from the left hand side of the figure to the right hand side of the figure. Horizontal line 3906 represents a threshold amount of battery charge that is desired. An amount of charge above 3906 may be desired to reduce the possibility of battery degradation.

At time $T_{85}$, vehicle speed is zero, the engine is stopped, the driveline disconnect clutch is open, battery state of charge is at a middle level that is greater than the level at 3906. These conditions may be representative of conditions when a vehicle is parked or stopped at a traffic signal.

At time $T_{86}$, the desired driveline torque increases in response to an increasing driver demand torque as determined from an accelerator pedal (not shown). The engine remains in an off state and the driveline disconnect clutch remains closed. Vehicle speed begins to increase as a driveline integrated starter/generator (DISG) (not shown) begins to supply positive torque to the vehicle driveline. Battery SOC begins to decline as battery charge is used to propel the vehicle.

Between time $T_{86}$ and time $T_{87}$, the desired driveline torque exceeds torque level 3904 in response to drive demand torque. As a result, the engine is rotated and started; however, the driveline disconnect clutch remains open. The engine may be started via a starter other than the DISG. Vehicle speed continues to increase and battery SOC continues to decrease.

At time $T_{87}$, the desired driveline torque exceeds torque level 3902 in response to driver demand torque. Shortly thereafter, the driveline disconnect clutch is closed in response to driveline torque exceeding threshold torque level 3902. By closing the driveline disconnect clutch, driveline torque may be increased via increasing engine torque. Closing the driveline disconnect clutch couples the engine to the DISG and the remaining driveline. The engine remains running and engine torque is increased so that the desired driveline torque may be provided by the DISG and the engine. The battery SOC continues to decrease as the DISG supplies torque to the driveline.

At time $T_{88}$, the desired driveline torque decreases in response to driver input to a level below threshold torque level 3902, but it remains above threshold torque level 3904. Engine torque is reduced in response to the reduced desired driveline torque. Additionally, the driveline disconnect clutch is opened so as to decouple the engine from the DISG and driveline. The engine remains combusting air and fuel. The engine speed may be reduced to a sailing idle speed that is lower than a base idle speed that the engine rotates at when the engine is coupled to the DISG. Additionally, engine spark timing may be advanced. Reducing engine speed and advancing spark timing may decrease fuel consumption.

At time $T_{89}$, the desired driveline torque is increased for a second time by the driver to a level above threshold torque 3902. The driveline disconnect clutch is closed in response to driveline torque exceeding torque threshold 3902. Engine torque is then increased and the desired driveline torque is provided via the engine. The DISG enters a generator mode and the battery state of charge is increased via a portion of engine torque. Vehicle speed increases as engine torque is provided to the driveline.

At time $T_{90}$, the desired driveline torque decreases in response to a reduced driver demand torque. The desired driveline torque decreases to a torque below threshold torque 3904. Consequently, the driveline disconnect clutch is opened and engine rotation is stopped in response to the low desired driveline torque. In this way, vehicle fuel consumption may be reduced. The DISG stays in generator mode and increase battery charge as the vehicle decelerates.

At time $T_{91}$, desired driveline torque is increased in response to driver demand torque. The desired driveline torque is increased to a level between torque threshold 3902 and torque threshold 3904. Since the desired driveline torque is near threshold torque 3902 the engine is rotated and started so that engine torque may be made available in a reduced amount of time if the desired driveline torque increases further. The vehicle speed is increased by supplying torque to the DISG. Battery state of charge begins to decrease as the DISG supplies torque to the vehicle driveline.

At time $T_{92}$, the desired driveline torque is increased in response to increasing driver demand torque. The desired driveline torque increases to a level greater than threshold torque 3902. Shortly thereafter, the driveline disconnect clutch is closed and engine torque is provide the driveline. In this way, driveline torque may readily be increased without having to wait for engine speed to reach a level where torque may be provided to the driveline. The DISG is also transitioned to generator mode and battery SOC is increased.

At time $T_{93}$, the desired driveline torque decreases in response to driver input to a level below threshold torque level 3902, but it remains above threshold torque level 3904. Engine torque is reduced in response to the reduced desired driveline torque. Further, the driveline disconnect clutch is opened so as to decouple the engine from the DISG and driveline. The engine remains combusting air and fuel. The engine speed may be reduced to a sailing idle speed. Torque is provided to the driveline via the DISG which transitions to a torque mode outputting a positive torque to the vehicle driveline.

At time $T_{94}$, battery SOC is reduced to level 3906 as the DISG continues to consume charge. The driveline disconnect clutch is closed in response to the battery SOC and the DISG is transitioned to a generator mode. The engine supplies torque to the driveline and the DISG. Thus, the driveline disconnect clutch may be opened and closed in response to desired driveline torque and battery SOC. Shortly after time $T_{94}$, the desired driveline torque is increased to a level above torque threshold 3902. Since the driveline disconnect clutch is already closed, it remains in that state.

At time $T_{95}$, the desired driveline torque decreases in response to a reduced driver demand torque. The desired driveline torque decreases to a torque below threshold torque 3904. Accordingly, the driveline disconnect clutch is opened and engine rotation is stopped in response to the low desired driveline torque. The DISG stays in generator mode and increase battery charge as the vehicle decelerates.

Figure 40:
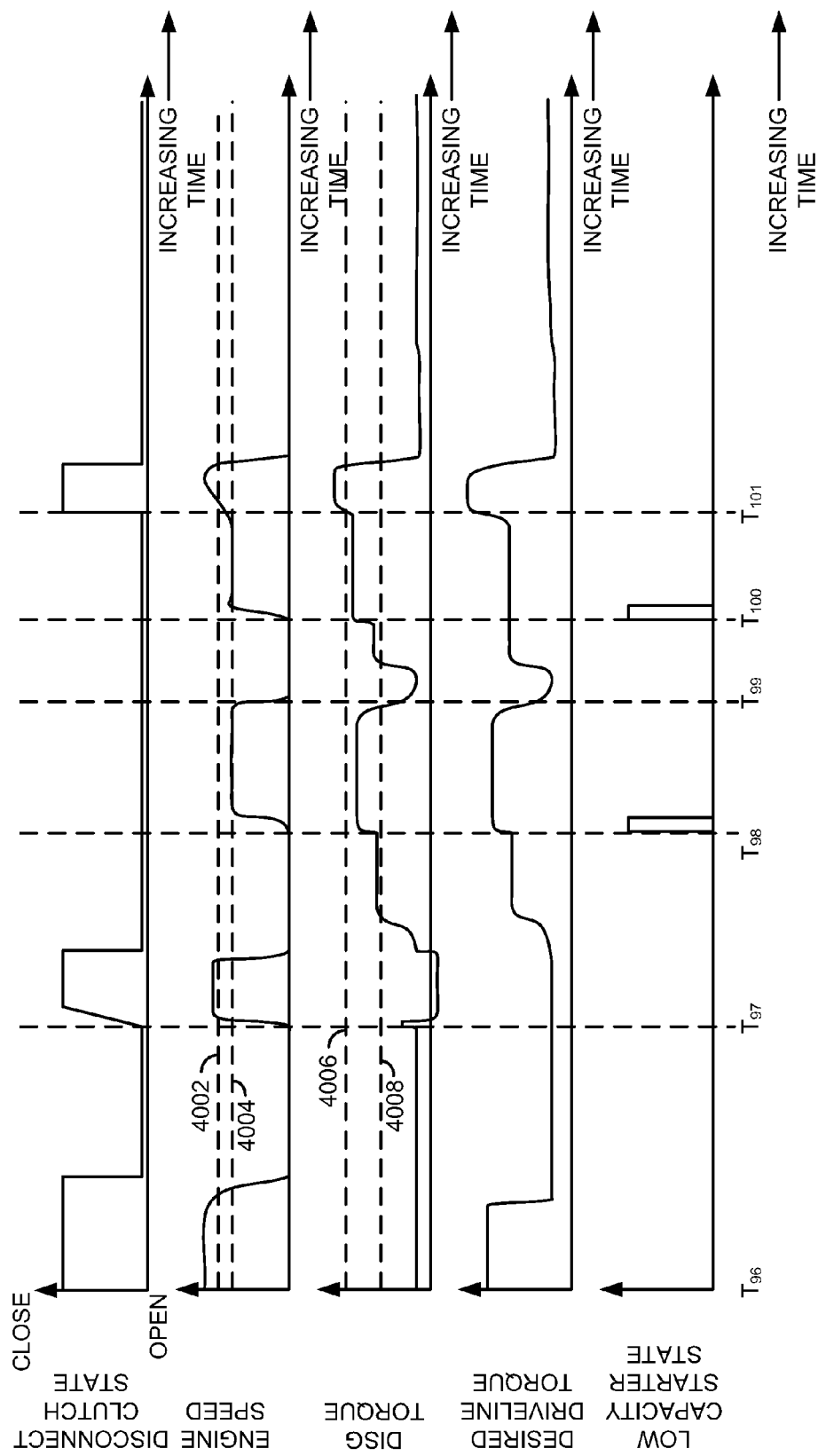

Referring now to FIG. 40, an example sequence for operating a driveline that includes a sailing mode according to the methods of FIGS. 37 and 38 is shown. The sequence of FIG. 40 may be provided by the system of FIGS. 1-3.

The first plot from the top of FIG. 40 represents driveline disconnect clutch state versus time. The Y axis represents driveline disconnect clutch state and the driveline disconnect clutch is closed when the driveline disconnect clutch state trace is at a higher level near the Y axis arrow. The X axis represents time and time increases from the left hand side of the figure to the right hand side of the figure.

The second plot from the top of FIG. 40 represents engine speed versus time. The Y axis represents engine speed and engine speed increases in the direction of the Y axis arrow. The X axis represents time and time increases from the left hand side of the figure to the right hand side of the figure. Horizontal line 4002 represents a base engine idle speed when the engine is coupled to the DISG via the driveline disconnect clutch. Horizontal line 4004 represents a base engine sailing mode idle speed when the engine is combusting air and fuel but is not coupled to the DISG.

The third plot from the top of FIG. 40 represents DISG torque versus time. The Y axis represents DISG torque and DISG torque increases in the direction of the Y axis arrow. The X axis represents time and time increases from the left hand side of the figure to the right hand side of the figure. Horizontal line 4006 represents an amount of torque the DISG is capable of providing to the driveline (e.g., a rated DISG torque). Horizontal line 4008 represents an amount of torque the DISG is capable of providing to the driveline while being able to crank the engine from zero speed.

The fourth plot from the top of FIG. 40 represents desired driveline torque versus time. The Y axis represents desired driveline torque and desired driveline torque increases in the direction of the Y axis arrow. In one example, the desired driving torque is based on driver demand torque as determined from an accelerator pedal. The X axis represents time and time increases from the left hand side of the figure to the right hand side of the figure.

The fifth plot from the top of FIG. 40 represents operating state of a low power starter (e.g., a starter with lower starting power than the DISG). The Y axis represents the operating state of the low power starter and the low power starter is rotating when the low power starter state trace is near the Y axis arrow. The X axis represents time and time increases from the left hand side of the figure to the right hand side of the figure.

At time $T_{96}$, the driveline disconnect clutch is closed and the engine speed is at an elevated level. The engine is providing positive torque to the driveline. The DISG torque is at a low level indicating the engine is providing most of the torque to the driveline. Further, the low capacity starter is not operating.

Between time $T_{96}$ and time $T_{97}$, the driveline disconnect clutch is opened and the engine is stopped in response to a reduction in the desired driveline torque. The desired driveline torque decreases in response to a decrease in drive demand torque (not shown). The low capacity starter remains off and the DISG torque remains at a lower level.

At time $T_{97}$, the driveline disconnect clutch is partially closed in response to a low state of battery charge (not shown). The DISG torque is briefly increased in response to closing the driveline disconnect clutch. The DISG provides additional torque to the driveline for starting the engine. Shortly thereafter, the engine is started by supplying fuel and spark to the engine. The DISG torque is decreased after the engine is started and DISG torque turns negative when the DISG enters a generator mode to charge the battery. The engine is cranked without the low capacity starter via the driveline disconnect clutch and the DISG at a time when the DISG torque is below threshold 4008.

Between time $T_{97}$ and time $T_{98}$, the engine and DISG charges the battery. The engine is stopped after the battery is charged and the DISG begins to provide positive torque to the driveline. The driveline disconnect clutch is also opened when the engine is stopped. The desired driveline torque is increased shortly after the engine is stopped in response to an increasing driver demand torque. However, the desired driveline torque is not within a threshold range of torque level 4006 so the engine is not started.

At time $T_{98}$, the desired driveline torque is increased to a level that is within a threshold range of torque to torque level 4006. The low capacity starter is engaged and rotates the engine in response to the increase in desired driveline torque. The engine starts shortly thereafter when spark and fuel are supplied to the engine. The driveline disconnect clutch remains in an open state since the DISG can provide the desired driveline torque without assistance from the engine. The engine operates at the sailing idle speed in anticipation of an increased desired driveline torque.

At time $T_{99}$, the desired driveline torque decreases to a level below threshold level 4008 in response to a reduced driver demand torque (not shown). The engine is stopped in response to the low desired driveline torque and the low capacity starter remains off. The driveline disconnect clutch also remains in an open state.

Between time $T_{99}$ and time $T_{100}$, the desired driveline torque is increased in response to an increased driver demand torque. The desired driveline torque is increased to a level that is less than a threshold torque away from the torque level 4006. Therefore, the DISG provides the desired driveline torque without starting the engine. The driveline disconnect clutch remains in an open state.

At time $T_{100}$, the desired driveline torque is increased further in response to an increased driver demand torque. The low capacity starter is engaged and the engine is rotated in response to the desired driveline torque increasing to within a threshold level of torque level 4006. The engine is started by supplying spark and fuel to the engine is response to engine rotation. The engine is accelerated up to the sailing mode idle speed 4004. The DISG continues to supply all positive torque to the driveline to meet the desired driveline torque. The low capacity starter is disengaged shortly after the engine is started.

At time $T_{101}$, the desired driveline torque is increased to a level greater than torque level 4006 in response to an increasing driver demand torque. The driveline disconnect clutch and is closed in response to the increasing driver demand torque and engine speed is also increased so that the engine may provide additional torque to augment the DISG torque. The low capacity starter remains off.

In this way, the starter, engine, and disconnect clutch may be operated to provide shorter response time to an increase in desired driveline torque. Further, the low capacity starter may be operated during conditions where the DISG lacks capacity to crank the engine so that the DISG operating range may be extended.

Thus, the methods and systems of FIGS. 1-3 and 37-40 also provide for a driveline operating method, comprising: operating an engine and providing engine torque to a driveline propelling a vehicle in response to a desired torque being greater than a threshold driveline integrated starter/generator torque; and operating the engine and not providing engine torque to the driveline in response to the desired torque being less than the threshold driveline torque and greater than a threshold engine cranking torque. In this way, a driveline may operate with improved efficiency and provide a shorter torque response time.

In some examples, the method includes where the threshold driveline integrated starter/generator torque is a torque of within a predetermined torque range of a rated torque of a driveline integrated starter/generator. The method includes where the threshold engine cranking torque is within a predetermined torque range of an engine cranking torque. The method includes where the engine cranking torque is a torque to rotate the engine from zero rotation to a speed less than 250 RPM. The method further comprises operating a driveline disconnect clutch in an open state while operating the engine and not providing engine torque to the driveline. The method includes where the desired torque is based on a driver demand torque. The method further comprises providing torque to the driveline via a driveline integrated starter/generator while operating the engine and not providing engine torque to the driveline.

The methods and systems of FIGS. 1-3 and 37-40 also provide for a driveline operating method, comprising: rotating an engine and providing engine torque to a driveline propelling a vehicle in response to a desired torque being greater than a threshold driveline integrated starter/generator torque; rotating the engine and not providing engine torque to the driveline in response to the desired torque being less than the threshold driveline torque and greater than a threshold engine cranking torque; and not rotating the engine in response to the desired torque being less than the threshold engine cranking torque. The method further comprises rotating and operating the engine in response to a battery state of charge when the desired torque is less than the threshold engine cranking torque.

In one example, the method further comprises rotating the engine from a stopped state in response to the desired torque being greater than the threshold driveline integrated starter/generator torque. The method includes where the threshold driveline integrated starter/generator torque is less than a predetermined torque away from a rated driveline integrated starter/generator torque. The method includes where a driveline disconnect clutch is in a closed state when providing engine torque to the driveline propelling the vehicle. The method includes where a driveline disconnect clutch is in an open state when not providing engine torque to the driveline propelling the vehicle. The method includes where a threshold driveline integrated starter/generator torque varies with vehicle operating conditions.

The methods and systems of FIGS. 1-3 and 37-40 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to idle an engine at a first idle speed while the driveline disconnect clutch is in an open state, and executable instructions to idle the engine at a second idle speed, the second idle speed greater than the first idle speed, while the driveline disconnect clutch is in a closed state.

In one example, the vehicle system further comprises additional executable instructions for opening and closing the driveline disconnect clutch in response to a desired driveline torque. The vehicle system further comprises additional executable instructions to advance spark timing and reduce engine air amount in response to the engine operating at the first idle speed. The vehicle system further comprises additional executable instructions to retard spark timing and increase engine air amount relative to spark timing and engine air amount when the engine operated at the first idle speed. The vehicle system further comprises additional executable instructions to provide engine torque to the transmission in response to a desired torque being greater than a threshold driveline integrated starter/generator torque. The vehicle system further comprises additional executable instructions to not provide engine torque to the transmission in response to the desired torque being less than a threshold driveline integrated starter/generator torque.

The methods and systems of FIGS. 1-3 and 37-40 also provide for a driveline operating method, comprising: operating an engine at a predetermined sailing idle speed, the sailing idle speed less than a base engine idle speed; and opening a driveline disconnect clutch while the engine is operating at the predetermined sailing idle speed to decouple the engine from vehicle wheels. The method includes where the engine is operated at the predetermined sailing idle speed when a desired driveline torque is within a threshold range of a driveline integrated starter/generator (DISG) threshold torque and when the DISG is supplying torque to vehicle wheels and where vehicle is moving while the engine is at the predetermined sailing idle speed. The method includes where the DISG threshold torque is maximum torque capacity of the DISG.

In some examples, the method further comprises where spark timing is more advanced than spark timing at base engine idle speed. The method further comprising exiting sailing idle speed in response to a desired torque exceeds a threshold value. The method further comprises closing the driveline disconnect clutch in response to the desired torque exceeding the threshold value. The method includes where the driveline disconnect clutch is in a driveline positioned between the engine and a driveline integrated starter/generator.

The methods and systems of FIGS. 1-3 and 37-40 also provide for a driveline operating method, comprising: operating an engine at a predetermined sailing idle speed in response to an operating state where a driveline integrated starter/generator (DISG) lacks torque to start an engine from rest, the sailing idle speed less than a base engine idle speed; and opening a driveline disconnect clutch while the engine is operating at the predetermined sailing idle speed to decouple the engine from vehicle wheels. The method further comprises providing a desired driveline torque to vehicle wheels via a DISG while the engine is operating at the predetermined sailing idle speed.

In one example, the method further comprises exiting operating the engine at the predetermined sailing idle speed in response to a torque request greater than a threshold value. The method includes where the engine is decoupled from the DISG. The method includes where the engine is decoupled from a transmission. The method further comprises accelerating the engine to a speed of the DISG before closing the driveline disconnect clutch. The method includes where spark supplied to the engine while the engine is operating at the predetermined sailing idle speed is more advance than when the engine is operated at a base idle speed.

The methods and systems of FIGS. 1-3 and 37-40 also provide for a vehicle system, comprising: an engine; a dual mass flywheel (DMF) including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including non-transitory instructions executable to enter a sailing mode in response to a desired torque.

In one example, the vehicle system further comprises additional instructions to enter sailing mode in response to the desired torque output being within a threshold torque of a DISG torque capacity. The vehicle system further comprises additional instructions to enter sailing mode in response to insufficient available DISG torque to start the engine. The vehicle system further comprises additional instructions to exit sailing mode in response to the desired torque being greater than a threshold. The vehicle system further comprises additional instructions to increase engine speed in response to exiting sailing mode. The vehicle system further comprises additional instructions to close the driveline disconnect clutch when engine speed is substantially at DISG speed.

The methods and systems of FIGS. 1-3 and 37-40 also provide for a driveline operating method, comprising: providing torque from an engine to a driveline coupled to wheels; operating the engine at an idle speed and decoupling the engine from the driveline in response to a reduced driver demand torque; and providing a constant vehicle deceleration rate during the reduced driver demand torque. In this way, a driveline may conserve fuel while providing driveline braking and improving torque response.

In some examples, the method further comprises opening a driveline disconnect clutch in response to the reduced driver demand torque. The method includes where a driveline integrated starter/generator provides a negative torque to provide the constant vehicle deceleration rate. The method includes where the idle speed is a first idle speed, and where the first idle speed is lower than a second idle speed, the engine operated at the second idle speed when the engine is coupled to the driveline. The method includes where the engine is operated at the idle speed in response to the reduced driver demand torque being less than a driveline integrated starter/generator threshold torque. The method includes where the driveline integrated starter/generator threshold torque is greater than 75% of a rated driveline integrated starter/generator torque. The method includes where the torque provided from the engine is a positive torque.

The methods and systems of FIGS. 1-3 and 37-40 also provide for a driveline operating method, comprising: providing torque from an engine to a driveline coupled to wheels; operating the engine at idle speed and decoupling the engine from the driveline in response to a reduced driver demand torque; providing a constant vehicle deceleration rate at the reduced driver demand torque; and accelerating the engine to a speed in response to an increase in driver demand torque after operating the engine at the idle speed. The method includes where the speed is a driveline integrated starter/generator speed.

In some examples, the method further comprises closing a driveline disconnect clutch in response to the speed reaching the driveline integrated starter/generator speed. The method includes where the constant vehicle deceleration is provided via a driveline integrated starter/generator. The method includes where the driveline integrated starter/generator is operated in a regeneration mode charging a battery. The method includes where the idle speed is a first idle speed, and where the first idle speed is lower than a second idle speed, the engine operated at the second idle speed when the engine is coupled to the driveline. The method includes where the engine is operated at the idle speed in response to the reduced driver demand torque being less than a driveline integrated starter/generator threshold torque.

The methods and systems of FIGS. 1-3 and 37-40 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to provide a constant vehicle deceleration rate while idling the engine at a sailing mode idle speed.

In one example, the vehicle system includes where the sailing mode idle speed is a speed less than a base idle speed, the base idle speed provided when the engine is coupled to the DISG. The vehicle system further comprises additional instructions to open the driveline disconnect clutch in response to a decreasing driver demand torque. The vehicle system further comprises additional instructions to exit sailing mode idle speed in response to an increasing driver demand torque. The vehicle system further comprises additional instructions to increase engine speed from sailing mode idle speed in response to an increasing driver demand torque. The vehicle system includes where the constant vehicle deceleration rate is provided via the DISG.

The methods and systems of FIGS. 1-3 and 37-40 also provide for a driveline operating method, comprising: providing torque to a driveline via a driveline integrated starter/generator in response to a desired torque; and starting an engine and idling the engine without providing engine torque to the driveline in response to the driver demand torque being within a threshold range of an engine cranking torque. In this way, different levels of desired driveline torque may be the basis for entering or exiting sailing mode. The method includes where the threshold range is greater than 75% of engine cranking torque. The method includes where the DISG torque is provided to a torque converter. The method includes where the engine is started via the driveline integrated starter/generator. The method includes where a driveline disconnect clutch is in an open state while idling the engine. The method also includes where the desired torque is based on a driver demand torque. The method includes where the engine cranking torque is an amount of torque to accelerated the engine from zero speed to a speed less than 250 RPM.

The methods and systems of FIGS. 1-3 and 37-40 also provide for a driveline operating method, comprising: providing torque to a driveline via a driveline integrated starter/generator in response to a driver demand torque; starting an engine and idling the engine without providing engine torque to the driveline in response to the driver demand torque being within a threshold range of an engine cranking torque; and accelerating the engine to driveline integrated starter/generator speed in response to the driver demand torque increasing to a threshold driveline integrated starter/generator torque. The method further comprises closing a driveline disconnect clutch in response to the engine reaching the driveline integrated starter/generator speed.

In one example, the method further comprises providing engine torque to the driveline after closing the driveline disconnect clutch. The method includes where the engine is started via a starter other than the driveline integrated starter/generator. The method includes where the engine is started via the driveline integrated starter/generator. The method includes where the engine is idled at a sailing mode idle speed. The method includes where spark supplied to the engine while the engine is operating at the sailing mode idle speed is more advance than when the engine is operated at a base idle speed.

The methods and systems of FIGS. 1-3 and 37-40 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to accelerate a vehicle from zero speed via the DISG without starting the engine, and instructions to start the engine in response to a desired torque exceeding a threshold engine cranking torque.

In one example, the vehicle system further comprises additional instructions to idle the engine at a sailing idle speed without providing engine torque to the driveline. The vehicle system further comprises additional instructions to accelerate the engine from the sailing idle speed in response to an increasing desired torque. The vehicle system further comprises additional instructions to close the driveline disconnect clutch in response to engine speed reaching DISG speed. The vehicle system further comprises additional instructions to increase engine torque after closing the driveline disconnect clutch. The vehicle system includes where the engine cranking torque is an amount of torque to accelerate the engine from zero rotational speed to an engine speed of less than 250 RPM.

The methods and systems of FIGS. 1-3 and 37-40 also provide for a driveline operating method, comprising: providing positive torque to a driveline via a driveline integrated starter/generator; operating an engine at an idle speed in a speed control mode; and accelerating the engine in the speed control mode to driveline integrated starter/generator speed in response to a desired torque. In this way, torque converter torque may be controlled during a tip-in condition. The method includes where the desired torque is a driver demand torque, and where a driveline disconnect clutch positioned in the driveline between the engine and the driveline integrated starter/generator is in an open state.

In one example, the method further comprises closing the driveline disconnect clutch in response to engine speed reaching or exceeding driveline integrated starter/generator speed. The method includes where the idle speed is a sailing mode idle speed. The method includes where the sailing mode idle speed is a lower speed than a base engine idle speed. The method further comprises advancing engine spark timing while the engine operates in the sailing mode idle speed with respect to engine spark timing of the engine while operating the engine at the base engine idle speed. The method further comprises reducing an engine air amount while the engine operates in the sailing mode idle speed with respect to engine air amount while operating the engine at the base engine idle speed.

The methods and systems of FIGS. 1-3 and 37-40 also provide for a driveline operating method, comprising: providing positive torque to a driveline via a driveline integrated starter/generator; operating an engine at an idle speed in a speed control mode; adjusting torque converter clutch slip and accelerating the engine in the speed control mode to driveline integrated starter/generator speed in response to a desired torque; and closing a driveline disconnect clutch in response to engine speed substantially matching driveline integrated starter/generator speed. The method includes where adjusting torque converter slip includes increasing torque converter slip. The method further comprises reducing torque converter slip in response to the driveline disconnect clutch being in a closed state.

In some examples, the method includes where the idle speed is a sailing mode idle speed. The method includes where the sailing mode idle speed is a lower speed than a base engine idle speed. The method includes where the desired torque is increasing. The method includes where the desired torque increases to a torque greater than a threshold driveline integrated starter/generator torque.

The methods and systems of FIGS. 1-3 and 37-40 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to solely provide positive torque to the transmission via the DISG in response to a desired torque being less than an engine cranking torque, and instructions adjusting engine speed to follow DISG speed when DISG torque is greater and the engine cranking torque and less than a threshold DISG torque.

In one example, the vehicle system further comprises additional instructions to close the driveline disconnect clutch when engine speed is substantially equal to DISG speed. The vehicle system further comprises additional instructions to operate the engine in a torque control mode after closing the driveline disconnect clutch. The vehicle system further comprises additional instructions to operate the engine in a speed control mode while adjusting engine speed to follow DISG speed. The vehicle system further comprises additional instructions to provide the desired torque via the engine and the DISG. The vehicle system further comprises a torque converter and torque converter clutch, and further comprising additional instructions to increase torque converter clutch slip in response to the desired torque.

The methods and systems of FIGS. 1-3 and 37-40 also provide for a driveline operating method, comprising: providing torque to a driveline coupled to vehicle wheels via an engine and a driveline integrated starter/generator (DISG); and entering a sailing mode during select conditions, the sailing mode including providing DISG torque to the driveline and idling the engine without providing engine torque to the driveline. The method includes where the select conditions include where a catalyst temperature is less than a threshold temperature. The method includes where the select conditions include where a fuel vapor canister has stored more than a threshold amount of fuel vapor. The method includes where the select conditions include where a vacuum level is less than a threshold vacuum. The method includes where the select conditions include where an engine coolant temperature is less than a threshold temperature. The method includes where the select conditions include where a driver has selected a sport driving mode. The method includes where the engine is idled at a sailing mode idle speed that is a lower idle speed than a base idle speed when the engine is coupled to the DISG.

The methods and systems of FIGS. 1-3 and 37-40 also provide for a driveline operating method, comprising: providing torque to a driveline coupled to vehicle wheels via an engine and a driveline integrated starter/generator (DISG); entering a sailing mode during select conditions, the sailing mode including providing DISG torque to the driveline and idling the engine without providing engine torque to the driveline; and advancing spark timing and reducing engine air amount in response to entering the sailing mode. The method includes where the select conditions include where a catalyst temperature is less than a threshold temperature and where an energy storage device state of charge is equal to or greater than a threshold state of charge.

In some examples, the method includes where the select conditions include where a fuel vapor canister has stored more than a threshold amount of fuel vapor and where energy storage device state of charge is equal to or greater than a threshold state of charge. The method includes where the select conditions include where a vacuum level is less than a threshold vacuum and where an energy storage device state of charge is equal to or greater than a threshold state of charge. The method includes where the select conditions include where an engine coolant temperature is less than a threshold temperature and where an energy storage device state of charge is equal to or greater than a threshold state of charge. The method includes where the select conditions include where a driver has selected a sport driving mode and where an energy storage device state of charge is equal to or greater than a threshold state of charge. The method includes where the engine is idled at a sailing mode idle speed that is a lower idle speed than a base idle speed when the engine is coupled to the DISG.

The methods and systems of FIGS. 1-3 and 37-40 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to enter a sailing mode during select conditions, where the engine is operated at a sailing mode idle speed without providing engine torque to the transmission and where DISG torque is provided to the transmission, where the select conditions include battery state of charge being equal or greater than a threshold battery charge.

In one example, the vehicle system further comprises additional instructions to purge fuel vapors during the sailing mode. The vehicle system further comprises additional instructions to generate vacuum during the sailing mode. The vehicle system further comprises additional instructions to increase catalyst temperature during the sailing mode. The vehicle system further comprises additional instructions to increase engine temperature during the sailing mode. The vehicle system includes where the threshold battery charge is a rated battery charge.

Figure 41:
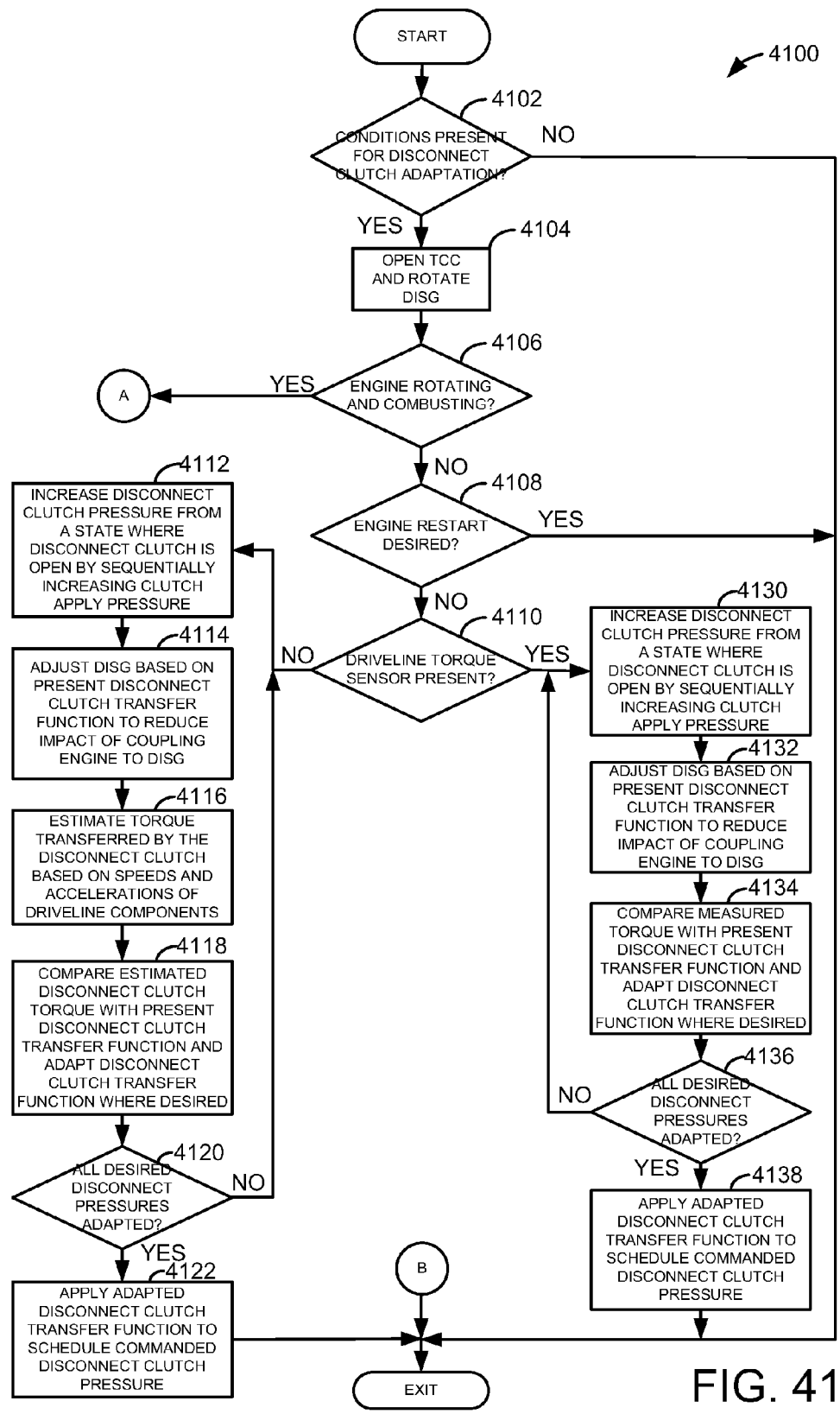
FIGS. 41-44 show methods and prophetic sequences for adapting driveline disconnect clutch operation.
Figure 42:
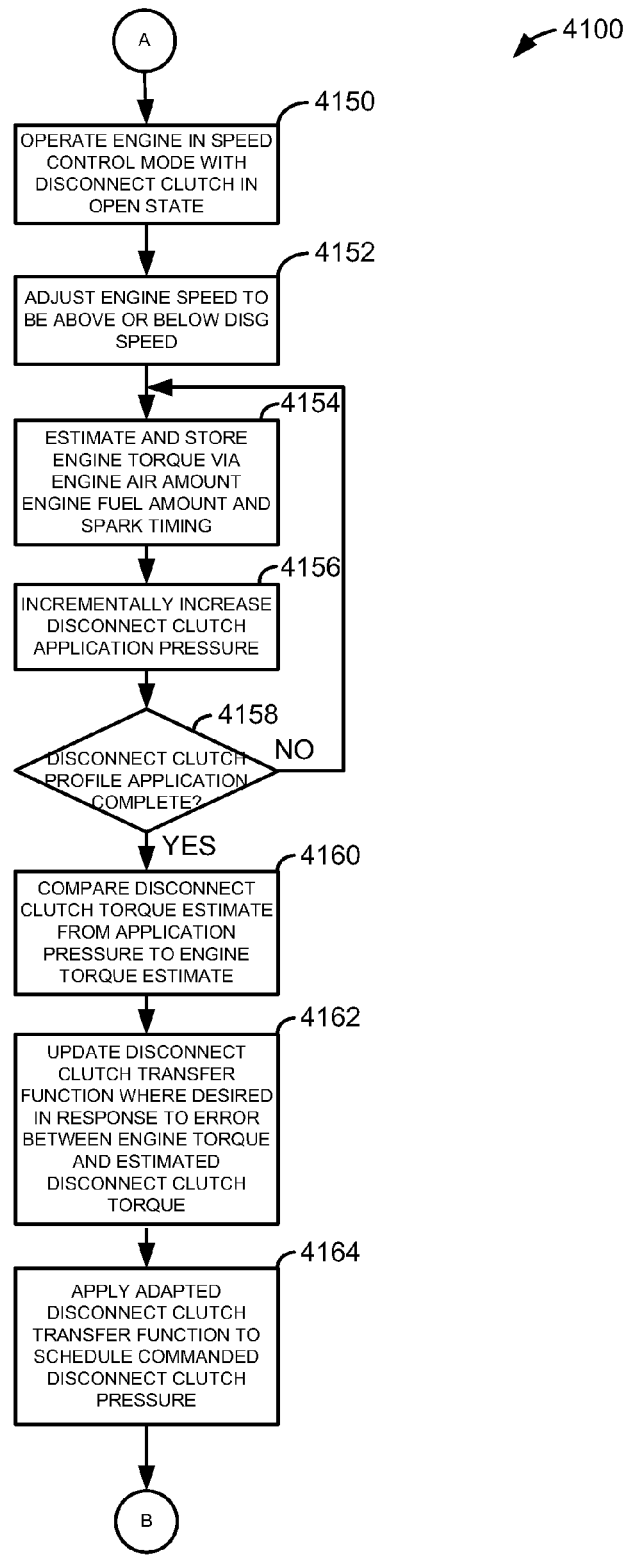

Referring now to FIGS. 41 and 42, a flowchart of a method for adapting a driveline disconnect clutch transfer function is shown. The method of FIGS. 41 and 42 may be stored as executable instructions in non-transitory memory of controller 12 in FIGS. 1-3.

At 4102, method 4100 judges whether or not conditions are present for driveline disconnect clutch adaptation. Driveline disconnect clutch adaptation may be implemented starting with the driveline disconnect clutch in an open state and after the driveline disconnect clutch reaches a predetermined operating temperature and after the engine and DISG reach selected operating conditions, such as minimum engine and DISG operating temperatures. In still another example, driveline disconnect clutch adaptation may be provided during conditions where torque converter impeller speed is greater than torque converter turbine speed. If method 4100 judges that conditions are present for driveline disconnect clutch adaptation, the answer is yes and method 4100 proceeds to 4104. Otherwise, the answer is no and method 4100 proceeds to exit.

At 4104, method 4100 opens the torque converter clutch (TCC) and the DISG is rotated if there is no torque sensor or if the engine is not rotating and combusting. If there is a torque sensor, torque measurement is not based on impeller speed. If the engine is rotating and combusting the method of FIG. 42 does not require the DISG to be turning. When DISG rotation is required, the DISG rotates under its own power via current supplied by an energy storage device. In one example, the DISG is rotated at less than 1000 RPM so that very little torque is transferred through the torque converter to the transmission. Thus, the DISG may be rotated at a speed that provides less than a threshold amount of torque through the torque converter to the transmission. Method 4100 proceeds to 4106 after the TCC is opened.

At 4106, method 4100 judges whether or not the engine is rotating and combusting an air-fuel mixture. In one example, the engine may be judged to be rotating and combusting an air fuel mixture when engine speed is greater than a threshold speed. If method 4100 judges that the engine is rotating and combusting an air-fuel mixture, the answer is yes and method 4100 proceeds to 4150. Otherwise, the answer is no and method 4100 proceeds to 4108.

At 4150, method 4100 operates the engine in a speed control mode. Further, the vehicle speed may be zero. The engine may be combusting an air-fuel mixture when driveline disconnect clutch adaptation begins or the engine may be started via a starter or the DISG. The converter clutch is in an open state and engine speed is controlled via varying engine torque by way of the engine throttle, spark timing, cam timing, valve lift, fuel injection or other actuators. Method 4100 proceeds to 4152 after the engine is put in a speed control mode.

At 4152, method 4100 adjusts engine speed to be above or below DISG speed. For example, if DISG speed is 400 RPM, engine speed may be adjusted to 800 RPM. Alternatively, engine speed can be adjusted to 700 RPM if DISG speed is 800 RPM, for example. Method 4100 proceeds to 4154 after engine speed is adjusted.

At 4154, method 4100 estimates engine torque and stores the estimated engine torque in memory. Engine torque may be estimated as is described in U.S. Pat. No. 7,066,121. Alternatively, engine torque may be estimated via other known methods. For example, engine torque may be empirically determined at selected engine speeds and engine loads. The empirical data is stored in controller memory and retrieved via indexing tables or functions based on present engine speed and load. Method 4100 proceeds to 4156 after engine torque is estimated.

At 4156, method 4100 incrementally increases the driveline disconnect clutch application pressure. In one example, the driveline disconnect clutch application pressure may be increased via increasing a duty cycle of a driveline disconnect clutch control signal. A higher duty cycle increases oil pressure supplied to the driveline disconnect clutch. The incremental increase in driveline disconnect application pressure may be predetermined and stored in memory as a driveline disconnect clutch transfer function. The driveline disconnect clutch transfer function relates driveline disconnect clutch application pressure and driveline disconnect clutch input torque and outputs a driveline disconnect clutch output torque. The driveline disconnect clutch transfer function may also be used to select a driveline disconnect clutch application pressure by indexing the transfer function via desired clutch output torque and clutch input torque.

The driveline disconnect clutch application pressure or force, engine speed, and DISG speed are stored in memory each time the driveline disconnect clutch application pressure is increased. Each time the disconnect clutch torque is changed to a new level (there may be multiple levels used in sequence to learn the clutch transfer function as per method 4130 and FIG. 43), the system needs may wait for engine speed to stabilize at the desired engine speed and then a new estimate of engine torque is stored. Once the engine speed controller has rejected any disturbance from the change in disconnect clutch torque, store both the estimated engine torque and the estimated disconnect clutch torque for use at 4160. The engine controller may use the estimated disconnect clutch pressure or capacity and the sign of the slip across the disconnect clutch to proactively increase or decrease engine torque as appropriate, or the engine control may only use feedback control to compensate engine speed for changes in disconnect clutch pressure. Method 4100 proceeds to 4158 after the driveline disconnect clutch application pressure is increased.

At 4158, method 4100 judges whether or not the driveline disconnect clutch application profile has been completely applied. In one example, the driveline disconnect clutch application profile provides only enough pressure to transmit minimal torque (e.g. 2 Nm) for one clutch plate to just begin to touch the other clutch plate. In other examples, the driveline disconnect clutch application profile may transition from fully open to fully closed. If method 4100 judges that not all application pressures of the driveline disconnect clutch profile have been applied, the answer is no and method 4100 returns to 4154. Otherwise, the answer is yes and method 4100 proceeds to 4160.

At 4160, method 4100 compares the driveline disconnect clutch torque estimate(s) from the driveline disconnect clutch transfer function to the engine torque estimate(s) stored when engine speed was stabilized at the desired speed at each of the commanded disconnect clutch pressures when the driveline disconnect clutch transfer function is applied via incrementing the driveline disconnect clutch application pressure. For example, if the driveline disconnect clutch transfer function outputs a driveline disconnect clutch duty cycle of 35% (corresponding to a desired driveline disconnect clutch application pressure or force) for achieving a desired disconnect clutch output torque of 50 N-m when the driveline disconnect clutch input torque is 85 N-m, but the driveline disconnect clutch output torque is 45 N-m as estimated by the engine torque estimator, it may be judged that the driveline disconnect clutch transfer function has an error of 5 N-m when the 35% duty cycle is applied to the driveline disconnect clutch when the driveline disconnect clutch input torque is 85 N-m. The difference between the desired driveline disconnect clutch torque and the engine torque may be determined for each set of operating conditions where the driveline disconnect clutch transfer function was applied at 4156. Method 4100 proceeds to 4162 after the driveline disconnect clutch torque as defined by the driveline disconnect clutch transfer function is compared to the torque estimated by the engine when the driveline disconnect clutch application pressure is incremented.

At 4162, method 4100 updates the driveline disconnect clutch transfer function at selected entries in response to error between driveline disconnect clutch torque estimated by the engine and driveline disconnect clutch torque expected based on the driveline disconnect clutch transfer function. In one example, if the driveline disconnect clutch torque estimated by the engine differs from the driveline disconnect clutch torque estimated from the driveline disconnect clutch transfer function, the driveline disconnect clutch torque estimated by the engine replaces the corresponding driveline disconnect clutch torque value in the driveline disconnect clutch transfer function. In this way, the engine torque estimator may be the basis for adjusting the driveline disconnect clutch transfer function. Method 4100 proceeds to 4164 after the disconnect transfer function is updated at selected values where driveline disconnect clutch torque estimated by the engine disagrees with driveline disconnect clutch torque described in the driveline disconnect clutch transfer function.

If the difference between the engine torque based estimated disconnect clutch torque and the previous disconnect clutch torque is above a threshold, the adaptation sequence may be rerun to test the system again at the next opportunity and the adaptation sequence may be executed until the system is successfully adapted. It should be noted that all adaptation methods described herein may be executed more frequently, sooner, or immediately in response to a magnitude in error of the driveline disconnect clutch transfer function.

At 4164, method 4100 applies the revised driveline disconnect clutch transfer function to scheduled driveline disconnect clutch pressure. For example, when an adjustment to driveline disconnect clutch pressure is requested, the driveline disconnect clutch pressure is output based on the revised driveline disconnect clutch transfer function at 4162. Method 4100 exits after the revised driveline disconnect clutch pressures are output.

At 4108, method 4100 judges whether or not an engine restart is requested. If engine rotation is stopped at 4108 it may be restarted if desired. If an engine restart is requested during driveline disconnect clutch adaptation, it may be possible that errors may be present in the adapted driveline disconnect clutch transfer function. Therefore, driveline disconnect clutch adaption is not performed during engine restarts. If method 4100 determines that an engine restart is desired, the answer is yes and method 4100 proceeds to exit. Otherwise, the answer is no and method 4100 proceeds to 4110.

At 4110, method 4100 judges whether or not a driveline torque sensor is present to detect driveline torque. If method 4100 judges that a driveline torque sensor is present, the answer is yes and method 4100 proceeds to 4130. Otherwise, the answer is no and method 4100 proceeds to 4112.

Note that in some examples, driveline disconnect clutch adaptation based on the torque converter (e.g., 4112-4122) or the torque sensor (e.g., 4130-4138) may be conducted simultaneously with the engine torque based estimate of driveline disconnect clutch torque (e.g., 4150-4164) if the engine and DISG speeds are kept separate (e.g., the driveline disconnect clutch slips) and the engine controller is operated in closed loop engine speed control.

At 4130, method 4100 increases driveline disconnect clutch pressure from a state where the driveline disconnect clutch is in a fully open state by sequentially increasing driveline disconnect clutch application pressure. The driveline disconnect clutch pressure may be increased at a predetermined rate or according to a predetermined group of selected driveline disconnect clutch application pressure increments. Method 4100 proceeds to 4132 after increasing the driveline disconnect clutch application pressure. The DISG may be operated in speed feedback mode with a constant commanded speed (e.g. idle speed ~700 RPM). Alternatively, the DISG speed may be chosen as a lower speed to reduce energy consumption At 4132, method 4100 adjusts DISG torque based in the present driveline disconnect clutch transfer function that is subject to adaptation after the driveline disconnect clutch application procedure is completed. In particular, the DISG torque is increased based on the amount of torque estimated to be transferred from the DISG to the engine via the driveline disconnect clutch according to the driveline disconnect clutch transfer function. Method 4100 proceeds to 4134 after the DISG torque is adjusted.

At 4134, method 4100 compares the amount of torque transferred by the driveline disconnect clutch to the commanded driveline disconnect clutch transfer torque (e.g., the amount of driveline disconnect clutch torque requested via the driveline disconnect clutch transfer function). In one example, the driveline disconnect clutch torque may be determined via the following equations depending on the location of the driveline torque sensor:

If the torque sensor is at the torque converter impeller:

$$\hat{T}_{clutch} = I_{elec\_machine} \cdot \dot{N}_{impeller} + T_{sensor} - T_{elec\_machine}$$

If the torque sensor is at the torque converter turbine/input shaft:

$$\hat{T}_{clutch} = I_{elec\_machine} \cdot \dot{N}_{impeller} + T_{sensor} - T_{elec\_machine} - T_{turbine}$$

Where $$T_{turbine} = \frac{N_{impeller}^2 \cdot TR\left(\frac{N_{turbine}}{N_{impeller}}\right)}{cpc^2\left(\frac{N_{turbine}}{N_{impeller}}\right)} + T_{conv\_clutch}$$

Where $\hat{T}_{clutch}$ is the estimated driveline disconnect clutch torque, $I_{elec\_machine}$ is the inertia of the DISG, $N_{impeller}$ is the torque converter impeller speed, $T_{sensor}$ is the torque measured via the torque sensor, $T_{elec\_machine}$ is the torque output of the DISG, $T_{turbine}$ is the torque of the torque converter turbine, cpc is the torque converter capacity factor, $N_{turbine}$ is the torque converter turbine speed, and $T_{conv\_clutch}$ is the torque converter clutch torque.

During conditions where torque converter turbine speed is less than torque converter impeller speed, the torque converter clutch is open, the driveline disconnect clutch is open (e.g., a desirable case is vehicle at rest with impeller spinning ~700 rpm), adaptively correct the capacity factor (cpc) of the torque converter based on motor torque and impeller acceleration using the above equations. During conditions where the torque converter impeller is spinning, the driveline disconnect clutch is open, and engine restart is not commanded, driveline disconnect clutch torque are commanded sequentially higher. Based on the current estimate of the driveline disconnect clutch stroke pressure or touch-point (e.g., driveline disconnect clutch is commanded to a point where the driveline disconnect clutch plates on the input and output sides of the driveline disconnect clutch first contact when the driveline disconnect clutch is transitioning from an open state to a partially closed state) of the driveline disconnect clutch, the driveline disconnect clutch torque is compensated via DISG torque to reduce vehicle drivability impact. In one example, the DISG torque is increased in proportion to an amount of the estimated driveline disconnect clutch torque based on the present clutch transfer function.

The driveline disconnect clutch torque estimate may be compared to the measurement from the torque sensor with appropriate compensation for torques and inertias between driveline disconnect clutch and torque sensor. The driveline disconnect clutch stroke pressure/touchpoint may be adaptively adjusted. In one example, the driveline disconnect clutch transfer function is adjusted via replacing a value in the driveline disconnect clutch transfer function with the estimated driveline disconnect clutch torque. Alternatively, the driveline disconnect clutch transfer function may be adjusted based on an error between the driveline disconnect clutch transfer function and the estimated driveline disconnect clutch torque.

If the commanded driveline disconnect clutch torque is less than or greater than the amount of torque transferred by the driveline disconnect clutch by a predetermined amount, the driveline disconnect clutch torque value in the driveline disconnect clutch transfer function at the operating point is adjusted to the measured driveline disconnect clutch torque.

In this way, the driveline disconnect clutch transfer function can be adjusted to provide an improved estimate of the amount of torque transferred by the driveline disconnect clutch. Method 4100 proceeds to 4136 after the driveline disconnect clutch transfer function has been assessed and/or adapted at the present operating conditions.

At 4136, method 4100 judges whether or not all the desired portions of the driveline disconnect clutch transfer function have been assessed and/or adjusted at all desired driveline disconnect clutch application pressures. If so, the answer is yes and method 4100 proceeds to 4138. Otherwise, the answer is no and method 4100 returns to 4130 where the driveline disconnect clutch application pressure is increased and the driveline disconnect clutch torque transfer function is evaluated at a new operating condition.

At 4138, method 4100 applies the revised driveline disconnect clutch transfer function to scheduled driveline disconnect clutch pressure. For example, when an adjustment to driveline disconnect clutch pressure is requested, the driveline disconnect clutch pressure is output based on the revised driveline disconnect clutch transfer function at 4134. Method 4100 exits after the revised driveline disconnect clutch pressures are output.

At 4112, method 4100 increases the driveline disconnect clutch application pressure from a state where the driveline disconnect clutch is fully opened as described at 4130. The vehicle speed may be zero at this time and the driveline disconnect clutch command may be incrementally increased to increase driveline disconnect clutch application pressure or force. Method 4100 proceeds to 4114 after the driveline disconnect clutch application pressure is adjusted.

At 4114, method 4100 adjusts the DISG torque as described at 4132. Method 4100 proceeds to 4116 after the DISG torque is adjusted.

At 4116, method 4100 estimates the torque transferred by the driveline disconnect clutch based on speeds and accelerations of driveline components. In one example, the torque transferred by the driveline disconnect clutch may be estimated via the following equations:

$$I_{impeller} \cdot \dot{N}_{impeller} = T_{clutch} + T_{elec\_mach} + T_{conv}$$

Where:

$$T_{conv} = \frac{N_{impeller}^2}{cpc^2\left(\frac{N_{turbine}}{N_{impeller}}\right)} + T_{conv\_clutch}$$

Solving for driveline disconnect clutch torque:

$$\hat{T}_{clutch} = I_{impeller} \cdot \dot{N}_{impeller} - T_{elec\_mach} + T_{conv}$$

Where $I_{impeller}$ the torque converter impeller inertia, $N_{impeller}$ is torque converter impeller speed, $T_{clutch}$ is torque of the driveline disconnect clutch, $T_{elec\_machine}$ is the DISG torque, $T_{conv}$ is torque converter impeller torque, cpc is the torque converter capacity factor, $N_{turbine}$ is the torque converter turbine speed, and $T_{conv\_clutch}$ the torque converter clutch torque.

During conditions where torque converter turbine speed is less than torque converter impeller speed, torque converter bypass clutch is open, driveline disconnect clutch is open (e.g., a desirable case is vehicle at rest with impeller spinning ~700 rpm), the capacity factor (cpc) of the torque converter, which is based on motor torque and impeller acceleration, is adaptively corrected via equations above. During conditions where the impeller is spinning, the driveline disconnect clutch is open, and engine restart is not commanded, sequentially higher driveline disconnect clutch torques are commanded. The driveline disconnect clutch torque is compensated via DISG torque to reduce drivability impact. The driveline disconnect clutch torque is based on the current estimate of the driveline disconnect clutch stroke pressure or the touchpoint of the driveline disconnect clutch.

For example, DISG torque is increased as the driveline disconnect clutch torque is increased. In one example, the DISG torque is increased in proportion to the torque transferred via the driveline disconnect clutch. The driveline disconnect clutch torque estimate is compared to a driveline disconnect clutch torque calculated using the equations above based on other torques, speeds, and accelerations at 4118. Then the driveline disconnect clutch stroke pressure/touchpoint of the driveline disconnect clutch is adaptively updated at 4118. Method 4100 proceeds to 4118 after the amount of torque transferred by the driveline disconnect clutch is estimated.

At 4118, method 4100 compares the estimated torque transferred by the driveline disconnect clutch with the driveline disconnect clutch torque from the present driveline disconnect clutch transfer function as described at 4134. The comparison may be performed by subtracting the estimated driveline disconnect clutch torque from the desired driveline disconnect clutch torque to provide an error that is the basis for adapting the driveline disconnect clutch transfer function. When the error is greater than a predetermined amount, the estimated driveline disconnect clutch torque replaces the value of driveline disconnect clutch in the driveline disconnect clutch transfer function or is the basis for adjusting the driveline disconnect clutch transfer function. Method 4100 proceeds to 4120 after the estimated amount of torque transferred by the driveline disconnect clutch is compared to the driveline disconnect clutch torque from the driveline disconnect clutch transfer function.

At 4120, method 4100 judges whether or not all the desired portions of the driveline disconnect clutch transfer function have been assessed and/or adjusted at all desired driveline disconnect clutch application pressures. If so, the answer is yes and method 4100 proceeds to 4122. Otherwise, the answer is no and method 4100 returns to 4112 where the driveline disconnect clutch application pressure is increased and the driveline disconnect clutch torque transfer function is evaluated at a new operating condition.

At 4122, method 4100 applies the revised driveline disconnect clutch transfer function to scheduled driveline disconnect clutch pressure. For example, when an adjustment to driveline disconnect clutch pressure is requested, the driveline disconnect clutch pressure is output based on the revised driveline disconnect clutch transfer function at 4118. Method 4100 exits after the revised driveline disconnect clutch pressures are output.

In some examples, a driveline disconnect clutch may be used in combination with a dual clutch automatic transmission (DCT) (e.g., FIG. 3). In these applications, the DISG may be used as a torque sensing device to measure the DCT launch clutch torque as a function of the commanded DCT launch clutch torque at the low torque levels that the launch clutch operates at during an engine restart and launch. The gain and/or offset may then be updated in the DCT launch clutch torque tables to match the actual input to output torque.

One example of using the DISG to sense the DCT launch clutch torque includes: measuring the DCT launch clutch torque when the vehicle is stopped and the brakes are applied, e.g. when the vehicle is at rest and the operator is applying the brake or the brake system is being commanded to delay the brake release. Such operation may be used to prevent the change in the DCT launch clutch torque from being either transmitted to the wheels or effecting the vehicle acceleration.

In some examples, the driveline disconnect clutch may be open. An open driveline disconnect clutch removes engine and/or dual mass flywheel (DMF) torque or compliance interactions that may impact the ability of the DISG to accurately sense the DCT launch clutch torque. The DISG may be operated in speed feedback mode with a constant commanded speed, e.g. idle speed ~700 RPM. The DISG speed may be chosen as a lower speed to reduce energy consumption. The DISG speed may be set to maintain the hydraulic pressure in the automatic transmission (AT) by using the DISG to spin the transmission hydraulic pump. Operating the DISG to maintain transmission oil pressure applies to a DCT with hydraulic clutches versus, a dry clutch DCT.

In some examples, the DCT launch clutch is fully open (e.g. with zero torque capacity) when a DISG torque estimate is learned. The DISG torque estimate is the basis for recording the open DCT launch clutch torque at the commanded DISG speed. The DISG torque estimate is a function of DISG three phase currents or of a commanded torque from an inner loop of the DISG speed feedback control. The DCT launch clutch is commanded to operate over a desired torque range after the open DCT launch clutch torque has been determined from the DISG torque estimate. The DCT launch clutch torques for each commanded torque in the desired torque range is determined from DISG torque determined at each commanded torque. A DCT launch clutch error torque is determined as a difference between the open DCT launch clutch torque measure and the sensed torque from the DISG three phase current torque estimate or the commanded torque. The DISG may be operated in speed feedback mode which includes an inner torque loop when determining the DCT launch clutch torque. The DCT torque table or transfer function is updated to the according to the observed DISG torque.

Further, variability in the actuation and estimation of torque transferred via a TCC may be a noise factor that can contribute to poor drivability of the vehicle system. If the TCC torque is not actuated correctly, due to errors in the commanded vs. the actual TCC torque during the engine restart process, the torque transferred to the wheels may be less than desired and the launch performance and drivability may be degraded.

The DISG may be operated as a torque sensing device to measure torque transferred via the TCC as a function of the commanded TCC torque during engine starting. The low torque levels transmitted via the TCC during engine starting and launch may be the basis for updating gain and/or offset values in TCC torque tables so that table values match the actual input to output torque.

One example of operating the DISG to sense the transferred TCC torque includes: measuring the TCC torque via the DISG when the vehicle is stopped and when the brakes are applied (e.g. when the vehicle is at rest and the operator is applying the brake). Another example includes estimating the transferred TCC torque via the DISG when automatic transmission clutches tie-up transmission output for hill hold purposes. Tying up the transmission reduces the possibility of transferred TCC torque being transmitted to vehicle wheels.

The torque transferred via the TCC may be more accurately determined when the driveline disconnect clutch is open since it removes engine, dual mass flywheel, or compliance interactions that may influence DISG torque estimates. The DISG may be operated in speed feedback mode at a low constant commanded speed (e.g. idle speed ~700 RPM) to reduce energy consumption when the DISG is the basis for TCC torque transfer estimates. The DISG speed may also be adjusted to maintain hydraulic pressure in the torque converter by rotating the transmission via the DISG.

The TCC transfer function, which describes the amount of torque transferred by the TCC at selected application pressures or forces, may be adapted based on DISG torque estimates. In one example, the TCC is commanded fully open (e.g. with zero torque capacity) and torque converter output is estimated based on DISG current. The DISG current is converted to a torque which is subtracted from torques determined at other TCC commands where the TCC is not commanded fully open. Thus, a torque offset is determined and stored to memory when the TCC is commanded fully open. The TCC is then commanded in increments over a desired torque range while DISG torque is estimated from DISG current at each commanded torque. A TCC transfer torque error amount is determined from a difference between the TCC open loop torque command (e.g., the TCC transfer function) and TCC torque as determined from the DISG three phase current. The TCC transfer function may be updated based on the TCC transfer torque error. In one example, a fraction of each TCC transfer torque error is added to the present value in the TCC transfer function that corresponds to the TCC transfer torque error.

In this way, the driveline disconnect clutch transfer function may be revised so that the driveline disconnect clutch may be applied more accurately. Further, the driveline disconnect clutch transfer function may be revised without taking actions that may be noticeable to the driver.

Figure 43:
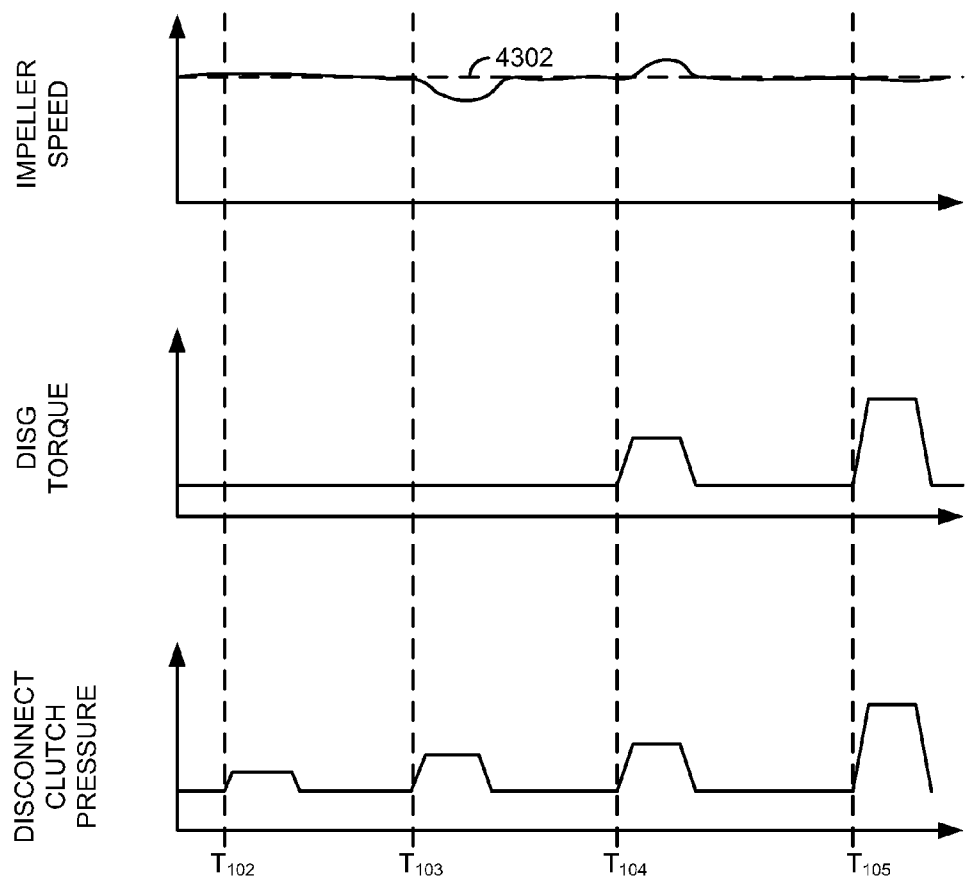

Referring now to FIG. 43, an example sequence for updating or adapting a driveline disconnect clutch transfer function according to the methods of FIGS. 41 and 42 is shown. The sequence of FIG. 43 may be provided by the system of FIGS. 1-3.

The first plot from the top of FIG. 43 represents torque converter impeller speed versus time. The Y axis represents torque converter impeller speed and torque converter impeller speed increases in the direction of the Y axis arrow. The X axis represents time and time increases from the left hand side of the figure to the right hand side of the figure. Horizontal line 4302 represents a desired torque converter impeller speed.

The second plot from the top of FIG. 43 represents DISG torque versus time. The Y axis represents DISG torque and DISG torque increases in the direction of the Y axis arrow. The X axis represents time and time increases from the left hand side of the figure to the right hand side of the figure.

The third plot from the top of FIG. 43 represents the driveline disconnect clutch application force or pressure versus time. The Y axis represents driveline disconnect clutch application force or pressure and the application force or pressure increases in the direction of the Y axis arrow. The X axis represents time and time increases from the left hand side of the figure to the right hand side of the figure.

Before time $T_{102}$, the torque converter impeller speed is at the desired torque converter impeller speed 4302 and the DISG torque is at a lower level. The driveline disconnect clutch pressure is also at a lower value. If the DISG is in speed control, the magnitude of the change in DISG torque required to hold the desired impeller speed may be used as the torque estimation mechanism similar to the way engine torque is used in FIG. 42.

At time $T_{102}$, the driveline disconnect clutch pressure is increased in response to a request to increase torque transferred by the driveline disconnect clutch. The DISG torque is not increased since the driveline disconnect clutch transfer function indicates that torque is not transferred by the driveline disconnect clutch at the present commanded value. The torque converter impeller speed remains at the desired torque converter impeller speed, or DISG torque is not required to change while in closed loop speed control mode, and it indicates that the driveline disconnect clutch torque transfer function that estimates driveline disconnect clutch torque is correct. The driveline disconnect pressure is reduced after it is increased so that the next increase in disconnect clutch pressure may be initiated from a known condition.

At time $T_{103}$, the driveline disconnect clutch pressure is increased a second time in response to a request to increase torque transferred by the driveline disconnect clutch. The DISG torque is again not increased since the driveline disconnect clutch transfer function indicates that torque is not transferred by the driveline disconnect clutch at the present commanded value. The torque converter impeller speed decreases, or DISG torque increases due to closed loop rpm control, to indicate that the driveline disconnect clutch torque transfer function is under estimating the driveline disconnect clutch torque that is transferred. The driveline disconnect clutch transfer function error may be determined from a torque sensor at the disconnect clutch, DISG current, or from a model as described at 4116. The driveline disconnect clutch transfer function is adjusted based on the error. In particular, in this example, the torque estimated for the output command is reduced by a predetermined amount. Alternatively, the output command for the driveline disconnect clutch may be reduced by a predetermined amount. The driveline disconnect pressure is reduced after it is increased so that the next increase in disconnect clutch pressure may be initiated from a known condition.

At time $T_{104}$, the driveline disconnect clutch pressure is increased a third time in response to a request to increase torque transferred by the driveline disconnect clutch. The DISG torque is increased since the driveline disconnect clutch transfer function indicates that torque is transferred by the driveline disconnect clutch at the present commanded value. The torque converter impeller speed increases, or DISG torque is adjusted via the closed loop rpm control to not increase as much as the disconnect clutch transfer function would indicate, to indicate that the driveline disconnect clutch torque transfer function is over estimating the driveline disconnect clutch torque that is transferred. The driveline disconnect clutch transfer function error may be determined and the driveline disconnect clutch transfer function is adjusted based on the error. In particular, in this example, the torque estimated for the output command is increased by a predetermined amount. Alternatively, the output command for the driveline disconnect clutch may be increased by a predetermined amount. The driveline disconnect pressure is reduced after it is increased so that the next increase in disconnect clutch pressure may be initiated from a known condition.

At time $T_{105}$, the driveline disconnect clutch pressure is increased a fourth time in response to a request to increase torque transferred by the driveline disconnect clutch. The DISG torque is increased since the driveline disconnect clutch transfer function indicates that torque is transferred by the driveline disconnect clutch at the present commanded value. The torque converter impeller speed stays constant to indicate that the driveline disconnect clutch torque transfer function is correctly estimating the driveline disconnect clutch torque that is transferred. The driveline disconnect clutch transfer function is not adjusted since there is less than a threshold amount of error in the estimate of driveline disconnect clutch torque transfer. The driveline disconnect pressure is reduced after it is increased so that the next increase in disconnect clutch pressure may be initiated from a known condition.

In this way, a transfer function that describes torque transferred by a driveline disconnect clutch may be adapted. Each driveline disconnect clutch application pressure in the transfer function may be adapted in this way so that the entire transfer function may be revised as the vehicle ages.

Figure 44:
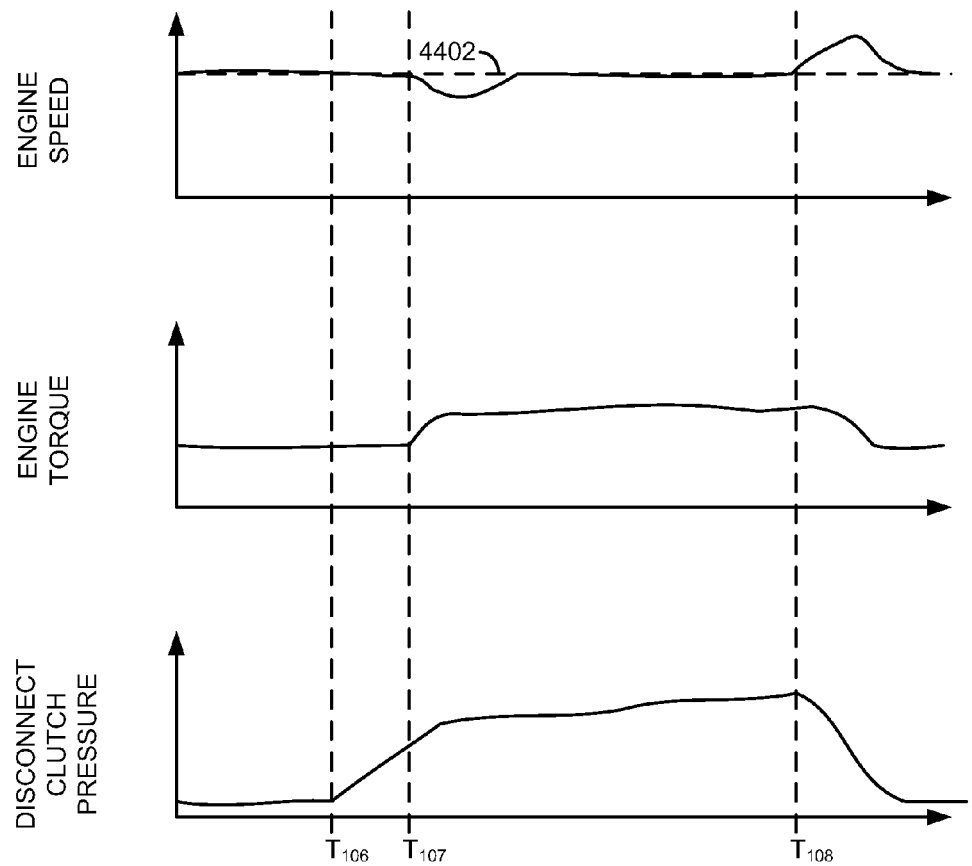

Referring now to FIG. 44, an example sequence for updating or adapting a driveline disconnect clutch transfer function according to the method of FIG. 42 is shown. The sequence of clutch torques shown in FIG. 43 may be applied to the sequence of FIG. 42. The sequence of FIG. 44 may be provided by the system of FIGS. 1-3.

The first plot from the top of FIG. 44 represents engine speed versus time. The Y axis represents engine speed and engine speed increases in the direction of the Y axis arrow. The X axis represents time and time increases from the left hand side of the figure to the right hand side of the figure. Horizontal line 4402 represents a desired engine speed.

The second plot from the top of FIG. 44 represents engine torque versus time. The Y axis represents engine torque and engine torque increases in the direction of the Y axis arrow. The X axis represents time and time increases from the left hand side of the figure to the right hand side of the figure.

The third plot from the top of FIG. 44 represents the driveline disconnect clutch application force or pressure versus time. The Y axis represents driveline disconnect clutch application force or pressure and the application force or pressure increases in the direction of the Y axis arrow. The X axis represents time and time increases from the left hand side of the figure to the right hand side of the figure.

Before time $T_{106}$, the engine speed is at the desired engine speed 4402 and the engine torque is at a lower level. The driveline disconnect clutch pressure is also at a lower value and commanding the driveline disconnect clutch to an open position. The engine is in a speed control mode and engine torque is determined from engine speed and engine load (e.g., present engine air mass divided by theoretical air mass the engine is capable of inducting whether naturally aspirated or supercharged). The DISG and torque converter speed (not shown) are adjusted to a speed that is different than the desired engine speed.

At time $T_{106}$, the driveline disconnect clutch pressure is increased in response to a request to increase torque transferred by the driveline disconnect clutch. The DISG speed (not shown) remains constant and the desired engine speed remains constant as the driveline disconnect clutch application force is increased. The engine torque initially remains at a constant level as the driveline disconnect clutch is gradually closed.

At time $T_{107}$, the driveline disconnect clutch pressure continues to increase and the engine speed begins to decelerate to a speed less than the desired engine speed. The engine speed control loop increases engine torque (e.g., via opening the engine throttle) in response the difference between desired engine speed and actual engine speed. The estimated driveline disconnect clutch torque is the difference between the engine torque before time $T_{106}$ and the engine torque at time after $T_{106}$ when the driveline disconnect clutch application force is increased (e.g., at time shortly after time $T_{107}$). The driveline disconnect clutch transfer function which outputs a driveline disconnect clutch application force or pressure in response to a desired driveline disconnect clutch torque may be adjusted based on the estimated driveline torque.

In this example, the driveline disconnect clutch transfer function entries that deviate from the estimated driveline disconnect clutch torque values determined at the commanded driveline disconnect clutch pressures may be updated to the estimated driveline disconnect clutch torque or by a fraction of the error if they vary from the estimated driveline disconnect clutch torque by more than a threshold amount of torque. The driveline disconnect clutch transfer function may be updated as the adaption process occurs or after the sequence is complete. It should also be noted that the engine speed may increase instead of decrease at time $T_{107}$ when torque converter impeller speed is greater than engine speed. In this example, torque converter impeller speed is adjusted to a speed greater than engine speed so that engine speed increases at time $T_{107}$ when the driveline disconnect clutch is closed.

At time $T_{108}$, the driveline disconnect clutch pressure is decreased in response to a request to decrease torque transferred by the driveline disconnect clutch. The actual engine speed is greater than the desired engine speed after the driveline disconnect clutch application pressure is reduced. The driveline disconnect clutch transfer function may be updated when the estimated driveline disconnect clutch torque varies from the entry in the driveline disconnect clutch transfer function varies from the estimated driveline disconnect clutch torque.

In this way, a transfer function that describes torque transferred by a driveline disconnect clutch may be adapted. Each driveline disconnect clutch application pressure in the transfer function may be adapted in this way so that the entire transfer function may be revised as the vehicle ages.

The methods and systems of FIGS. 1-3 and 41-44 also provide a driveline disconnect clutch adaptation method, comprising: adjusting application force of a driveline disconnect clutch in a vehicle driveline in response to a torque sensor while an engine in the vehicle driveline is not combusting air and fuel. In this way, a driveline disconnect clutch transfer function may be adapted to improve vehicle drivability. The method further comprises adapting a transfer function of the driveline disconnect clutch in response to the torque sensor. The method includes where a transfer function of the driveline disconnect clutch is adapted in response to a response of driveline components.

In some examples, the method includes where adjusting application of the driveline disconnect clutch is based on increasing driveline disconnect clutch application pressure from a condition where the driveline disconnect clutch is open. The method includes where a driveline integrated starter/generator is rotating during adjusting application of the driveline disconnect clutch. The method includes where a transmission lock-up clutch is open during adjusting application of the driveline disconnect clutch.

The methods and systems of FIGS. 1-3 and 41-44 also provide for a driveline disconnect clutch adaptation method, comprising: rotating a torque converter impeller at a speed less than a speed where greater than a threshold percentage of torque at the torque converter impeller is transferred to a torque converter turbine, the torque converter impeller in a vehicle driveline; and adjusting application force of a driveline disconnect clutch in the vehicle driveline in response to a torque sensor while an engine in the vehicle driveline is not combusting air and fuel. The driveline disconnect clutch adaptation method includes where the speed is less than 700 RPM.

In one example, the driveline disconnect clutch adaptation method includes where the application force is adjusted via adapting a driveline disconnect clutch transfer function. The driveline disconnect clutch adaptation method further comprises increasing a driveline disconnect clutch command and adjusting the driveline disconnect clutch transfer function based on output of the torque sensor. The driveline disconnect clutch adaptation method further comprises commanding opening of a torque converter clutch. The driveline disconnect clutch adaptation method includes where the torque converter impeller is rotated via a driveline integrated starter/generator. The driveline disconnect clutch adaptation method includes where the driveline integrated starter/generator rotates at a speed that generates a threshold transmission oil pressure that holds a transmission clutch in an applied state. The driveline disconnect clutch adaptation method includes where the torque converter impeller rotates at a speed greater than a speed of the torque converter turbine.

The methods and systems of FIGS. 1-3 and 41-44 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to adjust an estimate of torque transferred through the driveline disconnect clutch in response to a torque sensor output. The vehicle system includes where the engine is not combusting air and fuel.

In some examples, the vehicle system further comprises rotating the DISG at a speed below which a threshold percent of DISG torque is transferred to the transmission. The vehicle system further comprises a torque converter including a torque converter clutch and additional instructions to open the torque converter clutch while adjusting the estimate of torque transferred through the driveline disconnect clutch. The vehicle system further comprises additional instructions to rotate an impeller of the torque converter at a higher speed than a turbine of the torque converter. The vehicle system further comprises additional instructions to increase a closing force applied to the driveline disconnect clutch.

The methods and systems of FIGS. 1-3 and 41-44 also provide for a driveline disconnect clutch adaptation method, comprising: rotating a torque converter impeller at a first speed; operating an engine in a speed control mode and rotating the engine at a second speed different from the first speed; and adjusting a driveline disconnect clutch transfer function in response to a torque estimate based on engine operating conditions. The method includes where the torque converter impeller is rotated via a driveline integrated starter/generator.

In some examples, the method includes where the second speed is greater than the first speed. The method includes where the second speed is less than the first speed. The method includes where the engine operating conditions are engine speed and engine load. The method further comprises commanding an increase in application force of a driveline disconnect clutch. The method further comprises adjusting engine torque to maintain engine speed at the second speed while commanding the increase in application force of the driveline disconnect clutch.

The methods and systems of FIGS. 1-3 and 41-44 also provide for a driveline disconnect clutch adaptation method, comprising: rotating a torque converter impeller at a first speed; operating an engine in a speed control mode and rotating the engine at a second speed different from the first speed; storing an engine torque output value in response to an open driveline disconnect clutch; incrementally closing the driveline disconnect clutch; and adjusting a driveline disconnect clutch transfer function in response to a difference between a torque estimate based on engine operating conditions and a torque estimate based on the driveline disconnect clutch transfer function.

In one example, the driveline disconnect clutch adaptation method includes where the first speed is less than 700 RPM. The driveline disconnect clutch adaptation method includes where the engine operating conditions are engine speed and load. The driveline disconnect clutch adaptation method includes where the torque estimate based on engine operating conditions is an engine torque minus engine torque stored during the open driveline disconnect clutch. The driveline disconnect clutch adaptation method also includes where engine speed is adjusted via adjusting engine torque during the speed control mode. The driveline disconnect clutch adaptation method includes where the torque converter impeller is rotated via a driveline integrated starter/generator. The driveline disconnect clutch adaptation method includes where the driveline integrated starter/generator rotates at a speed that generates a threshold transmission oil pressure that holds a transmission clutch in an applied state. The driveline disconnect clutch adaptation method includes where the torque converter impeller rotates at a speed greater than a speed of the torque converter turbine.

The methods and systems of FIGS. 1-3 and 41-44 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to adjust an estimate of torque transferred through the driveline disconnect clutch in response to an engine torque estimate. The vehicle system includes where the engine torque estimate is based on engine speed and load.

In some examples, the vehicle system further comprises additional instructions for rotating the DISG and the engine, at a speed below which a threshold percent of DISG torque is transferred to the transmission. The vehicle system further comprises additional instructions for rotating the DISG at a speed that is less than a speed of engine rotation. The vehicle system further comprises additional instructions to perform closed loop engine speed control via adjusting engine torque while estimating the engine torque.

The methods and systems of FIGS. 1-3 and 41-44 also provide for a driveline disconnect clutch adaptation method, comprising: adjusting application force of a driveline disconnect clutch in a vehicle driveline in response to a torque sensor while an engine in the vehicle driveline is not combusting air and fuel. The method further comprises adapting a transfer function of the driveline disconnect clutch in response to the torque sensor. The method includes where a transfer function of the driveline disconnect clutch is adapted in response to a response of driveline components. The method includes where adjusting application of the driveline disconnect clutch is based on increasing driveline disconnect clutch application pressure from a condition where the driveline disconnect clutch is open. The method includes where a driveline integrated starter/generator is rotating during adjusting application of the driveline disconnect clutch. The method includes where a transmission lock-up clutch is open during adjusting application of the driveline disconnect clutch.

The methods and systems of FIGS. 1-3 and 41-44 also provide for a driveline disconnect clutch adaptation method, comprising: rotating a torque converter impeller at a speed less than a speed where greater than a threshold percentage of torque at the torque converter impeller is transferred to a torque converter turbine, the torque converter impeller in a vehicle driveline; and adjusting application force of a driveline disconnect clutch in the vehicle driveline in response to a torque sensor while an engine in the vehicle driveline is not combusting air and fuel. The driveline disconnect clutch adaptation method includes where the speed is less than 700 RPM.

In some examples, the driveline disconnect clutch adaptation method includes where the application force is adjusted via adapting a driveline disconnect clutch transfer function. The driveline disconnect clutch adaptation method further comprises increasing a driveline disconnect clutch command and adjusting the driveline disconnect clutch transfer function based on output of the torque sensor. The driveline disconnect clutch adaptation method further comprises commanding opening of a torque converter clutch. The driveline disconnect clutch adaptation method includes where the torque converter impeller is rotated via a driveline integrated starter/generator. The driveline disconnect clutch adaptation method includes where the driveline integrated starter/generator rotates at a speed that generates a threshold transmission oil pressure that holds a transmission clutch in an applied state. The driveline disconnect clutch adaptation method includes where the torque converter impeller rotates at a speed greater than a speed of the torque converter turbine.

The methods and systems of FIGS. 1-3 and 41-44 also provide for a vehicle system, comprising: an engine; a dual mass flywheel including a first side mechanically coupled to the engine; a driveline disconnect clutch mechanically including a first side coupled to a second side of the dual mass flywheel; a driveline integrated starter/generator (DISG) including a first side coupled to a second side of the driveline disconnect clutch; a transmission selectively coupled to the engine via the driveline disconnect clutch; and a controller including executable instructions stored in non-transitory memory to adjust an estimate of torque transferred through the driveline disconnect clutch in response to a torque sensor output.

In one example, the vehicle system includes where the engine is not combusting air and fuel. The vehicle system further comprises rotating the DISG at a speed below which a threshold percent of DISG torque is transferred to the transmission. The vehicle system further comprises a torque converter including a torque converter clutch and additional instructions to open the torque converter clutch while adjusting the estimate of torque transferred through the driveline disconnect clutch. The vehicle system further comprises additional instructions to rotate an impeller of the torque converter at a higher speed than a turbine of the torque converter. The vehicle system further comprises additional instructions to increase a closing force applied to the driveline disconnect clutch.

The methods and systems described above may infer torque at different locations of a torque converter. FIGS. 45-48 describe one example of determining torque at the torque converter impeller and turbine.

Referring now to FIG. 45, a function that describes a torque converter K factor is shown. The torque converter K factor is related to the speed ratio of the torque converter impeller and turbine. The K factor or FIG. 45 may be expressed as:

$$K = fn\left(\frac{N_{turbine}}{N_{impeller}}\right)$$

where K is the torque converter K factor, $N_{turbine}$ is torque converter turbine speed, and $N_{impeller}$ is torque converter impeller speed, an fn is a function describing the K factor. Then, torque at the torque converter impeller may be described by:

$$T_{imp} = 1.558 \cdot \frac{N_{impeller}^2}{K^2}$$

where $T_{imp}$ is torque converter impeller torque, and where 1.558 is a conversion factor from ft-lbf to N-m. The above relationships hold for speed ratios <1.

Referring now to FIG. 46, a function that describes a torque converter capacity factor as a function of a ratio of torque converter impeller speed to torque converter turbine speed is shown. The capacity factor is related to the K factor according to the equation:

$$\text{Capacity\_Factor} = \frac{1}{K^2}$$

where Capacity_Factor is the torque converter capacity factor and where K is the torque converter K factor described above. The function described in FIG. 46 may be used in conjunction with the functions described in FIGS. 47 and 48 to model behavior of a torque converter. The individual entries that form the curve shown in FIG. 46 may be empirically determined and stored in controller memory.

Referring now to FIG. 47, a function that describes a torque converter torque ratio (TR) as a function of a ratio of torque converter impeller speed to torque converter turbine speed is shown. The function described in FIG. 47 may be used in conjunction with the functions described in FIGS. 46 and 48 to model behavior of a torque converter. The individual entries that form the curve shown in FIG. 47 may be empirically determined and stored in controller memory. The function shown in FIG. 47 includes a Y axis that represents a torque converter torque ratio. The X axis represents the torque converter impeller to turbine speed ratio. It may be observed that there is an inverse relationship between torque converter torque ratio and torque converter impeller to turbine speed ratio. The TR may be described as:

$$TR = fn\left(\frac{N_{turbine}}{N_{impeller}}\right)$$

where TR is the torque converter torque ratio, fn is a function describing the torque ratio, $N_{turbine}$ is torque converter turbine speed, and $N_{impeller}$ is torque converter impeller speed. The torque converter torque ratio is related to the torque converter impeller speed via the equation:

$$T_{turbine} = T_{impeller} \cdot TR \quad \text{or}$$

$$T_{turbine} = 1.558 \cdot \frac{N_{impeller}^2}{K^2} \cdot TR$$

Figure 48:
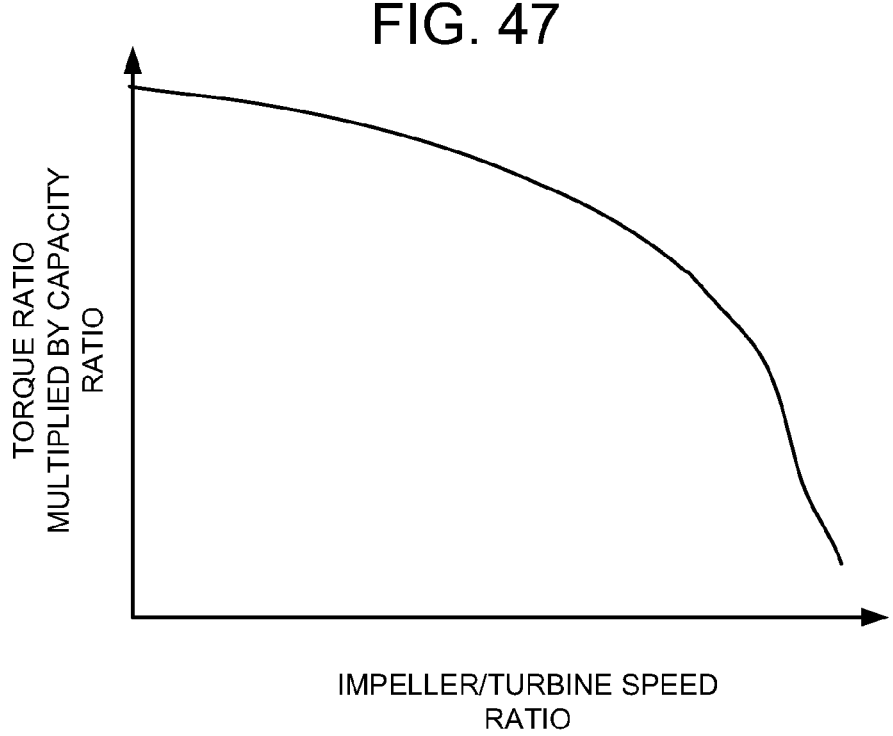

Referring now to FIG. 48, a function that describes a torque converter capacity factor of FIG. 46 multiplied by the torque converter torque ratio of FIG. 47 as a function of a ratio of torque converter impeller speed to torque converter turbine speed is shown.

The function described in FIG. 48 may be used in conjunction with the functions described in FIGS. 46 and 47 to model behavior of a torque converter. The individual entries that form the curve shown in FIG. 48 may be empirically determined and stored in controller memory. The function shown in FIG. 48 includes a Y axis that represents a torque converter capacity factor multiplied by the torque converter torque ratio. The Y axis represents the torque converter impeller to turbine speed ratio.

In one example, the function in FIG. 46 is indexed by the ratio of torque converter impeller speed to torque converter turbine speed and its output is multiplied by the torque converter impeller speed squared to provide an estimate of torque converter impeller torque. The function in FIG. 47 is indexed by the ratio of torque converter impeller speed to torque converter turbine speed and its output is multiplied by the function in FIG. 48 to provide an estimate of torque converter turbine torque. The torque across the torque converter is the difference between the torque converter impeller torque and the torque converter turbine torque. Of course, inverse operations to determine torque converter impeller speed and torque converter turbine speed may also be performed.

Thus, operation of a torque converter may be estimated according to a model comprising the functions described in FIGS. 45-48. In particular, the torque converter may provide an estimate of torque converter impeller torque or torque converter turbine torque as an estimate of DISG torque or wheel torque since the torque converter is mechanically coupled to the DISG and the transmission.

As will be appreciated by one of ordinary skill in the art, methods described in FIGS. 4-44 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling driveline braking, comprising:
    idling an engine combusting air and fuel with an open disconnect clutch; and
    during a first condition,
        stopping rotation of the engine;
        providing driveline braking via an electric machine while rotation of the engine is stopped;
        operating the electric machine in a speed control mode in response to a request to provide driveline braking via the engine;
        starting the engine;
        accelerating the engine to a speed of the electric machine; and
        closing the open driveline disconnect clutch in response to engine speed substantially equaling electric machine speed.

2. The method of claim 1, wherein engine idling includes operating the engine without providing engine torque to a driveline in response to driver demanded torque being within a threshold range of an engine cranking torque.

3. The method of claim 2, where the engine is started via a starter other than the electric machine.

4. The method of claim 2, where the request to provide driveline braking via the engine is based on a state of charge of an energy storage device.

5. The method of claim 4, where the request to provide driveline braking via the engine is in response to the state of charge of the energy storage device being greater than a threshold amount of charge.

6. The method of claim 2, further comprising adjusting slip of a torque converter clutch in response to closing the open driveline disconnect clutch, where the slip of the torque converter clutch is increased.

7. The method of claim 1, further comprising, during a second condition, increasing engine speed from idle speed to a speed synchronous with the electric machine, and closing the disconnect clutch.

8. A method for controlling driveline braking, comprising:
    stopping an engine with a disconnect clutch open;
    providing driveline braking via an electric machine while engine rotation is stopped;
    starting and rotating the engine;
    injecting fuel to the engine;
    accelerating the engine to a speed of the electric machine; and
    discontinuing to inject fuel to the engine and providing driveline braking via the engine while the electric machine outputs less than a threshold amount of current.

9. The method of claim 8, further comprising closing the driveline disconnect clutch in response to engine speed substantially equaling electric machine speed.

10. The method of claim 9, further comprising operating the electric machine in a speed control mode during closing the driveline disconnect clutch.

11. The method of claim 9, further comprising increasing slip of a torque converter clutch during closing the driveline disconnect clutch.

12. The method of claim 8, where the engine is started in response to charge of an energy storage device exceeding a threshold charge.

13. The method of claim 12, where electric machine torque is reduced in response to engine braking torque increasing after discontinuing to inject fuel to the engine.

14. The method of claim 8, where the engine is started via a starter other than the electric machine.

15. A vehicle system, comprising:
    an engine;
    a dual mass flywheel (DMF) including a first side mechanically coupled to the engine;
    a driveline disconnect clutch mechanically including a first side coupled to a second side of the dual mass flywheel;

a driveline integrated starter/generator (DISG) including a first side coupled to a second side of the driveline disconnect clutch;

a starter other than the DISG including a base state where the starter is not engaged to the engine;

a transmission selectively coupled to the engine via the driveline disconnect clutch; and a controller including non-transitory instructions executable to idle the engine while the disconnect clutch is open, automatically stop the engine, provide driveline braking via the DISG while engine rotation is stopped, start the engine in response to a state of charge of an energy storage device, stop combustion in the engine while the engine is rotating, and provide driveline braking via the engine.

16. The vehicle system of claim 15, further comprising additional instructions to accelerate the engine to a speed of the DISG.

17. The vehicle system of claim 16, further comprising additional instructions to close the driveline disconnect clutch when engine speed is substantially equal to DISG speed, and wherein during idling, said engine is operated by the controller to perform combustion without providing engine torque to a driveline.

18. The vehicle system of claim 15, further comprising additional instructions for starting the engine via the starter other than the DISG.

19. The vehicle system of claim 18, further comprising additional instructions for stopping combustion in engine cylinders after starting the engine.

20. The vehicle system of claim 19, further comprising additional instructions for adjusting engine braking after stopping combustion in engine cylinders.

* * * * *